US009087394B1

(12) United States Patent
Zimmerman

(10) Patent No.: US 9,087,394 B1
(45) Date of Patent: Jul. 21, 2015

(54) COMPUTER HARDWARE ARCHITECTURE AND DATA STRUCTURES FOR PACKET BINNING TO SUPPORT INCOHERENT RAY TRAVERSAL

(71) Applicant: RAYCAST SYSTEMS, INC., Pleasanton, CA (US)

(72) Inventor: Alvin D. Zimmerman, Pleasanton, CA (US)

(73) Assignee: Raycast Systems, Inc., Pleasanton, CA (US)

( * ) Notice: Subject to any disclaimer, the term of this patent is extended or adjusted under 35 U.S.C. 154(b) by 0 days.

(21) Appl. No.: 14/179,962

(22) Filed: Feb. 13, 2014

Related U.S. Application Data

(60) Provisional application No. 61/939,372, filed on Feb. 13, 2014.

(51) Int. Cl.

| | |
|---|---|
| ***G09G 5/36*** | (2006.01) |
| ***G06T 1/60*** | (2006.01) |
| ***G06T 15/06*** | (2011.01) |
| ***G06T 1/20*** | (2006.01) |

(52) U.S. Cl.
CPC ... *G06T 1/60* (2013.01); *G06T 1/20* (2013.01); *G06T 15/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,486,848 | A | 12/1984 | Kaminski | |
| 4,952,922 | A | 8/1990 | Griffin et al. | |
| 5,058,042 | A | 10/1991 | Hanna et al. | |
| 5,283,859 | A | 2/1994 | Quarendon et al. | |
| 5,313,568 | A | 5/1994 | Wallace et al. | |
| 5,488,700 | A | 1/1996 | Glassner | |
| 5,594,844 | A | 1/1997 | Sakai et al. | |
| 5,966,134 | A | 10/1999 | Arias | |
| 6,262,738 | B1 | 7/2001 | Gibson et al. | |
| 6,344,852 | B1 | 2/2002 | Zhu et al. | |
| 6,529,194 | B1 | 3/2003 | Yamaguchi | |
| 6,539,413 | B1 | 3/2003 | Goldovsky | |
| 6,556,200 | B1 | 4/2003 | Pfister et al. | |
| 6,597,359 | B1 | 7/2003 | Lathrop | |
| 6,654,012 | B1 | 11/2003 | Lauer et al. | |
| 6,765,574 | B1 | 7/2004 | Mao et al. | |
| 6,828,978 | B2 * | 12/2004 | Buehler | 345/543 |
| 6,862,025 | B2 | 3/2005 | Buehler | |
| 6,868,477 | B2 | 3/2005 | Hoskins et al. | |
| 6,957,309 | B1 * | 10/2005 | Gupta et al. | 711/154 |

(Continued)

OTHER PUBLICATIONS

Humphrey's, Greg, "WireGL: A Scalable Graphics System for Clusters", {Proceedings of the 28th Annual Conference on Computer Graphics and Interactive Techniques, 2001}, ACM Digital Library, SIGGRAPH '01, pp. 129-140, [retrieved on Apr. 21, 2014]. Retrieved from the Internet <URL: http://dl.acm.org/citation.cfm?id=383272>.*

(Continued)

*Primary Examiner* — Stephen R Koziol
*Assistant Examiner* — Terrell Robinson
(74) *Attorney, Agent, or Firm* — Fountainhead Law Group P.C.

(57) ABSTRACT

A new hardware architecture defines an indexing and encoding method for accelerating incoherent ray traversal. Accelerating multiple ray traversal may be accomplished by organizing the rays for minimal movement of data, hiding latency due to external memory access, and performing adaptive binning. Rays may be binned into coarse grain and fine grain spatial bins, independent of direction.

21 Claims, 103 Drawing Sheets

(56) References Cited

U.S. PATENT DOCUMENTS

| | | | | |
|---|---|---|---|---|
| 6,963,644 | B1 | 11/2005 | Matsuzaki et al. | |
| 6,975,318 | B2 | 12/2005 | Junkins et al. | |
| 6,987,683 | B2 | 1/2006 | Ao | |
| 7,164,420 | B2 | 1/2007 | Ard | |
| 7,272,607 | B2 | 9/2007 | Udeshi et al. | |
| 7,369,126 | B1 | 5/2008 | Hakura | |
| 7,495,664 | B2 | 2/2009 | Keller et al. | |
| 7,499,053 | B2 | 3/2009 | Keller et al. | |
| 7,519,603 | B2 | 4/2009 | Parker | |
| 7,567,248 | B1 | 7/2009 | Mark et al. | |
| 7,596,639 | B2 | 9/2009 | Ellis et al. | |
| 7,830,379 | B2 * | 11/2010 | Peterson et al. | 345/426 |
| RE42,092 | E * | 2/2011 | Tompkins et al. | 370/412 |
| 7,952,583 | B2 | 5/2011 | Waechter et al. | |
| 8,115,763 | B2 | 2/2012 | Woop et al. | |
| 8,149,238 | B2 | 4/2012 | Buyanovskiy | |
| 8,189,001 | B2 * | 5/2012 | Bakalash | 345/424 |
| 8,243,081 | B2 | 8/2012 | Shearer | |
| 8,248,416 | B2 * | 8/2012 | Keller et al. | 345/426 |
| 8,253,730 | B1 | 8/2012 | Carr | |
| 8,284,188 | B1 | 10/2012 | Lauterbach et al. | |
| 8,521,962 | B2 | 8/2013 | Reddy et al. | |
| 8,570,322 | B2 | 10/2013 | Hanika et al. | |
| 8,619,078 | B2 * | 12/2013 | Mejdrich et al. | 345/426 |
| 8,817,026 | B1 | 8/2014 | Zimmerman | |
| 8,842,117 | B1 | 9/2014 | Zimmerman | |
| 8,928,675 | B1 | 1/2015 | Zimmerman | |
| 8,947,447 | B1 | 2/2015 | Zimmerman | |
| 8,952,963 | B1 | 2/2015 | Zimmerman | |
| 2003/0095134 | A1 | 5/2003 | Tuomi et al. | |
| 2003/0122815 | A1 | 7/2003 | Deering | |
| 2003/0160798 | A1 | 8/2003 | Buehler | |
| 2003/0234789 | A1 | 12/2003 | Gritz | |
| 2004/0100465 | A1 | 5/2004 | Stowe et al. | |
| 2004/0183802 | A1 | 9/2004 | Chan | |
| 2004/0233207 | A1 | 11/2004 | Morphet | |
| 2005/0057564 | A1 | 3/2005 | Liao et al. | |
| 2005/0116951 | A1 | 6/2005 | Stephenson | |
| 2005/0140684 | A1 | 6/2005 | Buehler | |
| 2006/0139350 | A1 | 6/2006 | Reshetov et al. | |
| 2007/0040830 | A1 | 2/2007 | Papageorgiou | |
| 2007/0132754 | A1 | 6/2007 | Reshetov et al. | |
| 2007/0132772 | A1 | 6/2007 | Morphet | |
| 2007/0206008 | A1 | 9/2007 | Kaufman et al. | |
| 2007/0262989 | A1 | 11/2007 | Buyanovskiy | |
| 2008/0013535 | A1 * | 1/2008 | Khacherian et al. | 370/389 |
| 2008/0024489 | A1 | 1/2008 | Shearer | |
| 2008/0088619 | A1 | 4/2008 | Shearer et al. | |
| 2008/0150944 | A1 | 6/2008 | Reshetov et al. | |
| 2008/0159651 | A1 | 7/2008 | Stoll et al. | |
| 2008/0231627 | A1 | 9/2008 | Shearer | |
| 2008/0256271 | A1 * | 10/2008 | Breed | 710/52 |
| 2008/0259075 | A1 | 10/2008 | Fowler et al. | |
| 2009/0049452 | A1 | 2/2009 | Kriegel et al. | |
| 2009/0102844 | A1 | 4/2009 | Deparis | |
| 2009/0157997 | A1 | 6/2009 | Leonenko | |
| 2009/0172348 | A1 | 7/2009 | Cavin | |
| 2009/0225080 | A1 | 9/2009 | Keller et al. | |
| 2009/0256845 | A1 | 10/2009 | Sevastianov et al. | |
| 2009/0322752 | A1 | 12/2009 | Peterson et al. | |
| 2010/0033493 | A1 | 2/2010 | Nutter et al. | |
| 2010/0082704 | A1 | 4/2010 | Zhou et al. | |
| 2010/0141666 | A1 | 6/2010 | Christopher et al. | |
| 2010/0194751 | A1 | 8/2010 | Wald et al. | |
| 2011/0080419 | A1 | 4/2011 | Croxford et al. | |
| 2011/0227936 | A1 | 9/2011 | Redshaw | |
| 2011/0283059 | A1 | 11/2011 | Govindarajan et al. | |
| 2012/0082373 | A1 | 4/2012 | Mebane | |
| 2012/0086717 | A1 | 4/2012 | Liu | |
| 2012/0133654 | A1 | 5/2012 | Redgrave et al. | |
| 2012/0139926 | A1 | 6/2012 | Clohset et al. | |
| 2012/0169728 | A1 | 7/2012 | Mora | |
| 2012/0249553 | A1 | 10/2012 | Peterson et al. | |
| 2012/0293515 | A1 | 11/2012 | Clarberg et al. | |
| 2013/0002673 | A1 | 1/2013 | Xue et al. | |
| 2013/0113800 | A1 | 5/2013 | McCombe et al. | |
| 2013/0124823 | A1 | 5/2013 | Cavin | |
| 2013/0314417 | A1 | 11/2013 | Buyanovskly | |

OTHER PUBLICATIONS

J. Arvo and D. Kirk, A Survey of Ray Tracing Acceleration Techniques, In A. S. Glassner, editor, An Introduction to Ray Tracing. Academic Press, San Diego, CA, 1989.

Ares Lagae & Philip Dutré†, "Compact, Fast and Robust Grids for Ray Tracing," Eurographics Symposium on Rendering 2008.

D. Jevans and B. Wyvill, "Adaptive Voxel Subdivision for Ray Tracing," Proceedings of Graphics Interface '89, pp. 164-172, Jun. 1989.

K. S. Klimaszewski and T. W. Sederberg, "Faster Ray Tracing Using Adaptive Grids", IEEE CG&A, 17(1):42-51, Jan./Feb. 1997.

Thiago Ize, Peter Shirley, and Steven G. Parker, "Grid Creation Strategies for Efficient Ray Tracing", Proceedings of the 2007 IEEE Symposium on Interactive Ray Tracing, 6 pages.

J. David MacDonald and Kellogg S. Booth, "Heuristics for Ray Tracing Using Space Subdivision", The Visual Computer 1990, 6:153-166.

Steven Molnar, Michael Cox, David Ellsworth, and Henry Fuchs, "A Sorting Classification of Parallel Rendering", IEEE Computer Graphics and Applications 14(4):23-32, 1994, pp. 1-11.

John Amanatides and Andrew Woo, "A Fast Voxel Traversal Algorithm for Ray Tracing", (1987) Eurographics '87, 6 pages.

Alexander Reshetov, Alexei Soupikov, and Jim Hurley, "Multi-Level Ray Tracing Algorithm", ACM Trans. on Graphics , 2005, pp. 1176-1185.

Pavel Hradský, "Utilising OpenCL Framework for Ray-Tracing Acceleration", Master's thesis, Czech Technical University in Prague, Faculty of Electrical Engineering, Jan. 2011, 87 pages.

Timo Aila and Tero Karras, "Architecture Considerations for Tracing Incoherent Rays", High Performance Graphics, 2010, 10 pages.

Javor Kalojanov, Markus Billeter, and Philipp Slusallek, "Two-Level Grids for Ray Tracing on GPUs", Eurographics 2010, vol. 30, No. 2, 2010, 8 pages.

Alexandre S. Nery, Nadia Nedjah, and Felipe Franca, "GridRT: A Massively Parallel Architecture for Ray-Tracing Using Uniform Grids", Euromicro Conferece on Digital System Design, Architectures, Methods and Tools, IEEE Computer Society, 2009, pp. 211-216.

Biagio Cosenza, "A Survey on Exploiting Grids for Ray Tracing", Eurographics Italian Chapter Conference 2008, pp. 89-96.

Steve Glazer, Sara Jackson, and Samuel Milton, "Parallel Ray Tracing", 4005-735-01, 2012.

Samuli Laine and Tero Karras, "Efficient Sparse Voxel Octrees", ACM SIGGRAPH Symposium on Interactive 3D Graphics and Games 2010, 9 pages.

Alexandre S. Nery, Nadia Nedjah, Felipe M.G. Franca, and Lech Jozwiak, "Massively Parallel Identification of Intersection Points for GPGPU Ray Tracing", ICA3PP 2011 Workshops, Part II, LNCS 7017, pp. 14-23.

Cyril Crassin et al., "CloudLight: A System for Amortizing Indirect Lighting in Real-Time Rendering," NVIDIA Technical Report, NVR-2013-001, Jul. 2013, 10 pages.

Ingo Wald, "Realtime Ray Tracing and Interactive Global Illumination," Thesis, Computer Graphics Group, Saarland University, Saarbrucken, submitted Jan. 21, 2001, defended May 3, 2004Germany, 311 pages.

NonFinal Office Action mailed Apr. 23, 2014 in U.S. Appl. No. 14/179,879, 21 pages.

NonFinal Office Action mailed Apr. 24, 2014 in U.S. Appl. No. 14/179,902, 23 pages.

NonFinal Office Action mailed May 1, 2014 in U.S. Appl. No. 14/180,031, 15 pages.

NonFinal Office Action mailed May 8, 2014 in U.S. Appl. No. 14/180,006, 18 pages.

NonFinal Office Action mailed May 13, 2014 in U.S. Appl. No. 14/179,824, 21 pages.

Notice of Allowance mailed on May 15, 2014 in U.S. Appl. No. 14/180,068, 9 pages.

U.S. Appl. No. 14/312,889, filed Jun. 24, 2014.

(56) References Cited

OTHER PUBLICATIONS

U.S. Appl. No. 14/570,924, filed Dec. 15, 2014.
U.S. Appl. No. 14/553,698, filed Nov. 25, 2014.
U.S. Appl. No. 14/596,911, filed Jan. 14, 2015.
Paul Bourke, Beginners Guide to Bitmaps, Nov. 1993, http://paulbourke.net/dataformats/bitmaps/.
Notice of Allowance mailed on Jul. 23, 2014 in U.S. Appl. No. 14/179,879; 8 pages.
Notice of Allowance mailed on Aug. 12, 2014 in U.S. Appl. No. 14/180,031; 8 pages.
Final Office Action mailed on Sep. 17, 2014 in U.S. Appl. No. 14/179,824; 26 pages.
NonFinal Office Action mailed on Sep. 19, 2014 in U.S. Appl. No. 14/312,889; 9 pages.
Alexandre S. Nery, et al.; "An Efficient Parallel Architecture for Ray-Tracing," Journal; Analog Integrated Circuits and Signal Processing, vol. 70, Issue 2, pp. 189-202; Feb. 2012.
Aila et al.: "Understanding the efficiency of ray traversal on GPUs—Kepler and Fermi Addendum". NVIDIA Technical Report NVR-2012-02; pp. 4.
Eisenacher, C., Nichols, G., Selle, A., and Burley, B. 2013. Sorted deferred shading for production path tracing. EG Symposium on Rendering, vol. 32, No. 4, pp. 8.
Hillis, W., and Steele, G., Jr. 1986. Data parallel algorithms. ACM vol. 29, No. 12. pp. 14.
Ize, T., Wald, I., Robertson, C., and Parker, S. 2006. An evaluation of parallel grid construction for ray tracing dynamic scenes. Symposium on Interactive Ray Tracing, pp. 8.
Laine, S., Karras, T., and Aila, T. 2013. Megakernels considered harmful: wavefront path tracing on GPUs. HPG; pp. 7.
Moon, B., Byun, Y., Kim, T., and Claudio, P. 2010. Cache-oblivious ray reordering. ACM TOG, vol. 29, No. 3, Article 28, Jun. 2010, pp. 9.
Purcell, T., Buck, I., Mark, W., and Hanrahan, P. 2002. Ray tracing on programmable graphics hardware. ACM Trans. Graph 21, 3, pp. 9.
Wald, I., Ize, T., Kensler, A., Knoll, A., and Parker, S. 2006. Ray tracing animated scenes using coherent grid traversal. ACM TOG 25, 3, pp. 9.
Notice of Allowance mailed Nov. 24, 2014 in U.S. Appl. No. 14/312,889; 12 pages.
Notice of Allowance mailed Mar. 6, 2015 in U.S. Appl. No. 14/179,824; 16 pages.
Invitation to Pay Additional Fees mailed Apr. 23, 2015 for PCT Application Serial No. PCT/US15/14483, 4 pages.

* cited by examiner

Relative to Absolute Encoder Truth Table

| INPUTS | | OUTPUTS |
|---|---|---|
| index (relative) | block bitmap | cell address (absolute) |
| 0 0 [0] | 1 x x x | 0 0 |
| 0 0 [0] | 0 1 x x | 0 1 |
| 0 0 [0] | 0 0 1 x | 1 0 |
| 0 0 [0] | 0 0 0 1 | 1 1 |
| 0 1 [1] | 1 1 x x | 0 1 |
| 0 1 [1] | 1 0 1 x | 1 0 |
| 0 1 [1] | 1 0 0 1 | 1 1 |
| 0 1 [1] | 0 1 1 x | 1 0 |
| 0 1 [1] | 0 1 0 1 | 1 1 |
| 0 1 [1] | 0 0 1 1 | 1 1 |
| 1 0 [2] | 1 1 1 x | 1 0 |
| 1 0 [2] | 1 1 0 1 | 1 1 |
| 1 0 [2] | 1 0 1 1 | 1 1 |
| 1 0 [2] | 0 1 1 1 | 1 1 |
| 1 1 [3] | 1 1 1 1 | 1 1 |

x = '0' or '1' (don't care)
numbers in brackets are decimal

Fig. 5

Absolute to Relative Encoder Truth Table

| INPUTS | | OUTPUTS |
|---|---|---|
| cell address (absolute) | block bitmap | index (relative) |
| 0 0 | 1 x x x | 0 0 [0] |
| 0 1 | 0 1 x x | 0 0 [0] |
| 0 1 | 1 1 x x | 0 1 [1] |
| 1 0 | 0 0 1 x | 0 0 [0] |
| 1 0 | 1 0 1 x | 0 1 [1] |
| 1 0 | 0 1 1 x | 0 1 [1] |
| 1 0 | 1 1 1 x | 1 0 [2] |
| 1 1 | 0 0 0 1 | 0 0 [0] |
| 1 1 | 1 0 0 1 | 0 1 [1] |
| 1 1 | 0 1 0 1 | 0 1 [1] |
| 1 1 | 0 0 1 1 | 0 1 [1] |
| 1 1 | 1 1 0 1 | 1 0 [2] |
| 1 1 | 1 0 1 1 | 1 0 [2] |
| 1 1 | 0 1 1 1 | 1 0 [2] |
| 1 1 | 1 1 1 1 | 1 1 [3] |

x = '0' or '1' (don't care)
numbers in brackets are decimal

Fig. 7

Block_Mem_Ptr, 224 — Level

| Block_Mem_Ptr | Block_Mem (214) | Addr_Offset (216) | Frmt_Code (218) | Level |
|---|---|---|---|---|
| 00 | 0 1 1 0 | 01 | . . . | 1 |
| 01 | 0 0 1 0 | 02 | . . . | 2 |
| 02 | 0 1 0 0 | 02 | . . . | 2 |
| 03 | 0 0 1 1 | 0 | 1 | 3 |
| 04 | 1 1 0 0 | 2 | 2 | 3 |
| 05 | | | | |
| 06 | | | | |
| | ⋮ | ⋮ | ⋮ | |

COMPUTER HARDWARE ARCHITECTURE AND DATA STRUCTURES FOR PACKET BINNING TO SUPPORT INCOHERENT RAY TRAVERSAL

CROSS REFERENCE TO RELATED APPLICATIONS

This application claims priority to U.S. Provisional App. No. 61/939,372, Feb. 13, 2014 and is incorporated herein by reference in its entirety for all purposes.

This application is related to the following concurrently filed, commonly owned applications, each of which is herein incorporated by reference in its entirety for all purposes:

U.S. application Ser. No. 14/179,824, filed Feb. 13, 2104, titled "Computer Hardware Architecture and Data Structures for Triangle Binning to Support Incoherent Ray Traversal"

U.S. application Ser. No. 14/179,879, filed Feb. 13, 2104, titled "Computer Hardware Architecture and Data Structures for a Grid Traversal Unit to Support Incoherent Ray Traversal"

U.S. application Ser. No. 14/179,902, filed Feb. 13, 2104, titled "Computer Hardware Architecture and Data Structures for Encoders to Support Incoherent Ray Traversal"

U.S. application Ser. No. 14/180,006, filed Feb. 13, 2104, titled "Computer Hardware Architecture and Data Structures for Ray Binning to Support Incoherent Ray Traversal"

U.S. application Ser. No. 14/180,031, filed Feb. 13, 2104, titled "Computer Hardware Architecture and Data Structures for Lookahead Flags to Support Incoherent Ray Traversal"

U.S. application Ser. No. 14/180,068, filed Feb. 13, 2104, titled "Computer Hardware Architecture and Data Structures for a Ray Traversal Unit to Support Incoherent Ray Traversal"

BACKGROUND

Unless otherwise indicated herein, the discussion presented in this section is not admitted prior art to the claims in this application.

Ray tracing is a rendering technique that calculates an image of a scene by simulating the way rays of light travel in the real world. The process includes casting rays of light from a viewer (e.g., eye, camera, etc.) backwards through a viewing plane and into a scene. The user specifies the location of the viewer, light sources, and a database of objects including surface texture properties of objects, their interiors (if transparent) and any atmospheric media such as fog, haze, fire, and the like.

For every pixel in the final image, one or more viewing rays are shot from the camera into the scene to see if it intersects with any of the objects in the scene. These "viewing rays" originate from the viewer, represented by the camera, and pass through the viewing window, which represents the final image. When the ray hits an object, the material properties of that object are computed, and further rays can be launched for specular reflectivity, shadow effects, illumination effects, and so on.

Before a ray can be evaluated against an intersecting object, the object and its point of intersection with the ray must first be identified. At the core of any ray tracing system, are the acceleration structures that facilitate ray traversal through a scene in order to identify such intersections. Since ray traversal is a computationally intense activity, it is not surprising that numerous ray tracing acceleration structures and techniques have been developed over the years.

BRIEF DESCRIPTION OF THE DRAWINGS

With respect to the discussion to follow, and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow taken with the drawings make apparent to those of skill in the art how embodiments in accordance with the present disclosure may be practiced. In the accompanying drawings:

FIG. 5 shows an example of a truth table that defines the RtAE encoders shown in FIGS. 4A and 4B.

FIG. 7 shows an example of a truth table that defines the AtRE encoder shown in FIG. 6.

FIGS. 9A-9H, 9F-1, 9F-2, and 9G-1-9G-3 illustrate the process flow of FIG. 8 using an illustrative example.

FIGS. 16A-16E, 16A-1, 16B-1, and 16C-1 show additional details of the arithmetic modules 1432-1436 shown in FIG. 14.

FIGS. 25, 25A-25E, 25C-1, and 25C-2 show additional details for comparator module 1438*c* shown in FIG. 14.

FIGS. 35A-1, 35A-2, and 35B-35M illustrate various aspects of surface ray binning.

DETAILED DESCRIPTION

Figure 1:
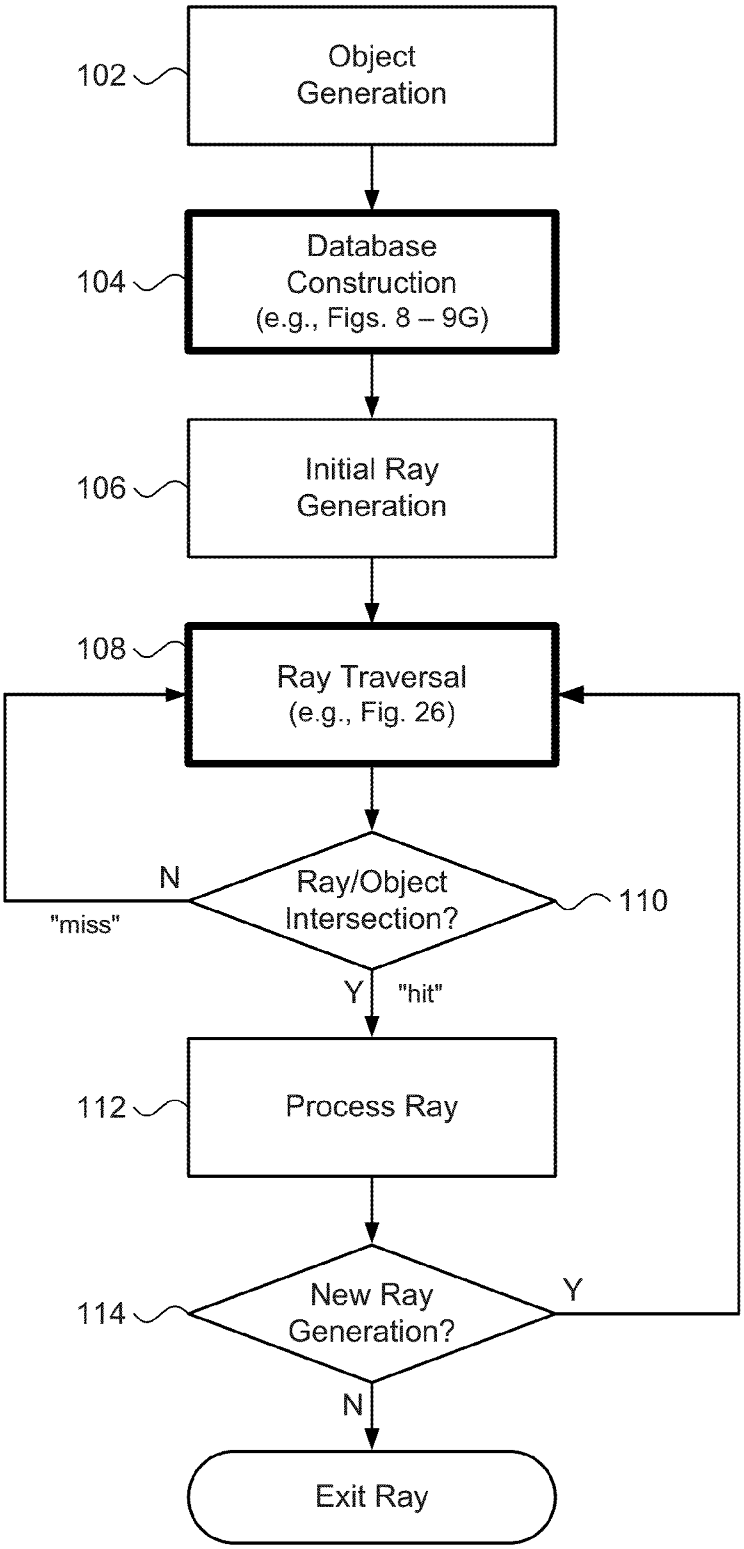
FIG. 1 shows a high level flow for ray traversal in accordance with the present disclosure.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

The following specification and accompanying figures are organized into three major parts to disclose a ray traversal acceleration structure in accordance with principles of the present disclosure. In Part I, the basic principles for an architecture including hardware logic, pseudo-code, and data structures are described to process a single ray in accordance with the present disclosure. Topics of discussion include: ultra-fine grain 3D adaptive spatial subdivision, nested grids, absolute/relative position indexing, high-radix bitmaps, and grid traversal engine. In Part II, an illustrative database engine is described to providing functionality including triangle binning, multi-grid binning/ultra-fine grain, packet binning, multi-definition pointer structure, and on-chip memory partitioning. In Part III, processing of multiple rays is discussed. Topics include coarse/fine grain temporal spatial ray coherence, ray count binning, multi-grid lookahead/ultra-fine grain, self-atomic rays, and ray re-assembly.

In the descriptions that follow, process flows, block diagrams, and pseudo-code fragments will be used to describe various embodiments in accordance with the present disclosure. Because of the processing speed of hardware as compared to software, it may be preferable to implement the disclosed embodiments in hardware; e.g., using digital logic circuits such as application specific ICs (ASICs), digital signal processors (DSPs), field-programmable gate arrays (FPGAs), etc., and combinations thereof. Pseudo-code fragments disclosed herein may be expressed in a suitable hardware description language (HDL) to allow for a hardware implementation, and so on. It is noted, however, that one of ordinary skill will readily appreciate that the process flows, block diagrams, and pseudo-code fragments may also be embodied as software processes instead of hardware (the software being stored in a suitable storage medium such as non-volatile memory), or as a combination of hardware and software. Going forward, therefore, it will be understood that disclosed process flows, block diagrams, and pseudo-code fragments may be embodied using any one of, or combinations of, several suitable hardware and/or software techniques and technologies. Accordingly, terms such as "compute," "calculate," "process," "computation," "calculation," etc., and their various grammatical forms are not to be restricted in meaning to computations performed by software executing on a digital processor, but, can refer to data generated by operation of hardware that does not execute software, including but not limited to adder circuits, multiplication circuits, divider circuits, comparator circuits, and the like, which can be implemented using sequential logic, combinatorial (combinational) logic, registers, digital logic circuits in general, etc.

For simplicity of explanation, the methodology set forth in the present disclosure will be depicted and described as a series of action blocks. It will be understood and appreciated that aspects of the subject matter described herein are not limited by the action blocks illustrated and/or by the order of action blocks. In some embodiments, the action blocks occur in an order as described below. In other embodiments, however, the action blocks may occur in parallel, in another order, and/or with other action blocks not presented and described herein. Furthermore, not all illustrated action blocks may be required to implement the methodology in accordance with aspects of the subject matter described herein. In addition, those skilled in the art will understand and appreciate that the methodology could alternatively be represented as a series of interrelated states via a state diagram, or as events, and so on.

The present disclosure is organized as follows:

PART I—SINGLE RAY
I. SYSTEM OVERVIEW
II. DATABASE CONSTRUCTION—STORING THE SCENE
III. GRID TRAVERSAL UNIT (GTU)
A. GTU
B. GTU Processing
C. GTU Processing Blocks
1. Intersect Ray with Partitioning Planes
2. Ray Current Position/Grid Comparator Array
3. Ray/Grid Intersection Comparator Array
4. Partitioning Planes Intersect Points in Grid
5. Get X_Addr, Y_Addr, Z_Addr for Intersect Points
6. Get Dirty Bits
7. Ray/Grid Block
8. Get Ray Distance Exiting Grid
9. Get Closest Dirty Cell Distance
10. Generate t_min_cell, t_max_cell, XYZ_Addr, Hit/Miss
11. Floating Point GTU Resources
IV. RAY TRAVERSAL PROCESSING
V. EXPANDING SPATIAL RESOLUTION
A. Fail Safe
B. Indexing Resolution
C. Adaptive Radix
D. Format Codes
E. MisMatch
F. Shared Object Structure with Object Pointers Encoding
VI. ULTRA-FINE GRAIN
A. Level 4
1. Level 4 as an Attribute
2. Level 4 as a Header
B. Executing Level 4
1. Level 4 as an Attribute
2. Level 4 as a Header
C. Multiple Rays
D. MisMatch
E. Shared Object Structure with Object Pointers Encoding
VII. RAY ATTRIBUTES
VIII. RAY CASTING APPLICATIONS PROGRAMMING INTERFACE (API)
A. Primitives
B. Objects
C. Ray Casting
PART II—DATABASE ENGINE
I. TRIANGLE BINNING
A. Triangle Vertices in Grid
B. Ray Casting-Based Binning
1. Edge Ray Binning
2. Surface Ray Binning For Surface Rays Along X_Planes
3. Repeat For Surface Rays Along Y_Planes
4. Repeat For Surface Rays Along Z_Planes
5. Load Block_Subdivide_reg
II. PACKET BINNING
III. TRIANGLE BINNING—LEVELS 1, 2, AND 3
IV. MULTI-GRID BINNING AND ULTRA-FINE GRAIN
V. ON-CHIP MEMORY PARTITIONING
A. Triangle Binning
B. Block Memory
1. Adaptive Radix Alignment
2. Alignment
C. Packet Binning
D. Multi—Level Binning/Ultra-Fine Grain
VI. SOME ADDITIONAL ENHANCEMENTS
PART III—MULTIPLE RAYS
I. COHERENCY AMONG INCOHERENT RAYS
II. GROUPING RAYS
A. Coarse grain Binning
B. Fine grain Binning
C. Mismatch Encoding
D. Ray Grouping and Traversal Flow
Hit Processing (“Hit” from block 4604)
Missed Ray Processing (“Miss from block 4604)
E. Ray Access Maps
III. ULTRA-FINE GRAIN LEVEL 4
A. Level 4 Header Table
B. Level 4 Data
C. Parallel Level 4 Comparison
1. Parallel Rays against an Object
2. Parallel Objects against a Ray
IV. MULTI—GRID TRAVERSAL/ULTRA-FINE GRAIN
A. Lookahead Flags
B. Lookahead Traversal/Ultra-Fine Grain
C. Extending GTU Resources
V. RAY MISS—NEXT LEVEL 1 CELL
VI. SELF-ATOMIC RAYS
A. Ray Attributes
B. Triangle Attributes
C. Ray Completion
VII. RAY RE-ASSEMBLY
A. Rays to Objects
B. Ray Order 1$^{st}$ Pass
C. Ray Order 2$^{nd}$ Pass
VIII. RAY COMPACTION
A. Basic Ray Attributes
B. Additional Ray Attributes
C. Ray # Attribute
D. Ray Completion
E. Ray Re-Assembly
F. Multiple Diffuse Rays
IX. RAY TRAVERSAL UNIT
A. Traversal Memory
B. Coarse grain Memory
C. Fine grain Memory, Ray Traversal Unit (RTU)
D. Extended Ray Traversal Unit (RTU)
E. Parallel Ray Traversal Units
F. Level 4
X. TRIANGLE ATTRIBUTES EXTENDED
A. Triangle List
B. Spatial Hierarchy
C. Traversal Triangles

Part I—Single Ray

This part will examine traversal of a single ray. Accelerating random ray traversal in accordance with the present disclosure may be accomplished by providing very low levels of indexing, compaction mechanisms to store data structures on-chip specifically encoded for the operation of grid traversal, an accelerated parallel Grid Traversal Unit (GTU), and minimal movement of data sets for ray intersection tests. The architecture efficiently:

- Removes empty space from the pointer structure
- Manages large polygon scenes
- Tightens ray/polygon proximity before moving data to intersect a ray
- Store pointer structure on-chip
- Traverse incoherent rays
- Stores the pointer structure, and data structure, in linear and contiguous memory
- Adaptively increase spatial resolution for dense polygon regions As will be seen, using a hierarchy of adaptively sized nested grids, the idea of absolute/relative indexing creates an elegance and efficiency to the pointer structure. Construction of the pointer structure in accordance with embodiments of the present disclosure is a function of volume, empty space, and spatial resolution of a 3D scene.

Grid based structures are inherently parallel, and axis-aligned planes greatly reduce the computations required. A disadvantage of grid based structures is object overlap in the bounding cells and the extra data storage for object replication in the data structure.

During ray traversal processing, a ray spends its time in three areas:

- traversing the acceleration structure
- moving data to be tested
- testing the data with ray intersection These can become significant processing bottlenecks when one considers that millions to billions of rays with potentially millions to billions of primitive objects may be processed when rendering a scene.

Moving random data can be expensive in terms of latency, so tight ray/object proximity rejection tests are done to reduce unnecessary data movement. In accelerating a ray hit determination, the tests also accelerate a ray miss determination. The algorithm assigns every bit in the acceleration structure dual-meaning: as a data structure and as a pointer structure.

- First, an absolute position value—meaning is a voxel dirty (occupied, valid)—dirty '1' if voxel has at least one object in it . . . clean '0' if empty.
- Second, a relative order value—meaning is a 'relative' position pointer into the next structure. By treating this bit as relative, versus absolute, the algorithm removes all empty space (with the resolution of the current index level) for the next level of indexing or data storage.

I. System Overview

FIG. 1 illustrates a high level overview of the process of ray traversal, showing the incorporation of aspects of the present disclosure in the context of the process. The process may begin with object generation (block 102) where objects in an image ("scene") to be rendered are created. The objects may then be represented and organized in a database (block 104). Embodiments for database organization in accordance with the present disclosure will be described in more detail below. Ray traversal may then proceed by generating a ray (block 106) and performing a ray traversal of the ray (block 108) through the scene to identify a candidate for intersection testing (block 110). If the ray intersects an object ('Y' branch in block 110), then the ray may be processed (block 112) to determine, for example, the proper color for the pixel that corresponds to the ray, and so on. If another ray is to be generated ('Y' branch in block 114), then the process may be repeated from block 108 with the newly generated ray. Returning to block 110, if the ray does not intersect with an object ('N' branch) in the scene, then processing may return to block 108 to continue traversing the ray through the scene to identify the next candidate for intersection testing. Embodiments for ray traversal in accordance with the present disclosure will be described in more detail below. The discussion will now turn to a description of database organization (block 104) and ray traversal (block 108) in accordance with principles set forth in the present disclosure.

Figure 2:
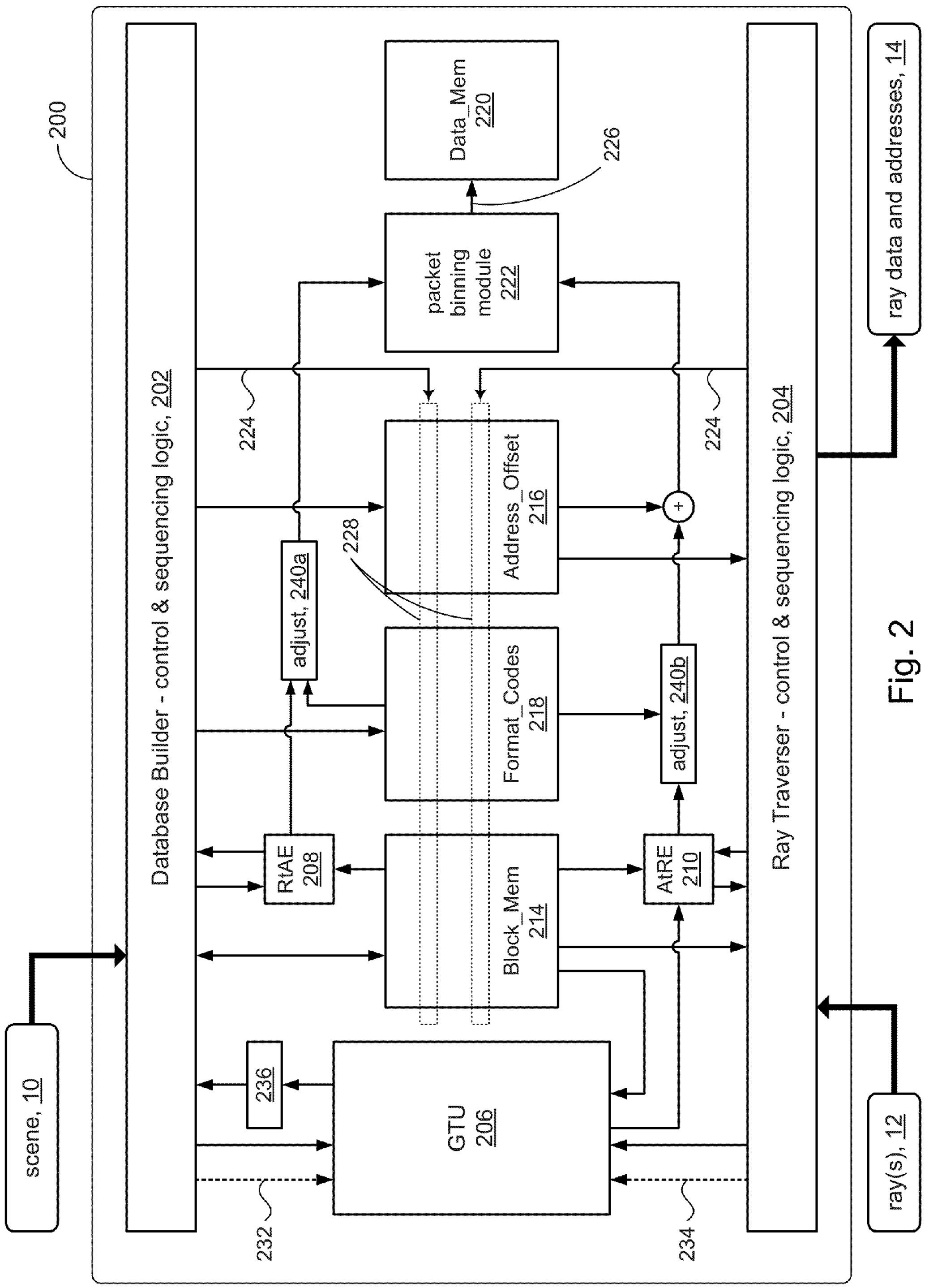
FIG. 2 shows a system block diagram of a ray traversal unit (RTU) in accordance with an illustrative example of an embodiment of the present disclosure.

FIG. 2 shows a high level block diagram of an illustrative ray traversal unit (RTU) 200 for processing a single ray in accordance with the present disclosure for organizing data that represents a scene 10 and for accessing that data to perform ray traversal of rays 12. Briefly, for the purpose of describing FIG. 2, in some embodiments scene 10 may be represented using spatial decomposition to create a hierarchy of adaptively sized nested grids. The scene itself represents the highest level grid (level 1). Each grid may be subdivided into "cells" and represented by a block bitmap (or simply "bitmap"). The cells at one grid level become grids at the next grid level, and so on. The scene 10 may therefore be viewed as comprising a hierarchy of cells. At the highest level in the hierarchy of cells, are the cells that comprise the level 1 grid, namely the scene 10, and are referred to as level 1 cells. At the next level in the hierarchy of cells, the scene comprises level 2 cells; each of the level 1 cells is a level 2 grid comprised of level 2 cells. Level 3 cells comprise the next level in the hierarchy, and so on. Primitive objects comprising the scene 10 may be binned according to the cells that bound the objects entirely or partially. For example, a primitive object that is bound (entirely or partially) in a level 1 cell will also be bound by one or more level 2 cells, one or more level 3 cells, and so on to the last level in the hierarchy. The RTU 200 may perform ray traversal for incoming rays 12 by traversing rays through the scene 10 using the database to generate addresses 14 of ray intersections with objects in scene 10. Additional details will be discussed below.

The RTU 200 may include a suitable data interface to receive data comprising scene 10 and rays 12, and to output intersect addresses (and other information) 14. In some embodiments, the data interface may comprise one or more data ports for connection to other components in a ray tracing system that incorporates RTU 200. In other embodiments, the RTU 200 may read in data comprising the scene 10 from a data file or from another system, and so on.

The RTU 200 may include a database builder 202 that comprises control and sequencing logic to receive data representative of scene 10 and build a database to store the scene for ray traversal. A ray traverser 204 may comprise control and sequencing logic to access the database created by the database builder 202 to traverse rays 12 and identify any intersections with objects in the scene 10. The ray traverser 204 receives rays 12 and produces intersect addresses 14 that identify ray intersections with objects in scene 10 along with other information such as identities of the intersected object and the like.

The database may comprise data stores Block_Mem 214, Address_Offset 216 (Address_Offset_Mem), Format_Codes 218, and Data_Mem 220. For example, the Block_Mem data store 214 may store block bitmaps to represent the scene 10. The format codes may include conversion data to convert from logical addresses, generated during database construction and used during ray traversal, to physical addresses.

The data stores 214-220 may be stored in any suitable configuration of physical memory. In some embodiments, for example, the data stores 214-220 may be blocks of memory in a single physical memory space. In other embodiments, the data stores 214-220 may be individual physical memories, or they may share space among several physical memories, and so on.

The database builder 202 may access corresponding entries 228 in the Block_Mem 214, Address_Offset 216, and Format_Codes 218 data stores using Block_Mem_Ptr 224. Similarly, entries in the Data_Mem data store 220 may be accessed using Data_Mem_Addr 226. In some embodiments, data in the Data_Mem data store 220 may be stored and accessed using packet binning pointers generated by packet binning module 222, which will be discussed in more detail below.

The RTU 200 may include a grid traversal unit (GTU) 206. As will be explained in more detail below, a GTU 206 in accordance with the present disclosure, may comprise arithmetic units (e.g., adders, multipliers, comparators, etc.) configured for parallel operation. The GTU 206 may be configured by the database builder 202 (e.g., using configuration signals 232) to provide arithmetic support for database construction. A Block_Subdivide register 236 stores a block bitmap produced by the GTU 206 and used by the database builder 202 during database construction. The GTU 206 may also be configured by the ray traverser 204 using configuration signals 234 to provide arithmetic support for ray traversal operations.

In accordance with some embodiments of the present disclosure, database construction may use "relative indexing" to create a representation of the scene 10. The RTU 200 includes a relative index to absolute address encoder (RtAE) 208 to generate an absolute address based on a relative index. As will be explained in more detail below, the RtAE 208 is used by the database builder 202 during database construction. The RTU 200 includes an absolute address to relative index encoder (AtRE) 210 to generate a relative index based on an absolute address, and is used by the ray traverser 204 during ray traversal. The concepts of "relative indexing" and "absolute addressing" in accordance with the present disclosure will be discussed in more detail below.

Adjust logic **240*a* may be provided to adjust the absolute address generated by the RtAE 208 based on format codes when producing Data_Mem_Addr 226 during database construction. Adjust logic 240*b*, likewise, may be provided to adjust the production of Data_Mem_Addr 226** during ray traversal.

In accordance with the present disclosure, the RTU 200 provides "binning" of primitive objects that comprise the scene 10. This aspect of the present disclosure will be explained in more detail below, but basically refers to associating (binning) each primitive object with a cell. The information that represents the association between primitive objects and cells may be stored in the Data_Mem data store 220.

In some embodiments, the Data_Mem data store 220 may comprise on-chip memory and off-chip memory. The on-chip memory may not be sufficient to store the amount of data that is created by the database builder 202. Accordingly, in some embodiments, off-chip (external) memory may be provided and managed by the packet binning module 222 to facilitate the movement of data between on-chip memory and off-chip memory. It will be appreciated that, as memory density and memory technology continue to improve, the Data_Mem data store 220 may comprise increasingly more on-chip memory than off-chip memory.

Referring now to FIGS. 3A-3F, some terminology, notations, and conventions relating to database construction will be described.

Figure 3A:
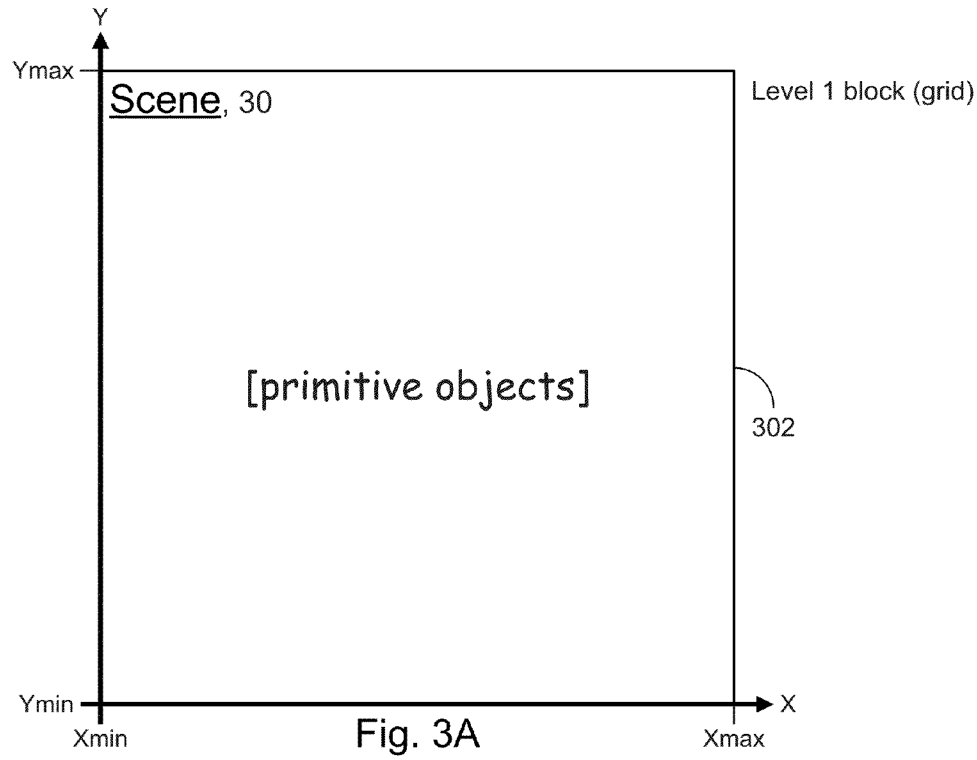
FIGS. 3A-3F introduce notations and conventions for describing grids and cells in accordance with the present disclosure.

FIG. 3A represents a 2D scene 30 to be rendered. The scene 30 may comprise objects. Typically, the objects that constitute the scene 30 are decomposed into primitive objects, which can then be processed for intersection by rays. Primitive objects may include elementary shapes (e.g., triangles, rectilinear shapes, circles, spheres, cylinders, and other polygons), complex shapes such as parametric surfaces, swept surfaces, and so on.

The scene 30 is associated with "world coordinates." Typical world coordinate systems include a Cartesian coordinate system (shown in the figure) or a polar coordinate system, or any other suitable coordinate system. In some embodiments, the world coordinates may be expressed as Xmin, Xmax, Ymin, and Ymax values in an X-Y Cartesian coordinate system. Data representing the primitive objects comprising scene 30 may represent their locations in the scene in terms of the scene's world coordinates.

The scene 30 may be spatially decomposed to partition the scene into grids of cells. A quad tree decomposition, for example, may be used to divide the scene 30 into a grid of cells to create a hierarchy of axis-aligned cells. At each level in the hierarchy, the scene 30 may be represented as a grid of cells. For example, the initial scene 30 may be referred to as a "level 1" grid.

Figure 3B:
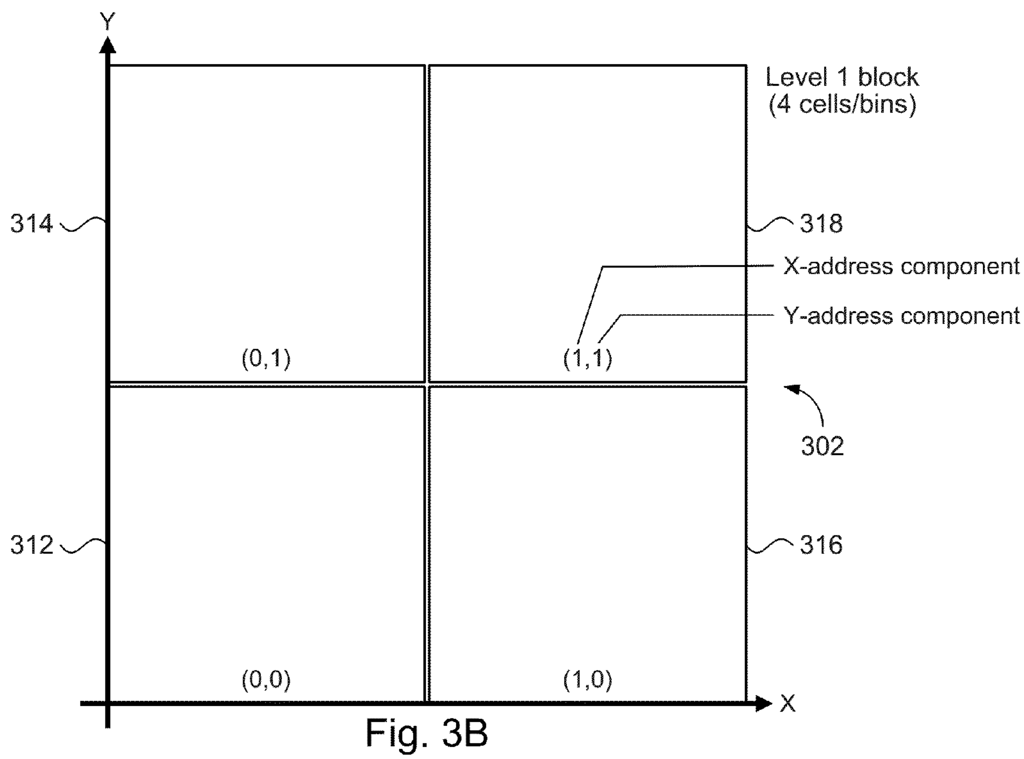

A grid may be subdivided (partitioned) into cells. Merely for the purposes of explanation, we can assume a partitioning of 2×2 cells. Referring to FIG. 3B, for example, the level 1 grid 302 (i.e., scene 30) is shown subdivided into four cells 312, 314, 316, 318. Each cell 312-318 may be associated with a "cell address" that represents the position of that cell within the grid. In some embodiments, the cell address comprises an X-address component and a Y-address component. The cell address can be a two-bit value for a 2×2 grid of four cells, one bit for an X-address component and one bit for a Y-address component. The cell addresses may be numbered as illustrated in FIG. 3B. Each cell has a position along the X-axis and along the Y-axis. The positions along the X- and Y-axes may be numbered as in a Cartesian coordinate system. For example, the address of cell 312 is (0, 0) the address of cell 314 is (0, 1) the address of cell 316 is (1, 0) and the address of cell 318 is (1, 1). It will be appreciated, of course, that any other addressing convention may be employed.

Figure 3C:
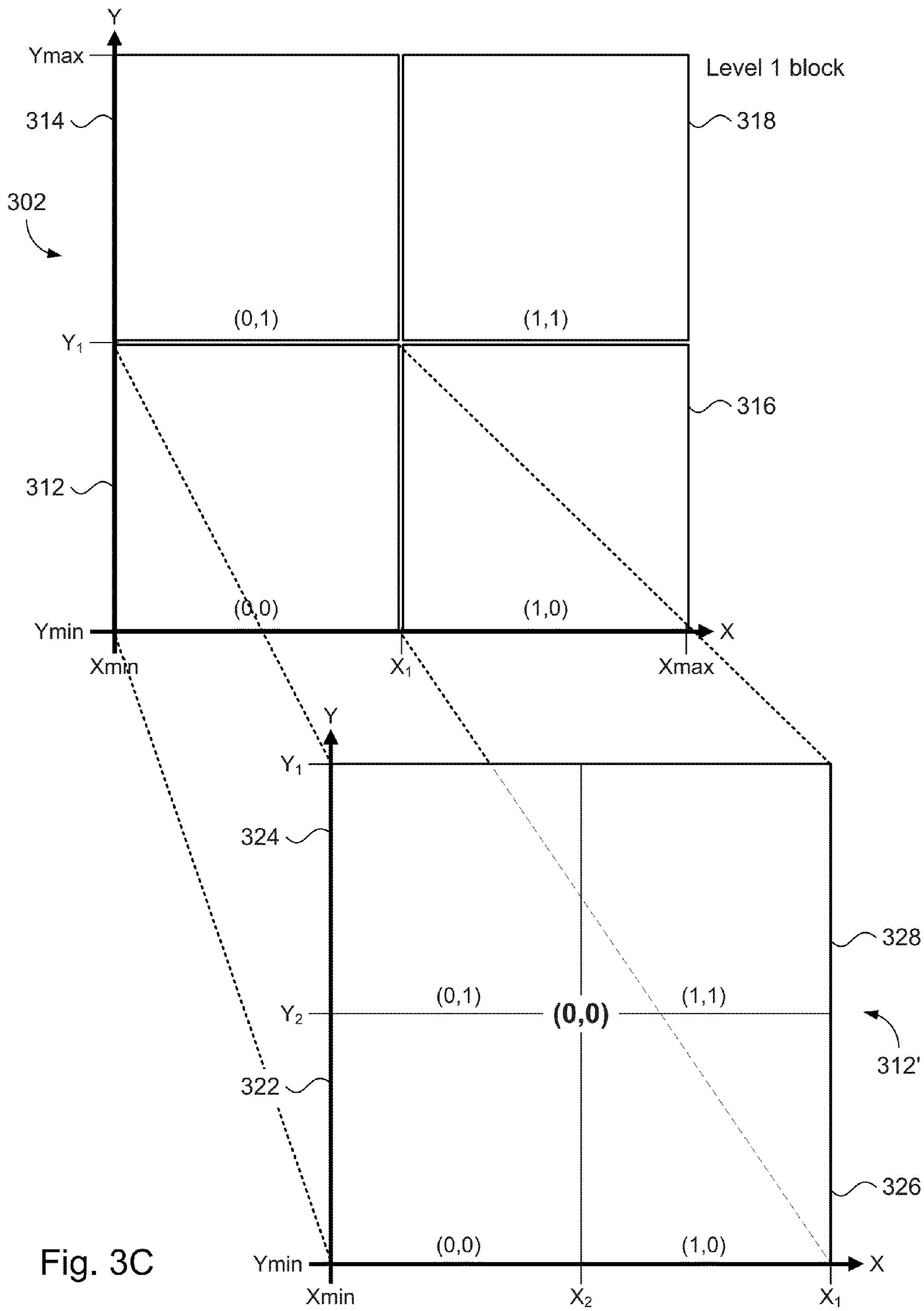

The cells of a grid at a given partitioning level k in the hierarchy ("level k cells"), in turn, constitute grids at the next lower level k+1 in the hierarchy, each comprising their own set of cells. Referring to FIG. 3C, for example, the level 1 grid 302 comprises four level 1 cells 312-318. Each cell 312-318 in turn constitutes a grid at level 2, and may be referred to as a "level 2" grid. Thus, cell 312 may be referred to as a level 2 grid 312' that comprises level 2 cells 322, 324, 326, 328. Likewise, though not shown in FIG. 3C, cell 314 constitutes a level 2 grid as do cells 316 and 318. Cell addressing at each partitioning level follow the same convention. The level 2 cells 322-328, in turn, constitute grids in a level 3 partition (not shown in the figure), and so on. This progression may continue with additional levels of partitioning until a termination criterion is met; e.g., the system may define a total of N partitioning levels by design. A partitioning level m is said to be a "higher" partitioning level than a partitioning level n, where m<n; and vice versa—partitioning level n is a "lower" partitioning level than partitioning level m.

FIG. 3C further illustrates that each grid may be represented in terms of the world coordinates of the original scene 30. Thus, for example, the world coordinates for a level 2 grid 312' are Xmin, $X_1$, Ymin, $Y_1$, which are the coordinates of the level 1 cell 312. As another example, the world coordinates for the level 2 cell at address (1, 1) in grid 312' are $X_2$, $X_1$, $Y_2$, $Y_1$.

Figure 3D:
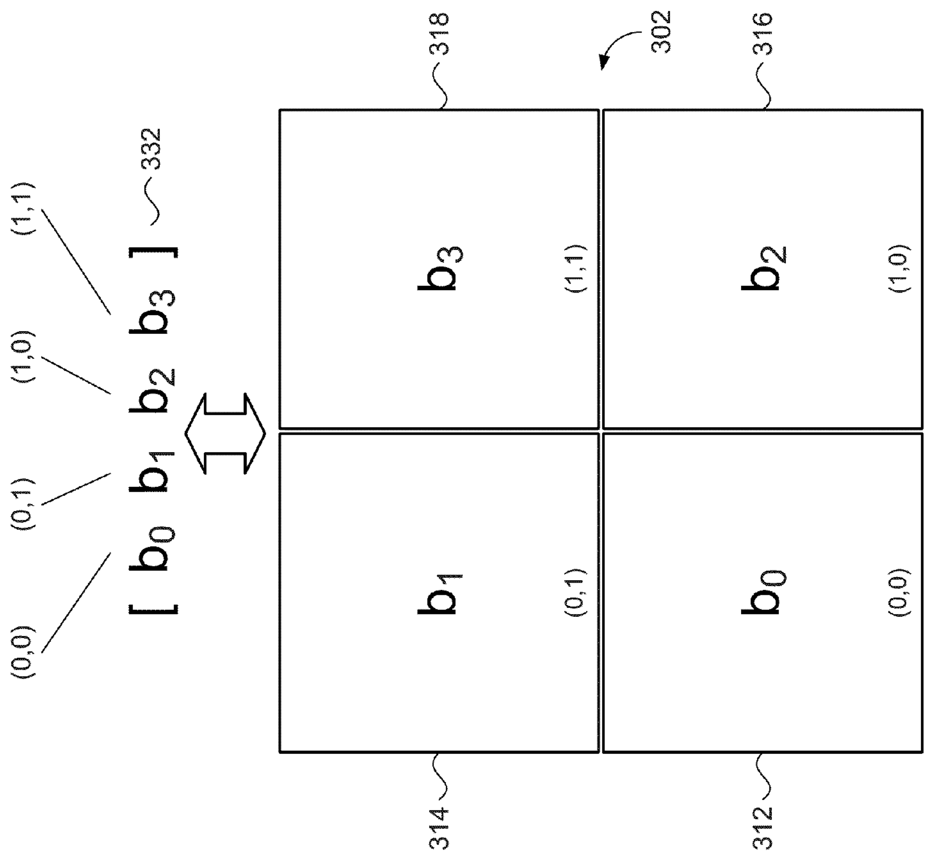

In some embodiments, each grid may be represented by a corresponding block bitmap ("bitmap"). Referring to FIG. 3D, for example, grid 302 may be represented by bitmap 332. The bit position of each bit $b_0$, $b_1$, $b_2$, $b_3$ in the bitmap 332 may correspond one-to-one with respective cells 312, 314, 316, 318 in the grid 302 and their cell addresses. Thus, bit $b_0$ in bitmap 332 corresponds (maps) to address (0, 0) in the grid 302, bit $b_1$ corresponds to address (0, 1), bit $b_2$ corresponds to address (1, 0), and bit $b_3$ corresponds to address (1, 1).

Figure 3E:
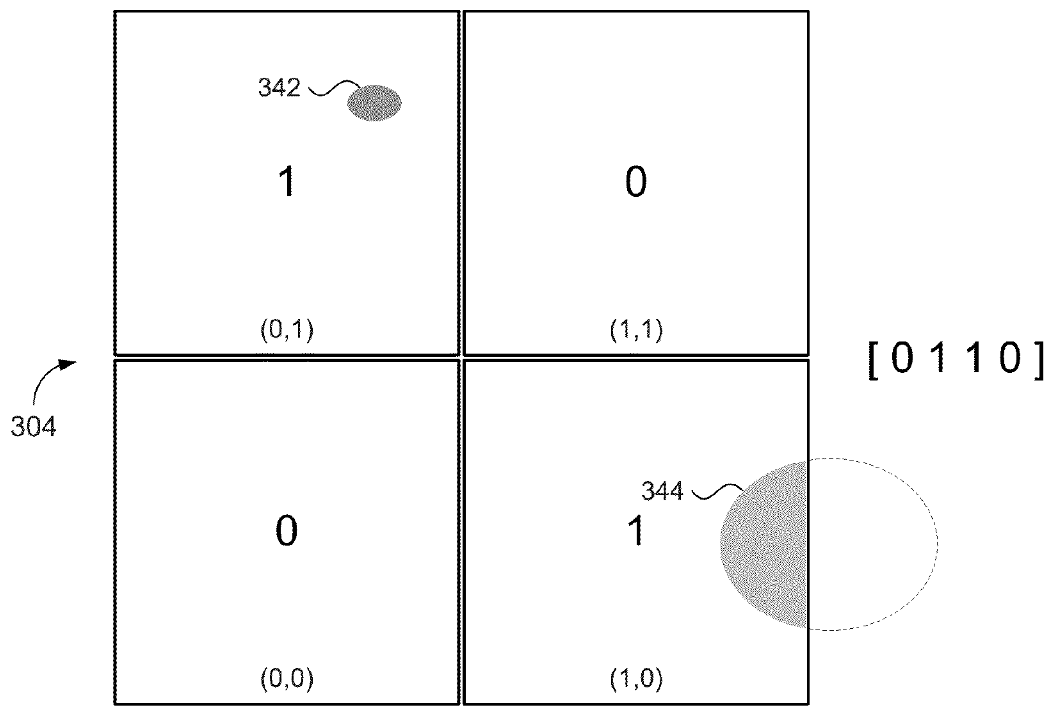
Figure 3F:
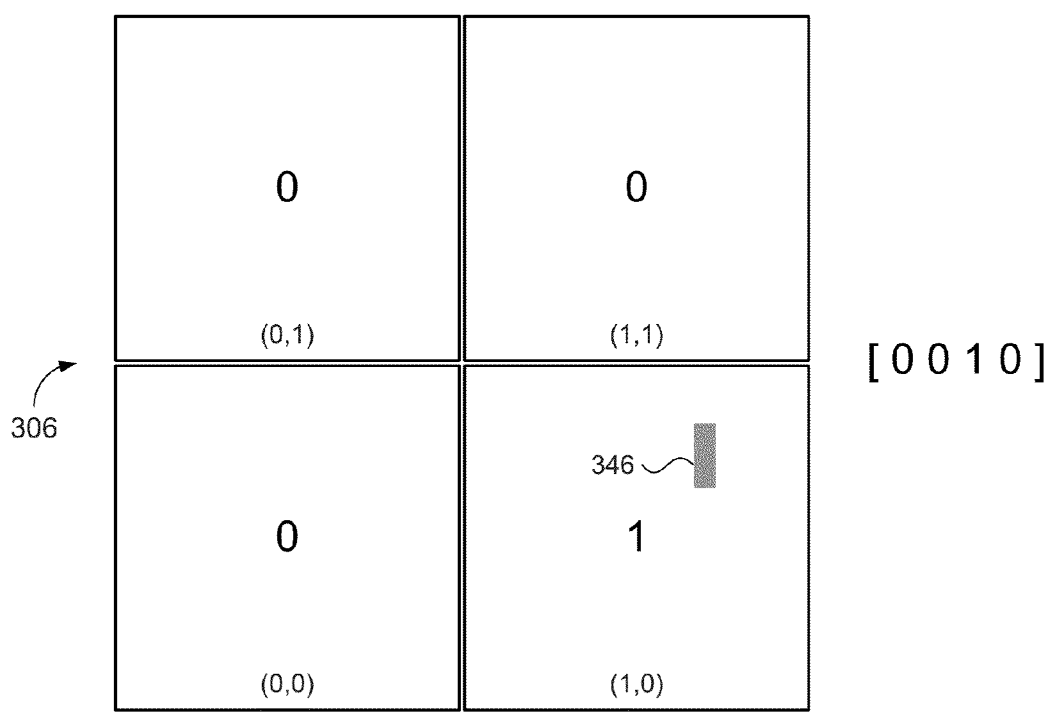

A cell may be marked or designated as being "dirty" or "clean." A cell is dirty if the cell contains a primitive object or a portion of a primitive object. Referring to FIG. 3E, for example, the cell at address (0, 1) in grid 304 is "dirty" because the cell contains a primitive object 342. Likewise, the cell at address (1, 0) contains a portion of a primitive object 344 and is also designated as "dirty"; the other two cells are "clean." In some embodiments, dirty cells in a grid may be represented by setting their corresponding bits in the bitmap for that grid. In an embodiment, for example, a '1' bit will indicate the cell is dirty, while a '0' bit indicates the cell is clean. Thus, for example, the bitmap for grid 304 is [0 1 1 0]. As another example, FIG. 3F shows a grid 306, where the cell at address (1, 0) contains a primitive object 346, and so the bitmap looks like [0 0 1 0].

The examples above illustrate an example of quad tree partitioning. It will be appreciated that spatial partitioning other than quad trees may be used. In addition, cells comprising a grid may be of different shapes other than square, and may be non-uniformly sized.

The examples above assume a 2D scene. One of skill will readily appreciate that the foregoing may be adapted for 3D scenes, where the "cells" are cubes. For example, the world coordinate for a 3D scene would comprise three axes: X, Y, and Z. A grid in the 3D scene (sometimes referred to as a "bounding cube") can be subdivided into cubes (sometimes referred to as "voxels"). For example, a 2×2×2 partitioning of a level n cube would result in eight level n+1 cubes, thus defining an octree hierarchy. In a 2×2×2 partitioning configuration, each 3D grid would be represented by an eight-bit bitmap to represent the eight constituent cells of that grid. The cell address of each cell would comprise a three-bit value (an X-address component, a Y-address component, and a Z-address component) to uniquely identify each of the eight cell positions in the 3D grid.

The foregoing examples define a grid resolution of 2×2 cells and three partitioning levels. It will be appreciated that in other embodiments, the spatial resolution may be increased by defining additional partitioning levels and/or the grid resolution at each level. For example, in a 2D architecture, a grid may be defined as having $N_x \times M_y$ resolution, where $N_x$ and $M_y$ can be any suitable integer values; e.g., $N_x = M_y = 4$, 8, 16, etc. A grid resolution of $N_x = M_y = 8$, for example, would define 64 cells in the grid, the bitmap would comprise 64 bits, and the cell address would be 6 bits. In some embodiments, $N_x$ and $M_y$ can be different integer values.

Likewise, in a 3D architecture, the grid may have a resolution of $N_x \times M_y \times Q_z$. For example, a 3D grid having a resolution of $N_x = M_y = Q_z = 8$ would define $8^3 = 512$ cells and be represented by a 512-bit bitmap. In some embodiments, $N_x$, $M_y$, and $Q_z$ may be the same integer value, or some combination of two or more different integer values. In some embodiments, the grid resolution (2D or 3D architecture) may vary from one partitioning level to another. The cells within a grid may be non-uniform in size (e.g., see FIG. 12), and so on.

Figure 4A:
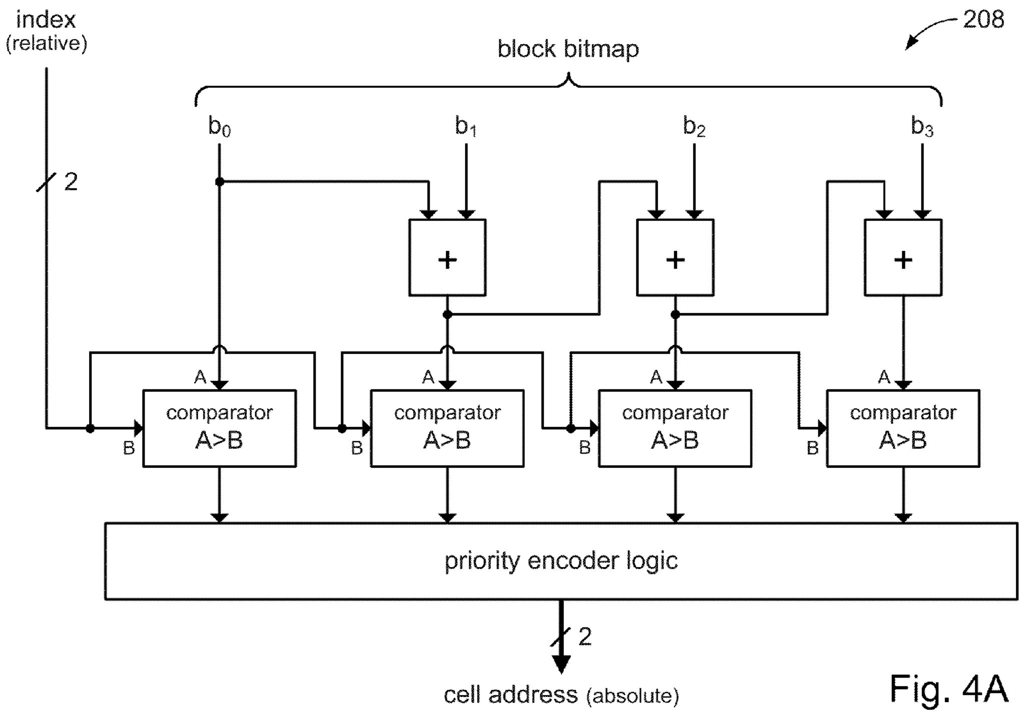
FIGS. 4A and 4B illustrate examples of an RtAE encoder.

With the terminology of cell addresses and bitmaps in place, the discussion will now turn to descriptions of the RtAE encoder 208 and AtRE encoder 210 introduced in FIG. 2. Referring first to FIG. 4A, in some embodiments, the RtAE 208 may be digital logic circuitry comprising adders, comparators, and priority encoder logic. Priority encoders are known. A priority encoder implements a "priority" function. If two or more bits in an input bitstream ($b_0$ $b_1$ $b_2$ . . . $b_n$) are active (e.g., logic HI) at the same time, the bit having the highest priority will take precedence. For example, the output of the priority encoder may represent the ordinal position of that bit in the input bitstream.

Figure 4B:
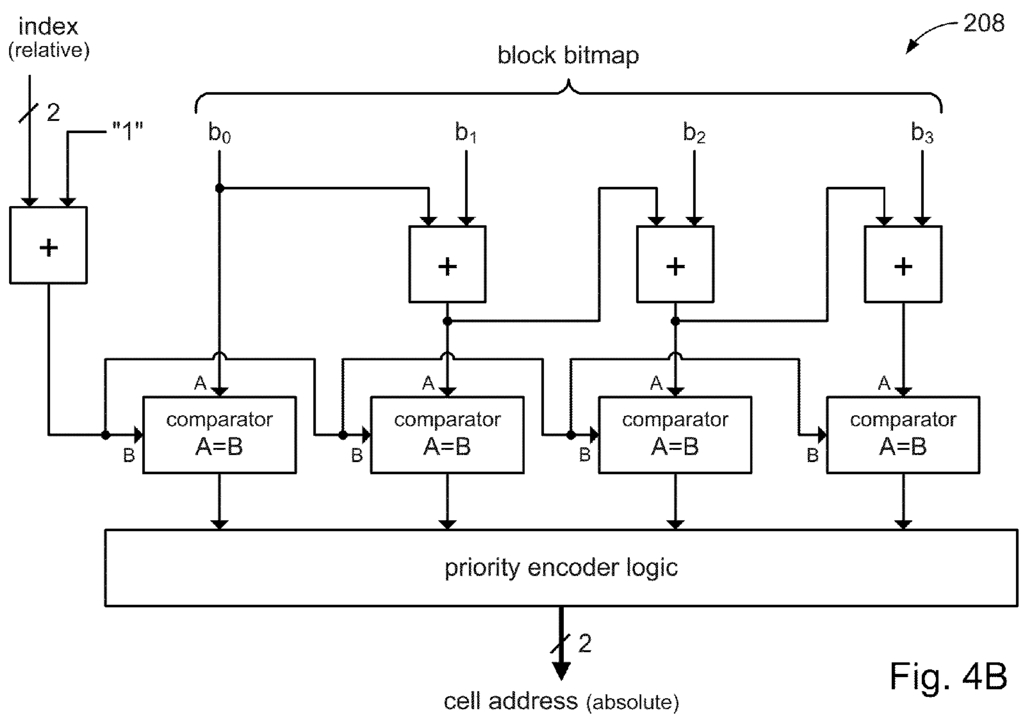

Inputs to the RtAE 208 include: an n-bit input (relative index) and a $2^n$-bit input (block bitmap). The n-bit output (cell address) of RtAE 208 is defined by the truth table shown in FIG. 5. The index specifies a relative (ordinal) position of a dirty bit (among the dirty bits) in the block bitmap, and produces the cell address of the cell corresponding to that dirty bit. For purposes of explanation, n is 2. FIG. 4B illustrates an alternate embodiment of RtAE 208. Expressed in the context of the conventions used in the present disclosure, a review of the truth table reveals that the RtAE 208 can produce at its output the cell address associated with the $i^{th}$ dirty bit in the block bitmap by setting the relative index to i, which in various embodiments may be numbered from $0\text{-}2^{n-1}$ or from $1\text{-}2^n$, depending on the desired numbering convention. As will become more apparent in the discussion below, the RtAE 208 can realize a significant reduction in processing time during database construction. Additional details of the operation of the RtAE 208 is discussed below.

Figure 6:
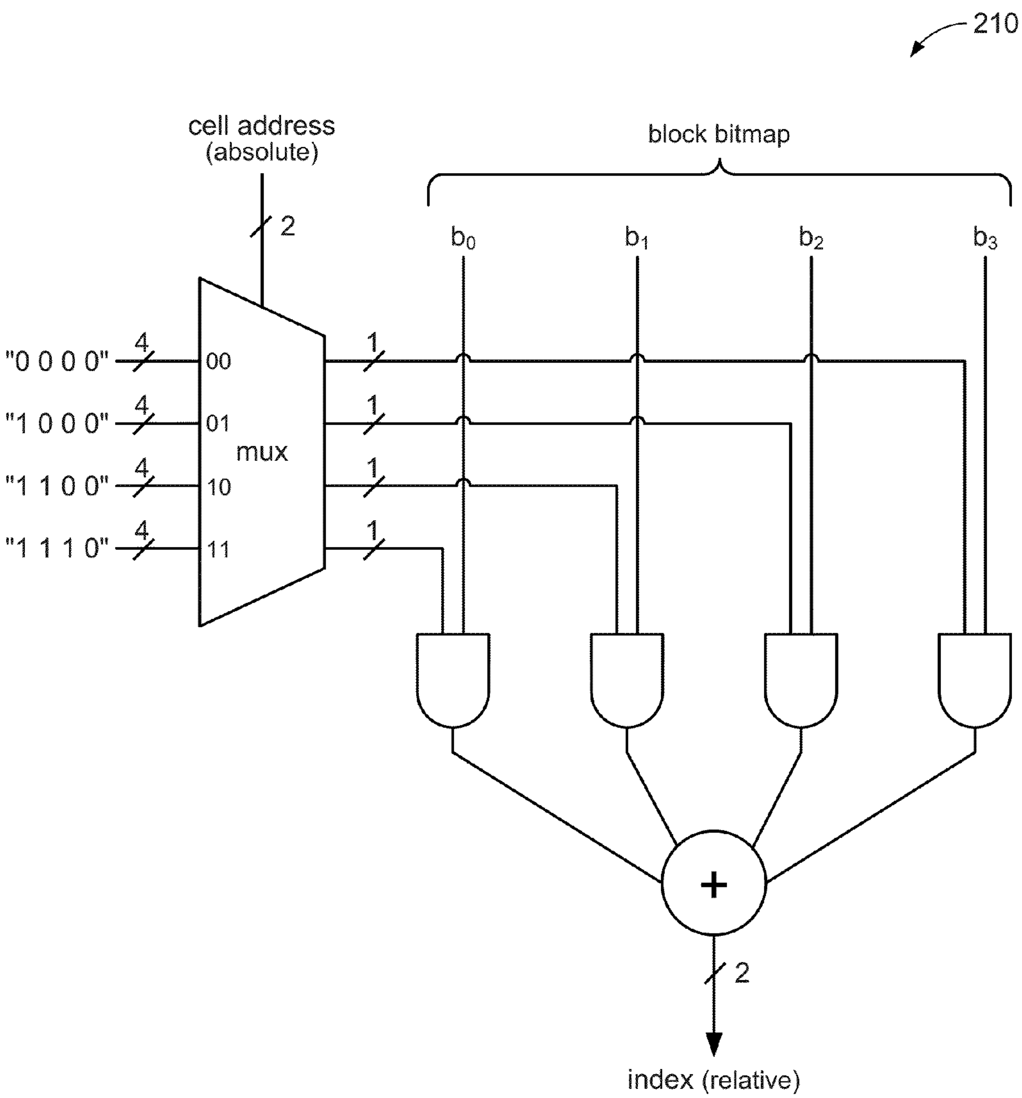
FIG. 6 illustrates an example of an AtRE encoder.

Referring now to FIG. 6, in some embodiments, the AtRE 210 may be digital logic circuitry comprising a multiplexer, AND gates, and an adder. Inputs to the AtRE 210 include: an n-bit input (cell address) and a $2^n$-bit input (block bitmap). The n-bit output (relative index) of AtRE 210 is defined by the truth table shown in FIG. 7. For purposes of explanation, n is 2. Expressed in the context of the conventions used in the present disclosure, a review of the truth table reveals that the AtRE 210 can produce at its output the position (relative index) of the dirty bit in the block bit map that is identified by the cell address relative to other dirty bits in the block bitmap. As will become more apparent in the discussion below, the AtRE 210 can realize a significant reduction is processing time during ray traversal.

In an embodiment, the cell address may be a two-bit value and the block bitmap may be a four-bit value. In operation, the cell address selects a four-bit mask using a multiplexer (mux) that selects one of four four-bit values and outputs the selected four-bit value as four separate one-bit values. The selected mask is used to mask the block bitmap using the AND gates. The four bits of the resulting masked value are summed to produce a two-bit output, which as will be explained below may serve as a relative index. FIG. 7 shows a truth table for AtRE 210.

The examples given are for grid resolutions of 2×2. It will be appreciated that the RtAE 208 and AtRE 210 encoders can be readily scaled up for higher resolution grids. For example, in an 8×8 resolution grid, the bitmap would be a 64 bit input ($b_0$ to $b_{63}$) and the index would be a G-bit index to reference the $1^{st}$ to $64^{th}$ dirty bits in the bit map. The cell address would also be 6 bits. The encoders 208, 210 can support 3D grids; for example, an 8×8×8 resolution 3D grid uses encoders with a 9-bit index, a 512-bit wide bitmap, and a 9-bit cell address.

II. Database Construction—Storing the Scene

The discussion will now turn to a description of database construction (block 104, FIG. 1) in accordance with the present disclosure to create a database that represents a scene.

To keep the description to a manageable level, examples for a 2D scene will be used and the grid resolution will be 2×2 cells with a total of three partitioning levels. The discussion will reference FIGS. 8 and 9A-9G. It will be appreciated from the discussion that the digital circuitry and data formats for database construction can be readily scaled to accommodate 3D scenes.

Figure 8:
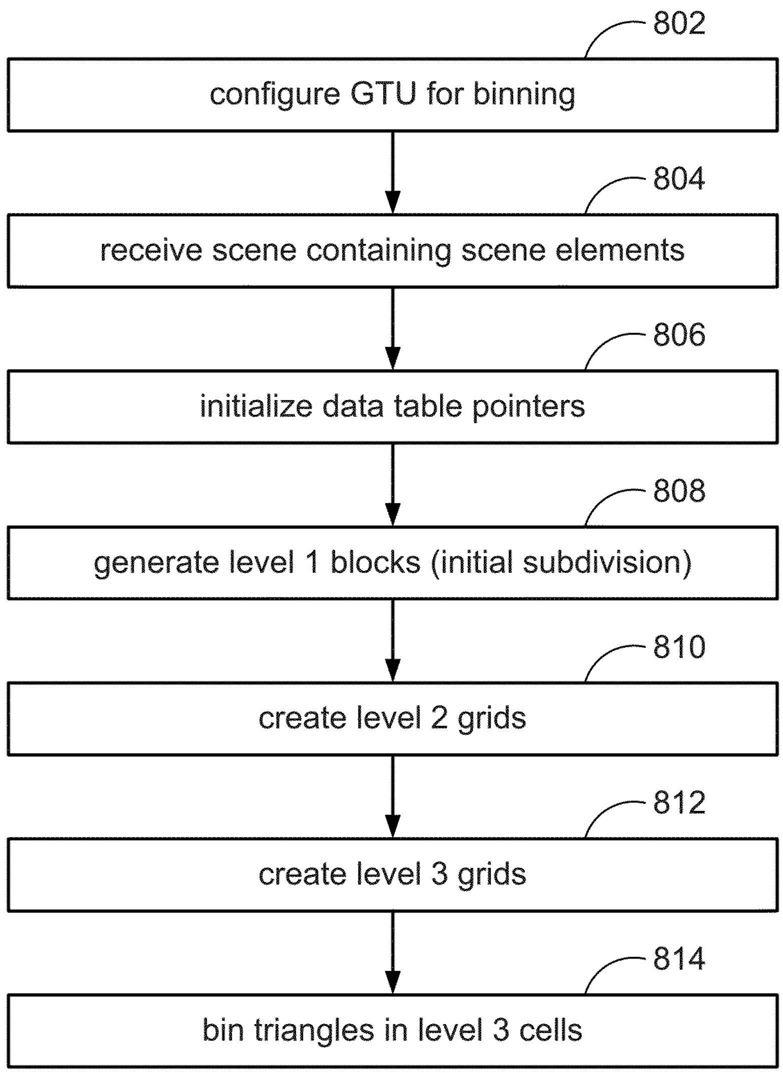
FIG. 8 is high level process flow for representing a scene in accordance with the present disclosure.

FIG. 8 shows a high level process flow for database construction in accordance with some embodiments. At block 802, the RTU 200 (FIG. 2) may be configured for database construction. In some embodiments, for example, the GTU 206 is a configurable unit that the database builder 202 may configure to perform "triangle binning" Triangle binning (referred in the discussion below as Subdivide( ) is part of database construction that involves, for every triangle (i.e., primitive object) comprising the scene, identifying the cells in a given partitioning level that contain at least a portion of that triangle, and storing triangle-related information in memory (a bin) associated with the cell. The process is repeated for every partitioning level. Details of triangle binning and the role of the GTU 206 in triangle binning will be discussed below.

Figure 9A:
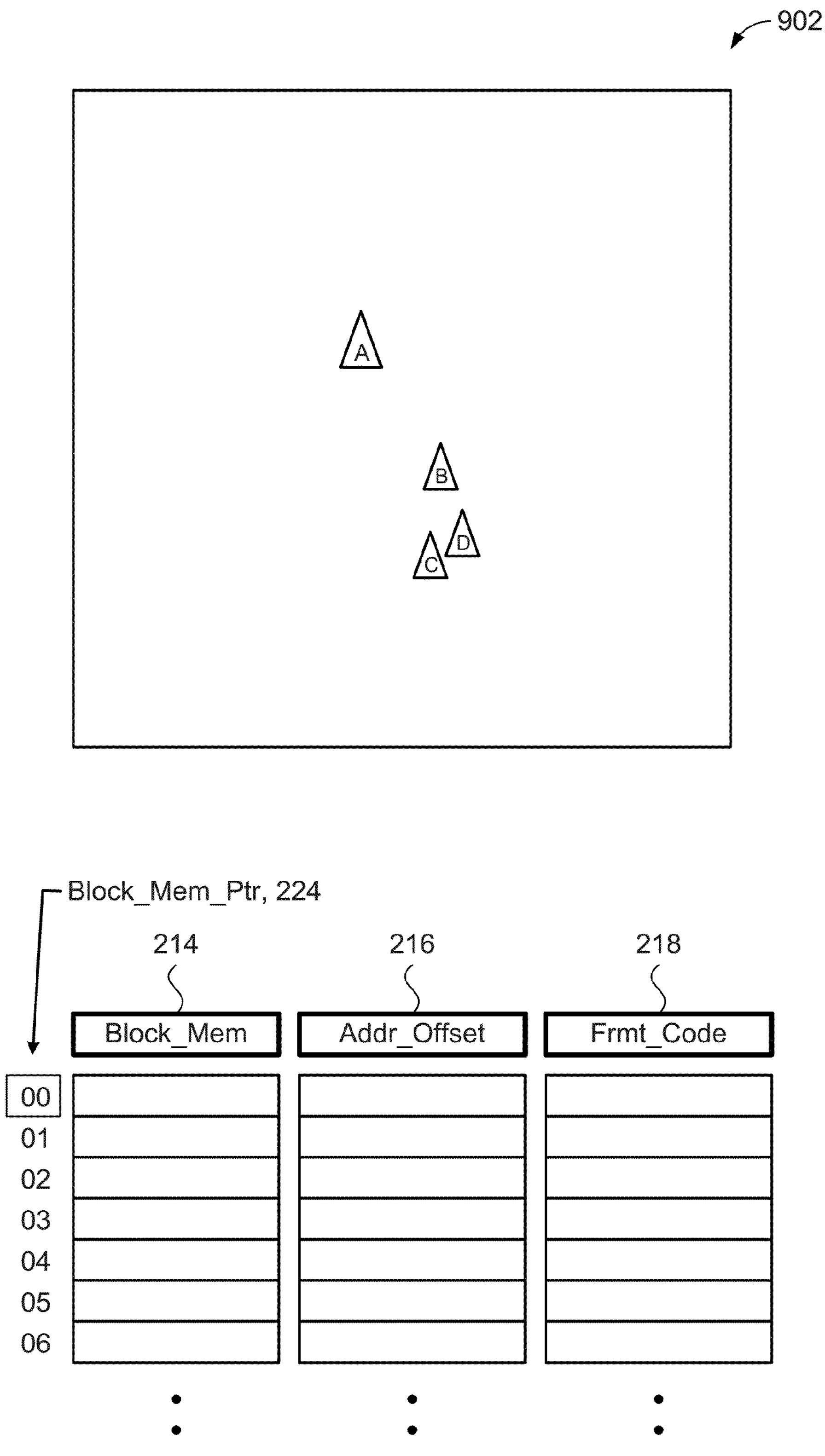

At block 804, the RTU 200 may receive data comprising a scene (e.g., scene 902, FIG. 9A). The scene may comprise several primitive objects. Primitive objects may be any suitable shape. However, for purposes of discussion we can assume, without loss of generality, that primitive objects are triangles. For example, the scene 902 shown in FIG. 9A comprises triangles A, B, C, and D.

At block 806, pointers into the data stores 214, 216, 218 may be initialized. In some embodiments, for example, the Block_Mem 214, Address_Offset 216, and Format_Codes 218 data stores may be accessed together. Accordingly, these data stores 214-218 may be accessed using the same pointer, for example Block_Mem_Ptr 224, which may be initialized to 0 to point to the beginning of each data store 214-218. FIG. 9A represents the state of the data at this point.

The scene 902 received at block 802 may be viewed as the initial level 1 grid, which in our example contains triangles A-D. At block 808, the scene 902 may be subdivided into level 1 cells. The process of subdividing a grid into cells will be discussed in more detail below in the Part II, Section I entitled "Triangle Binning" In some embodiments, the process of subdividing may employ the GTU 206 to perform the necessary operations. In general, the subdividing process logically divides a grid into four cells (recall the grid resolution is 2×2). The subdividing process includes binning or otherwise identifying, for each cell in that grid, which triangles or portions of triangles contained in that grid are also contained in (bounded by) that cell (if any). A bitmap that represents the cells of the grid is produced, and dirty bits in the bitmap are set for each corresponding cell that contains at least a portion of a triangle (i.e., the cell is dirty).

Figure 9B:
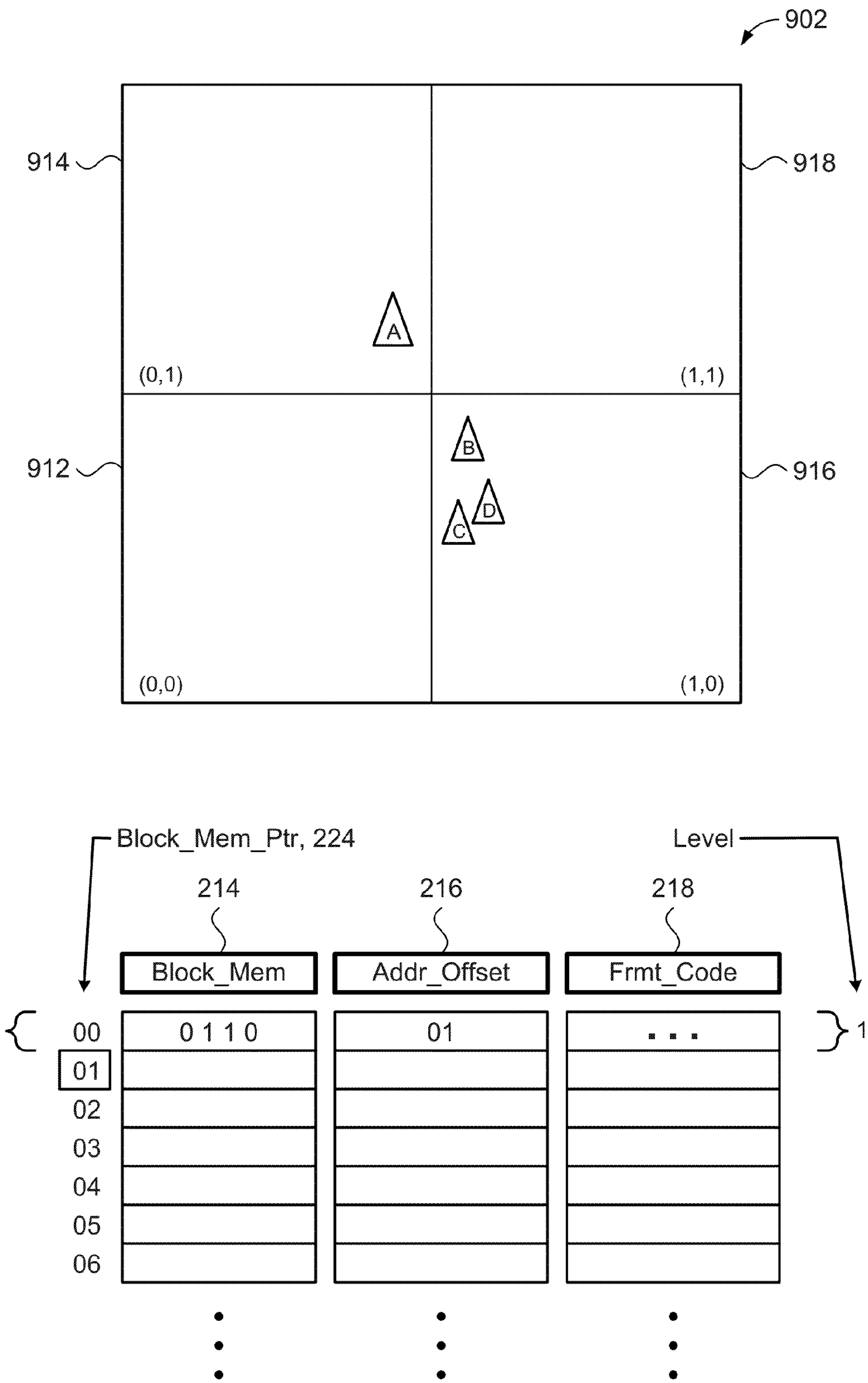

Continuing with block 808, and referring now to FIG. 9B, the resulting level 1 grid 902 is shown subdivided into cells 912, 914, 916, 918. The cells 914 and 916 are dirty; cell 914, for example, contains triangle A, and cell 916 contains triangles B, C, and D. Accordingly, the bitmap for the level 1 grid 902 is [0 1 1 0] (reference FIG. 3D). This level 1 bitmap may be written into the Block_Mem data store 214. As will be explained in more detail below, the action of subdividing includes subdividing a given grid into cells and binning the triangles bounded by each cell. In some embodiments, the following information represents the result of the subdivide action on the level 1 grid:

Level 1 Bin(0,0){null}{triangle_count=0}
Level 1 Bin(0,1){triangle A}{triangle_count=1}
Level 1 Bin(1,0){triangle B, triangle C, triangle D}{triangle_count=3}
Level 1 Bin(1,1){null}{triangle_count=0}
Block_Subdivide_reg=[0 1 1 0]

The notation above indicates how the triangles are binned at level 1. For example, Level 1 Bin(0,0) {null}{triangle_count=0} means there are no triangles in cell (0, 0); whereas, Level 1 Bin(1,0) {triangle B, triangle C, triangle D}{triangle_count=3} indicates that there are three triangles in cell (1, 0). Thus, the level 1 grid 902 is subdivided into level 1 cell 912-918. The level 1 cell at cell address (0, 0) and cell address (1, 1) each has no triangles, so the "bin" is null and the triangle count is 0. The terms "bin" and "cell" are closely related; "cell" refers to the logical subdivision of a grid, while "bin" is typically used in the context of a data store that holds information about the cell, for example, a list of triangles or portions of triangles bounded or contained by the cell, triangle count, and the like. The cell at (0, 1) has one triangle, and so the bin (e.g., a data store) contains an identifier for triangle A and the triangle count is 1. The cell at (1, 0) has three triangles; the bin contains identifiers for triangles B, C, and D, and the triangle count is 3.

In accordance with the present disclosure, values in the Address_Offset data store 216 correspond to "next" partitioning levels in Block_Mem 214. For a given entry in Block_Mem 214, the corresponding value in Address_Offset 216 can be used to identify an entry in Block_Mem that stores the bitmap of a grid in the next partitioning level relative to the partitioning level of the grid corresponding to the given entry. Referring to FIG. 9B, for example, the bitmap for the level 1 grid 902 is stored in entry "00" of Block_Mem 214 (identified by Block_Mem_Ptr=0), which may be expressed using programming notation for data arrays, namely Block_Mem[0]. There is only one bitmap for grid 902, since it is at the highest partitioning level, and so only one entry in Block_Mem 214 is needed for the level 1 grid. The entry in Block_Mem 214 that will be used to store a level 2 bitmap is the very next entry. Accordingly, Address_Offset[0] will be set to "01", indicating that the next entry is offset from the current entry by 1.

In accordance with the present disclosure, the Format_Codes data store 218 may store values for accessing Block_Mem 214 and Data_Mem. In a particular embodiment, the Format_Codes data store 218 will include "triangle counts" at the final partitioning level. The Format_Codes data store 218 may also store formatting codes for shading attributes, different surfaces, attributes for primitive objects, and so on. In accordance with the present disclosure, formatting codes may further include information about how each partitioning level is accessed; e.g., in terms of different sized grids at each level, spatial resolution, and so on.

At this point, the data is deemed to be initialized. Referring to FIG. 9B, for example, the scene 902 has been subdivided to define cells 912-918. Scene 902 may be referred to as the level 1 grid and the cells 912-918 may be referred to as level 1 cells. The level 1 bitmap [0 1 1 0] is written into Block_Mem[0]. The Address_Offset data store 216 is written with a value representing an offset that points to the next level. Here, the value "01" is written into Address_Offset[0]. Suitable formatting code(s) may be written into the Format_Codes data store 218.

Processing to create additional partitioning levels may commence from this initial data state. As explained above, the example disclosed herein will assume two additional partitioning levels in order to keep the discussion manageable. It will be appreciated from the disclosure that the process can be readily extended to accommodate any number of partitioning levels.

At block 810, level 2 grids are defined from the level 1 cells 912-918. In particular, a level 1 cell may be subdivided to create a level 2 grid. Each dirty bit in the level 1 bitmap [0 1 1 0] is processed to create a corresponding level 2 grid. In a accordance with a particular embodiment, the following pseudo-code fragment may be used to represent the processing in block 810:

PSEUDO-CODE FRAGMENT I.

```
for ( L1_Relative_ptr= 0; relative_ptr < Block_Count (Block_Level_1); L1_Relative_ptr++ ) {
  XY_Position = RtAE (Block_Level_1, L1_Relative_ptr );
  Subdivide ( Level 1 Bin [ XY_Position ] ); // create level 2 grid
  write Block_Mem [ Block_Mem_Ptr ] and Address_Offset [ Block_Mem_Ptr ];
  Block_Mem_Ptr++;
}
```

Recall, that this pseudo-code fragment and others that follow may be used to generate HDL descriptions of digital logic to perform the processing represented by the pseudo-code. "Block_Level__1" is the level 1 bitmap being processed. "Level 1 Bin[XY_Position]" refers to the cell in the level 1 grid that is identified by the cell address XY_Position. The "Subdivide( )" process will divide the referenced cell to create a level 2 grid. The "Block_Count( )" process provides a count of the number of dirty bits in the Block_Level__1 bitmap and determines how many iterations of the FOR loop to perform. For example, Block_Count( ) will generate "2" for the bitmap [0 1 1 0].

The "Subdivide( )" process subdivides a given cell in the current grid to create a next-level grid, in this case a level 2 grid. As will be explained in more detail below, the "Subdivide( )" process stores information about the next-level grid, including its world coordinates, what triangles (whole or partial) are contained in it (i.e., binning), and so on; i.e., the triangles are binned at level 2. The "Subdivide( )" process generates a next-level bitmap that is stored in the Block_Subdivide register 236.

The "RtAE( )" process identifies the cell address XY_Position of the $i^{th}$ dirty bit (specified by L1_Relative_ptr) in the bitmap specified by Block_Level__1. In accordance with the present disclosure, the index (or ordinal number) i may be expressed using "L1_Relative_ptr" and refers to the $i^{th}$ dirty bit in relative order; thus, for example:

- relative_ptr=0, specifies index i=1, referring to the $1^{st}$ dirty bit in the bitmap
- relative_ptr=1, specifies index i=2, referring to the $2^{nd}$ dirty bit in the bitmap
- relative_ptr=2, specifies index i=3, referring to the $3^{rd}$ dirty bit in the bitmap
- relative_ptr=3, specifies index i=4, referring to the $4^{th}$ dirty bit in the bitmap "L1_Relative_ptr" may be referred to as a relative index in the sense that the pointer is referencing dirty bits relative to the other dirty bits in a given bitmap. Stated another way, "L1_Relative_ptr" refers to the order of a given dirty bit among all the dirty bits in the given bitmap. In accordance with principles of the present disclosure, the "RtAE( )" process identifies the "absolute" position of a dirty bit in the bitmap based on its "relative" position among the other dirty bits in the bitmap, and thus provides the corresponding cell address. The absolute position is absolute in the sense that it refers to the bit position within the bitmap among all the bits comprising the bitmap, both dirty bits and clean bits. As a convention, the bits will be read from left to right.

As an observation, an "absolute" position may coincide with a "relative" position. Consider the bitmap [1 1 0 1], for example. Here, the first dirty bit in the bitmap coincides with the first bit position of the bitmap, and the second dirty bit coincides with the second bit position. However, the third dirty bit is in the fourth bit position (does not coincide). As another example, consider the bitmap [0 1 0 1]. The first dirty bit in the bitmap is not in the first bit position of the bitmap, but rather is in the second bit position of the bitmap, and the second dirty bit is in the fourth bit position.

The block bitmap for a grid may be viewed as being both a "data structure" and a "pointer structure." The block bitmap is a data structure in the sense that each bit corresponds to a constituent cell in the grid, and indicates if the cell is dirty ('1') or clean ('0'). The block bitmap is a pointer structure in the sense that the dirty bits in the bitmap point to the dirty cells of the grid. Moreover, the pointer structure is "relative" in that the position of a given dirty bit relative to the other dirty bits serves to identify an ordinal position of the given dirty bit among the dirty bits. Thus, for example, one may refer to the 'first' dirty bit in a bitmap relative to the other dirty bits in that bitmap. The clean bits are not relevant in the context of viewing the bitmap as a pointer structure.

In some embodiments, the "RtAE( )" process may be implemented using digital logic circuits such as illustrated, for example, in FIGS. 4A and 4B. The bitmap and relative index "L1_Relative_ptr" are inputs to the digital circuit. The relative index may be provided as a two-bit value, since "L1_Relative_ptr" ranges from 0-3 in some embodiments. The truth table in FIG. 5 shows how the digital circuit maps inputs to outputs. The output expresses the absolute bit position in terms of the cell address that the bit position maps to (see for example, FIG. 3D). Thus, for example, a relative index of '00' specifies the first dirty bit among all the dirty bits in the bitmap. For a given input bitmap of [0 1 x x], where 'x' can be '0' or '1', the output will be '01' which says that the first dirty bit in the given input bitmap occurs in the second bit position (hence, the 'x' bits are irrelevant), which corresponds to cell address (0, 1).

Loosely expressed, the conversion from relative index i to cell address may be logically described as marching down the block bitmap, inspecting each bit, counting only the dirty ('1') bits, and continuing until the $i^{th}$ dirty bit has been reached. The corresponding cell address of the $i^{th}$ dirty bit is the cell address of interest. An advantageous aspect of the RtAE encoder 208 is that the conversion time is the same irrespective of the size of the bitmap. The conversion occurs in one cycle, whether the bitmap is four bits (as in FIG. 4A) or 512 bits; e.g., using "big 0" notation, the processing time is O(1) (i.e., constant with the number of bits n). By comparison, a software or other programmatic implementation of the conversion would involve an iterative march through the bitmap, or involve pointer tables, or other such data structures.

Processing occurs at least in O(n) time (i.e., time increases linearly with n), and depending on implementation can be worse than O(n) time. In a practical implementation, where the bitmap may be on the order to $2^9=512$ bits, a programmatic approach can easily slow down ray traversal.

By processing only the dirty cells (i.e., cells that bound an object or part of an object), this absolute/relative encoding process eliminates having to store cells in the scene that are empty; the empty space is effectively removed from the scene when the scene is represented in the database. This can represent a significant savings in storage requirements because a scene can consist mostly of empty space.

Figure 9C:
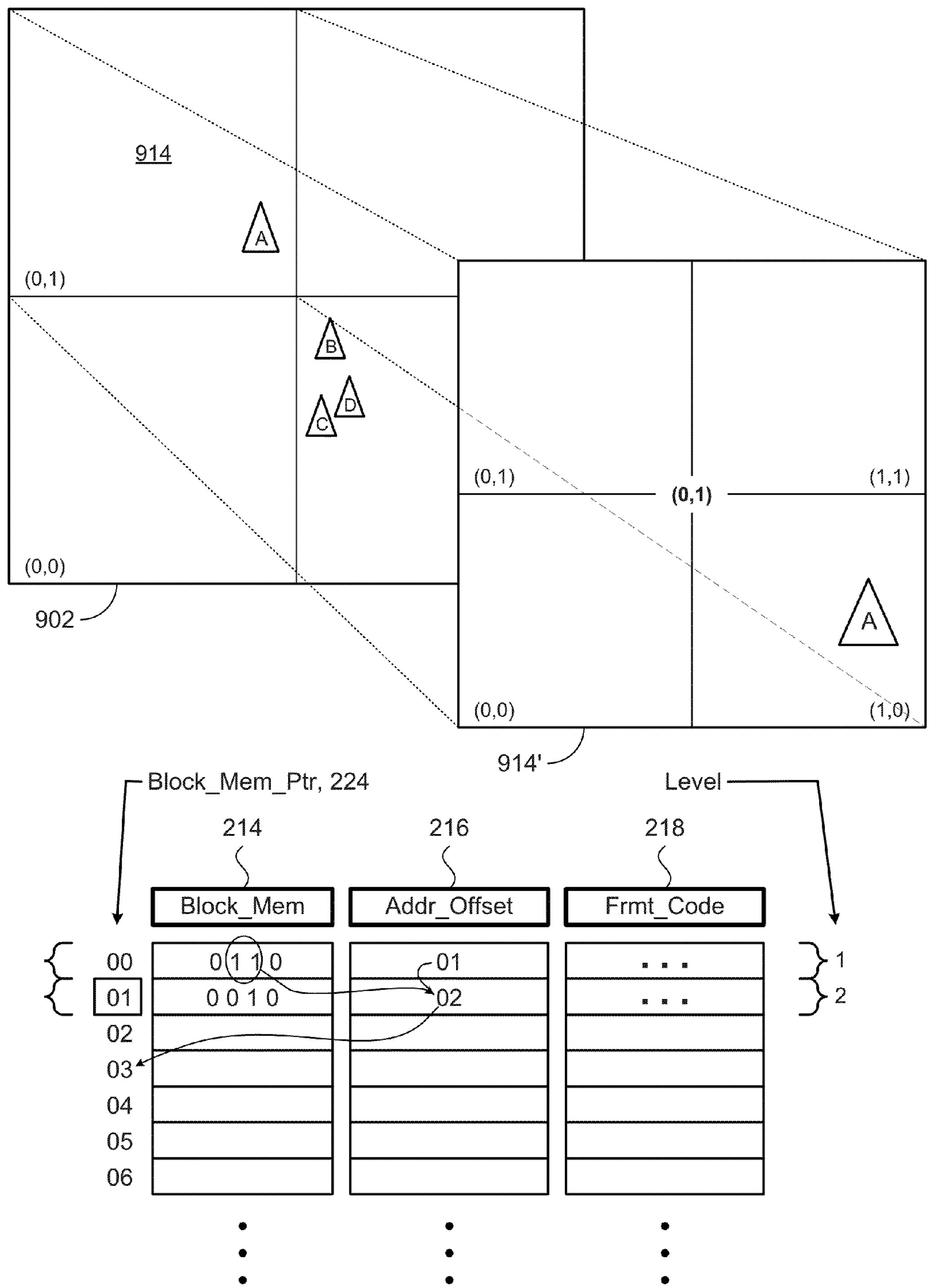

Continuing with the discussion of FIG. 8 and referring to FIG. 9C, the level 1 grid 902 is represented by the level 1 bitmap [0 1 1 0]. Accordingly, the first dirty bit can be found (e.g., using the RtAE with bitmap=[0 1 1 0] and L1_Relative_ptr="00") to be in the second bit position. The cell address corresponding to the second bit position is (0, 1), which identifies cell 914. The "Subdivide( )" process will create a level 2 grid 914' from the level 1 cell 914. As can be seen in FIG. 9C, the triangle A is only contained in (bounded by) cell (1, 0) of the level 2 grid 914'. Accordingly, the level 2 bitmap for grid 914' is [0 0 1 0]. The bitmap is written into Block_Mem data store 214. The following represents the "Subdivide( )" process on the level 1 cell at cell address (0, 1):

At L1_Relative_ptr=0:
Subdivide Level 1 Bin[RtAE(Block_Level__1, L1_Relative_ptr)];//Bin[(0,1)];
Level 2[L1_Relative_ptr]Bin(0,0) {null}{triangle_count=0}
Level 2[L1_Relative_ptr]Bin(0,1) {null}{triangle_count=0}
Level 2[L1_Relative_ptr]Bin(1,0) {triangle A}{triangle_count=1}
Level 2[L1_Relative_ptr]Bin(1,1) {null}{triangle_count=0}
Block_Subdivide_reg=[0 0 1 0]

An offset value is written into Address_Offset data store 216 to point to the next entry in Block_Mem 214 that will store a next-level bitmap. Since there are two dirty level 1 cells, entries for two level 2 grids will be created. Accordingly, the location in Block_Mem 214 for the next-level bitmap is two locations away from the current pointer value of Block_Mem_Ptr=1. This is illustrated in FIG. 9C. In accordance with a particular embodiment of the present disclosure, the following pseudo-code fragment may be used to represent how the offset value can be generated:

PSEUDO-CODE FRAGMENT II.

```
If (Block_Mem_Ptr == 0) {
   Address_Offset [ Block_Mem_Ptr ] = 1; // or value of next empty grid.
}
Else {
   // Find Relative Offset
   Address_Offset [ Block_Mem_Ptr ] =
      Address_Offset [ Block_Mem_Ptr − 1 ] +
      Block_Count ( Block_Mem [ Block_Mem_Ptr − 1 ] ) − 1;
}
```

The foregoing code produces a "relative" offset value; i.e., the offset value is added to the current Block_Mem_Ptr 224 to point to the correct location in the Block_Mem data store 214. In another embodiment, the Address_Offset data store 214 may alternatively store an absolute address in accordance with the following pseudo-code fragment:

PSEUDO-CODE FRAGMENT III.

```
If (Block_Mem_Ptr == 0) {
   Address_Offset [ Block_Mem_Ptr ] = 1; // or value of next empty grid.
}
Else {
   // Find Absolute Address
   Address_Offset [ Block_Mem_Ptr ] =
      Block_Mem_Ptr + Address_Offset [ Block_Mem_Ptr − 1 ] +
      Block_Count ( Block_Mem [ Block_Mem_Ptr − 1 ] ) − 1;
}
```

This completes the description of processing of the first dirty bit in the level 1 bitmap [0 1 1 0].

Figure 9D:
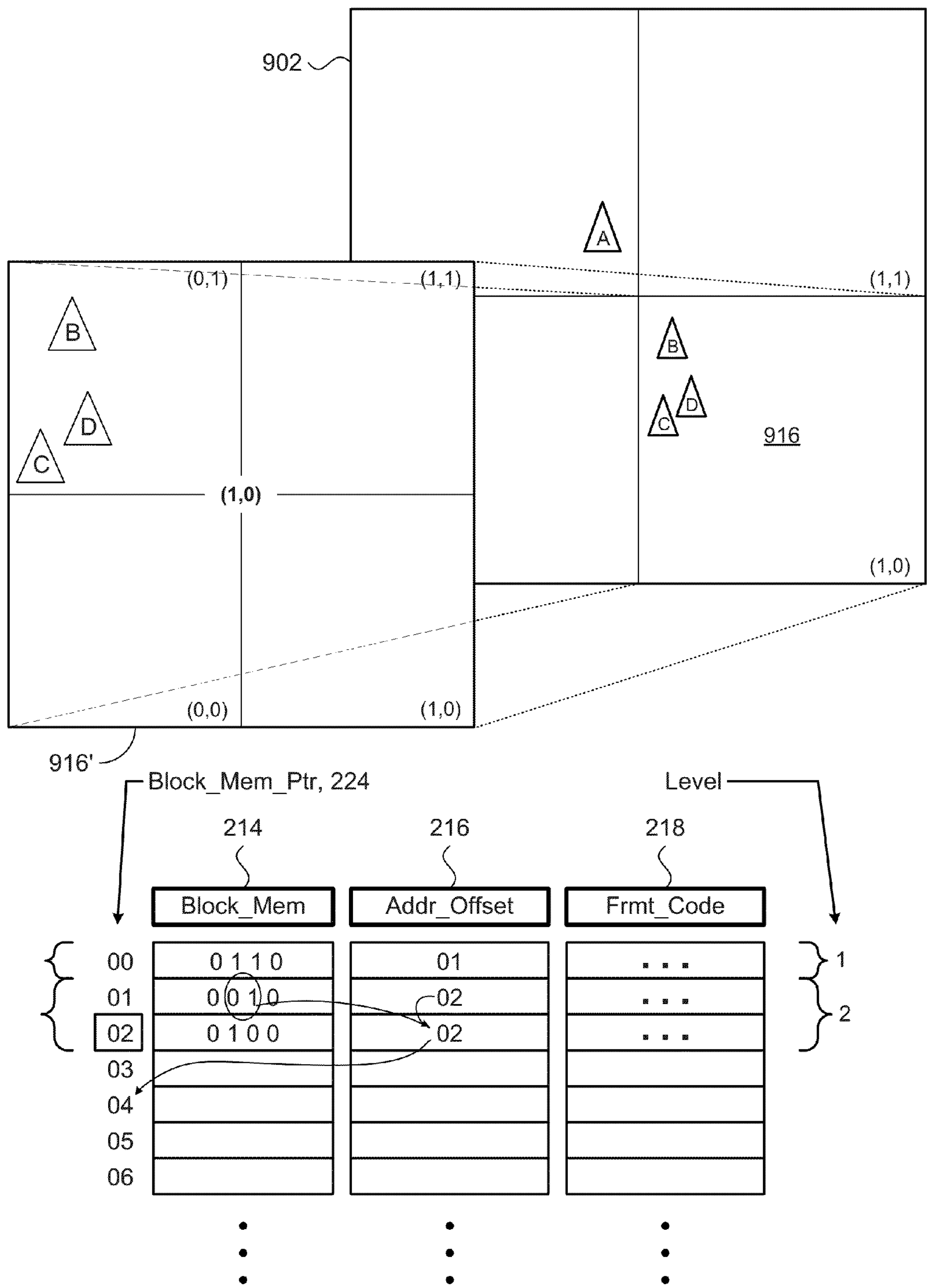

Processing in block 810 continues with the second dirty bit in the level 1 bitmap [0 1 1 0], which occurs in the third bit position of the bitmap. Referring now to FIG. 9D, the third bit position corresponds to the level 1 cell 916 (cell address (1, 0)) in the level 1 grid 902, which contains triangles B, C, D. The "Subdivide( )" process creates another level 2 grid 916' from cell 916, and since all three triangles B-D are contained in the cell, the corresponding bitmap looks like [0 1 0 0]. The data stores 214-218 are updated accordingly. The following information represents the "Subdivide( )" process on the level 1 cell at cell address (1, 0):

At L1_Relative_ptr=1
Subdivide Level 1 Bin[RtAE(Block_Level__1, L1_Relative_ptr)];//Bin[(1, 0)];
Level 2[L1_Relative_ptr]Bin(0,0) {null}{triangle_count=0}
Level 2[L1_Relative_ptr]Bin(0,1) {triangle A triangle B triangle C}{triangle_count=3}
Level 2[L1_Relative_ptr]Bin(1,0) {null}{triangle_count=0}
Level 2[L1_Relative_ptr]Bin(1,1) {null}{triangle_count=0}
Block_Subdivide_reg=[0 1 0 0]

Figure 9E:
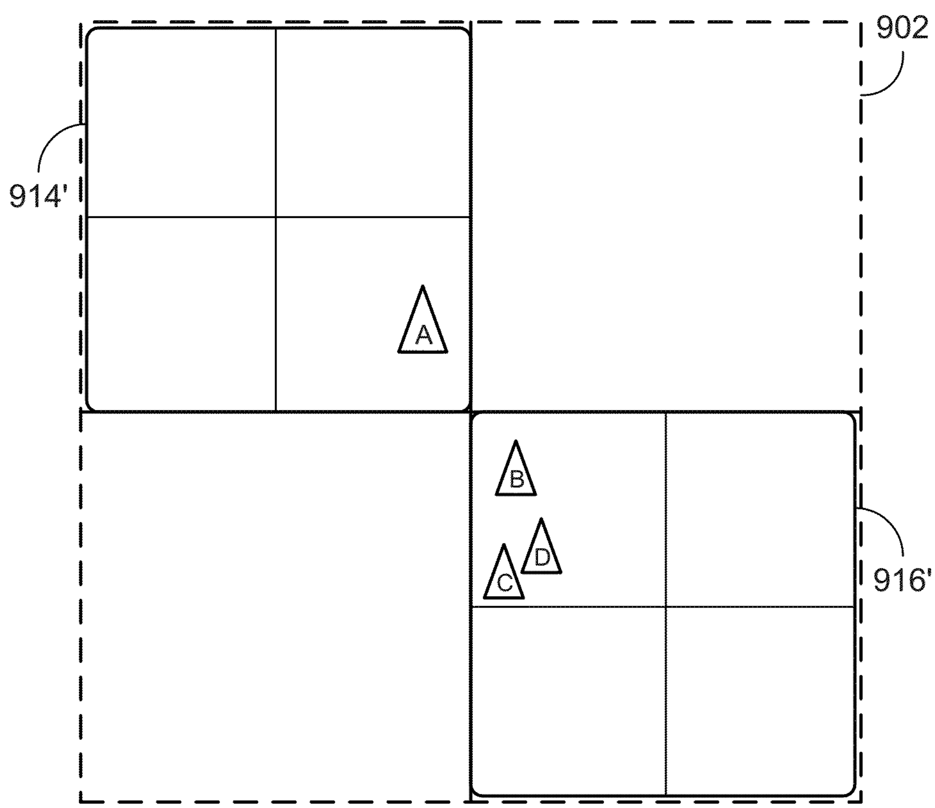

Since there are no more dirty bits in the level 1 bitmap, this completes the processing in block 810 for the level 1 grid 902. Referring to FIG. 9E, at this point, the database contains data for the level 1 grid 902 and for two level 2 grids 914', 916'.

Figure 9F:
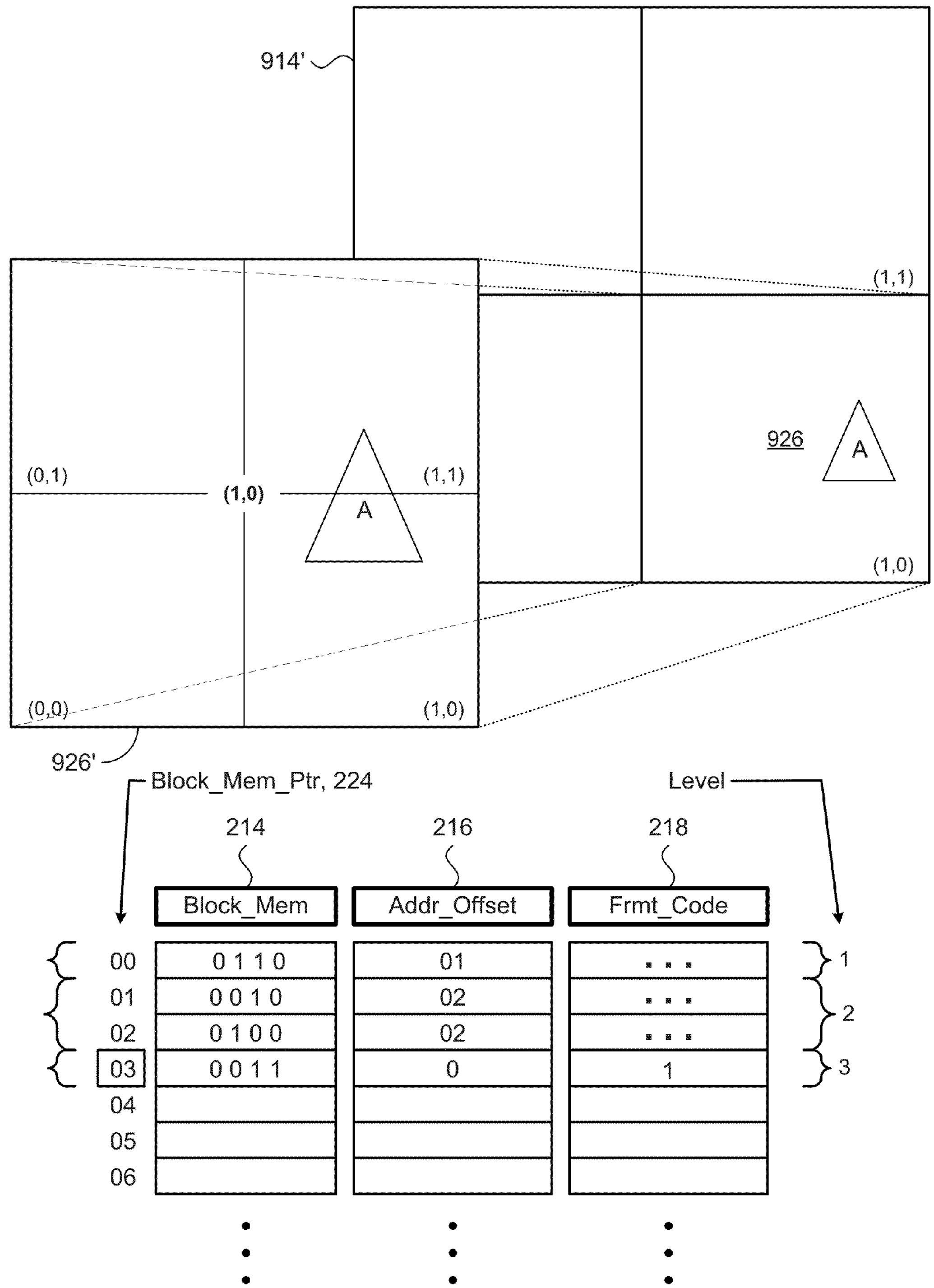
Figures 1, 9F:
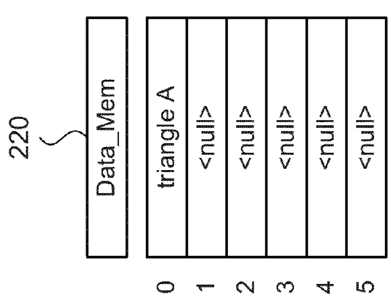
Figures 2, 9F:
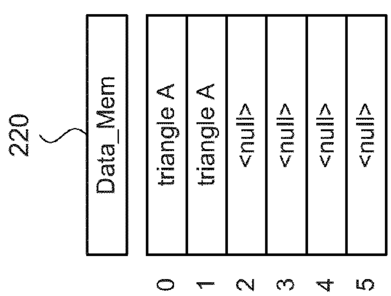

At block 812, each of the level 2 grids, namely grids 914', 916', may be processed to generate partitioning level 3. In particular, each level 2 cell that comprises grid 914' and each level 2 cell that comprises grid 916' is processed to create corresponding level 3 grids. For example, block 812 may first process the level 2 grid 914', by processing each dirty bit in the level 2 bitmap [0 0 1 0] for grid 914'. Referring to FIG. 9F, the first (and only) dirty bit in bitmap [0 0 1 0] is in bit position 3, which corresponds to level 2 cell 926 at cell address (1, 0). Subdividing the level 2 cell 926 creates a level 3 grid 926'. As can be seen in FIG. 9F, triangle A is contained in (bounded by) two level 3 cells in the level 3 grid 926', at cell addresses (1, 0) and (1, 1). Accordingly, the bitmap for the level 3 grid 926' is [0 0 1 1].

Figures 1, 9G:
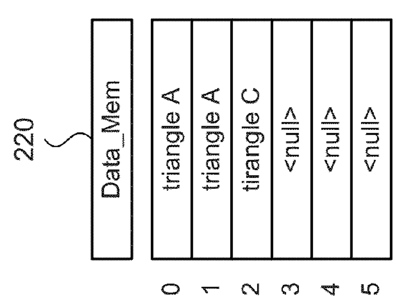
Figures 2, 9G:
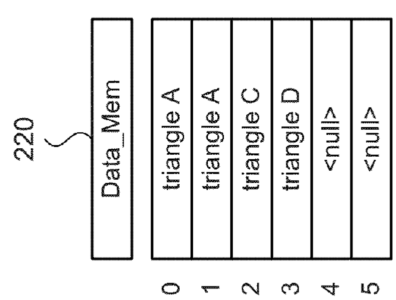
Figures 3, 9G:
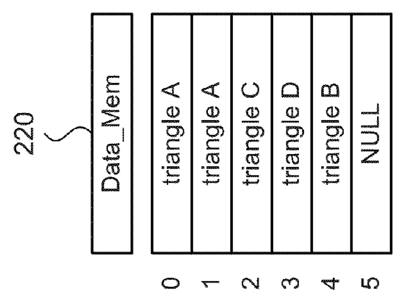
Figure 9G:
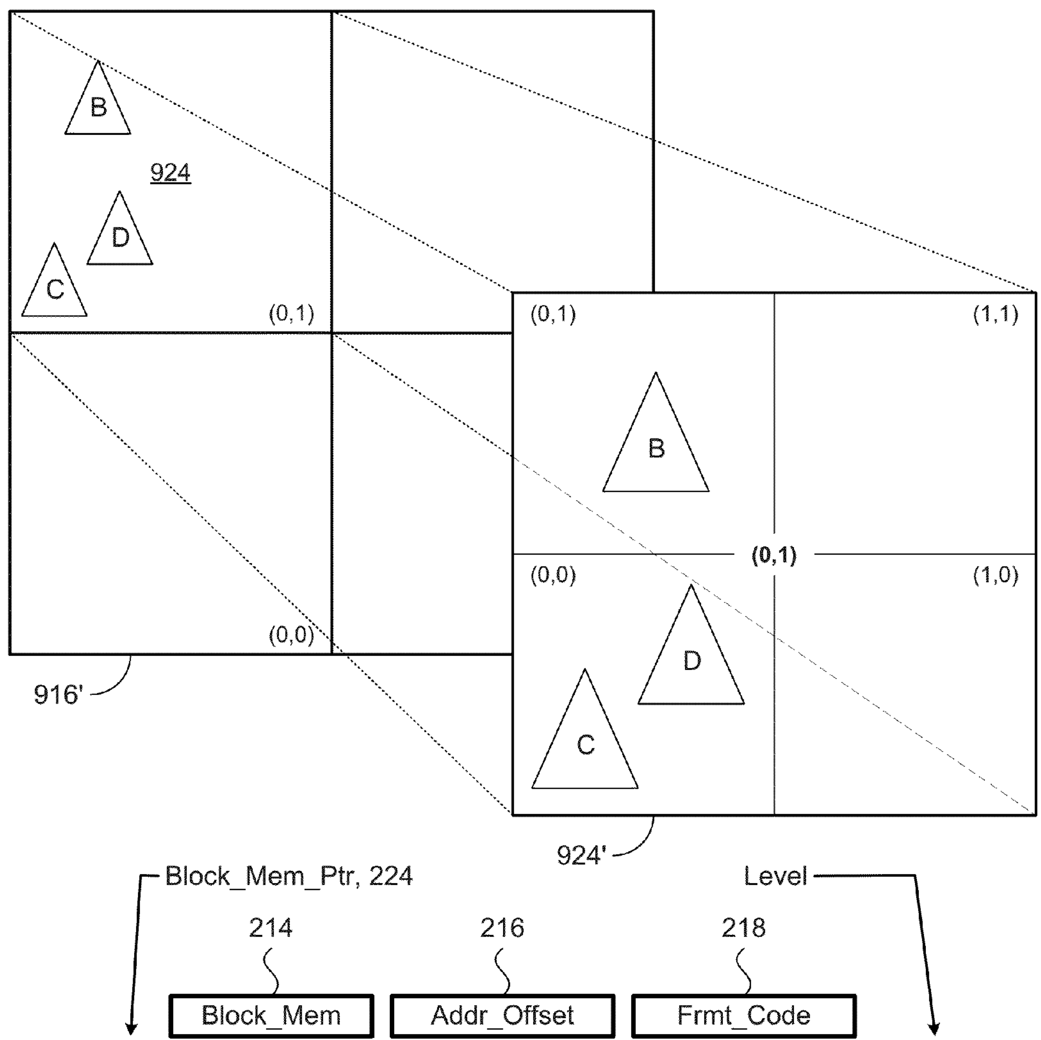
Figure 9H:
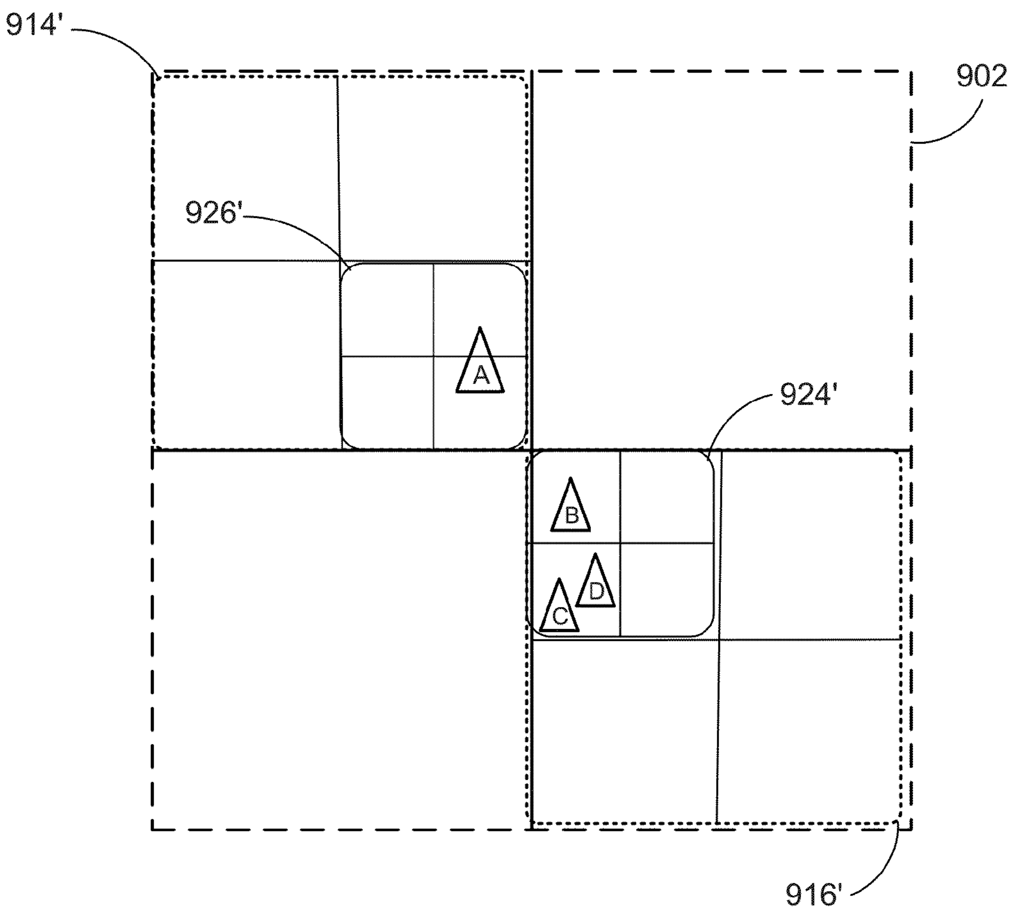

Block 812 may process the next (and last) level 2 grid 916', by processing each dirty bit in the level 2 bitmap [0 1 0 0] for grid 916'. Referring to FIG. 9G, the first (and only) dirty bit in bitmap [0 1 0 0] is in bit position 2, which points to level 2 cell 924 at cell address (0, 1). Subdividing the cell 924 creates level 3 grid 924'. As can be seen in FIG. 9G, triangles B and C are contained in cell address (0, 0) of grid 924' and triangle A is contained in cell address (0, 1) of the grid. Accordingly, the bitmap for the level 3 grid 924' is [1 1 0 0]. Referring to FIG. 9H, the database contains data for the level 1 grid 902, two level 2 grids 914', 916', and two level 3 grids 924', 926'.

Since level 3 is the final partitioning level in our example, there is processing (block 814) to store the binned triangles into the Data_Mem data store 220. In accordance with the present disclosure, packet binning may be used to bin the triangles. Packet binning will be explained in more detail below. As explained above, triangles are binned at each partitioning level. More particularly, each triangle in the scene at a given partitioning level is binned according to the cell(s) in a given grid at the given partitioning level that wholly or partially contain that triangle. For example, triangle A will be binned into level 1 cell 914 at (0, 1) (see FIG. 9B), into the level 2 cell 926 at (1, 0) (see FIG. 9C), and into level 3 cells (1, 0) and (1, 1) as shown in FIG. 9C.

Processing in block 814 uses the Write_Data_Structure( ) module shown in the pseudo-code fragment below. In accordance with some embodiments of the present disclosure, the following pseudo-code fragment may be used to represent some of the processing in blocks 812 and 814:

PSEUDO-CODE FRAGMENT IV.

```
L1_Block_Count = Block_Count ( Block_Level_1 );
Write_Data_ptr = 0;
// Using the same Block_Mem for Level 1 and Level 2,
// with Level 1 Block taking one address location:
First_L2_Block_Mem_Ptr = 1
For ( L2_Block_Mem_Ptr = First_L2_Block_Mem_Ptr ;
    L2_Block_Mem_Ptr < L1_Block_Count +
    First_L2_Block_Mem_Ptr ;
    L2_Block_Mem_Ptr++) {
// processing in block 812
    For ( L2_Relative_ptr = 0;
        L2_Relative_ptr < Block_Count [ Block_Mem
        [ L2_Block_Mem_Ptr ] ];
        L2_Relative_ptr++) {
          //
          // Create Level 3 grid from level 2 cell
          //
          XY_Position = RtAE ( Block_Mem [ L2_Block_Mem_Ptr ],
          L2_Relative_ptr );
          L3_Block_Mem_Ptr = Block_Mem_Ptr ;
          // New Level 3 Block ptr
          Subdivide ( Level_2_Bin [ L2_Block_Mem_Ptr ]
          [ XY_Position ] );
          //
          // update data stores
          //
          Block_Max_Triangle_Bin_Count( ); // Get Max Triangle Count
          Block_Mem [Block_Mem_Ptr ] = Block_Subdivide_reg,
          Address_Offset [ Block_Mem_Ptr ] = Write_Data_ptr ,
          Format_Codes [ Block_Mem_Ptr ] = Max_Triangle_Bin_Count;
          //
          // processing for block 814
          //
          For ( L3_Relative_ptr = 0 ;
              L3_Relative_ptr < Block_Count [ L3_Block_Mem_Ptr ];
              L3_Relative_ptr ++)
                Write_Data_Structure( ); // Write to Data Memory
                in Linear
                                          // Contiguous order
          // End For
          Block_Mem_Ptr++;
      }// End For
}// End For}
```

The notation Level__2_Bin[L2_Block_Mem_Ptr][XY_Position] references a level 2 cell in the level 2 grid (represented by the bitmap L2_Block_Mem_Ptr) that is identified by XY_Position. The format codes may be used in the last partitioning level to inform how to store the triangles in the Data_Mem data store 220, and how to give pointer values to the dirty bits in the level 3 block bitmap (Block_Level__3). In a particular implementation, the maximum triangle count in a given bin will be used. A Block_Max_Triangle_Bin_Count( ) module can be defined to generate the triangle count of the cell in a given grid (e.g., level 3 grid) that has the largest number of binned triangles. This module may be represented, for example, using the following pseudo-code fragment:

PSEUDO-CODE FRAGMENT V.

```
// Block_Max_Triangle_Bin_Count
// the current level block_mem_ptr may be:
// L1_Block_Mem_ptr, L2_Block_Mem_ptr, or L3_Block_Mem_ptr
Max_Triangle_Bin_Count = 0 ;
L_Block_Mem_ptr =c urrent level Block_Mem_ptr
For ( Relative_ptr = 0;
    Relative_ptr < Block_Count ( Block_Mem [ L_Block_Mem_ptr ] );
    Relative_ptr++) {
      XY_Position = RtAE ( Block_Mem [L_Block_Mem_ptr ],
      Relative_ptr );
      t_count = Level [ L_Block_Mem_ptr ] Bin
      [ XY_Position ] Triangle_count;
      If ( t_count > Max_Triangle_Bin_Count )
          Max_Triangle_Bin_Count = t_count;
}// End For
// End Block_Max_Triangle_Bin_Count
```

The notation Level [L_Block_Mem_ptr]Bin[XY_Position] Triangle_count represents the triangle count of the triangles binned in the cell identified by the cell address XY_Position in a particular grid at a particular partitioning level identified by Level [L_Block_Mem_ptr].

An illustrative embodiment of the Write_Data_Structure( ) module may be expressed using the following pseudo-code fragment:

PSEUDO-CODE FRAGMENT VI.

```
// Write_Data_Structure
//    Takes the Triangles from the Bins, and writes the Triangles into
//    linear & contiguous memory using Triangle_Count
XY_Position = RtAE ( Block_Mem [ L3_Block_Mem_ptr ] ,
L3_Relative_ptr )
Local_Triangle_count = Level_3 [ L3_Relative_ptr ] Bin (XY_Position )
Triangle_Count;
For ( Triangle_Count_ptr = 0; Triangle_Count_ptr <
Max_Triangle_Bin_Count;
  Triangle_Count_ptr++ ) {
  If ( Triangle_Count_ptr < Local_Triangle_Count )
    // Each Bin has its own triangle count
    // use this to move each triangle from the list
    // up to the Bin's triangle_count
    Write Triangle [ Triangle_Count_ptr ] to
    Data_Mem [ Write_Data_ptr ];    // to Data Structure (Data_Mem
    data store 220)
  Else
    // If the Bin's triangle_count is less than Max_Triangle_Bin_Count
    // then fill ( Max_Triangle_Bin_Count – Bin's triangle_count )
    // with NULLs
    Write NULL to Data_Mem [ Write_Data_ptr ];    // to Data Structure
  Write_Data_ptr++;
}
// End Write_Data_Structure
```

The following data structures are an illustrative representation of a result of processing in blocks 812 and 814 on the level 2 cell 926 shown in FIG. 9F:

PSEUDO-CODE FRAGMENT VII.

```
At L2_Block_Mem_ptr = 1;
At L2_Relative_ptr = 0;
// create level 3 grid
Subdivide Level 2 Bin [ RtAE ( Block_Mem [ L2_Block_Mem_ptr ], L2_Relative_ptr ) ] ;
   Level 3 Bin (0,0) { null } {triangle_count = 0}
   Level 3 Bin (0,1) { null } {triangle_count = 0}
   Level 3 Bin (1,0) { triangle A } { triangle_count = 1 }
   Level 3 Bin (1,1) { triangle A } { triangle_count = 1 }
   Block_Subdivide_reg = [ 0011 ]
Block_Max_Triangle_Count( );    // Max_Triangle_Bin_Count = 1
Block_Mem [ Block_Mem_ptr]        = Block_Subdivide_reg;    // Block_Mem [ 3 ] = [ 0011 ]
Address_Offset [ Block_Mem_ptr ]  = Write_Data_ptr = 0 ;    // Address_Offset [ 3 ] = 0 ;
Format_Codes [ Block_Mem_ptr ]    = Max_Triangle_Bin_Count;
                                                            // Format_Codes [ 3 ] = 1
```

So far, the Address_Offset data store 216 has been used to point to entries in the Block_Mem data store 214, but in the final partitioning level (in our example level 3), Address_Offset will be used to point to entries in the Data_Mem data store 220, where data about the triangles are stored. The Address_Offset can be relative or absolute, but will be relative in this example. Accordingly, as shown in FIG. 9F, the Address_Offset entry for Block_Mem_Ptr=3 is set to the beginning of the Data_Mem data store 220, namely offset=0. In addition, the Format_Codes data store 218 will store the largest number of triangles binned in a cell in the level 3 grid, which in this case is 1, referring to triangle A in cell (1, 1).

Since partitioning level 3 is the last level, the triangles identified in block 812 for a given level 3 grid may now be stored (block 814) in memory; e.g., the Data_Mem data store 220. The following pseudo-code fragment is illustrative of the processing in blocks 812 and 814 for L2_Block_Mem_ptr=1. The data states of the Data_Mem data store 220 are illustrated in FIGS. 9F-1 and 9F-2.

PSEUDO-CODE FRAGMENT VIII.

```
L2_Block_Count    =2;
Write_Data_ptr    = 0 ;
L3_Block_Mem_ptr = Block_Mem_ptr ; // First Level 3 Block_Mem_ptr
At L2_Block_Mem_Ptr = 1 ;
   At L2_Relative_ptr = 0 ;
   XY_Position = 10 ;
   Subdivide Level 2 [ 0 ] Bin [ 10 ];    // Create New Level 3
   Max_Triangle_Bin_Count = 1;
   Block_Mem [ 3 ]        = [ 0011 ] ;
   Address_Offset [ 3 ]   = 0 ;
   Format_Codes [ 3 ]     = 1; // Max_Triangle_Bin_Count
   At L3_Block_Mem_ptr = 3     // First Level 3 Block, See Fig. 9F-1
      At L3_Relative_ptr = 0
      XY_Position = 10 ;
      Local_Triangle_Count = Level 3 [ 0 ] Bin [ 10 ] Triangle_Count = 1 ;
      Triangle_Count_ptr = 0 ;
      Write Triangle [ 0 ] to Data_Mem [ 0 ] ; // Write Triangle A from Bin
      [10]
      Write_Data_ptr++ ; // Write_Data_ptr = 1 // See Fig. 9F-2
   At L3_Relative_ptr = 1
      XY_Position = 11 ;
      Subdivide Level 2 [ 0 ] Bin [ 11 ] ;
      Local_Triangle_Count = Level 3 [ 0 ] Bin [ 11 ] Triangle_Count = 1 ;
      Write Triangle [ 0 ] to Data_Mem [ 1 ]; // Write Triangle A from Bin
      [11]
      Write_Data_ptr++ ; // Write_Data_ptr = 2
```

The following information represent the result of processing in blocks 812 and 814 on the level 2 cell 924 shown in FIG. 9G:

PSEUDO-CODE FRAGMENT IX.

```
At L2_Block_Mem_ptr = 2 :
At L2_Relative_ptr = 0 ;
// create level 3 grid
XY_Position = 00 ;
Subdivide Level 2 Bin [ 00 ] ;
   Level 3 [ 1 ] Bin (0,0) { triangle C triangle D } { triangle_count = 2 }
   Level 3 [ 1 ] Bin (0,1) { triangle B } { triangle_count = 1 }:
   Level 3 [ 1 ] Bin (1,0) { null } {triangle_count = 0}
   Level 3 [ 1 ] Bin (1,1) { null } {triangle_count = 0}
   Block_Subdivide_reg = [ 1100 ];
Block_Max_Triangle_Count;    // Max_Triangle_Bin_Count = 2 ;
Block_Mem [ 4 ]       = [ 1100 ]
Address_Offset[ 4 ]   = 2 ;
Format_Codes [ 4 ]    = 2 ;
```

The following pseudo-code fragment is illustrative of the processing in blocks 812 and 814 for L3_Block_Mem_ptr=4. The data states of the Data_Mem data store 220 are illustrated in FIGS. 9G-1, 9G-2, and 9G-3.

PSEUDO-CODE FRAGMENT X.

```
At L3_Relative_ptr = 0
   XY_Position = 00 ;
   Local_Triangle_Count = Level 3 [ 1 ] Bin [ 00 ] Triangle_Count = 2 ;
   Triangle_Count_ptr = 0;
   Write Triangle [ 0 ] to Data_Mem [ 2 ] ; // Write Triangle C from Bin
   [ 00 ]
   Write_Data_ptr++ ; // Write_Data_ptr = 3 // See Fig. 9G-1
   Triangle_Count_ptr = 0;
   Write Triangle [ 1 ] to Data_Mem [ 3 ] ; // Write Triangle D from Bin
   [00 ]
   Write_Data_ptr++ ; // Write_Data_ptr = 4 // See Fig. 9G-2
At L3_Relative_ptr = 1
   XY_Position = 01 ;
   Local_Triangle_Count = Level 3 [ 1 ] Bin [ 01 ] Triangle_Count = 1 ;
   Triangle_Count_ptr = 0;
   Write Triangle [ 0 ] to Data_Mem [ 4 ]; // Write Triangle B from Bin
   [ 01 ]
   Write_Data_ptr++ ; // Write_Data_ptr = 5 // See Fig. 9G-3
   Triangle_Count_ptr = 1 ;
   Write NULL to Data_Mem [ 5 ]; // See Fig. 9G-3
   // Max_Triangle_Bin_Count > Triangle_Count_ptr
   Write_Data_ptr++ ; // Write_Data_ptr = 6
```

This completes the initial description of database construction in accordance with the present disclosure. A description of Subdivide( ) will be discussed below in connection with triangle binning At this point, however, the discussion will turn to a description of a GTU in accordance with the present disclosure.

III. Grid Traversal Unit (GTU)

Figure 10:
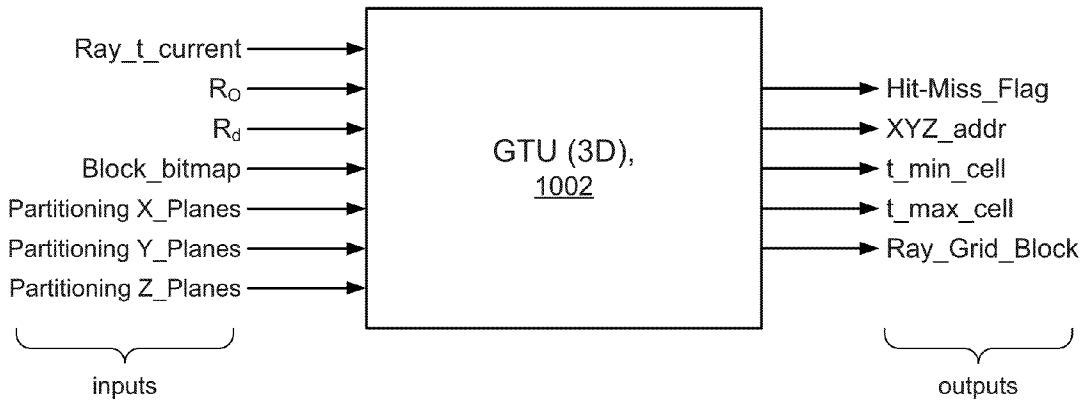
FIG. 10 shows an example of a grid traversal unit.

FIG. 10 illustrates an example of a 3D GTU 1002 to facilitate processing ray traversal in accordance with principles of the present disclosure. In some embodiments, the GTU 1002 is a configurable parallel architecture data engine (e.g., comprising digital logic circuitry) that can be configured to execute ray traversal operations. One of the basic operations for ray traversal is detecting the intersection of a ray with an object in the scene. The basic idea is to "shoot" a ray into a grid (which will be referred to herein as "the grid of interest" or simply "the grid"), and determine whether the ray intersects a dirty cell in the grid and the cell address of the closest dirty cell intersected by the ray. Subsequent processing, described later, will determine whether the ray intersects the object in the dirty cell, but the GTU first identifies the closest dirty cell intersected by the ray.

As can be seen in FIG. 10, the 3D GTU 1002 may operate to receive the following inputs and produce the following outputs relating to ray traversal operations:

- input: Ray_t_current—This indicates the current ray distance.
- input: $R_O$—This is the point of origin of a ray ("ray origin") that is shot into the grid. In a 3D world coordinate system, the ray origin may be expressed in terms of the X, Y, Z coordinates of the point of origin; for example, $R_O \equiv X_O, Y_O, Z_O$.
- input: $R_d$—This is a direction vector of the ray. The ray direction vector $R_d$ may be expressed in any of several conventional ways; e.g., in terms of its component vectors $X_d$, $Y_d$, $Z_d$ on respective X-, Y-, and Z-axes. The ray direction vector $R_d$ may be a unit vector.
- input: Block_bitmap—This is a bitmap that represents the grid of interest, for a given partitioning level. The number of bits in the bitmap depends on the X-, Y-, and Z-resolutions. For example, the number of bits in the bitmap will equal $N_x \times M_y \times Q_z$, where $N_x$ is the number of cells along the X-axis, $M_y$ is the number of cells on the Y-axis, and $Q_z$ is the number of cells on the Z-axis.
- input: partitioning X_Planes[0-$N_x$]—This is an array (of size $N_x+1$) of X-axis coordinates of partitioning planes on the X-axis (X-partitioning planes) that comprise the grid of interest. Partitioning planes are known, but will nonetheless be discussed in more detail below.
- input: partitioning Y_Planes[0-$M_y$]—This is an array (of size $M_y+1$) of Y-axis coordinates of partitioning planes on the Y-axis (Y-partitioning planes) that comprise the grid of interest.
- input: partitioning Z_Planes[0-$Q_z$]—This is an array (of size $Q_z+1$) of Z-axis coordinates of partitioning planes on the Z-axis (Z-partitioning planes) that comprise the grid of interest.
- output: Hit_Miss_Flag—This flag is set or not set depending on whether the ray intersects a dirty cell within the grid of interest. For example, this flag may be set (e.g., set to '1') if the ray intersects a dirty cell, and set to '0' otherwise. The other outputs may be ignored if the flag is not set, since this would mean that the given ray did not intersect any dirty cells in the grid of interest.
- output: XYZ_addr—This represents the cell address of the closest dirty cell intersected by the ray, if the Hit_Miss_Flag is set; e.g., this may be an n-bit value, where $n=N_x \times M_y \times Q_z$. In other words, XYZ_addr identifies the first dirty cell intersected by the ray as defined by its origin $R_O$ and direction vector $R_d$.
- output: t_min_cell—This represents the distance from the ray origin $R_O$, along the ray direction vector $R_d$, to the point where the ray enters the closest dirty cell, if the Hit_Miss_Flag is set.
- output: t_max_cell—This represents the distance from the ray origin $R_O$, along the ray direction vector $R_d$, to the point where the ray exists the closest dirty cell, if the Hit_Miss_Flag is set.
- output: Ray_Grid_Block—This is an "intersection" bitmap that represents the grid of interest. The Ray_Grid_Block is similar to the Block_bitmap in that the Ray_Grid_Block is a bitmap comprising a bit for each cell in the grid of interest, a total of $N_x \times M_y \times Q_z$ bits. However, unlike the Block_bitmap, where bits are set when their corresponding cells are dirty, bits in the Ray_Grid_Block are set when their corresponding cells (dirty or clean) are intersected by the ray, as defined by the $R_O$ and $R_d$ input parameters, where the intersect distance is ≥ Ray_t_current (i.e., where the ray intersect occurs at or in front of the current position of the ray).

Note—If an object bounded by a cell at XYZ_addr has a ray intersection, then the t_min_cell and t_max_cell values provide the information to determine if the intersection with the ray occurs inside the cell, for example, by comparing a distance value t_Ray (e.g., FIG. 26) of the ray/object intersection with t_min_cell and t_max_cell.

In some embodiments, the GTU inputs and outputs may be signal lines (data buses) for carrying data into (input data buses) the GTU 1002 and data out of (output data buses) the GTU. For example, if the block bitmap is a 512-bit bitmap, then the Block_bitmap input may be a data bus having 512 bitlines.

The examples in FIGS. 11A-11D illustrate some of the inputs and outputs described above. In order to keep the discussion manageable, the examples shown in the figures are for a 2D scene, partitioned at level 1 using grids having a 2×2 resolution, where $N_x=M_y=2$. In each example, the ray is defined by its ray origin $R_O$ and its ray direction vector $R_d$. One of ordinary skill can readily apply these inputs and outputs to 3D grids.

Figure 11A:
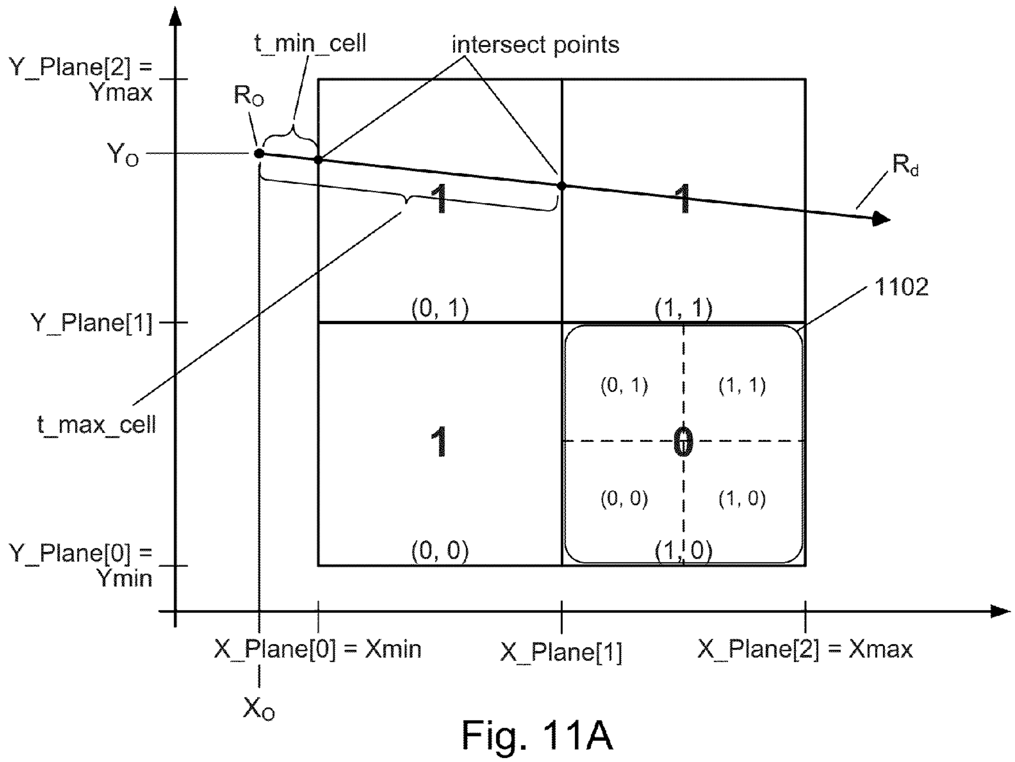
FIGS. 11A-11D illustrate examples of ray traversal through a grid.

FIG. 11A shows a grid that is represented by the bitmap (Block_bitmap) [1 1 0 1]. The ray intersects dirty cells at cell addresses (0, 1) and (1, 1). The GTU 1002 will assert the Hit_Miss_Flag (e.g., Hit_Miss_Flag='1'). The XY_addr output will be (0, 1) because that is the closest dirty cell intersected by the ray. The distance values t_min_cell and t_max_cell will be generated for the cell at address (0, 1) where the ray enters the cell and leaves the cell. Ray_Grid_Block will be [0 1 0 1], which indicates that the ray intersects (passes through) the cells at cell addresses (0, 1) and (1, 1). The figure shows examples of "intersect points" on the X-partitioning planes[1] and [2]. FIG. 11A further shows an example of a level 2 grid 1102 defined in level 1 cell address (1, 0), which will be referred to again below in connection with partitioning planes.

Figure 11B:
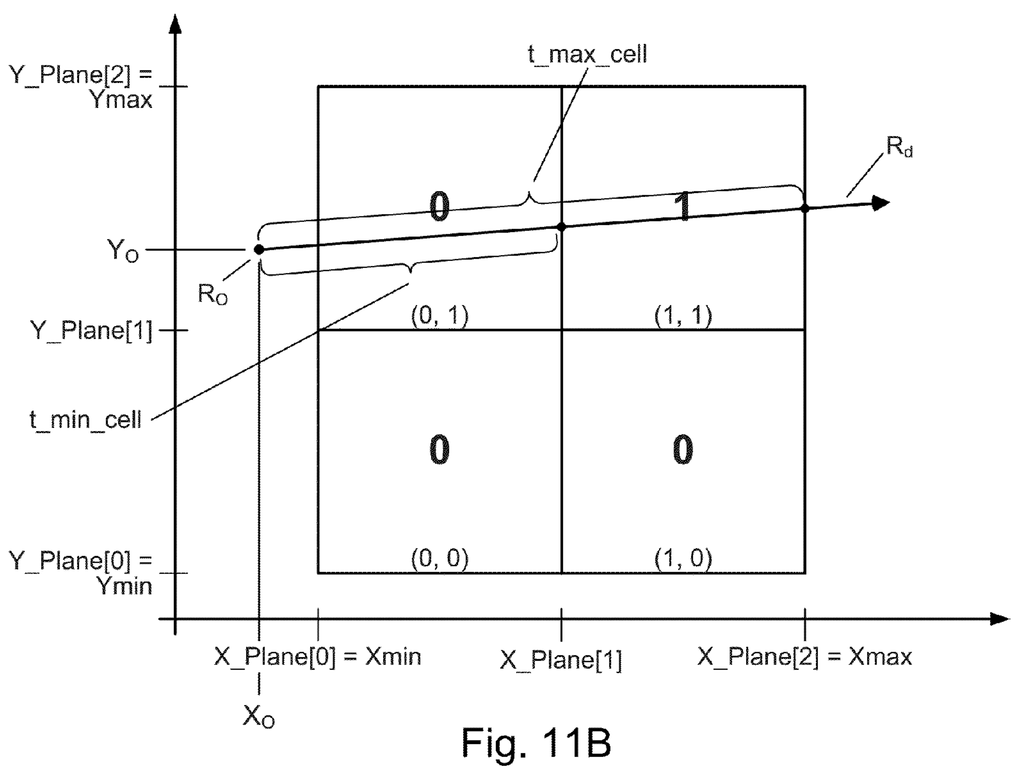

FIG. 11B shows a grid represented by Block_bitmap=[0 0 0 1] in which the ray intersects the dirty cell at cell address XY_addr=(1, 1). The distance values of t_min_cell and t_max_cell will be generated for the cell at address (1, 1) where the ray enters the cell and leaves the cell. The Ray_Grid_Block will be [0 1 0 1] because the ray intersects the cells at cell addresses (0, 1) and (1, 1).

Figure 11C:
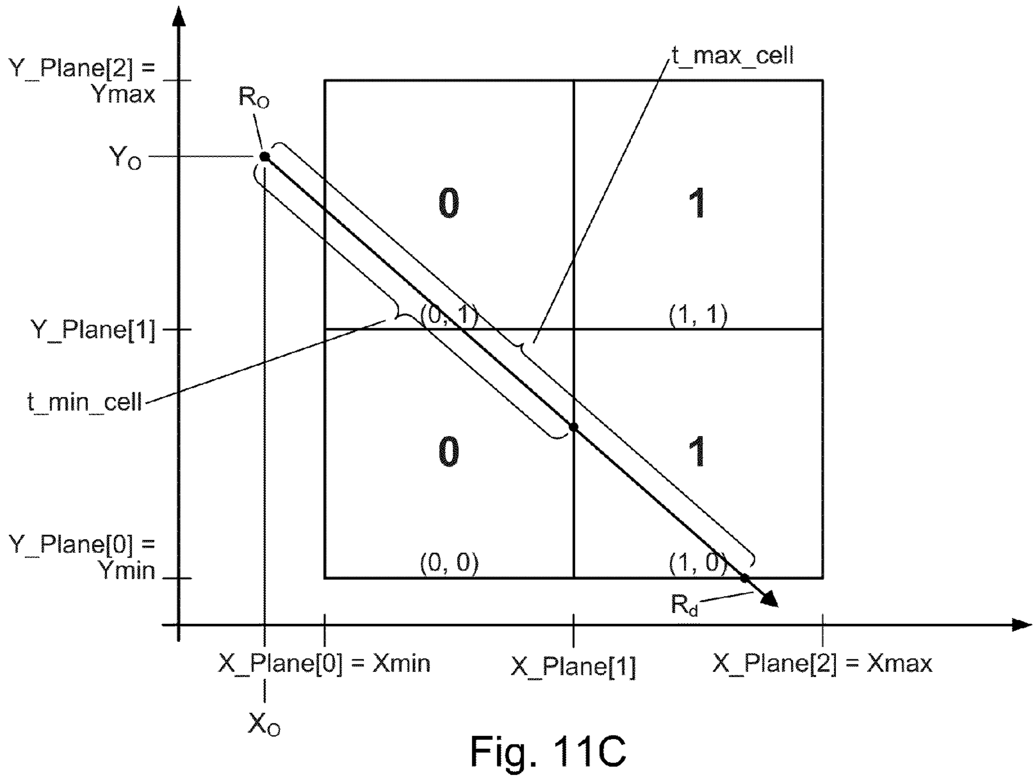

FIG. 11C shows a grid [0 0 1 1] where the ray intersects the dirty cell at XY_addr=(1, 0). The distance values of t_min_cell and t_max_cell will be generated for the cell at address (1, 0) where the ray enters the cell and leaves the cell. The Ray_Grid_Block will be [1 1 1 0] because the ray intersects the cells at cell addresses (0, 0), (0, 1) and (1, 0).

Figure 11D:
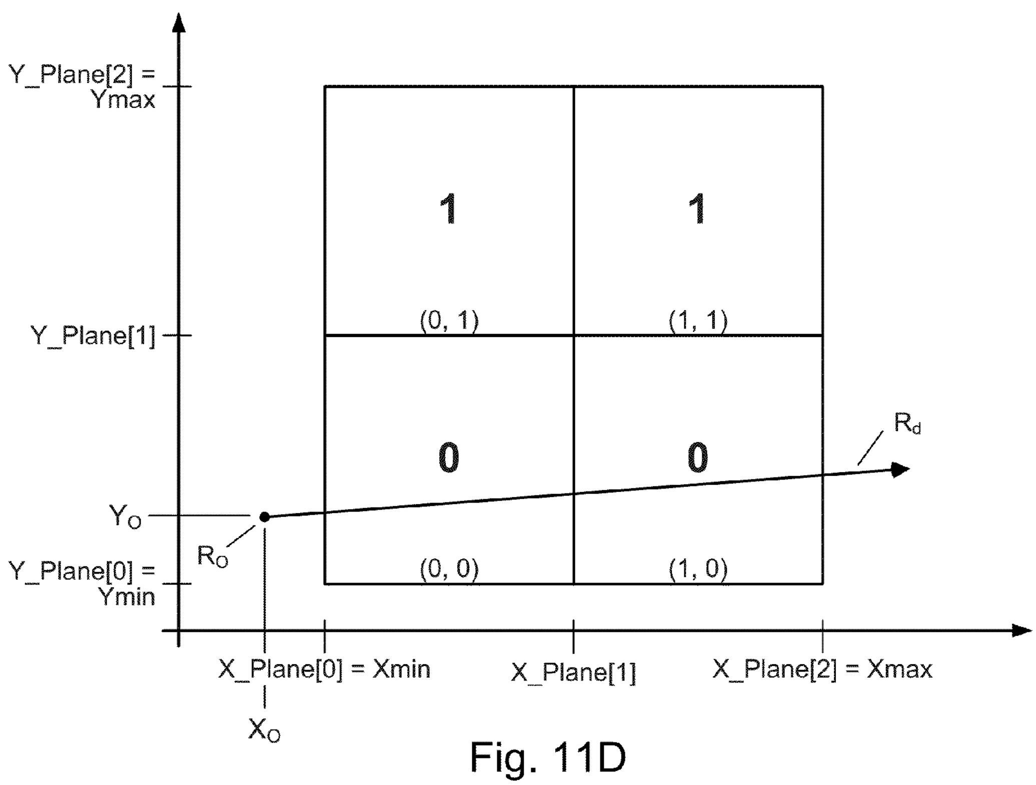

FIG. 11D illustrates an example, where the ray does not intersect any of the two dirty cells in the grid (represented in this example by Block_bitmap=[0 1 0 1]). Here, the Hit_Miss_Flag is not asserted; e.g., Hit_Miss_Flag='0'), and so the other GTU outputs (e.g., t_min_cell, t_max_cell, etc.) may be ignored.

Figure 12:
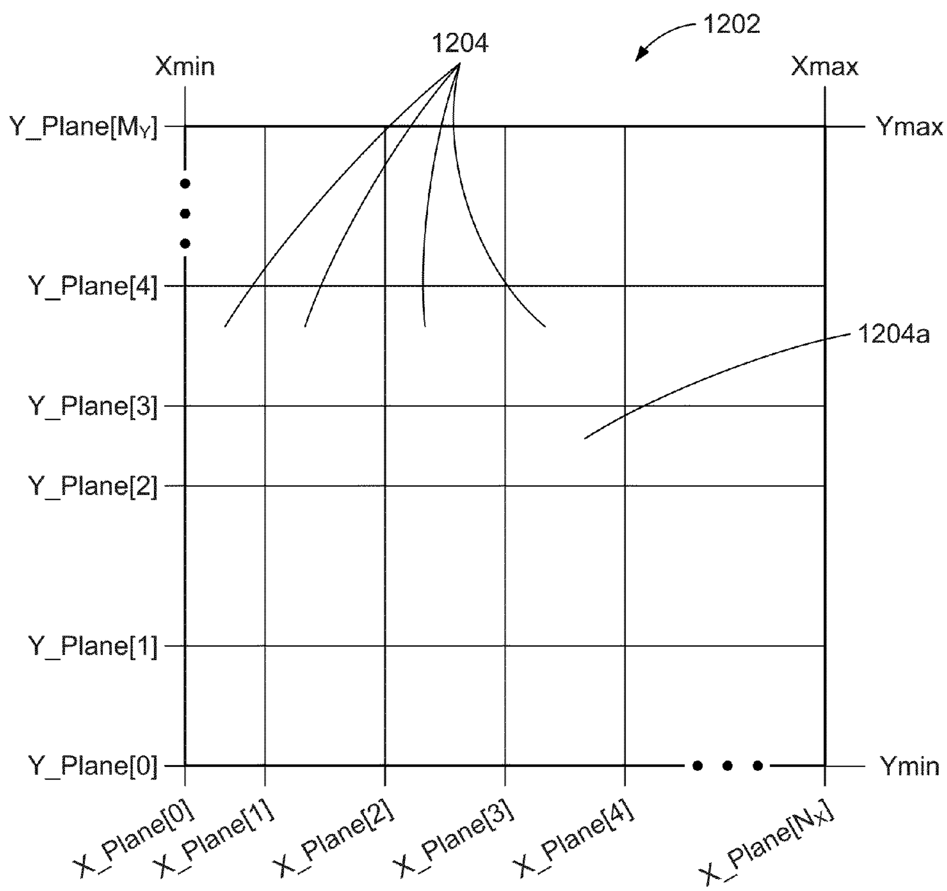
FIG. 12 illustrates an example of partitioning planes.

The discussion will now turn to a description of partitioning planes (e.g., X_Plane[ . . . ] and Y_Plane[ . . . ]) with reference to the example shown in FIG. 12, where a 2D grid is used to keep the discussion manageable. The figure shows a 2D grid 1202 partitioned into planes ("partitioning planes") on the X-axis (X-partitioning planes) and on the Y-axis (Y_partitioning planes). The partitioning resolution is $N_x \times M_y$, which means that the grid is partitioned on the X-axis into $N_x$ partitions and on the Y-axis into $M_y$ partitions thus defining $N_x \times M_y$ cells. Each cell 1204 is bounded by a pair of X-partitioning planes and a pair of Y-partitioning planes. For example, cell 1204*a* is bounded on the X-axis by X_Plane[3] and X_Plane[4] and on the Y-axis by Y_Plane[2] and Y_Plane[3].

In some embodiments, each partitioning plane may be defined by a coordinate on its respective axis. The partitioning planes may be stored in an array of such coordinates. Thus, for example, X_Plane[0] represents an X-partitioning plane at the coordinate Xmin, X_Plane[$N_x$] is defined by the coordinate Xmax, and so on. In some embodiments, the grid partitioning may be uniform, or as illustrated in FIG. 12, the partitioning may be non-uniform.

As an illustration, the following pseudo-code fragment may be used to generate the coordinate for each X-partitioning plane. The pseudo-code fragment partitions planes for four partitioning levels, although additional partitioning levels can be generated. We can assume without loss of generality, that the partitioning planes at each level are uniformly distributed. It will be appreciated, however, that in some embodiments denser plane resolutions could be placed on the viewport, or view frustrum, than on world coordinates not in view. The same pseudo-code fragment may be used to generate the coordinates for the Y-partitioning planes, and, in the case of a 3D grid, for the Z-partitioning planes:

PSEUDO-CODE FRAGMENT XI.

```
X_Plane_Delta_Level_1 = ( Xmax − Xmin )            / Grid X dimension Level 1 ;
X_Plane_Delta_Level_2 = X_Plane_Delta_Level_1      / Grid X dimension Level 2 ;
X_Plane_Delta_Level_3 = X_Plane_Delta_Level_2      / Grid X dimension Level 3 ;
X_Plane_Delta_Level_4 = X_Plane_Delta_Level_3      / Grid X dimension Level 4 ;
// Level 1 Partitioning Planes
  For ( i = 0 ; i < Grid X dimension Level 1 ; i++ )
    Level 1 X_Partition_Plane [ i ] = i * X_Plane_Delta_Level_1 + Xmin
  Level 1 X_Partition_Plane [ Grid X dimension Level 1 ] = Xmax    //Precision Consistency
// Level 2 Partitioning Planes
  L2_X_Base = Level 1 X_Partition_Plane [ Level 1 Grid X_addr ]
  For ( i = 0 ; i < Grid X dimension Level 2 ; i++ )
    Level 2 X_Partition_Plane [ i ] = i * X_Plane_Delta_Level_2 + L2_X_Base
  Level 2 X_Partition_Plane [ Grid X dimension Level 2 ] =
    Level 1 X_Partition_Plane [ Level 1 Grid X_addr + 1 ]    //Precision Consistency
// Level 3 Partitioning Planes
  L3_X_Base = Level 2 X_Partition_Plane [ Level 2 Grid X_addr ]
  For ( i = 0 ; i < Grid X dimension Level 3 ; i++ )
    Level 3 X_Partition_Plane [ i ] = i * X_Plane_Delta_Level_3 + L3_X_Base
  Level 3 X_Partition_Plane [ Grid X dimension Level 3 ] =
    Level 2 X_Partition_Plane [ Level 2 Grid X_addr + 1 ]    //Precision Consistency
// Level 4 Partitioning Planes
  L4_X_Base = Level 3 X_Partition_Plane [ Level 3 Grid X_addr ]
  For ( i = 0 ; i < Grid X dimension Level 4 ; i++ )
    Level 4 X_Partition_Plane [ i ] = i * X_Plane_Delta_Level_4 + L4_X_Base
  Level 4 X_Partition_Plane [ Grid X dimension Level 4 ] =
    Level 3 X_Partition_Plane [ Level 3 Grid X_addr + 1 ]    //Precision Consistency
```

"Grid X dimension Level n" refers to the X-axis grid resolution at level n. The foregoing defines baseline X-planes for four partitioning levels. Baseline Y-planes may be similarly defined. These planes are "baseline" in that they define the planes for the level 1 grid. In the case of a 3D scene, the baseline includes Z-planes for the level 1 grid.

Figure 13A:
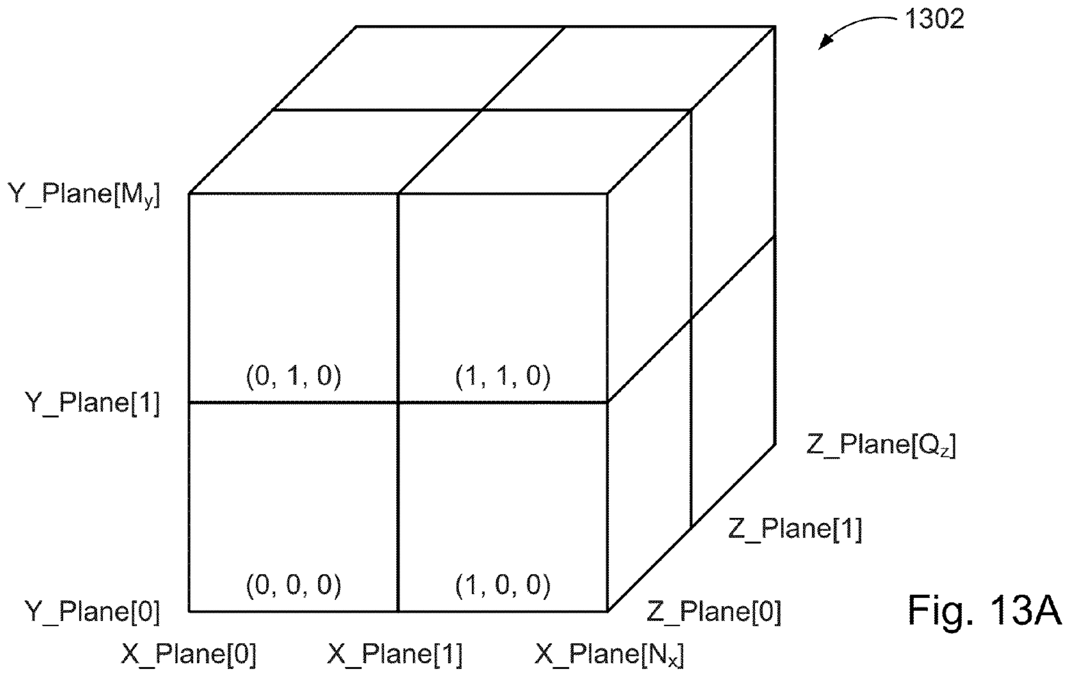
FIGS. 13A and 13B illustrate examples of a partitioned 3D grid.

FIG. 13A illustrates an example of a 3D grid 1302 of $N_x \times M_y \times Q_z$ resolution, where $N_x=M_y=Q_z=2$. The partitioning planes include 3 X-planes, 3 Y-planes, and 3 Z-planes. Any suitable addressing convention may be used to uniquely identify each of the eight cells that comprise the grid. For example, the cell address may be a 3-bit address comprising a 1-bit X-address component, a 1-bit Y-address component, and a 1-bit Z-address component as explained above.

Figure 13B:
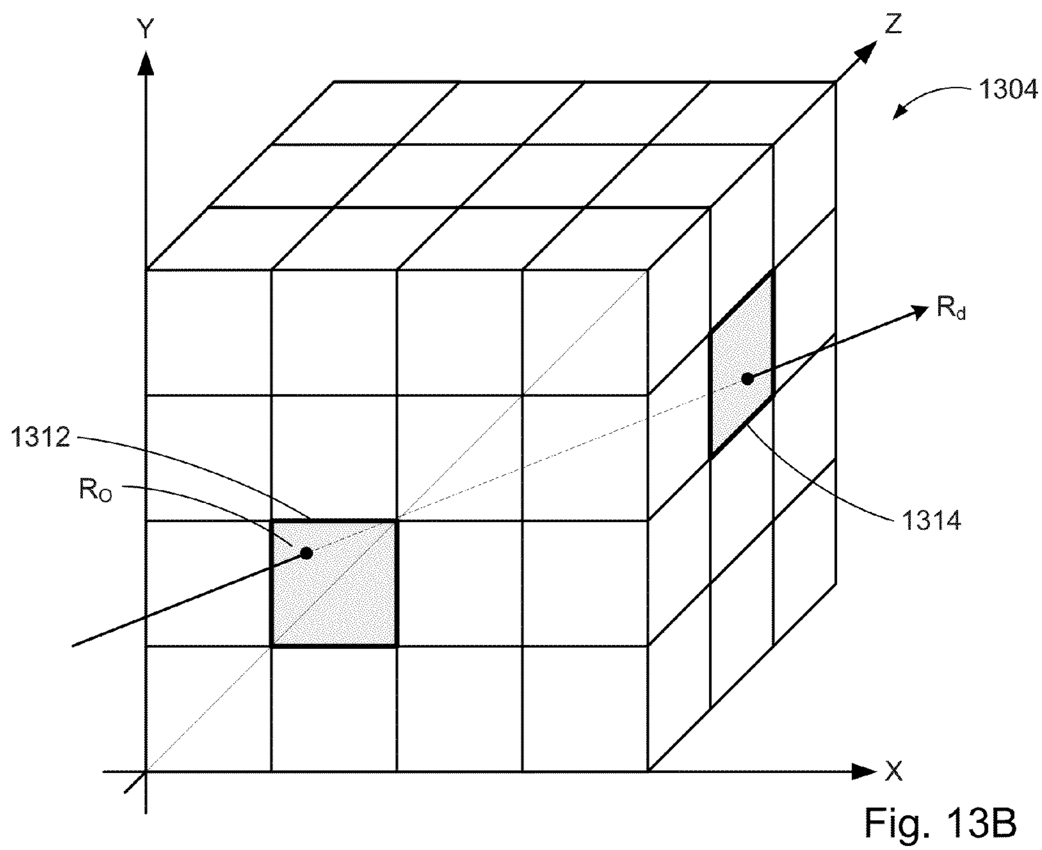

FIG. 13B illustrates an example of a 3D grid 1304 of $N_x \times M_y \times Q_z$ resolution, where $N_x=M_y=Q_z=4$ resulting in $4^3=64$ cells. Each of the 64 cells may be addressed by a 6-bit value. For example, the cell address may comprise a 2-bit X-address component to identify the cell in one of the four positions along the X-axis, and likewise a 2-bit Y-address component and a 2-bit Z-address component. In other embodiments, the number of partitioning planes may be other than 4 (for example, eight or sixteen). In general, the number of cells, and hence the number of bits in the bitmap that represents the grid 1304, is $N_x \times M_y \times Q_z$. The figure further shows a ray defined by $R_O$ and $R_d$. The ray is shown entering the 64-cell grid 1304 at cell 1312 and exiting the grid at cell 1314.

The general 3D plane equation is given by the relation: Ax+By+Cz+D=0. For axis-aligned partitioning planes:

X_Plane: A=1, B=0, C=0

Y_Plane: A=0, B=1, C=0

Z_Plane: A=0, B=0, C=1

The parameter D represents the distance t of the axis from the origin, where:

$$t - \frac{-(AX_O + BY_O + CZ_O + D)}{(AX_d + BY_d + Cz_d)},$$

where the ray origin $R_O$ is defined by the coordinates $X_O$, $Y_O$, $Z_O$, and the ray direction vector $R_d$ is a unit vector defined by the coordinates $X_d$, $Y_d$, $Z_d$ relative to the ray origin. The intersect point of the ray and the plane is defined by:

$$R(t)=R_O+(R_d*t).$$

The discussion will now turn to a description of details of a GTU (e.g., 206, FIG. 2) in accordance with some embodiments. The GTU performs ray traversal through a given grid (grid of interest) of the scene for a given partitioning level. In some embodiments, the GTU may also be configured to support processing for triangle binning, discussed in more detail in Part II.

A. GTU

Figure 14:
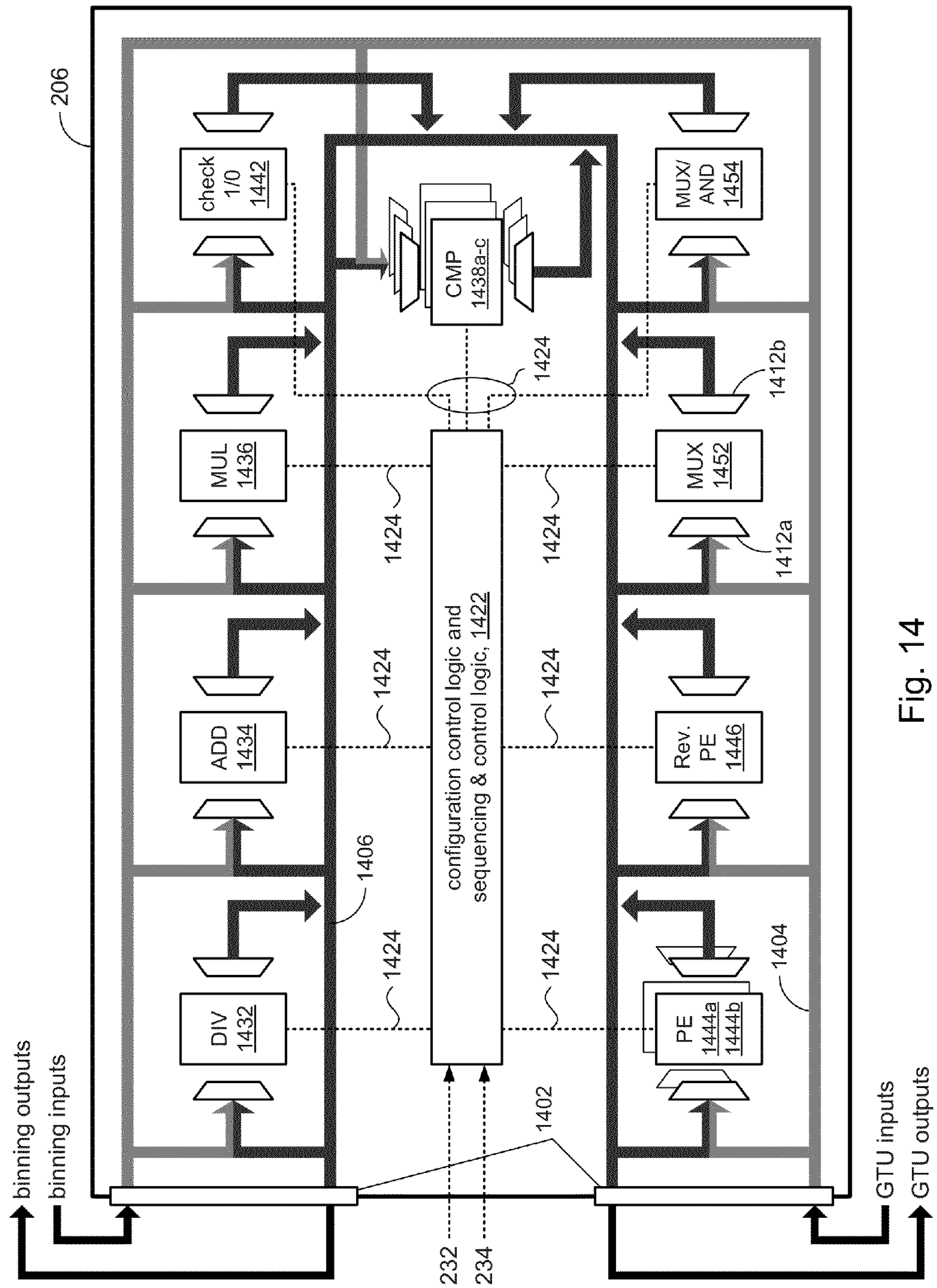
FIG. 14 shows an illustrative embodiment of a grid traversal unit.

Referring to FIG. 14, a high level system diagram showing an illustrative embodiment of a GTU 206 in accordance with the present disclosure will now be described. In some embodiments, the GTU 206 comprises several modules of digital logic circuitry 1432-1454 to provide hardware-based data generation and logical manipulations of data provided to the GTU.

The GTU 206 may comprise a data input section 1404 and a data output section 1406. The data I/O sections 1404 and 1406 illustrated in FIG. 14 are simplified representations for storing and moving data. In particular implementations, the data I/O sections 1404 and 1406 may comprise data buses and control lines for moving data, registers and/or other suitable memory to hold data in transit to support the flow of data into and out of the GTU 206 and its constituent digital logic modules 1432-1454, and selectors and other digital logic to coordinate the movement of data into and out of the GTU and its constituent digital logic modules.

The data input section 1404 may receive GTU inputs from the ray traverser 204 (FIG. 2) or binning inputs from the database builder 202. Conversely, the data output section 1406 may provide GTU outputs to the ray traverser 204 and binning outputs to the database builder 202. An example of GTU inputs is provided above in connection with FIG. 10, as well as the GTU outputs. An example of binning inputs will be discussed in detail below. An example of binning outputs was discussed above in connection with the database builder 202, and in a particular embodiment comprises the bitmap (stored in the Block_Subdivide register 236) of a grid being processed by the database builder.

The GTU 206 may include data interfaces 1402 for connecting an external data source (e.g., GTU inputs, binning inputs) to the data input section 1404, and for connecting internally generated data provided on the data output section 1406 to an external data sink (e.g., GTU outputs, binning outputs).

In some embodiments, the GTU 206 may further comprise a controller logic module 1422 to configure the GTU and to provide sequencing control during operation of the GTU. In accordance with the present disclosure, the controller logic module 1422 can configure the GTU 206 to perform a first set of operations using the GTU inputs. The operations performed in this first configuration of the GTU 206 comprise ray traversal operations. Further in accordance with the present disclosure, the controller logic module 1422 can configure the GTU 206 to perform a second set of operations using the binning inputs. The operations performed in this second configuration of the GTU 206 comprise operations for packet binning triangles, further details of which will be described below.

The controller logic module 1422 further provides sequencing control to coordinate the operation of the digital logic modules 1432-1454, the movement of externally provided data into the digital logic modules, and the movement of data produced by the digital logic modules into other digital logic modules and as output of the GTU 206. Control signals 1424 may be used to coordinate operation of the digital logic modules 1432-1454 and the movement of data. In some embodiments, the controller logic module 1422 may provide support for pipelined processing of data.

The discussion will now turn to a description of the digital logic modules 1432-1454 comprising the GTU 206, which may be collectively referred to as "arithmetic modules." As will become clear in the discussions below, the GTU 206 is designed for a high degree of parallel data generation and logic processing. The GTU 206 may include various floating point (FP) arithmetic circuits. In some embodiments, the FP arithmetic circuits may be designed for 32-bit floating point numbers, although it will be appreciated that higher or lower precision floating point arithmetic may be used. The GTU 206 may include arithmetic units such as a divider module 1432 having several floating point divider logic circuits. An adder module 1434 may comprise several arrays of FP adders, each array comprising several FP adder logic circuits. A multiplier module 1436 may comprise several arrays of FP multipliers. Each array of FP multipliers comprises several FP multiplier logic circuits. The GTU 206 may include comparator module 1438*a*-1438*c*, each comprising several arrays of FP comparator logic circuits. The design of FP logic for dividers, multipliers, adders, and comparators is well known.

In various embodiments, these FP arithmetic circuits may use any suitable design and can be implemented using any suitable technology; e.g., application specific ICs (ASICs), field programmable gate arrays (FPGAs), and so on.

The GTU 206 may include additional supporting logic circuits to support ray traversal operations. For example, the GTU 206 may include a check module 1442 for the presence of all 1's or all 0's in the inputs to the module. The GTU 206 may include priority encoder modules 1444*a*, 1444*b*, each comprising several arrays of priority encoder circuits. A reverse priority encoder module 1446 may comprise an array of reverse priority encoder circuits. A multiplexer (MUX) module 1452 may comprise several multiplexer circuits. A multiplexer/AND module 1454 may comprise several multiplexer circuits operating in conjunction with several AND gates.

In some embodiments, some or all of the foregoing digital logic modules 1432-1454 may include an input selector 1412*a* and an output selector 1412*b*. The input selectors 1412*a* and output selectors 1412*b* may respectively select data from the data input section 1404 or output data onto the data output section 1406 under the control of the controller logic module 1422; e.g., using control signals 1424.

B. GTU Processing

Figure 15:
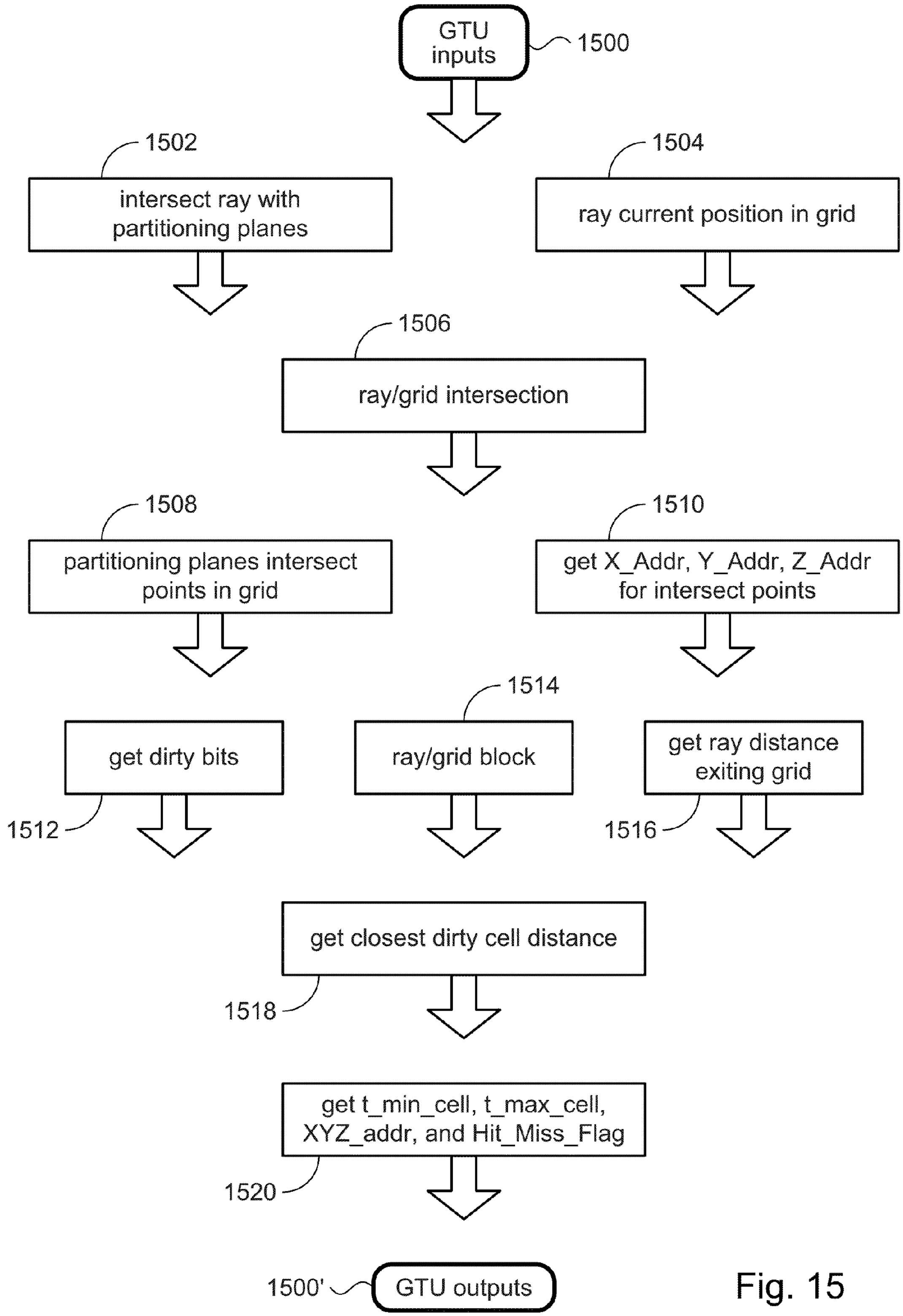
FIG. 15 shows processing performed by the grid traversal unit.

FIG. 15 shows processing blocks in the GTU of the present disclosure according to some embodiments. The processing blocks depicted in the figure are loosely arranged in a hierarchy, where information from a higher level generally feeds into blocks at a lower level. For example, the GTU inputs at block 1500 represent the highest level in the hierarchy, providing data to various lower level processing blocks, and GTU outputs at block 1500' represent the lowest level in the hierarchy, receiving data produced by higher level processing blocks. A more detailed description of the GTU and the data generated by the GTU will follow after this high level description is presented.

When the GTU receives its inputs, the GTU may begin processing at block 1502 by generating the coordinates at each X-, Y-, and Z-partitioning plane that the ray passes through. Thus, for example, where the ray intersects an X-partitioning plane, the Y- and Z-coordinates (ray-plane intersect point) of the ray at the intersection with that X-partitioning plane are generated. Likewise, where the ray intersects a Y-partitioning plane, the X- and Z-coordinates of the intersect point of the ray at that Y-partitioning plane intersection are generated, and where the ray intersects a Z-partitioning plane, the X- and Y-coordinates of the ray at that Z-partitioning plane intersection are generated. The GTU may produce the following output:

- Y_Intersect_X_Plane[0-$N_x$], which may be a data array of Y-axis coordinates (intersect points) of the ray at the intersections of the X-partitioning planes. Thus, for example,
- Y_Intersect_X_Plane[i] is the coordinate on the Y-axis where the ray intersects X-partitioning plane i.
- Z_Intersect_X_Plane[0-$N_x$], which may be a data array of Z-axis coordinates of the ray at the intersections of the X-partitioning planes. Thus, for example, Z_Intersect_X_Plane [i] is the coordinate on the Z-axis where the ray intersects X-partitioning plane i.
- X_Intersect_Y_Plane[0-$M_y$], which may be a data array of X-axis coordinates of the ray at the intersections of the Y-partitioning planes.
- Z_Intersect_Y_Plane[0-$M_y$], which may be a data array of Z-axis coordinates of the ray at the intersections of the Y-partitioning planes.
- X_Intersect_Z_Plane[0-$Q_z$], which may be a data array of X-axis coordinates of the ray at the intersections of the Z-partitioning planes.
- Y_Intersect_Z_Plane[0-$Q_z$], which may be a data array of Y-axis coordinates of the ray at the intersections of the Z-partitioning planes.

The GTU may also generate the distance of the ray from its origin $R_O$ to the intersection of each partitioning plane ("plane intersect distance"), for example:

- t_x[0-$N_x$], which may be a data array of plane intersect distance values from $R_O$ to the intersection of each of the X-partitioning planes X_Plane[0-$N_x$]
- t_y[0-$M_y$], which may be a data array of plane intersect distance values from $R_O$ to the intersection of each of the Y-partitioning planes Y_Plane[0-$M_y$]
- t_z[0-$Q_z$], which may be a data array of plane intersect distance values from $R_O$ to the intersection of each of the Z-partitioning planes Z_Plane[0-$Q_z$]

The GTU may also generate the current ray position $R_c$ based on the ray direction vector $R_d$, its origin $R_O$, and current distance Ray_t_current.

At block 1504, the GTU generates cell address components of the cell address of a candidate cell that contains the current ray position $R_c$. The cell is a "candidate" in the sense that its location may or may not be wholly contained within the grid of interest; for example, one of the address components of the candidate cell may or may not lie within the grid. Block 1504 may produce the following output:

- X_Addr_Current, which is the X-address component of a cell address
- Y_Addr_Current, which is the Y-address component of a cell address
- Z_Addr_Current, which is the Z-address component of a cell address
- X_Valid_Current, which may be a 1-bit value that indicates whether the X-address component is valid (i.e., lies within the grid of interest)
- Y_Valid_Current, which may be a 1-bit value that indicates whether the Y-address component is valid (i.e., lies within the grid of interest)
- Z_Valid_Current, which may be a 1-bit value that indicates whether the Z-address component is valid (i.e., lies within the grid of interest)

At block 1506, the GTU compares the X-, Y-, and Z-intersect coordinates generated in block 1502 against their respective X-, Y-, and Z-partitioning planes to assess their positions relative to each other. For example, for each X-partitioning plane, its corresponding generated Y- and Z-intersect coordinates are compared to respective Y- and Z-partitioning planes to evaluate whether the intersect coordinate is less than or equal to (LTE), equal to (EQ), or greater than or equal to (GTE) the coordinate of the respective partitioning planes. This is repeated for each of the Y- and Z-partitioning planes. Block 1506 may produce the following output:

- Y_GTE_X_Plane[0-$N_x$][0-$M_y$], which may be a bank of $N_x$+1 registers of $M_y$+1 bits each, where a bit is set if the Y-intersect coordinate corresponding to a given X-partitioning plane is ≥the coordinate of a given Y-partitioning plane, and reset otherwise
- Z_GTE_X_Plane[0-$N_x$][0-$Q_z$], which may be a bank of $N_x$+1 registers of $Q_z$+1 bits each, where a bit is set if the Z-intersect coordinate corresponding to a given X-partitioning plane is ≥the coordinate of a given Z-partitioning plane, and reset otherwise
- X_GTE_Y_Plane[0-$M_y$][0-$N_x$], which may be a bank of $M_y$+1 registers of $N_x$+1 bits each, where a bit is set if the X-intersect coordinate corresponding to a given Y-partioning plane is ≥the coordinate of a given X-partitioning plane, and reset otherwise Z_GTE_Y_Plane[0-$M_y$][0-$Q_z$], which may be a bank of $M_y$+1 registers of $Q_z$+1 bits each, where a bit is set if the Z-intersect coordinate corresponding to a given Y-partitioning plane is ≥the coordinate of a given Z-partitioning plane, and reset otherwise X_GTE_Z_Plane[0-$Q_z$][0-$N_x$], which may be a bank of $Q_z$+1 registers of $N_x$+1 bits each, where a bit is set if the X-intersect coordinate corresponding to a given Z-partitioning plane is ≥the coordinate of a given X-partitioning plane, and reset otherwise Y_GTE_Z_Plane[0-$Q_z$][0-$M_y$], which may be a bank of $Q_z$+1 registers of $M_y$+1 bits each, where a bit is set if the Y-intersect coordinate corresponding to a given Z-partitioning plane is ≥the coordinate of a given Y-partitioning plane, and reset otherwise Y_LTE_X_Plane[0-$N_x$][0-$M_y$], which may be a bank of $N_x$+1 registers of $M_y$+1 bits each, where a bit is set if the Y-intersect coordinate corresponding to a given X-partitioning plane is the coordinate of a given Y-partitioning plane, and reset otherwise Z_LTE_X_Plane[0-$N_x$][0-$Q_z$], which may be a bank of $N_x$+1 registers of $Q_z$+1 bits each, where a bit is set if the Z-intersect coordinate corresponding to a given X-partitioning plane is ≤the coordinate of a given Z-partitioning plane, and reset otherwise X_LTE_Y_Plane[0-$M_y$][0-$N_x$], which may be a bank of $M_y$+1 registers of $N_x$+1 bits each, where a bit is set if the X-intersect coordinate corresponding to a given Y-partitioning plane is ≤the coordinate of a given X-partitioning plane, and reset otherwise Z_LTE_Y_Plane[0-$M_y$][0-$Q_z$], which may be a bank of $M_y$+1 registers of $Q_z$+1 bits each, where a bit is set if the Z-intersect coordinate corresponding to a given Y-partitioning plane is ≤the coordinate of a given Z-partitioning plane, and reset otherwise X_LTE_Z_Plane[0-$Q_z$][0-$N_x$], which may be a bank of $Q_z$+1 registers of $N_x$+1 bits each, where a bit is set if the X-intersect coordinate corresponding to a given Z-partitioning plane is ≤the coordinate of a given X-partitioning plane, and reset otherwise Y_LTE_Z_Plane[0-$Q_z$][0-$M_y$], which may be a bank of $Q_z$+1 registers of $M_y$+1 bits each, where a bit is set if the Y-intersect coordinate corresponding to a given Z-partitioning plane is ≤the coordinate of a given Y-partitioning plane, and reset otherwise Y_EQ_X_Plane[0-$N_x$][0-$M_y$], which may be a bank of $N_x$+1 registers of $M_y$+1 bits each, where a bit is set if the Y-intersect coordinate corresponding to a given X-partitioning plane is =the coordinate of a given Y-partitioning plane, and reset otherwise Z_EQ_X_Plane[0-$N_x$][0-$Q_z$], which may be a bank of $N_x$+1 registers of $Q_z$+1 bits each, where a bit is set if the Z-intersect coordinate corresponding to a given X-partitioning plane is =the coordinate of a given Z-partitioning plane, and reset otherwise X_EQ_Y_Plane[0-$M_y$][0-$N_x$], which may be a bank of $M_y$+1 registers of $N_x$+1 bits each, where a bit is set if the X-intersect coordinate corresponding to a given Y-partitioning plane is =the coordinate of a given X-partitioning plane, and reset otherwise Z_EQ_Y_Plane[0-$M_y$][0-$Q_z$], which may be a bank of $M_y$+1 registers of $Q_z$+1 bits each, where a bit is set if the Z-intersect coordinate corresponding to a given Y-partitioning plane is =the coordinate of a given Z-partitioning plane, and reset otherwise X_EQ_Z_Plane[0-$Q_z$][0-$N_x$], which may be a bank of $Q_z$+1 registers of $N_x$+1 bits each, where a bit is set if the X-intersect coordinate corresponding to a given Z-partitioning plane is =the coordinate of a given X-partitioning plane, and reset otherwise Y_EQ_Z_Plane[0-$Q_z$][0-$M_y$], which may be a bank of $Q_z$+1 registers of $M_y$+1 bits each, where a bit is set if the Y-intersect coordinate corresponding to a given Z-partitioning plane is =the coordinate of a given Y-partitioning plane, and reset otherwise In some embodiments, a bit is "set" by setting the bit to '1', and '0' otherwise. The foregoing comparisons (evaluations) may be referred to respectively as the GTE evaluations, the LTE evaluations, and the EQ evaluations.

At block 1508, the GTU determines whether the intersection of the ray with each partitioning plane occurs within the grid of interest using results of the evaluations made at block 1506. Thus, for example, for a given X-partitioning plane that the ray intersects, if the corresponding Y-intersect coordinate is bounded between two consecutive Y-partitioning planes comprising the grid and the corresponding Z-intersect coordinate is bounded between two consecutive Z-partitioning planes comprising the grid, then that intersection occurs within the grid insofar as the Y- and Z-partitioning planes are concerned. This test is performed for every X-partitioning plane. The foregoing is repeated for the Y- and Z-partitioning planes. In an embodiment, block 1508 sets ('1') a plane valid bit associated with each partitioning plane (e.g., X) if its intersection is bounded within the grid, and is reset ('0') otherwise. Block 1508 may produce the following output:

X_Plane_Valid[0-$N_x$], which may be a ($N_x$+1)-bit register where each plane valid bit corresponds to one of the X-partitioning planes, where a bit is set if the ray intersection with that X-partitioning plane occurs within the grid and reset otherwise Y_Plane_Valid[0-$M_y$], which may be a ($M_y$+1)-bit register where each plane valid bit corresponds to one of the Y-partitioning planes, where a bit is set if the ray intersection with that Y-partitioning plane occurs within the grid and reset otherwise Z_Plane_Valid[0-$Q_z$], which may be a ($Q_z$+1)-bit register where each plane valid bit corresponds to one of the Z-partitioning planes, where a bit is set if the ray intersection with that Z-partitioning plane occurs within the grid and reset otherwise At block 1510, the GTU generates the candidate X-, Y-, and Z-address components of cell addresses using the LTE and GTE evaluations made at block 1506. These cell address components are "candidates" in the sense that they may or may not be address components of actual cells in the grid. The cell address of a cell that is bounded by a given X-partitioning plane will have an X-address component that is determined by the X-partitioning plane. For example, a cell bounded by X_Plane[0] will have an X-address component of 0, assuming the direction of the ray in the X-direction is positive. The Y- and Z-address components of the cell address of that cell will be determined based on the Y- and Z-partitioning planes which bound that cell. Block 1510 produces the following output:

Y_Addr_X_Plane[0-$N_x$], which stores a Y-address component of the cell address of a cell that is bounded by the Y-partitioning plane associated with the X-partitioning plane.

Z_Addr_X_Plane[0-$N_x$], which stores a Z-address component of the cell address of a cell that is bounded by the Z-partitioning plane associated with the X-partitioning plane.

X_Addr_Y_Plane[0-$M_y$], which stores an X-address component of the cell address of a cell that is bounded by the X-partitioning plane associated with the Y-partitioning plane.

Z_Addr_Y_Plane[0-$M_y$], which stores a Z-address component of the cell address of a cell that is bounded by the Z-partitioning plane associated with the Y-partitioning plane.

X_Addr_Z_Plane[0-$Q_z$], which stores an X-address component of the cell address of a cell that is bounded by the X-partitioning plane associated with the Z-partitioning plane.

Y_Addr_Z_Plane[0-$Q_z$], which stores a Y-address component of the cell address of a cell that is bounded by the Y-partitioning plane associated with the Z-partitioning plane.

At block 1512, the GTU identifies dirty cells in the grid of interest from the cell address components generated at block 1510 and the valid bits generated at block 1508, using the Block_bitmap input. Block 1512 may produce the following output:

t_valid X_Plane[0-$N_x$], which may be a ($N_x$+1)-bit register, where each bit corresponds to an X-partitioning plane and is set ('1') if the partitioning plane bounds a cell that is dirty, and is reset ('0') otherwise t_valid Y_Plane[0-$M_g$], which may be a ($M_y$+1)-bit register, where each bit corresponds to a Y-partitioning plane and is set ('1') if the partitioning plane bounds a cell that is dirty, and is reset ('0') otherwise t_valid Z_Plane[0-$Q_z$], which may be a ($Q_z$+1)-bit register, where each bit corresponds to a Z-partitioning plane and is set ('1') if the partitioning plane bounds a cell that is dirty, and is reset ('0') otherwise At block 1514, the GTU determines the cells comprising the grid of interest that are intersected by the ray using the cell address components generated at block 1510. The valid bits generated at block 1508 and the current position generated in block 1504 may be used to identify a cell that contains the current ray position $R_c$. The process produces Ray_Grid_Block, which is a bitmap that represents the cells of the grid of interest, where a bit is set if the ray intersects the corresponding cell. The Ray_Grid_Block may be a register having $B_S$ bits, where the block size $B_S = N_x \times M_y \times Q_z$.

At block 1516, the GTU generates the distance from the ray origin $R_O$ to the point on the grid of interest where the ray exits. Block 1516 may produce the following output:

t_X_max_Grid, which may be a data store that contains the distance between the ray origin $R_O$ and a point on an X-partitioning plane where the ray exits the grid of interest t_Y_max_Grid, which may be a data store that contains the distance between the ray origin $R_O$ and a point on an Y-partitioning plane where the ray exits the grid of interest t_Z_max_Grid, which may be a data store that contains the distance between the ray origin $R_O$ and a point on an Z-partitioning plane where the ray exits the grid of interest At block 1518, the GTU generates the address components of a cell address for a candidate dirty cell in the grid of interest that is closest to the ray origin $R_O$. The dirty cell is a "candidate" in the sense that the cell may or may not exist. Block 1518 may produce the following output:

X_addr, which is the candidate X-address component

Y_addr, which is the candidate Y-address component

Z_addr, which is the candidate Z-address component t_X_min, which is the distance from the ray origin $R_O$ to the X-partitioning plane that bounds the candidate dirty cell t_Y_min, which is the distance from the ray origin $R_O$ to the Y-partitioning plane that bounds the candidate dirty cell t_Z_min, which is the distance from the ray origin $R_O$ to the Z-partitioning plane that bounds the candidate dirty cell At block 1520, the GTU generates the various outputs of the GTU (FIG. 10), including t_min_cell, t_max_cell, XYZ_addr, and Hit_Miss_Flag.

C. GTU Processing Blocks

The discussion will now turn to a more detailed description of the operations performed in the processing blocks illustrated in FIG. 15. The discussion will include a description of additional details of the digital logic modules comprising the GTU 206 shown in FIG. 14 that are configured to perform the operations.

1. Intersect Ray with Partitioning Planes

Figure 15A:
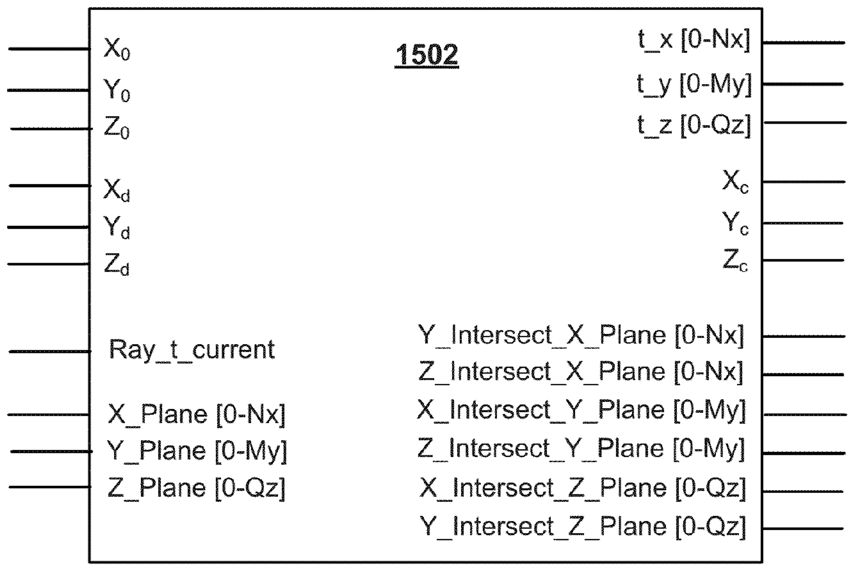
FIGS. 15A-15J show additional details of the processing illustrated in FIG. 15.

Referring to FIG. 15A, data generated in block 1502 use inputs shown in the figure to produce the output described above and shown in the figure. The inputs are obtained from the GTU inputs (e.g., FIG. 10), and include the X-, Y-, and Z-coordinates $X_O$, $Y_O$, and $Z_O$ of the ray origin $R_O$, the X-, Y-, and Z-components $X_d$, $Y_d$, and $Z_d$ of the ray direction vector $R_d$, the current position of the ray Ray_t_current, and the X-, Y-, and Z-partitioning planes. The following pseudo-code fragment illustrates how block 1502 may be implemented and how the data may be generated in the block:

PSEUDO-CODE FRAGMENT XII.

```
// generate inverses
Xd_Inverse = 1 / Xd
Yd_Inverse = 1 / Yd
Zd_Inverse = 1 / Zd
// generate current ray position Rc
Xc = Xo + ( Xd * Ray_t_current )
Yc = Yo + ( Yd * Ray_t_current )
Zc = Zo + ( Zd * Ray_t_current )
// Parallel - generate distances to plane intersection
t_x [ 0 – Nx ] = – ( Xo – X_Plane [ 0 – Nx ] ) * Xd_Inverse
t_y [ 0 – My ] = – ( Yo – Y_Plane [ 0 – My ] ) * Yd_Inverse
t_z [ 0 – Qz ] = – ( Zo – Z_Plane [ 0 – Qz ] ) * Zd_inverse
// End Parallel
// Parallel - Get X, Y, Z values for all Ray / XYZ_Planes [ ] intersect points
Y_Intersect_X_Plane [ 0 – Nx ] = Yo + ( Yd * t_x [ 0 – Nx ] )
Z_Intersect_X_Plane [ 0 – Nx ] = Zo + ( Zd * t_x [ 0 – Nx ] )
X_Intersect_Y_Plane [ 0 – My ] = Xo + ( Xd * t_y [ 0 – My ] )
Z_Intersect_Y_Plane [ 0 – My ] = Zo + ( Zd * t_y [ 0 – My ] )
X_Intersect_Z_Plane [ 0 – Qz ] = Xo + ( Xd * t_z [ 0 – Qz ] )
Y_Intersect_Z_Plane [ 0 – Qz ] = Yo + ( Yd * t_z [ 0 – Qz ] )
// End Parallel
```

Figures 1, 16A:
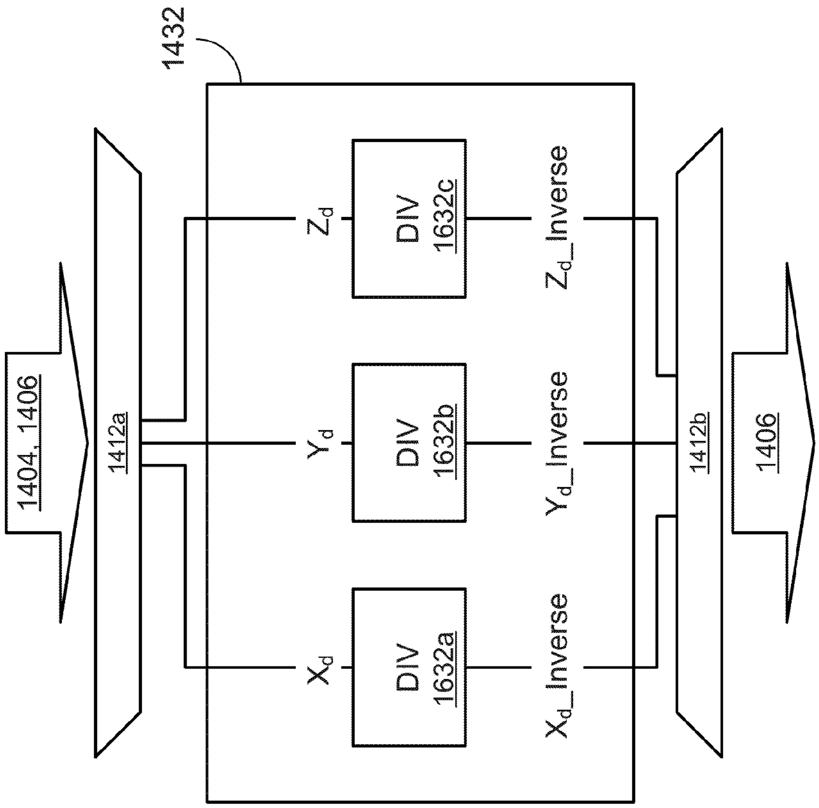
Figure 16A:
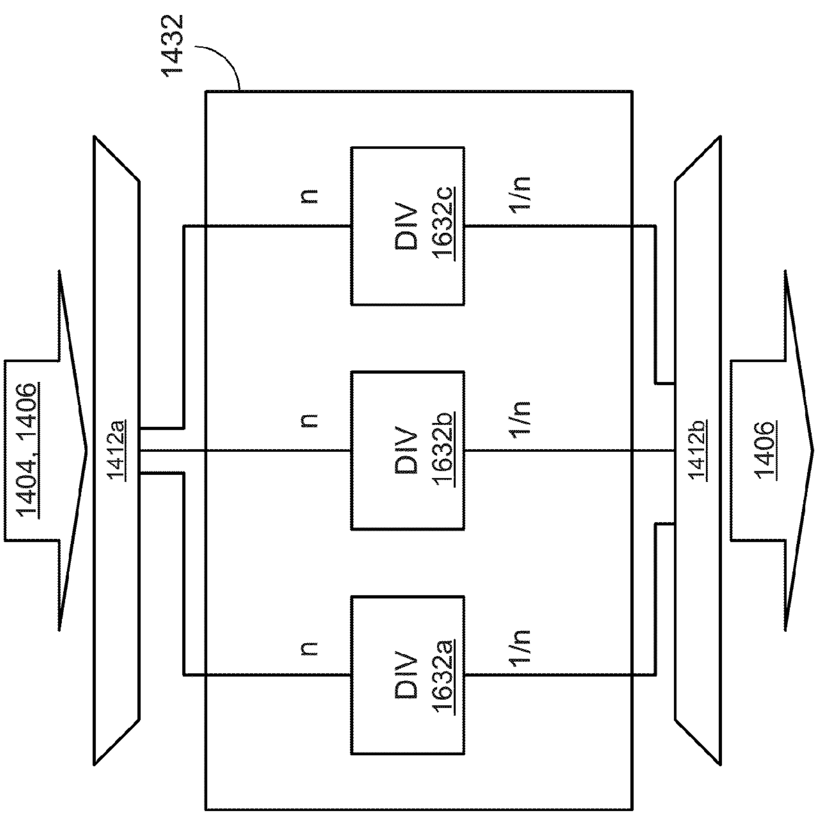

In some embodiments, the coordinate values and distance values described herein may be floating point numbers, and the operations may be performed using the divider module 1432, adder module 1434, and the multiplier module 1436 of GTU 206 shown in FIG. 14. Referring to FIGS. 16A and 16A-1, for example, a high level diagrammatic representation of the divider module 1432 in accordance with some embodiments may comprise three FP divider circuits 1632_a_, 1632_b_, 1632_c_ designed to perform an FP inverse operation (divide-by-one) on their respective inputs. As illustrated in FIG. 16A-1, the divider module 1432 may be configured (e.g., using the controller logic module 1422 to control input selector 1412_a_) to receive the $X_d$, $Y_d$, and $Z_d$ components of the ray direction vector $R_d$ as inputs from the data input section 1404. The resulting inverses $1/X_d$, $1/Y_d$, and $1/Z_d$ can be output to the data output section 1406 for subsequent processing.

Figure 16B:
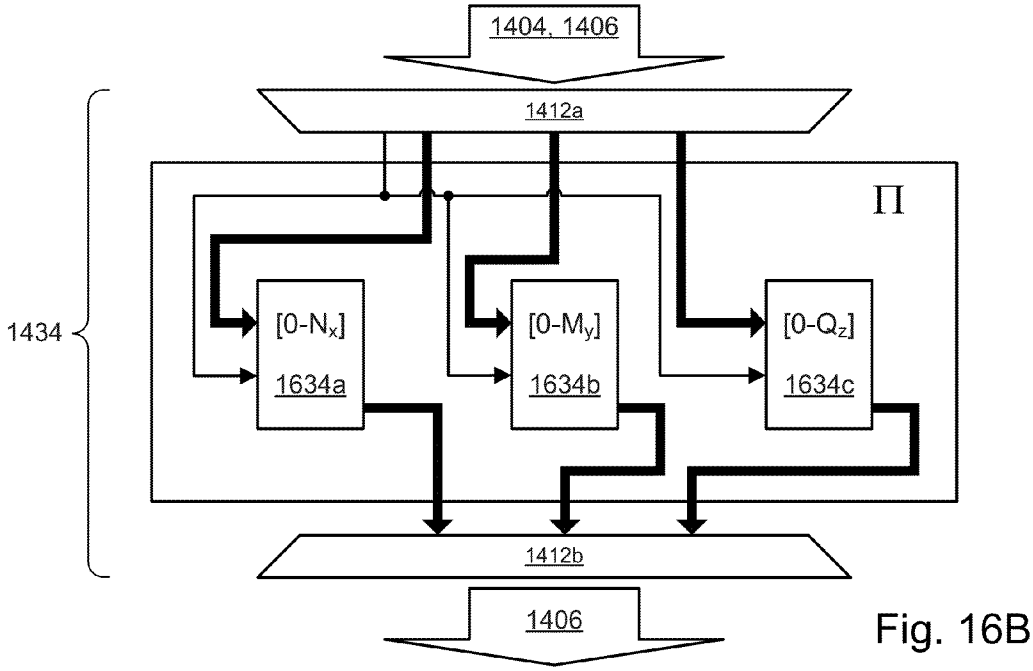

Referring to FIGS. 16B and 16B-1, in some embodiments, the adder module 1434 may comprise three FP adder arrays 1634a-1634c, one for each of the X-, Y-, and Z-partitioning planes. FIG. 16B-1 shows an example of an FP adder array 1634. Each FP adder array 1634 may comprise (N+1) FP adder circuits. The adder array 1634 may be configured (e.g., using control signals 1424) to add a single FP term X to a vector of size (N+1) of FP terms I[0-N] to produce a corresponding sum vector O[0-N] in one add cycle. The adder array 1634 may also be configured to add the FP term X to only some of the vector elements. In some embodiments, the number of FP adder circuits that is designed into an FP adder array may be based on the number of partitioning planes in order to facilitate parallel processing. For example, in a particular design of FP adder array 1634a, the array may be associated with the X-partitioning planes and comprise $(N_x+1)$ FP adder circuits. Similarly, a particular design of FP adder array 1634b may be associated with the Y-partitioning planes and comprise $(M_y+1)$ FP adder circuits, and a particular design of FP adder array 1634c may comprise $(Q_z+1)$ FP adder circuits for the Z-partitioning planes.

Figure 16C:
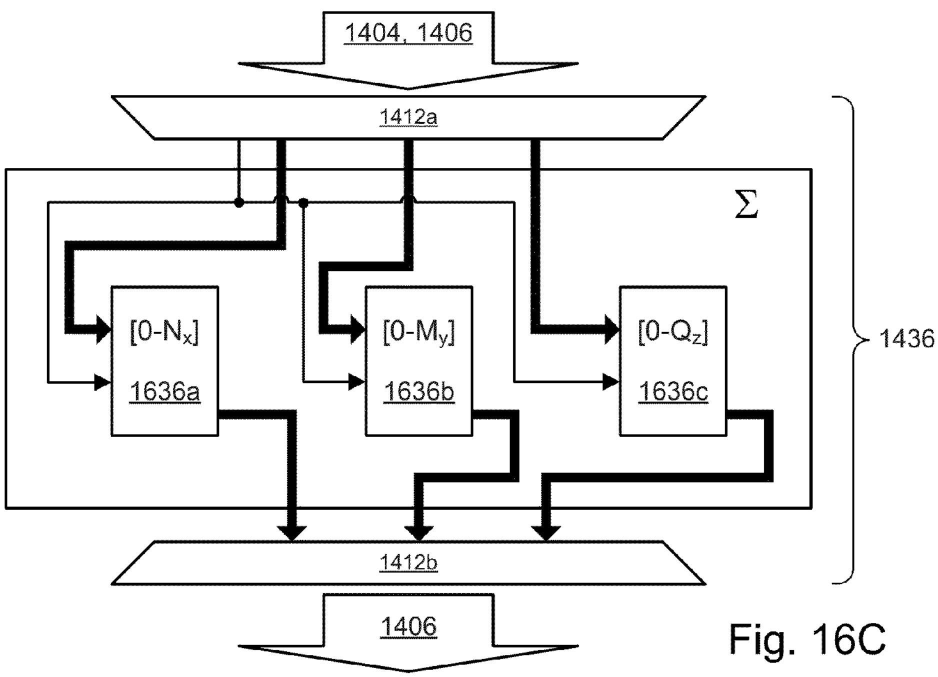
Figures 1, 16B:
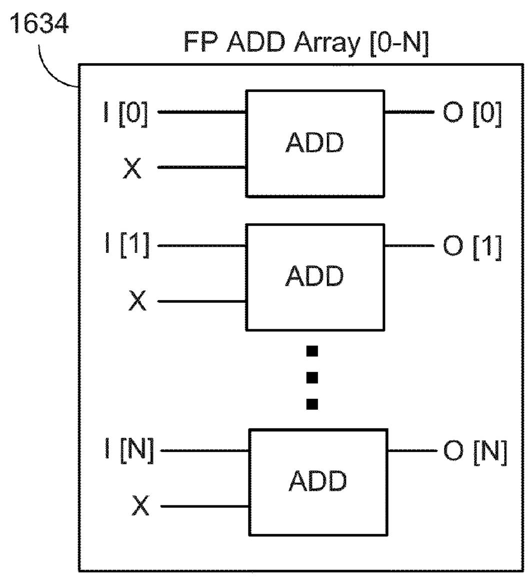
Figures 1, 16C:
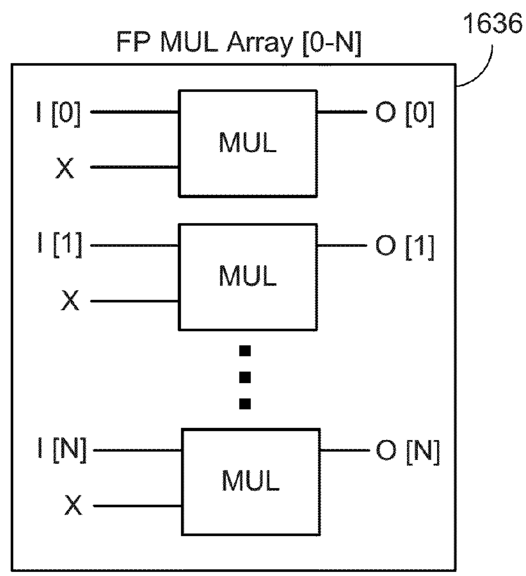

Referring to FIGS. 16C and 16C-1, in some embodiments, the multiplier module 1436 may comprise three FP multiplier arrays 1636a-1636c, one for each of the X-, Y-, and Z-partitioning planes. FIG. 16C-1 shows an example of an FP multiplier array 1636. Each FP multiplier array 1636 comprises (N+1) FP multiplier circuits, and may be configured (e.g., using control signals 1424) to multiply a single FP multiplicand X with a vector of size (N+1) of FP multiplicands I[0-N] to produce a corresponding product vector O[0-N] in one multiply cycle. The multiplier array 1636 may also be configured to multiply the FP multiplicand X with only some of the vector elements. In some embodiments, the number of FP multiplier circuits that is designed into an FP multiplier array may be based on the number of partitioning planes in order to facilitate parallel processing. For example, in a particular design of FP multiplier array 1636a, the array may be associated with the X-partitioning planes and comprise $(N_x+1)$ FP multiplier circuits. Similarly, a particular design of FP multiplier array 1636b may be associated with the Y-partitioning planes and comprise $(M_y+1)$ FP multiplier circuits, and a particular design of FP multiplier array 1636c may comprise $(Q_z+1)$ FP multiplier circuits for the Z-partitioning planes.

Figure 16D:
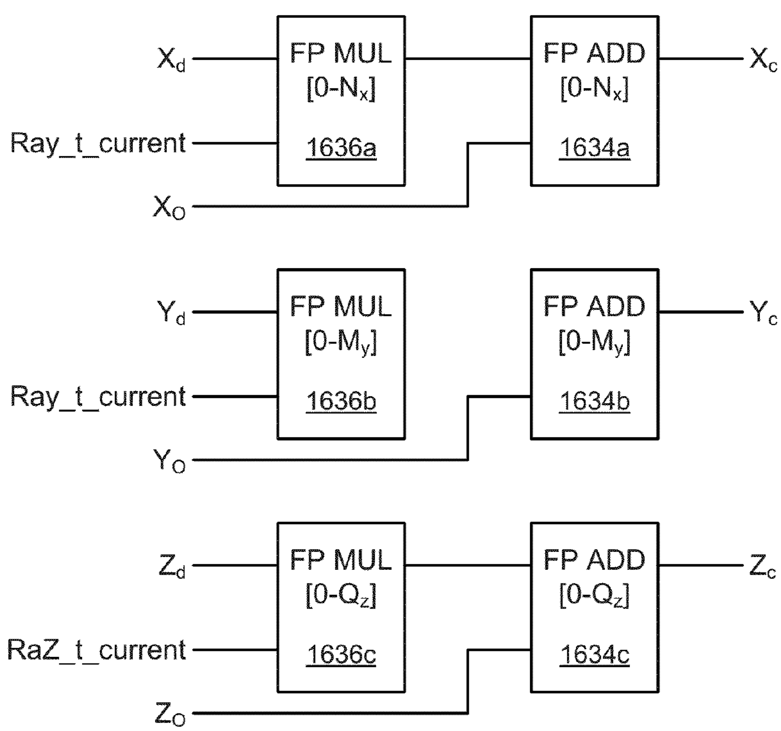

The adder module 1434 and the multiplier module 1436 may be configured (e.g., using the controller logic module 1422 to control input selector 1412a) to generate the X-, Y-, and Z-coordinates of the ray position $R_c$. Referring to FIG. 16D, for example, the adder and multiplier modules 1434, 1436 may be configured to receive the inputs and outputs as shown to generate the current ray position $R_c$. The associated input and output selectors of each array can be controlled to use only one element in the vector in order to multiply two scalar values. For example, the input selector 1412a for multiplier array 1636a may be controlled to connect the $X_d$ input from the data input section 1404 to the I[0] input vector element. Similarly, the output selector 1412b of adder array 1634a may be controlled to connect the O[0] vector element to X, on the data output section 1406.

Figure 16E:
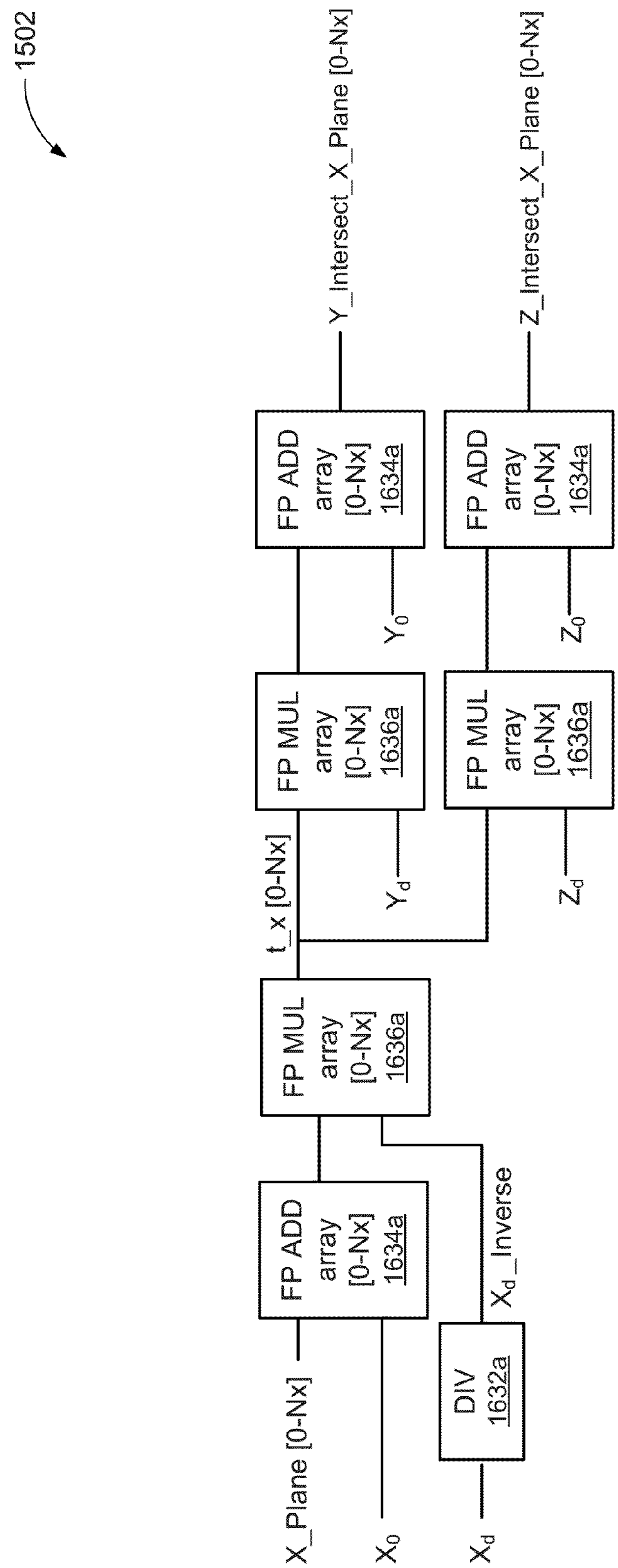

The modules 1432-1436 may be configured to generate distance values to the plane intersections ("plane intersect distances") and the intersect points of the ray with the X-, Y-, and Z-partitioning planes. FIG. 16E, for example, illustrates a configuration for generating the t_x[0-$N_x$] plane intersect distances and the Y_Intersect_X_Plane[0-$N_x$] and Z_Intersect_X_Plane[0-$N_x$] intersect points, for each X-partitioning plane. Here, the entire array in each module is used. For example, all $(N_x+1)$ X-partitioning planes feed into the adder array 1634a to produce $(N_x+1)$ sum terms with $X_O$. The $(N_x+1)$ sum terms then feed into the multiplier array 1636a, and so on. It will be appreciated that the adder and multiplier arrays corresponding to the Y- and Z-partitioning planes are similarly configured to produce their respective plane intersect distances and intersect points. The figure further illustrates that the add and multiply modules may be configured for data flow in pipeline fashion.

2. Ray Current Position/Grid Comparator Array

Figure 15C:
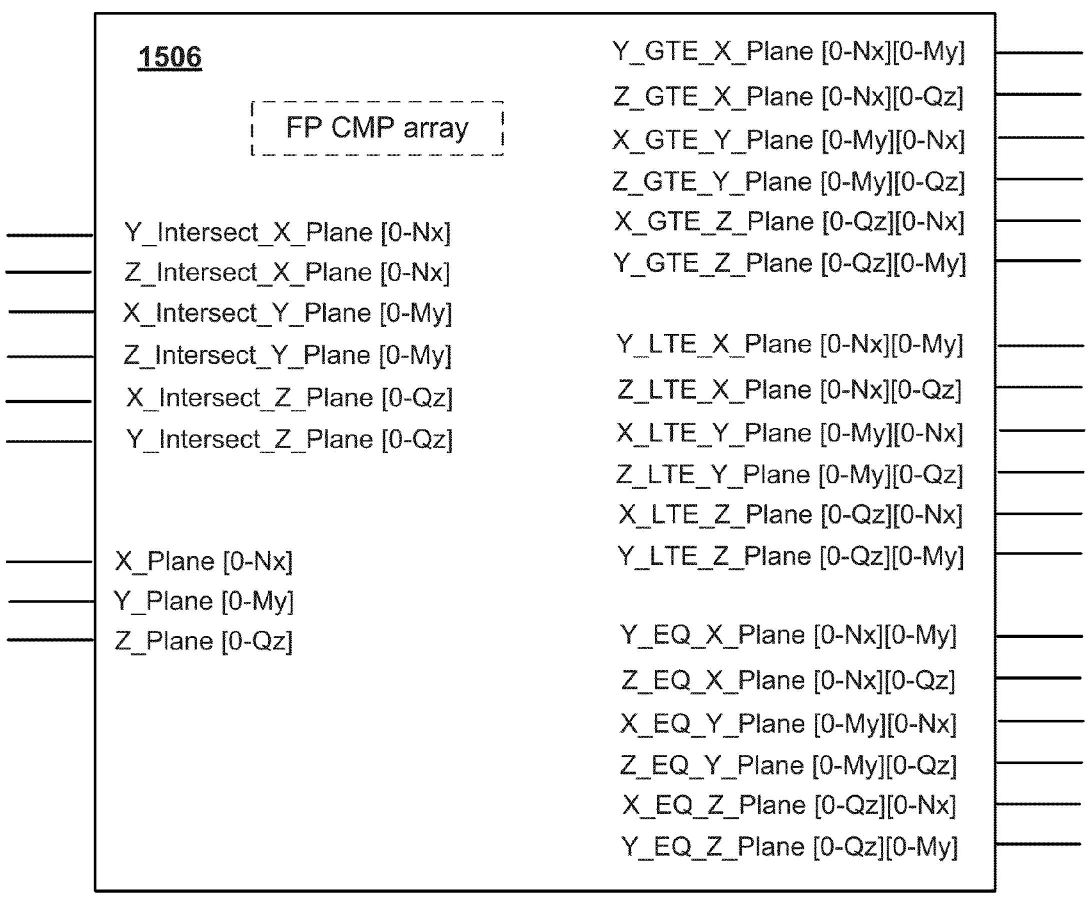
Figure 15B:
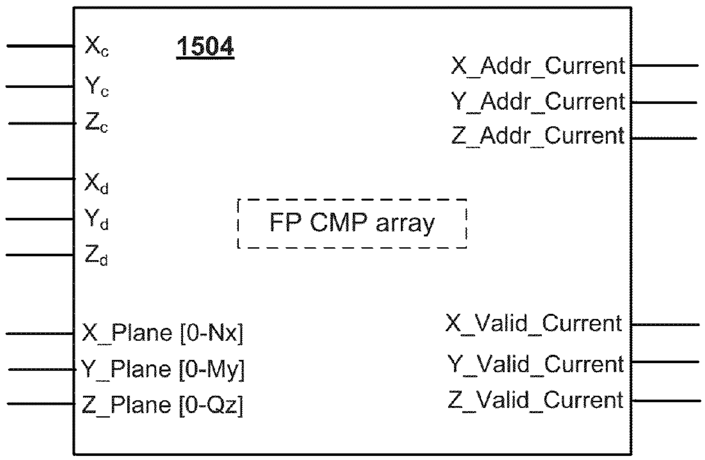

Referring to FIG. 15B, data generated in block 1504 use inputs shown in the figure to produce the output described above and shown in the figure. The ray direction vector $R_d$ and partitioning plane inputs come from the GTU inputs, and the current ray position $R_c$ comes from the output of block 1502. The following pseudo-code fragment illustrates how block 1504 may be implemented and how the data may be generated in the block. It will be apparent that the processing may be conducted largely in parallel. For purposes of discussion, a programming notation used to represent "for loops" will be employed as a convenient way to express the parallel processing performed by the digital logic circuits that can be used to implement these blocks, and thus should not be construed as a restriction of embodiments to only serialized programmatic implementations.

PSEUDO-CODE FRAGMENT XIII.

```
// Parallel
X_Valid_Current = 0;                                  // 1-bit value
Y_Valid_Current = 0;                                  // 1-bit value
Z_Valid_Current = 0;                                  // 1-bit value
// process X-partitioning planes
If (Xd Pos) // Xd is Positive, consider the planes in increasing direction
  For( i = 0; i < Nx; i++)
    If ( Xc >= X_Plane [ i ] && Xc < X_Plane [ i +1 ])
      X_Addr_Current = i;    // integer value
      X_Valid_Current = 1;
Else // Xd is Negative, consider the planes in decreasing direction
  For( i= Nx;i > 0; i--)
    If ( Xc <= X_Plane [ i ] && Xc > X_Plane [ i - 1 ] )
      X_Addr_Current = i - 1;
      X_Valid_Current = 1;
// process Y-partitioning planes
If (Yd Pos ) //Yd is Positive
  For (i = 0; i < My; i++)
    If ( Yc >= Y_Plane [ i ] && Yc < Y _Plane [ i +1 ] )
      Y_Addr_Current = i;    // integer value
      Y_Valid_Current = 1;
Else // Yd is Negative
  For(i= My;i > 0; i--)
    If ( Yc <= Y_Plane [ i ] && Yc > Y_Plane [ i - 1 ] )
      Y_Addr_Current = i - 1;
      Y_Valid_Current = 1;
// process Z-partitioning planes
If (Zd Pos) //Zd is positive
  For (i = 0; i < Qz; i++)
    If ( Zc >= Z_Plane [ i ] && Zc < Z_Plane [ i +1 ] )
      Z_Addr_Current = i; // integer value
      Z_Valid_Current = 1;
Else // Zd is Negative
  For ( i= Qz; i > 0; i )
    If ( Zc <= Z_Plane [ i ] && Zc > Z_Plane [ i - 1 ] )
      Z_Addr_Current = i - 1;
      Z_Valid_Current = 1;
End If
// End Parallel
```

Figure 17:
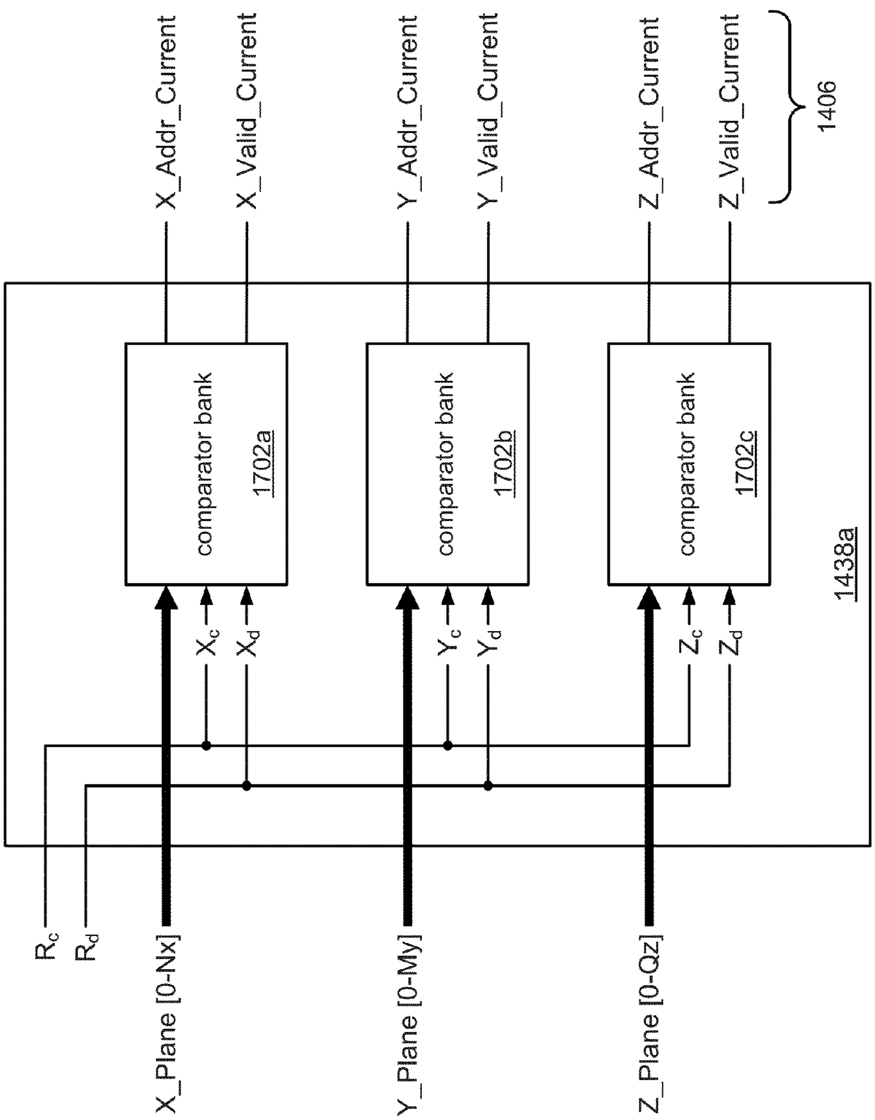
FIGS. 17, 17A-17C show additional details for comparator module 1438*a* shown in FIG. 14.
Figure 17A:
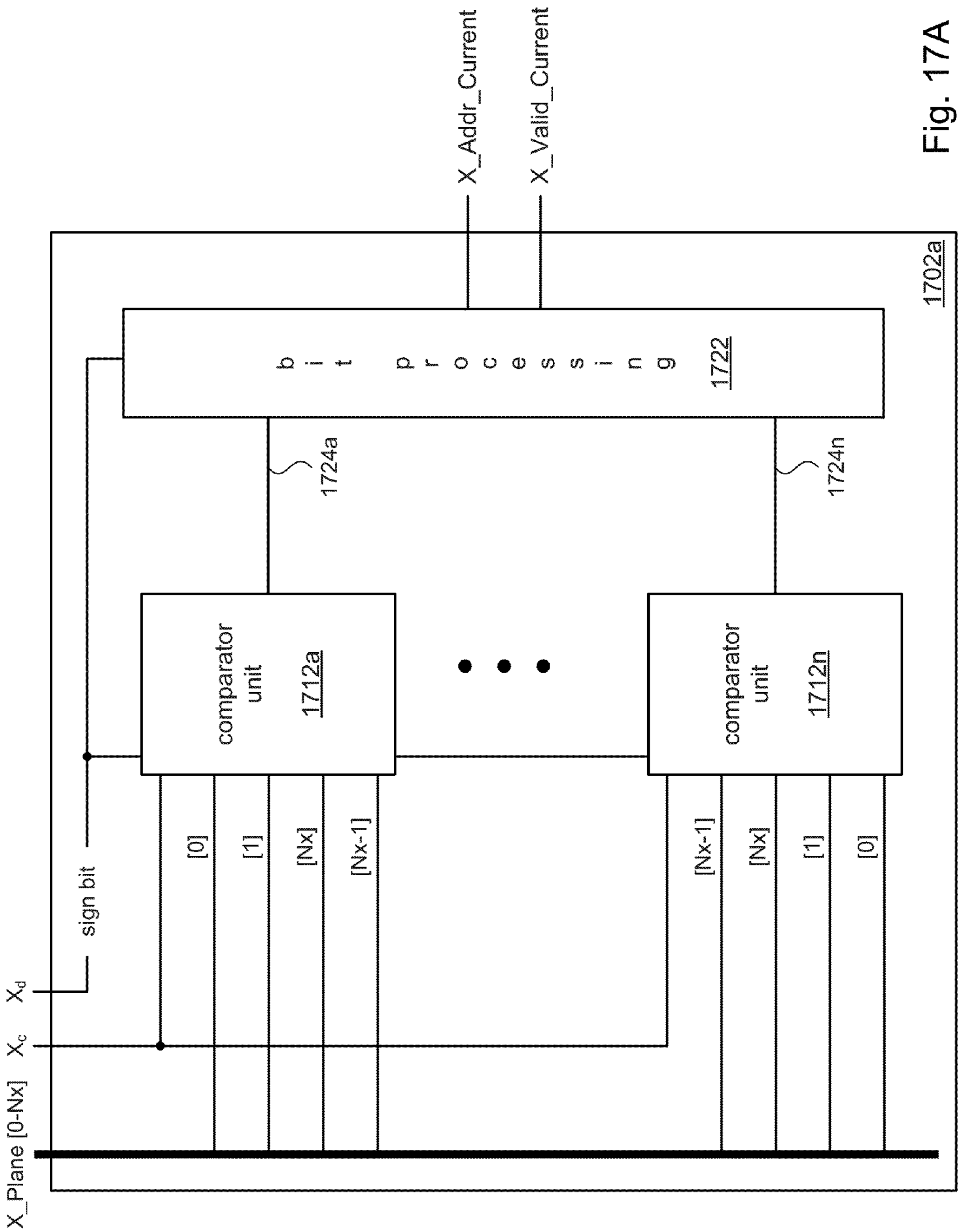
Figure 17B:
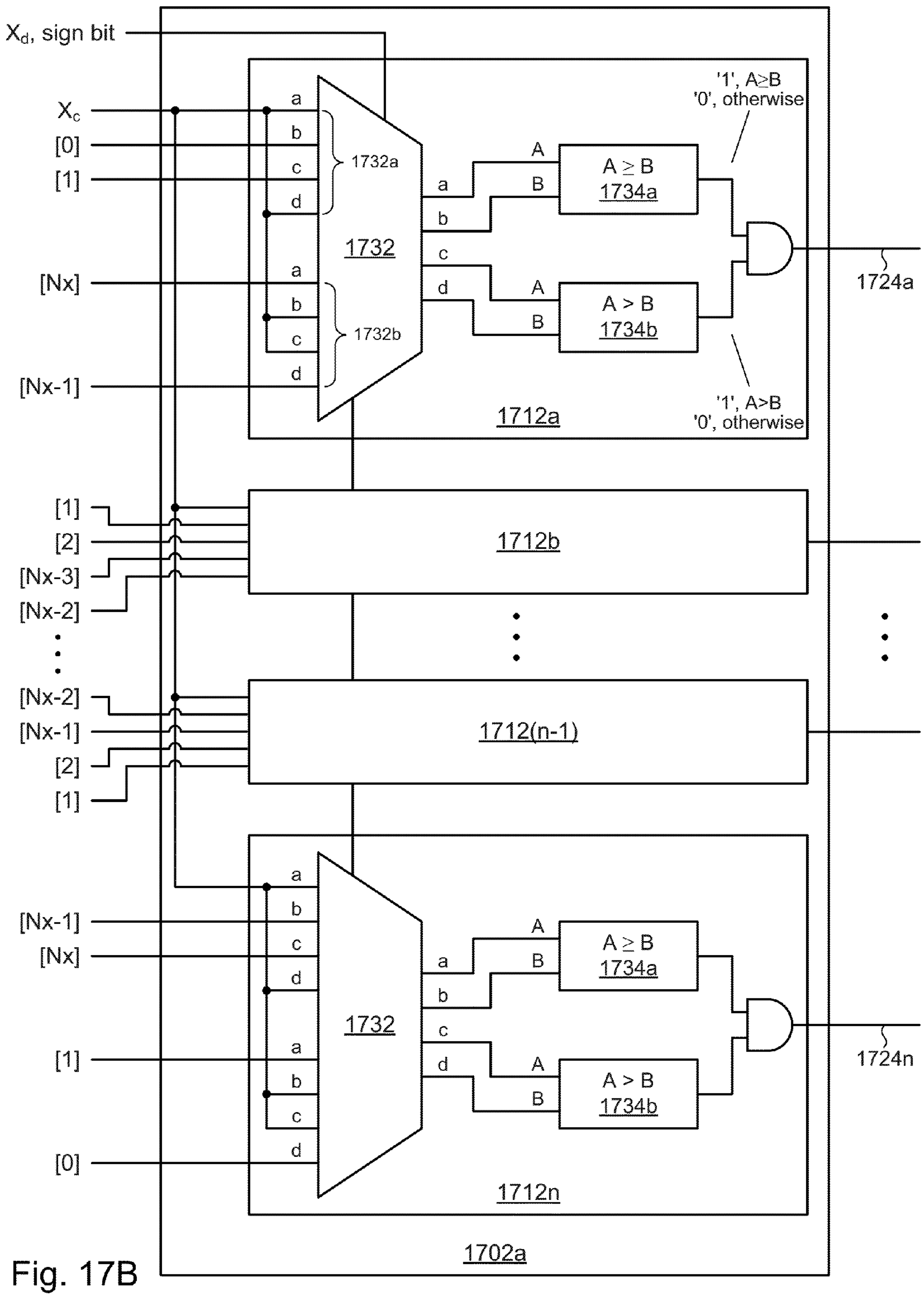

FIGS. 17 and 17A-17C show details of comparator module 1438a, in accordance with some embodiments, for performing the operations shown in the above pseudo-code fragment. These figures serve to illustrate that the pseudo-code can be implemented in digital logic circuitry (rather than as software executing on a central processing unit (CPU)), but should not be construed as being limited to any particular implementation of the comparator module 1438*a*. Referring to FIG. 17, the comparator module 1438*a* may comprise three comparator banks 1702*a*, 1702*b*, 1702*c* for processing respective X-, Y-, and Z-partitioning planes, to respectively generate the X_, Y__ and Z_ 'Addr' and 'Valid' values shown in the pseudo-code fragment above. The outputs of the comparator banks 1702*a*-1702*c* may be gated to the data output section 1406. In some embodiments, the outputs may be stored in registers or other suitable data stores comprising the data output section 1406 (e.g., via output mux 1412*b*, FIG. 14). FIGS. 17A and 17B show additional details of the digital logic circuits for comparator bank 1702*a* for processing X-partitioning planes. It will be appreciated by one of ordinary skill that the digital logic circuits for comparator banks 1702*b* and 1702*c* may be similarly constructed for processing respective Y- and Z-partitioning planes.

Referring to FIG. 17A, the comparator bank 1702*a* comprises $N_x$ comparator units 1712*a*-1712*n*, each unit representing one iteration of the FOR loop. Referring to FIG. 17B, each comparator unit (e.g., 1712*a*) in turn comprises a selector 1732 and two FP comparator circuits 1734*a*, 1734*b*. Selector 1732 receives two sets 1732*a*, 1732*b* of four input values to the comparator s 1734*a*, 1734*b*, and outputs one set depending on the sign bit. The selector outputs feed into comparators 1734*a*, 1734*b*. Comparator 1734*a* compares its FP inputs A and B according to the expression "A≥B," and asserts a logic level (e.g., logic '1') if the expression is true and '0' otherwise. Comparator 1734*b*, likewise, performs the ">" comparison. Selector 1732 is controlled by the sign bit of the X-component $X_d$ of the ray direction vector $R_d$ and thus performs the IF/ELSE comparison operations according to whether $X_d$ is positive or negative. Upon inspection of FIG. 17B, it will be apparent that comparator unit 1712*a* represents the positive and negative branch comparison operations for the first iteration of the FOR loop, comparator unit 1712*b* represents the positive and negative branch comparison operations for the second iteration of the FOR loop, comparator unit 1712(*n*−1) represents the positive and negative branch comparison operations for the next to last iteration of the FOR loop, and comparator unit 1712*n* represents the positive and negative branch comparison operations for the last iteration of the FOR loop.

In accordance with the present disclosure, the number of comparators comprising the comparator module 1438*a* may be a function of or otherwise based on the number of partitioning planes in order to facilitate parallel processing. For example, referring to the illustrative embodiment of FIG. 17B, it can be seen that the number of comparators for processing the X-partitioning planes is $2 \times N_x$. Likewise, though not shown in the figures, the number of comparators for processing the Y-partitioning planes is $2 \times M_y$ and the number of comparators for processing the Z-partitioning planes is $2 \times Q_z$.

Figure 17C:
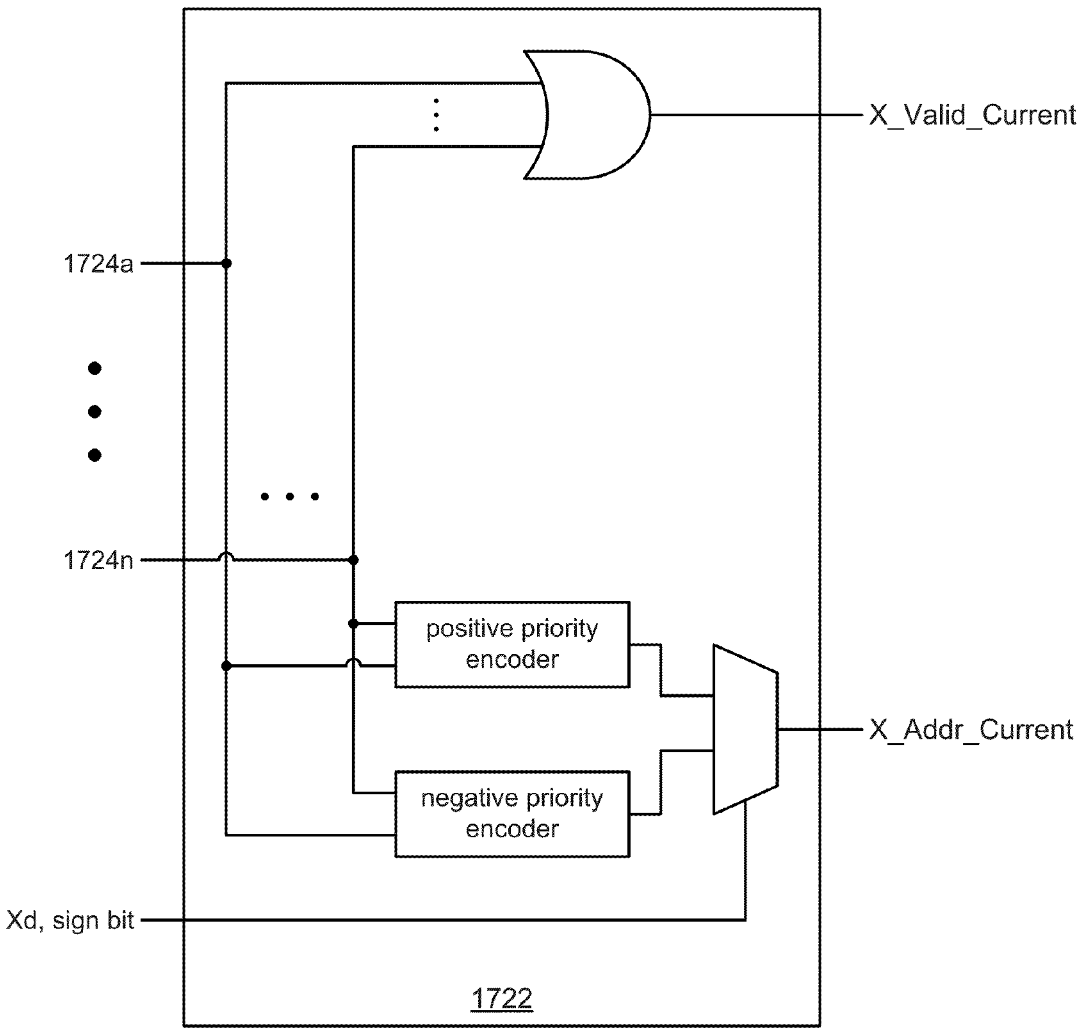

FIG. 17A shows that the outputs (1-bit values) 1724*a*-1724*n* of respective comparator units 1712*a*-1712*n* feed into a bit processor 1722. Referring now to FIG. 17C, the bit processor 1722 comprises an OR gate that OR's together the outputs 1724*a*-1724*n*. The output of the OR gate represents the X_Valid_Current value, and is TRUE if any of the comparators 1734*a*, 1734*b* (FIG. 17B) evaluate to TRUE.

The bit processor 1722 further comprises a positive priority encoder and a negative priority encoder. As mentioned earlier, priority encoders are known. The positive priority encoder is "positive" in the sense that the output represents the position (counting from 0) of the first occurrence of a '1' bit in the input bitstream, reading the bitstream in a first direction (e.g., from left to right). The negative priority encoder is "negative" in the sense that the output of the negative priority encoder represents the position of the first occurrence of a '1' bit in the input bitstream, reading the bitstream in the direction opposite the first direction.

A close examination of the FOR loops above for processing X-partitioning planes will reveal that they implement priority encoder logic. The outcomes of the comparator units 1724*a*-1724*n* constitute the input bitstream, and the position of the occurrence of the first '1' bit in the bitstream constitutes X_Addr_Current. Positive priority encoding is provided for a positive value of the X-component $X_d$ and negative priority encoding is provided for a negative value. The output of each encoder feeds into a selector that is controlled by the sign bit to select the appropriate output as X_Addr_Current.

3. Ray/Grid Intersection Comparator Array

Referring to FIG. 15C, data generated in block 1506 use inputs shown in the figure to produce the output described above and shown in the figure. For example, the partitioning plane inputs come from the GTU inputs, and the intersect point inputs come from the output of block 1502. The following pseudo-code fragment illustrates how block 1506 may be implemented and how the data may be generated in the block:

PSEUDO-CODE FRAGMENT XIV.

```
// Parallel
For ( i = 0; i <= Nx; i++ ) {
  For ( q = 0; q <= My; q++ ) {
    Y_GT_X_Plane [ i ] [ q ] = Y_Intersect_X_Plane [ i ] > Y_Plane [ q ];
    Y_EQ_X_Plane [ i ] [ q ] = Y_Intersect_X_Plane [ i ] == Y_Plane [ q ];
    Y_LT_X_Plane [ i ] [ q ] = Y_Intersect_X_Plane [ i ] < Y_Plane [ q ];
  } // End For
  For ( q = 0; q <= Qz; q++) {
    Z_GT_X_Plane [ i ] [ q ] = Z_Intersect_X_Plane [ i ] > Z_Plane [ q ];
    Z_EQ_X_Plane [ i ] [ q ] = Z_Intersect_X_Plane [ i ] == Z_Plane [ q ];
    Z_LT_X_Plane [ i ] [ q ] = Z_Intersect_X_Plane [ i ] < Z_Plane [ q ];
  } // End For
} // End For
For ( i = 0; i <= My; i++ ) {
  For ( q = 0; q <= Nx; q++ ) {
    X_GT_Y_Plane [ i ] [ q ] = X_Intersect_Y_Plane [ i ] > X_Plane [ q ];
    X_EQ_Y_Plane [ i ] [ q ] = X_Intersect_Y_Plane [ i ] == X_Plane [ q ];
    X_LT_Y_Plane [ i ] [ q ] = X_Intersect_Y_Plane [ i ] < X_Plane [ q ];
  } // End For
  For ( q = 0; q <= Qz; q++) {
    Z_GT_Y_Plane [ i ] [ q ] = Z_Intersect_Y_Plane [ i ] > Z_Plane [ q ];
    Z_EQ_Y_Plane [ i ] [ q ] = Z_Intersect_Y_Plane [ i ] == Z_Plane [ q ];
    Z_LT_Y_Plane [ i ] [ q ] = Z_Intersect_Y_Plane [ i ] < Z_Plane [ q ];
  } // End For
} // End For
For ( i = 0; i <= Qz; i++) {
  For ( q = 0; q <= Nx; q++) {
    X_GT_Z_Plane [ i ] [ q ] = X_Intersect_Z_Plane [ i ] > X_Plane [ q ];
    X_EQ_Z_Plane [ i ] [ q ] = X_Intersect_Z_Plane [ i ] == X_Plane [ q ];
    X_LT_Z_Plane [ i ] [ q ] = X_Intersect_Z_Plane [ i ] < X_Plane [ q ];
  } // End For
  For ( q = 0; q <= My; q++ ) {
    Y_GT_Z_Plane [ i ] [ q ] = Y_Intersect_Z_Plane [ i ] > Y_Plane [ q ];
    Y_EQ_Z_Plane [ i ] [ q ] = Y_Intersect_Z_Plane [ i ] == Y_Plane [ q ];
    Y_LT_Z_Plane [ i ] [ q ] = Y_Intersect_Z_Plane [ i ] < Y_Plane [ q ];
  } // End For
} // End For
// generate GTE, LTE, and EQ evaluations
Y_GTE_X_Plane [ 0 – Nx ] [ 0 – My ] =
      Y_GT_X_Plane [ 0 – Nx ] [ 0 – My ] | Y_EQ_X_Plane
      [ 0 – Nx ] [ 0 – My ]
Z_GTE_X_Plane [ 0 – Nx ] [ 0 – Qz ] =
      Z_GT_X_Plane [ 0 – Nx ] [ 0 – Qz ] | Z_EQ_X_Plane
      [ 0 – Nx ] [ 0 – Qz ]
X_GTE_Y_Plane [ 0 – My ] [ 0 – Nx ] =
      X_GT_Y_Plane [ 0 – My ] [ 0 – Nx ] | X_EQ_Y_Plane
      [ 0 – My ] [ 0 – Nx ];
```

-continued

PSEUDO-CODE FRAGMENT XIV.

```
Z_GTE_Y_Plane [ 0 – My ] [ 0 – Qz ] =
        Z_GT_Y_Plane [ 0 – My ] [ 0 – Qz ] | Z_EQ_Y_Plane
        [ 0 – My ] [ 0 – Qz ];
X_GTE_Z_Plane [ 0 – Qz ] [ 0 – Nx ] =
        X_GT_Z_Plane [ 0 – Qz ] [ 0 – Nx ] | X_EQ_Z_Plane
        [ 0 – Qz ] [ 0 – Nx ]
Y_GTE_Z_Plane [ 0 – Qz ] [ 0 – My ] =
        Y_GT_Z_Plane [ 0 – Qz ] [ 0 – My ] |Y_EQ_Z_Plane
        [ 0 – Qz ] [ 0 – My ]
Y_LTE_X_Plane [ 0 – Nx ] [ 0 – My ] =
        Y_LT_X_Plane [ 0 – Nx ] [ 0 – My ] | Y_EQ_X_Plane
        [ 0 – Nx ] [ 0 – My ]
Z_LTE_X_Plane [ 0 – Nx ] [ 0 – Qz ] =
        Z_LT_X_Plane [ 0 – Nx ] [ 0 – Qz ] | Z_EQ_X_Plane
        [ 0 – Nx ] [ 0 – Qz ]
X_LTE_Y_Plane [ 0 – My ] [ 0 – Nx ] =
        X_LT_Y_Plane [ 0 – My ] [ 0 – Nx ] | X_EQ_Y_Plane
        [ 0 – My ] [ 0 – Nx ];
Z_LTE_Y_Plane [ 0 – My ] [ 0 – Qz ] =
        Z_LT_Y_Plane [ 0 – My ] [ 0 – Qz ] | Z_EQ_Y_Plane
        [ 0 – My ] [ 0 – Qz ];
X_LTE_Z_Plane [ 0 – Qz ] [ 0 – Nx ] =
        X_LT_Z_Plane [ 0 – Qz ] [ 0 – Nx ] | X_EQ_Z_Plane
        [ 0 – Qz ] [ 0 – Nx ]
Y_LTE_Z_Plane [ 0 – Qz ] [ 0 – My ] =
        Y_LT_Z_Plane [ 0 – Qz ] [ 0 – My ] |Y_EQ_Z_Plane
        [ 0 – Qz ] [ 0 – My ]
// End Parallel
```

The number of FP comparisons that are performed can be unacceptably time consuming if processed in serial fashion, such as in a programmatic implementation. Therefore, in accordance with the present disclosure, arrays of hardware FP comparators may be provided to perform the comparison operations in parallel fashion using digital logic circuitry rather than programmatically using software executed by a CPU. Although the resulting total number of comparators is far greater than the number of FP adders and FP multipliers, floating point resources required to implement FP comparators are far less than the resources required to implement the FP adders and FP multipliers. In some embodiments, for example,

- each X-partitioning plane is associated with a comparator for each Y-partitioning plane and for each Z-partitioning plane, resulting in $(N_x+1)\times(M_y+Q_z+2)$ comparators
- each Y-partitioning plane is associated with a comparator for each X-partitioning plane and for each Z-partitioning plane, resulting in an additional $(M_y+1)\times(N_x+Q_z+2)$ comparators
- each Z-partitioning plane is associated with a comparator for each X-partitioning plane and for each Y-partitioning plane, resulting in an additional $(Q_z+1)\times(N_x+M_y+2)$ comparators Each comparator may be configured to output a GT (greater than) signal, an LT (less than) signal, and an EQ (equal to) signal. In some embodiments, these signals may be 1-bit values.

Figure 18:
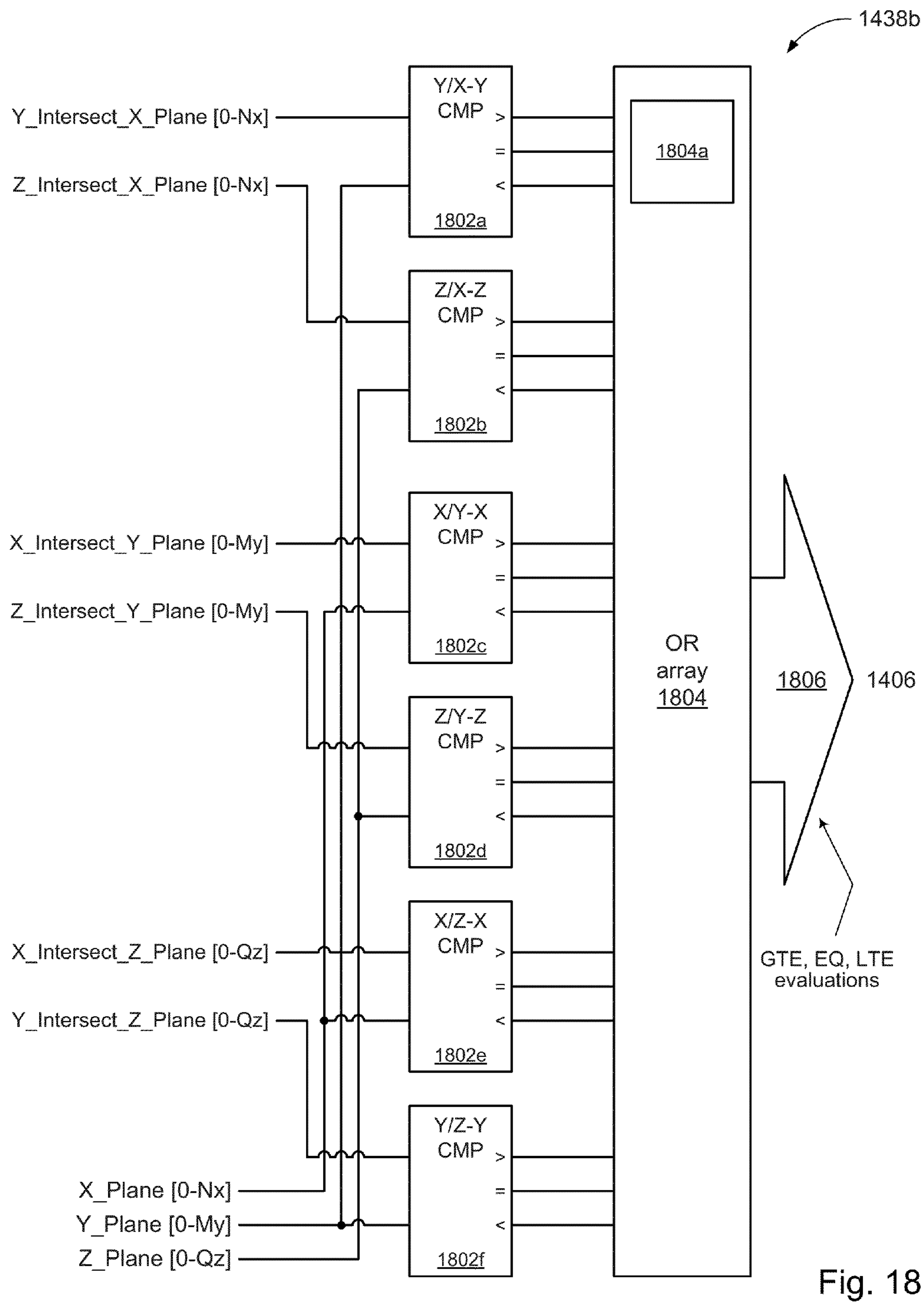
FIGS. 18 and 18A show additional details for comparator module 1438*b* shown in FIG. 14.
Figure 18A:
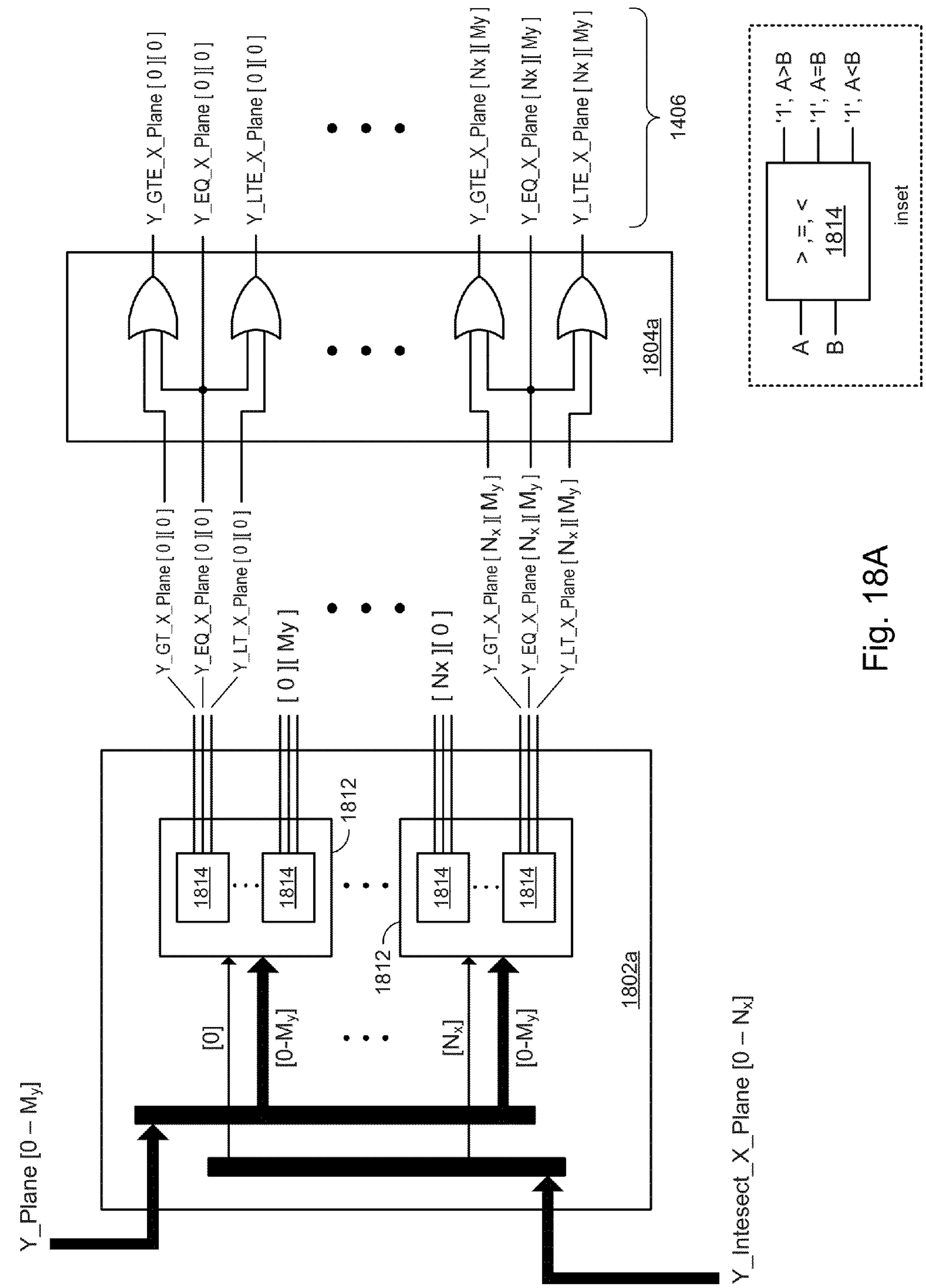

FIGS. 18 and 18A show details of comparator module 1438*b*, in accordance with some embodiments, for performing the operations expressed in the above pseudo-code fragment. These figures serve to illustrate that the pseudo-code can be implemented in digital logic circuitry (rather than as software executing on a CPU), but should not be construed as being limited to any particular implementation of the comparator module 1438*b*. Referring to FIG. 18, the comparator module 1438*b* may include six arrays of comparators 1802*a*, 1802*b*, 1802*c*, 1802*d*, 1802*e*, 1802*f*. Each array 1802*a*-1802*f* receives a vector of intersect points and a vector of partitioning planes according to the above comparison operations. An OR array 1804 performs the OR'ing functions according to the above. The output 1806 of the OR array 1804 may be gated onto the data output section 1406 and stored, for example, in registers or other data stores comprising the data output section. FIG. 18A illustrates details of the digital logic circuits for comparator array 1802*a* and OR sub-array 1804*a* to illustrate the operations for the Y-intersects points in the X-partitioning plane. It will be appreciated that the digital logic circuits for comparator arrays 1802*b*-1802*f* may be similarly constructed.

Referring to FIG. 18A, the comparators in comparator array 1802*a* may be organized as sets of comparators 1812, each set of comparators corresponding to one of the Y-partitioning planes. Each set of comparators 1812, in turn, may comprise FP comparator circuits 1814, one for each Y-partitioning plane. Each FP comparator circuit 1814 receives two inputs (e.g., Y_Plane[0] and Y_Intersect_X_Plane[0]) and produce three signals, indicating respectively if one input is greater than, equal to, or less than the other input.

FIG. 18A also shows an illustrative embodiment of the OR sub-array 1804*a*. The outputs (referred to as the GTE, EQ, and LTE evaluations) of the OR sub-arrays that comprise the OR array 1804 may be stored as bits in one or more registers in the data output section 1406.

In accordance with the present disclosure, the number of comparators comprising the comparator module 1438*b* may be a function of or otherwise based on the number of partitioning planes in order to facilitate parallel processing. For example, referring to the illustrative embodiment shown in FIG. 18A, it can be seen that comparator array 1802*a* comprises $(N_x+1)\times(M_y+1)$ FP comparator circuits 1814. Likewise, though not shown in the figures, the number of comparators in comparator array 1802*b* is $(N_x+1)\times(Q_z+1)$, in comparator array 1802*c* it is $(M_y+1)\times(N_x+1)$, in comparator array 1802*d* it is $(M_y+1)\times(Q_z+1)$, in comparator array 1802*e* is $(Q_z+1)\times(N+1)$, and in comparator array 1802*f* is $(Q_z+1)\times(M_y+1)$.

4. Partitioning Planes Intersect Points in Grid

Figure 15D:
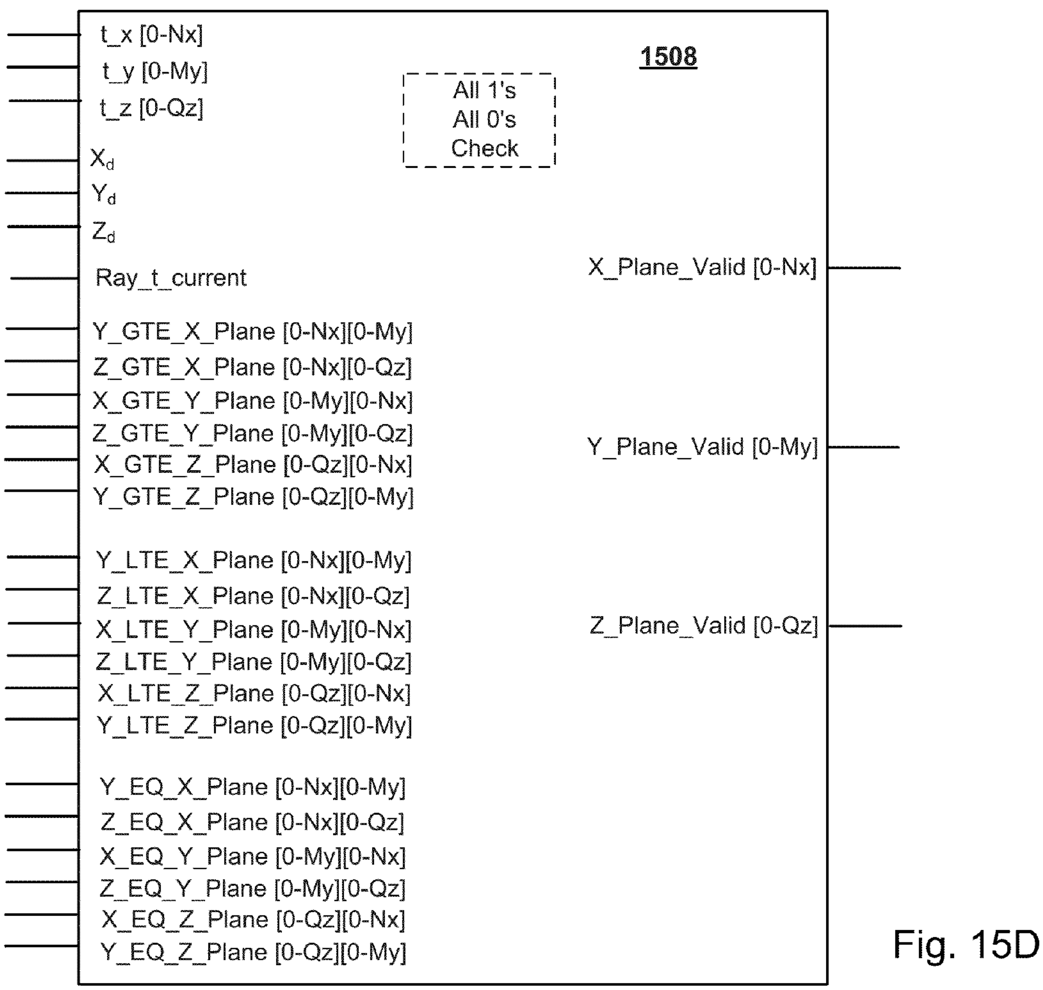

Referring to FIG. 15D, data generated in block 1508 use inputs shown in the figure to produce the output described above and shown in the figure. For example, the current ray position Ray_t_current and the ray direction vector $R_d$ come from the GTU inputs, and the GTE, EQ, and LTE evaluations come from the output of block 1506, while the plane intersect distances t_x[ ], t_y[ ], and t_z[ ] come from block 1502. The following pseudo-code fragment illustrates how block 1508 may be implemented and how the data may be generated in the block:

PSEUDO-CODE FRAGMENT XV.

```
// Parallel
// process plane valid bits for X-partitioning planes
For ( i = 0; i <= Nx; i++) {
   X_Plane_Valid [ i ] = 0;
   If ( t_x [ i ] > Ray_t_current )
      X_Plane_Valid [ i ] = 1;
```

-continued

PSEUDO-CODE FRAGMENT XV.

```
  If ( Yd Pos ) // consider the planes in increasing direction
    If ( (Y_GTE_X_Plane [ i ] [ 0 – My ] == all 0’s ||
    Y_GTE_X_Plane [ i ] [0 – My ] == all 1’s )
      && Y_EQ_X_Plane [ i ] [ 0 ] == 0 )
        X_Plane_Valid [ i ] = 0;
  Else // Yd Neg // consider the planes in decreasing direction
    If ( (Y_LTE_X_Plane [ i ] [ 0 – My ] == all 0’s ||
    Y_LTE_X_Plane [ i ] [0 – My ] == all 1’s )
      && Y_EQ_X_Plane + i + + My + == 0 )
        X_Plane_Valid [ i ] = 0;
  If ( Zd Pos )
    If ( (Z_GTE_X_Plane [ i ] [ 0 – Qz ] == all 0’s || Z_GTE_X_Plane [ i ] [0 – Qz ] == all 1’s )
      && Z_EQ_X_Plane [ i ] [ 0 ] == 0 )
        X_Plane_Valid + i + = 0;
  Else // Zd Neg
    If ( (Z_LTE_X_Plane [ i ] [ 0 – Qz ] == all 0’s || Z_LTE_X_Plane [ i ] [0 – Qz ] == all 1’s )
      && Z_EQ_X_Plane [ i ] [ Qz ] == 0 )
        X_Plane_Valid [ i ] = 0;
}// End For
// process plane valid bits for Y-partitioning planes
For( i = 0; i <= My; i++){
  Y_Plane_Valid [ i ] = 0;
  If ( t_y [ i ] > Ray_t_current )
    Y_Plane_Valid [ i ] = 1;
  If ( Xd Pos )
    If ( (X_GTE_Y_Plane [ i ] [ 0 – Nx ] == all 0’s ||
    X_GTE_Y_Plane [ i ] [0 – Nx ] == all 1’s )
      && X_EQ_Y_Plane [ i ] [ 0 ] == 0 )
        Y_Plane_Valid [ i ] = 0;
  Else // Xd Neg
    If ( (X_LTE_Y_Plane [ i ] [ 0 – Nx ] == all 0’s || X_LTE_Y_Plane [ i ] [0 – Nx ] == all 1’s )
      && X_EQ_Y_Plane [ i ] [ Nx ] == 0 )
        Y_Plane_Valid [ i ] = 0;
  If ( Zd Pos )
    If ( (Z_GTE_Y_Plane [ i ] [ 0 – Qz ] == all 0’s || Z_GTE_Y_Plane [ i ] [0 – Qz ] == all 1’s)
      && Z_EQ_Y_Plane [ i ] [ 0 ] == 0 )
        X_Plane_Valid [ i ] = 0;
  Else // Zd Neg
    If ( (Z_LTE_Y_Plane [ i ] [ 0 – Qz ] == all 0’s || Z_LTE_Y_Plane [ i ] [0 – Qz ] == all 1’s )
      && Z_EQ_Y_Plane [ i ] [ Qz ] == 0 )
        Y_Plane_Valid [ i ] = 0;
}// End For
// process plane valid bits for Z-partitioning planes
For( i = 0; i <= Qz; i++){
  Z_Plane_Valid [ i ] = 0;
  If ( t_z [ i ] > Ray_t_current )
    Z_Plane_Valid [ i ] =1;
  If ( Xd Pos )
    If ( (X_GTE_Z_Plane [ i ] [ 0 – Nx ] == all 0’s ||Y_GTE_Z_Plane [ i ] [0 – Nx == all 1’s )
      && X_EQ_Z_Plane [ i ] [ 0 ] == 0 )
        Z_Plane_Valid [ i ] = 0;
  Else // Xd Neg
    If ( (X_LTE_Z_Plane [ i ] [ 0 – Nx ] == all 0’s ||Y_LTE_Z_Plane [ i ] 0 –Nx ] == all 1’s )
      && X_EQ_Z_Plane [ i ] [ Nx ] == 0 )
        Z_Plane_Valid [ i ] = 0;
  If ( Yd Pos )
    If ( (Y_GTE_Z_Plane [ i ] [ 0 – My ] == all 0’s ||Y_GTE_Z_Plane [ i ] [0 – My ] == all 1’s)
      && Y_EQ_Z_Plane [ i ] [ 0 ] == 0 )
        Z_Plane_Valid [ i ] = 0;
  Else // Yd Neg
    If ( (Y_LTE_Z_Plane [ i ] [ 0 – My ] == all 0’s ||Y_LTE_Z_Plane [ i ] [0 – My ] == all 1’s)
      && Y_EQ_Z_Plane [ i ] [ My ] == 0 )
        Z_Plane_Valid [ i ] = 0;
}// End For
// End Parallel
```

Figure 19:
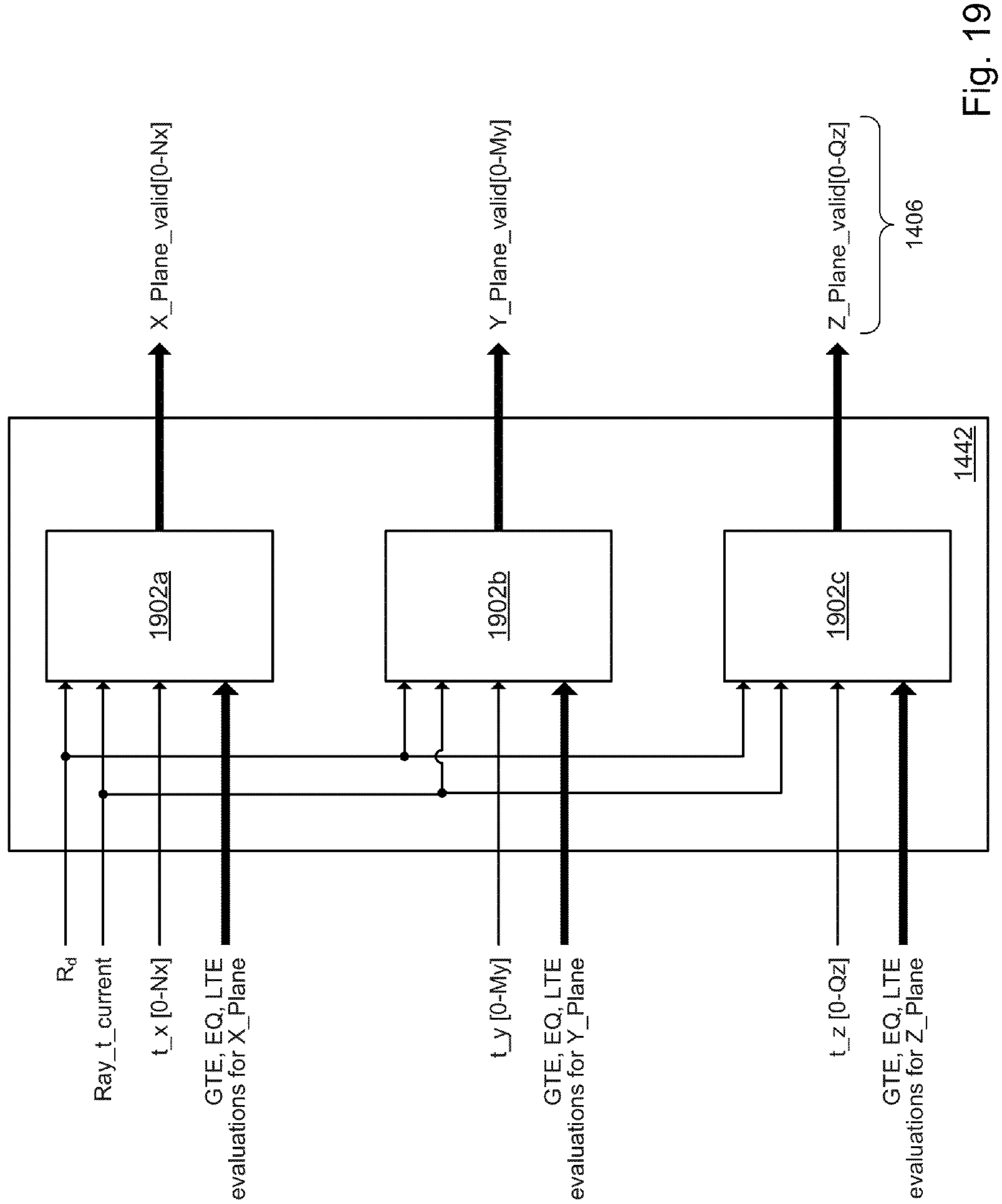
FIGS. 19 and 19A-19B show additional details for check module 1442 shown in FIG. 14.
Figure 19A:
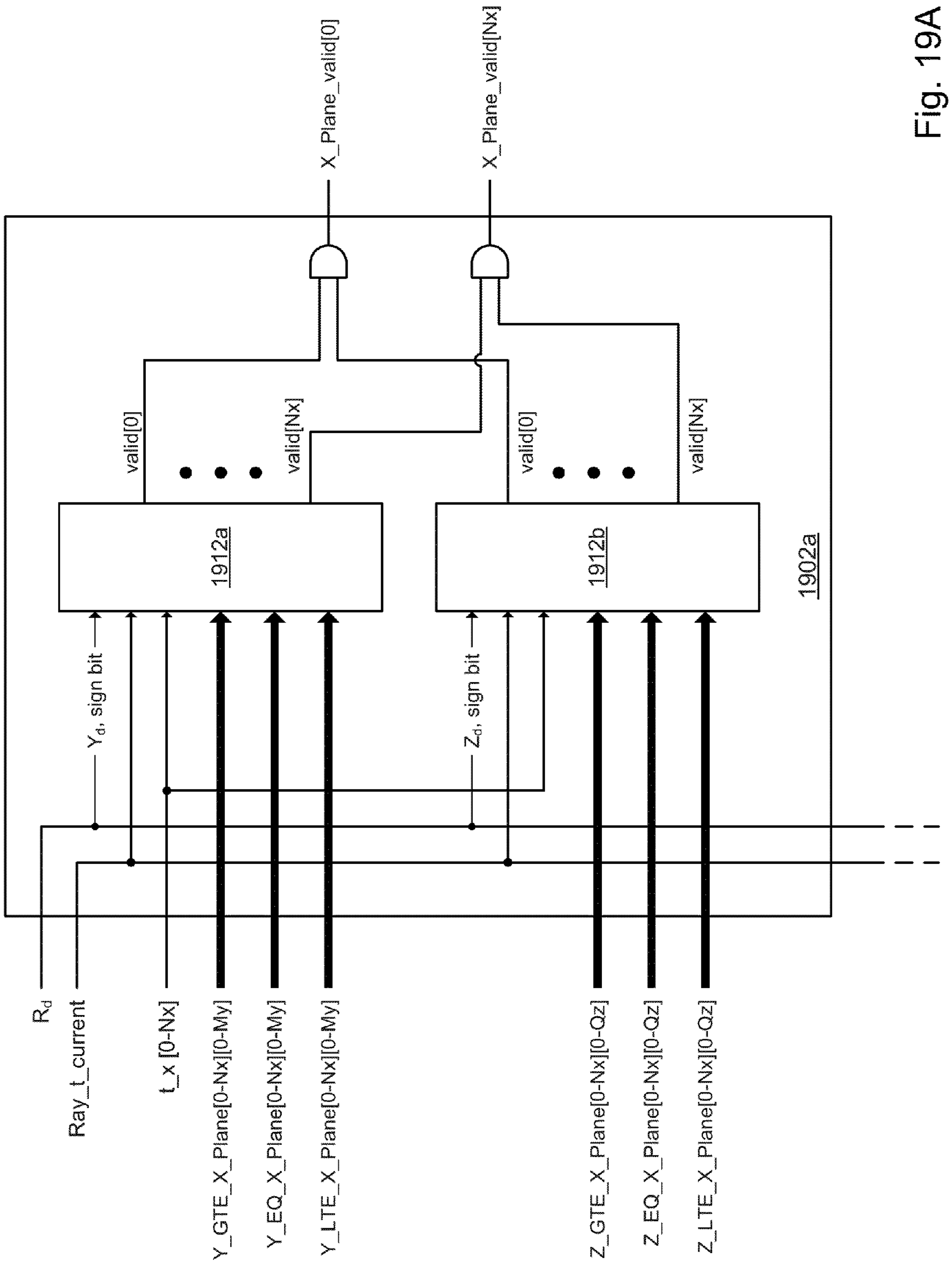
Figure 19B:
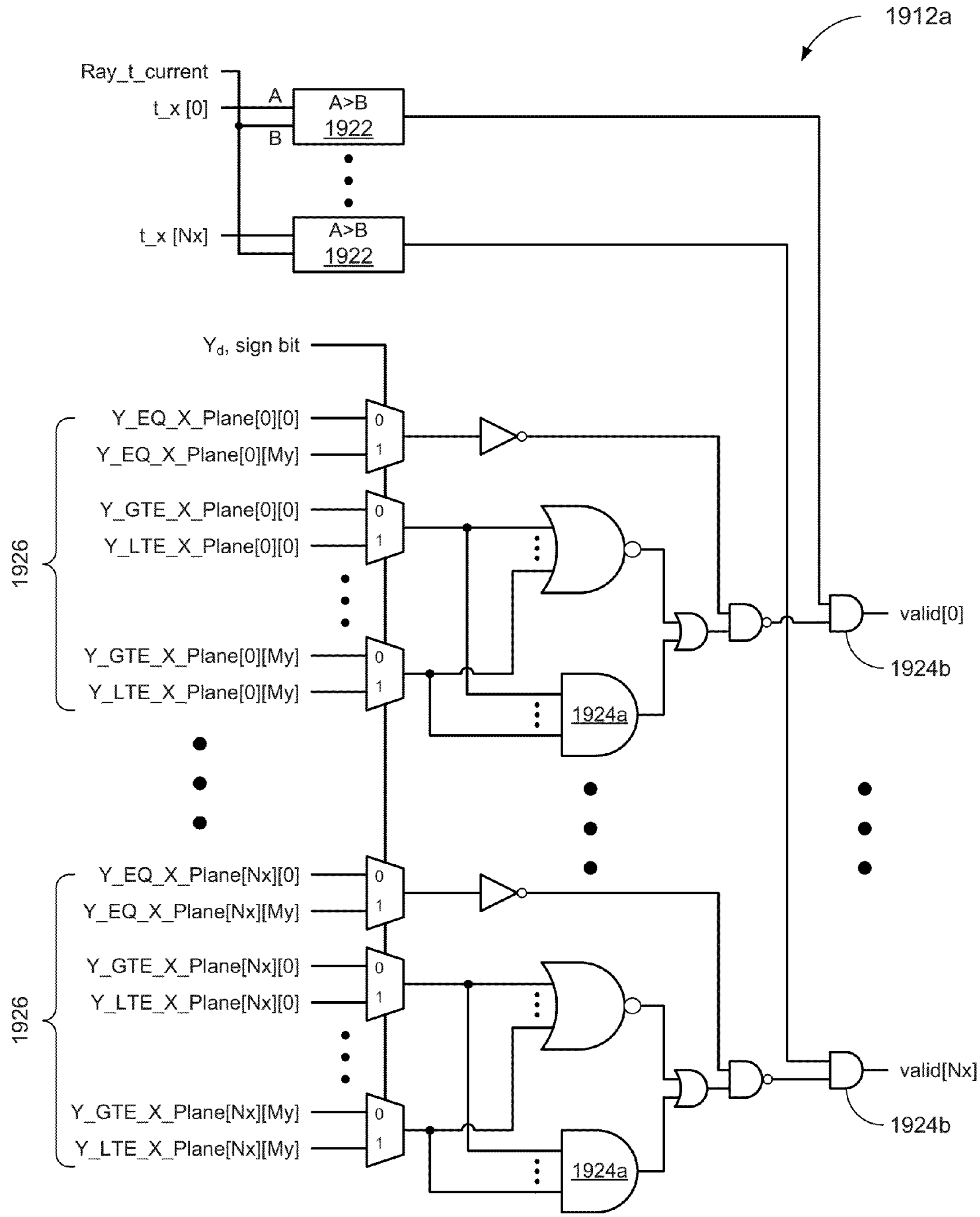

FIGS. 19 and 19A-19B show details of check module 1442, in accordance with some embodiments, for performing the operations shown in the above pseudo-code fragment. These figures serve to illustrate that the pseudo-code can be implemented in digital logic circuitry (rather than as software executing on a CPU), but should not be construed as being limited to any particular implementation of the check module 1442. Referring to FIG. 19, the check module 1442 may comprise logic units 1902*a*, 1902*b*, 1902*c* for processing the evaluations for respective X-, Y-, and Z-partitioning planes. The resulting plane valid bits may be gated to registers or other data stores comprising the data output section 1406. FIGS. 19A and 19B show additional details of the digital logic circuits for logic unit 102*a* for generating plane valid bits for the X-partitioning planes. It will be appreciated by one of ordinary skill that the digital logic circuits for logic units 1902*b* and 1902*c* may be similarly constructed for processing respective Y- and Z-partitioning planes.

Referring to FIG. 19A, the logic unit 1902*a* comprises a module 1912*a* for checking the Y-intersections on the X-Planes and a module 1912*b* for checking the Z-intersections on the X-Planes. Each module 1912*a*, 1912*b* outputs a plane valid bit (X_Plane valid[0-$N_x$]) that indicates if the respective Y- and Z-intersections occur within the grid. If both the Y- and Z-intersections with an X_Plane occur within the grid, then the corresponding X_Plane valid[ ] bit is set, for example, by using the AND gates.

FIG. 19B illustrates an example of the digital logic circuits that may be used to implement module 1912*a* for the Y-intersections, with the understanding that module 1912*b* may be similarly constructed for the Z-intersections. Each iteration of the FOR loop for processing the X-partitioning planes is represented by a corresponding comparator 1922 and corresponding logic 1926. The sign bit for the Y-component $Y_d$ of the ray direction vector $R_d$ selects the proper terms for the operation. The NOR gate determines the 'all 0's' condition, and the AND gate 1924*a* determines the 'all 1's' condition. The NAND gate performs the evaluation in the IF statements, and the final AND gate 1924*b* sets the valid bit.

The number of comparators comprising the check module 1442 may be a function of the number of partitioning planes in order to facilitate parallel processing. For example, referring to the illustrative embodiment of FIGS. 19A and 19B, it can be seen that the number of comparators for processing the X-partitioning planes is $2\times N_x$. Likewise, though not shown in the figures, the number of comparators for processing the Y-partitioning planes is $2\times M_y$ and the number of comparators for processing the Z-partitioning planes is $2\times Q_z$.

5. Get X_Addr, Y_Addr, Z_Addr for Intersect Points

Figure 15E:
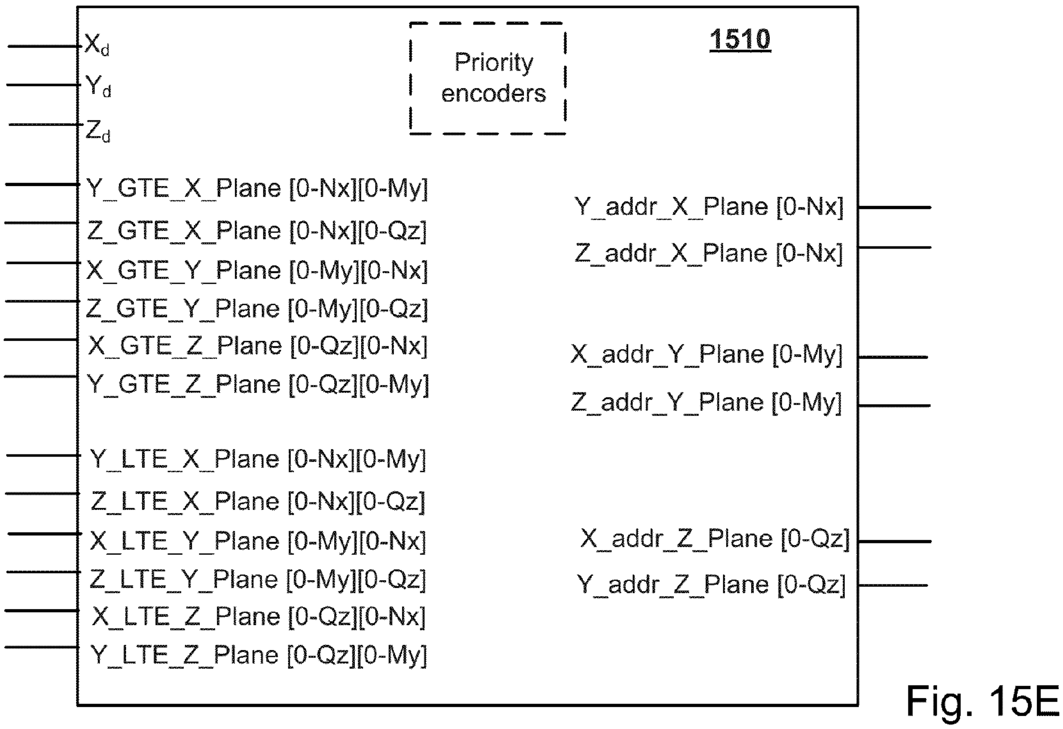

Referring to FIG. 15E, data generated in block 1510 use inputs shown in the figure to produce the output described above and shown in the figure. For example, the ray direction vector $R_d$ comes from the GTU inputs and the GTE and LTE evaluations come from the output of block 1506. Generally, the ray direction vector $R_d$ is used to determine the plane address components using intersect points that occur within the grid. The GTE and LTE evaluations are used to determine whether a partitioning plane intersection occurs within the grid or not. The following pseudo-code fragment illustrates how block 1510 may be implemented and how the data may be generated in the block:

PSEUDO-CODE FRAGMENT XVI.

```
Function Pos_Priority_Encode Input Width [ 0 – K ]
  Output Addr;
  Addr = K;
  For ( i = 0; i < K; i++ )
    If ( Input [ i ] == 1 )
      Addr = i;
      Return Addr
End Pos_Priority_Encode
Function Neg_Priority_Encode Input Width [ 0 – K ]
  Output Addr;
  Addr = 0;
  For ( i = K; i > 0; i–– )
    If ( Input [ i ] == 1 )
      Addr = i – 1;
      Return Addr
End Neg_Priority_Encode
// Parallel
// determine Y– and Z– plane address components
If ( Xd Pos )
  For ( i = 0; i < Nx; i++ )
    If ( Yd Pos )
      Y_addr_X_Plane [ i ] = Pos_Priority_Encode
      ( Y_GTE_X_Plane [ i ] [ 0 – My ] )
```

-continued

PSEUDO-CODE FRAGMENT XVI.

```
    Else
      Y_addr_X_Plane [ i ] = Neg_Priority_Encode
      ( Y_LTE_X_Plane [ i ] [ 0 – My ] )
    If ( Zd Pos )
      Z_addr_X_Plane [ i ] = Pos_Priority_Encode
      ( Z_GTE_X_Plane [ i ] [ 0 – Qz ] )
    Else
      Z_addr_X_Plane [ i ] = Neg_Priority_Encode
      ( Z_LTE_X_Plane [ i ] [ 0 – Qz ] )
  End For
Else // Xd Neg
  For ( i = Nx; i > 0; i–– )
    If ( Yd Pos )
      Y_addr_X_Plane [ i ] = Pos_Priority_Encode
      ( Y_GTE_X_Plane [ i ] [ 0 – My ] )
    Else
      Y_addr_X_Plane [ i ] = Neg_Priority_Encode
      ( Y_LTE_X_Plane [ i ] [ 0 – My ] )
    If ( Zd Pos )
      Z_addr_X_Plane [ i ] = Pos_Priority_Encode
      ( Z_GTE_X_Plane [ i ] [ 0 – Qz ] )
    Else
      Z_addr_X_Plane [ i ] = Neg_Priority_Encode
      ( Z_LTE_X_Plane [ i ] [ 0 – Qz ] )
  End For
End If // Xd
// determine X– and Z– plane address components
If ( Yd Pos )
  For ( i = 0; i < My; i++ )
    If ( Xd Pos )
      X_addr_Y_Plane [ i ] = Pos_Priority_Encode
      ( X_GTE_Y_Plane [ i ] [ 0 – Nx ] )
    Else
      X_addr_Y_Plane [ i ] = Neg_Priority_Encode
      ( X_LTE_Y_Plane [ i ] [ 0 – Nx ] )
    If ( Zd Pos )
      Z_addr_Y_Plane [ i ] = Pos_Priority_Encode
      ( Z_GTE_Y_Plane [ i ] [ 0 – Qz ] )
    Else
      Z_addr_Y_Plane [ i ] = Neg_Priority_Encode
      ( Z_LTE_Y_Plane [ i ] [ 0 – Qz ] )
  End For
Else // Yd Neg
  For ( i = My; i > 0; i–– )
    If ( Xd Pos )
      X_addr_Y_Plane [ i ] = Pos_Priority_Encode
      ( X_GTE_Y_Plane [ i ] [ 0 – Nx ] )
    Else
      X_addr_Y_Plane [ i ] = Neg_Priority_Encode
      ( X_LTE_Y_Plane [ i ] [ 0 – Nx ] )
    If ( Zd Pos )
      Z_addr_Y_Plane [ i ] = Pos_Priority_Encode
      ( Z_GTE_Y_Plane [ i ] [ 0 – Qz ] )
    Else
      Z_addr_Y_Plane [ i ] = Neg_Priority_Encode
      ( Z_LTE_Y_Plane [ i ] [ 0 – Qz ] )
  End For
End If // Yd
// determine X– and Y– plane address components
If ( Zd Pos )
  For ( i = 0; i < Qz; i++ )
    If ( Xd Pos )
      X_addr_Z_Plane [ i ] = Pos_Priority_Encode
      ( X_GTE_Z_Plane [ i ] [ 0 – Nx ] )
    Else
      X_addr_Z_Plane [ i ] = Neg_Priority_Encode
      ( X_LTE_Z_Plane [ i ] [ 0 – Nx ] )
    If ( Yd Pos )
      Y_addr_Z_Plane [ i ] = Pos_Priority_Encode
      ( Y_GTE_Z_Plane [ i ] [ 0 – My ] )
    Else
      Y_addr_Z_Plane [ i ] = Neg_Priority_Encode
      ( Y_LTE_Z_Plane [ i ] [ 0 – My ] )
```

-continued

PSEUDO-CODE FRAGMENT XVI.

```
  End For
Else // Zd Neg
  For ( i = Qz; i > 0;i-- )
    If ( Xd Pos )
      X_addr_Z_Plane [ i ] = Pos_Priority_Encode
      ( X_GTE_Z_Plane [ i ] [ 0 - Nx ] )
    Else
      X_addr_Z_Plane [ i ] = Neg_Priority_Encode
      ( X_LTE_Z_Plane [ i ] [ 0 - Nx ] )
    If ( Yd Pos )
      Y_addr_Z_Plane [ i ] = Pos_Priority_Encode
      ( Y_GTE_Z_Plane [ i ] [ 0 - My ] )
    Else
      Y_addr_Z_Plane [ i ] = Neg_Priority_Encode
      ( Y_LTE_Z_Plane [ i ] [ 0 - My ] )
  End For
End If // Zd
// End Parallel
```

Figure 20:
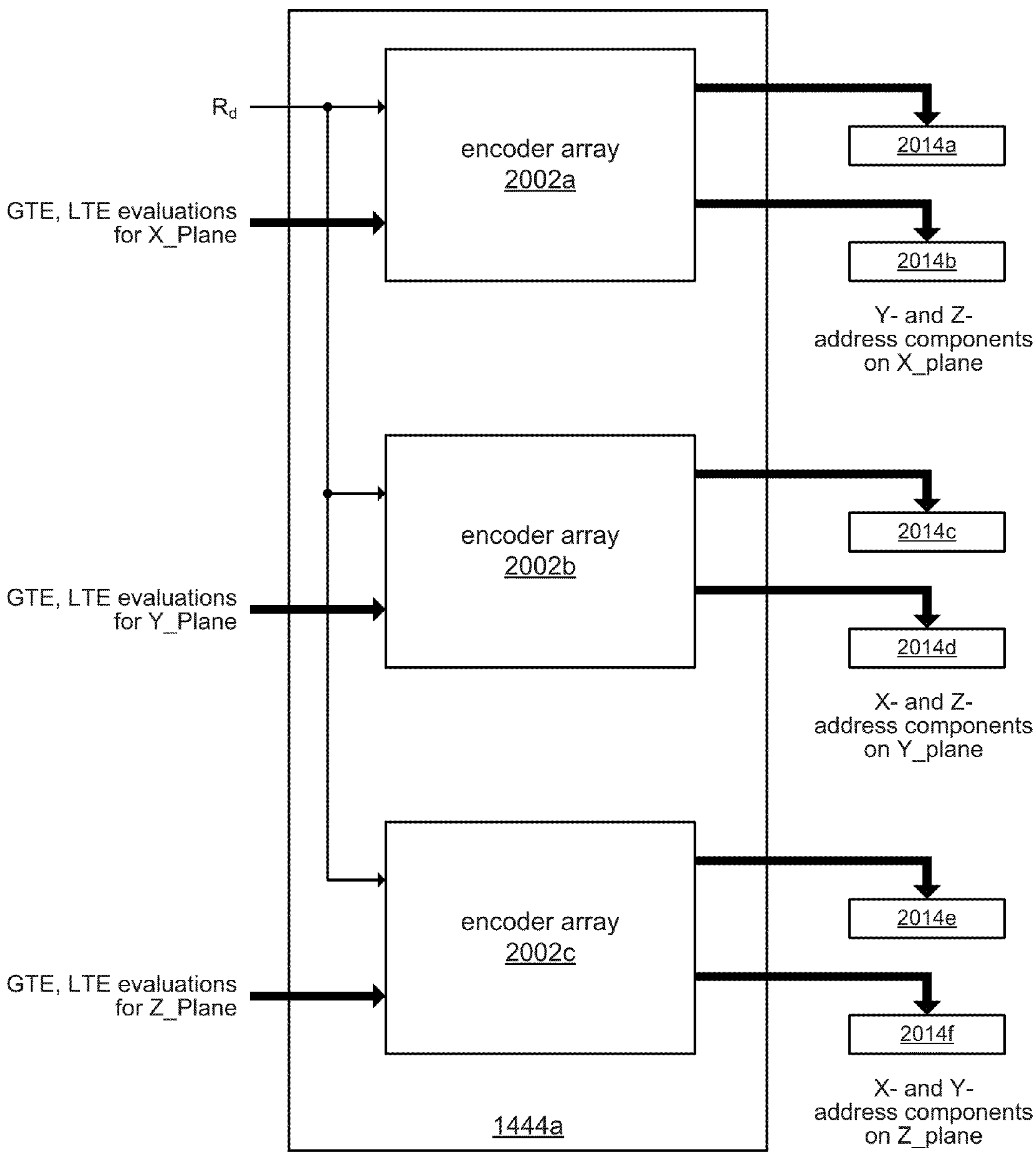
FIGS. 20 and 20A show additional details for priority encoder 1444*a* shown in FIG. 14.
Figure 20A:
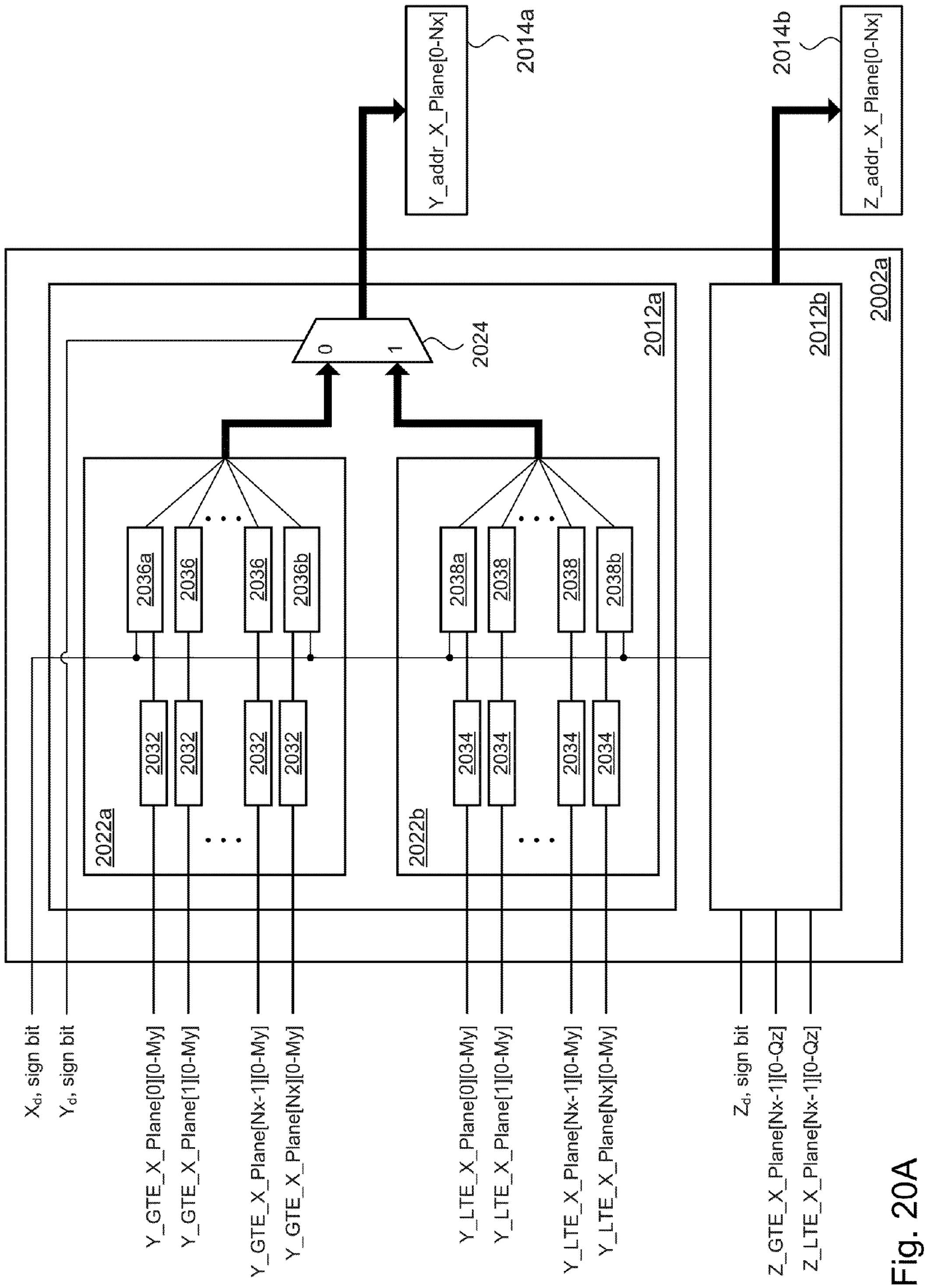

FIGS. 20 and 20A show details of priority encoder module 1444*a*, in accordance with some embodiments, for performing the operations shown in the above pseudo-code fragment. These figures serve to illustrate that the pseudo-code can be implemented in digital logic circuitry (rather than as software executing on a CPU), but should not be construed as being limited to any particular implementation of the priority encoder module 1444*a*. Referring to FIG. 20, the priority encoder module 1444*a* may comprise three priority encoders arrays 2002*a*, 2002*b*, 2002*c* for processing respective X-, Y-, and Z-partitioning planes. The priority encoder array 2002*a* produces the Y- and Z-plane addresses 2014*a*, 2014*b* on the X_Plane. Similarly, the priority encoder array 2002*b* produces the X- and Z-plane addresses 2014*c*, 2014*d* on the Y_Plane, and the priority encoder array 2002*c* produces the X- and Y-plane addresses 2014*e*, 2014*f* on the Z_Plane. The outputs 2014*a*-2014*f* may be gated to the data output section 1406. In some embodiments, the outputs 2014*a*-2014*f* may be stored in registers or other data stores comprising the data output section 1406. FIG. 20A shows additional details of the digital logic circuits for priority encoder array 2002*a* for processing X-partitioning planes. It will be appreciated by one of ordinary skill that the digital logic circuits for priority encoder arrays 2002*b* and 2002*c* may be similarly constructed for processing respective Y- and Z-partitioning planes.

The Pos_Priority_Encode module and the Neg_Priority_Encode module shown in the above pseudo-code fragment may represent digital logic circuitry commonly known as priority encoders, discussed earlier. As will be seen, the output of the positive and negative priority encoders in the priority encoder module 1444*a* serve to produce the X-, Y-, or Z-address components of cell addresses.

The digital logic circuitry for the positive priority encoder defined above may comprise a (K+1)-bit input bitstream ($b_O$ $b_1 \ldots b_K$) to produce an output of $\log_2$ (K+1) bits. The positive priority encoder is "positive" in the sense that the output represents the bit position (starting with 0) of the first occurrence of a '1' bit in the input bitstream, reading the bitstream in a first direction, for example, from left to right. The positive priority encoder may be configured to output K when the input bitstream contains all 0's or the first '1' bit occurs in the last bit position. In other implementations, a separate output pin may be provided to indicate an input that contains all 0's. As an example, an input bitstream of '0 1 1 0 1' (K=4), will produce an output value of 1 since the first occurrence of '1' (reading from left to right) is in the $2^{nd}$ bit position. The input bitstream '0 0 0 0 1' (K=4) will produce an output value of 4, since the '1' bit occurs in the last bit position reading the bitstream from left to right.

The digital logic circuitry for the negative priority encoder defined above may be similarly constructed. The negative priority encoder is "negative" in the sense that the output of the negative priority encoder represents the bit position (counting from 0) of the first occurrence of a '1' bit in the input bitstream, reading the bitstream in the opposite direction, namely right to left in our example. The output of the negative priority encoder may be the value 0 when the input bitstream contains all 0's or the first '1' bit occurs in the last bit position reading from right to left. Thus, for example, the bitstream '1 0 0 1 0' (K=4) will produce an output of 3 because the first '1' bit in the bitstream from right to left is in bit position 3. The bitstream '1 1 0 0' will produce 1 because the first '1' bit, reading the bitstream from right to left, occurs in bit position 1.

Referring to FIG. 20A, the priority encoder array 2002*a* may comprise a Y-encoding unit 2012*a* and a Z-encoding unit 2012*b*. Details of the Y-encoding unit 2012*a* will be given, with the understanding that the Z-encoding unit may be similarly constructed. The Y-encoding unit 2012*a* may comprise a bank 2022*a* of positive priority encoders 2032 and corresponding registers 2036. Each encoder 2032 will process a GTE evaluation to produce a Y-address component that is stored in the corresponding register 2036. The Y-encoding unit 2012*b* may further comprise a bank 2022*b* of negative priority encoders 2034 and corresponding registers 2038. The negative priority encoders 2034 produce Y-address components, which are stored in the registers 2038.

The output of each bank 2022*a*, 2022*b* comprises the contents of the respective registers 2036, 2038, which feed into a selector 2024. The output of selector 2024 is controlled by the sign bit of the Y-component $Y_d$ of the ray direction vector $R_d$ to select the Y-address components according to the direction of $Y_d$.

Registers 2036 in bank 2022*a* include an 'a' register 2036*a* and a 'b' register 2036*b*. Registers 2036*a* and 2036*b* are controlled by the sign bit of the X-component $X_d$ of the ray direction vector $R_d$. Similar registers 2038*a*, 2038*b* are provided in bank 2022*b*. The reason for these registers arises from the consideration that only points of intersection at entry are considered. Therefore, for X-partitioning planes, a positive $X_d$ direction will consider X_Planes [0−($N_x$−1)] and a negative $X_d$ direction will consider X_Planes[1-$N_x$]. Thus, for positive $X_d$ direction, the registers 2036*b* and 2038*b* will be cleared (e.g., set to all zeroes), and likewise for negative $X_d$ direction, the registers 2036*a* and 2038*b* will be cleared. A similar circuit configuration is made for each of the Y_Planes[ ] and Z_Planes[ ].

6. Get Dirty Bits

Figure 15F:
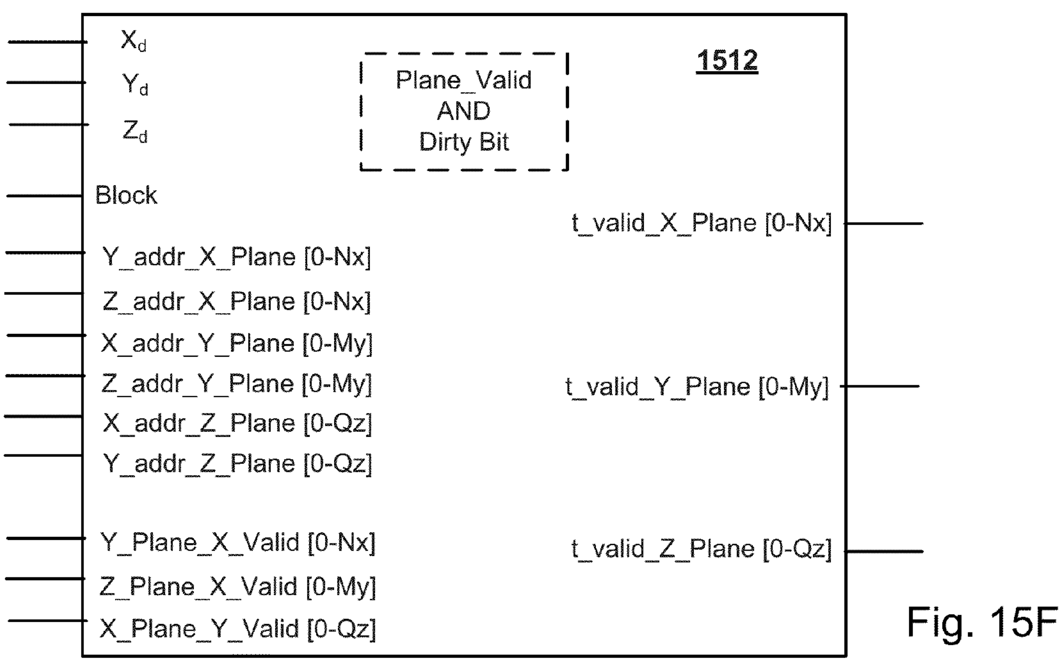

Referring to FIG. 15F, data generated in block 1512 use inputs shown in the figure to produce the output described above and shown in the figure. For example, the ray direction vector $R_d$ and Block_bitmap inputs come from the GTU inputs, and the plane valid bits and plane address components come from the outputs of blocks 1510 and 1508, respectively. The following pseudo-code fragment illustrates how block 1512 may be implemented and how the data may be generated in the block:

PSEUDO-CODE FRAGMENT XVII.

```
// Parallel
// process X-partitioning planes
If ( Xd Pos )
  For ( i = 0; i < Nx; i++ )
    XYZ_addr_sel_x = { i, Y_addr_X_Plane [ i ],
    Z_addr_X_Plane [ i ] };
    t_valid_X_Plane [ i ] = X_Plane_Valid [ i ] & Block
    [ XYZ_addr_sel_x ];
  End For
Else // Xd Neg
  For ( i = Nx; i > 0; i-- )
    XYZ_addr_sel_x = { i - 1, Y_addr_X_Plane [ i ],
    Z_addr_X_Plane [ i ] };
    t_valid_X_Plane [ i ] = X_Plane_Valid [ i ] & Block
    [ XYZ_addr_sel_x ];
  End For
End If // Xd
// process Y-partitioning planes
If ( Yd Pos )
  For ( i = 0; i < My; i++ )
    XYZ_addr_sel_y = { X_addr_Y_Plane [ i ], i,
    Z_addr_Y_Plane [ i ] };
    t_valid_Y_Plane [ i ] = Y_Plane_Valid [ i ] & Block
    [ XYZ_addr_sel_y ];
  End For
Else // Yd Neg
  For ( i = My; i > 0; i-- )
    XYZ_addr_sel_y = {X_addr_Y_Plane [ i ], i - 1,
    Z_addr_Y_Plane [ i ] };
    t_valid_Y_Plane [ i ] = Y_Plane_Valid [ i ] & Block
    [ XYZ_addr_sel_y ];
  End For
End If // Yd
// process Z-partitioning planes
If (Zd Pos)
  For ( i = 0; i < Qz; i++ )
    XYZ_addr_sel_z = { X_addr_Z_Plane [ i ],
    Y_addr_Z_Plane [ i ], i };
    t_valid_Z_Plane [ i ] = Z_Plane_Valid [ i ] & Block
    [ XYZ_addr_sel_z ];
  End For
Else // Zd Neg
  For ( i = Qz; i > 0; i-- )
    XYZ_addr_sel_z = {X_addr_Z_Plane [ i ],
    Y_addr_Z_Plane [ i ], i - 1 };
    t_valid_Z_Plane [ i ] = Z_Plane_Valid [ i ] & Block
    [ XYZ_addr_sel_z ];
  End For
End If // Zd
// End Parallel
```

Figure 21:
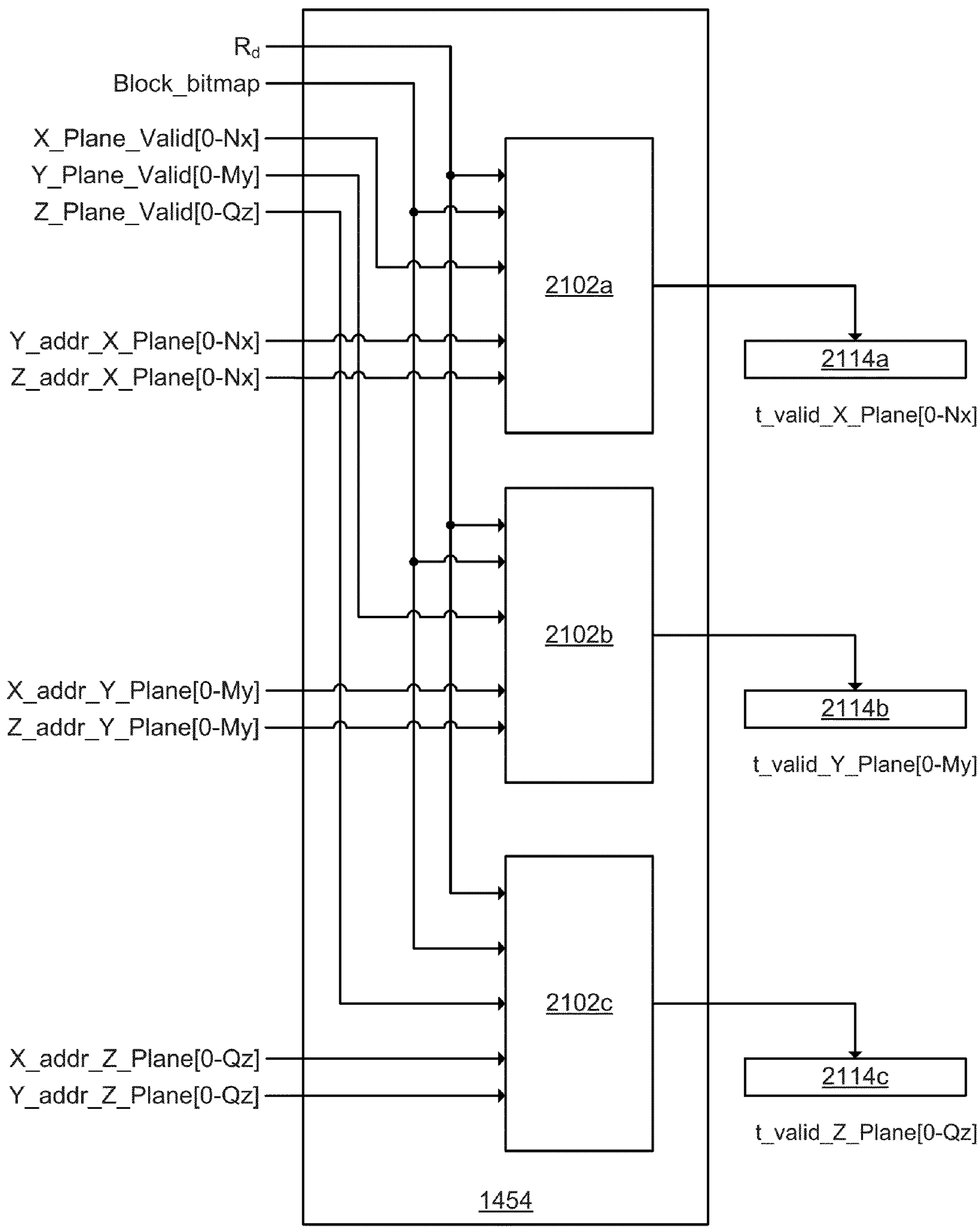
FIGS. 21 and 21A show additional details for MUX module 1454 shown in FIG. 14.
Figure 21A:
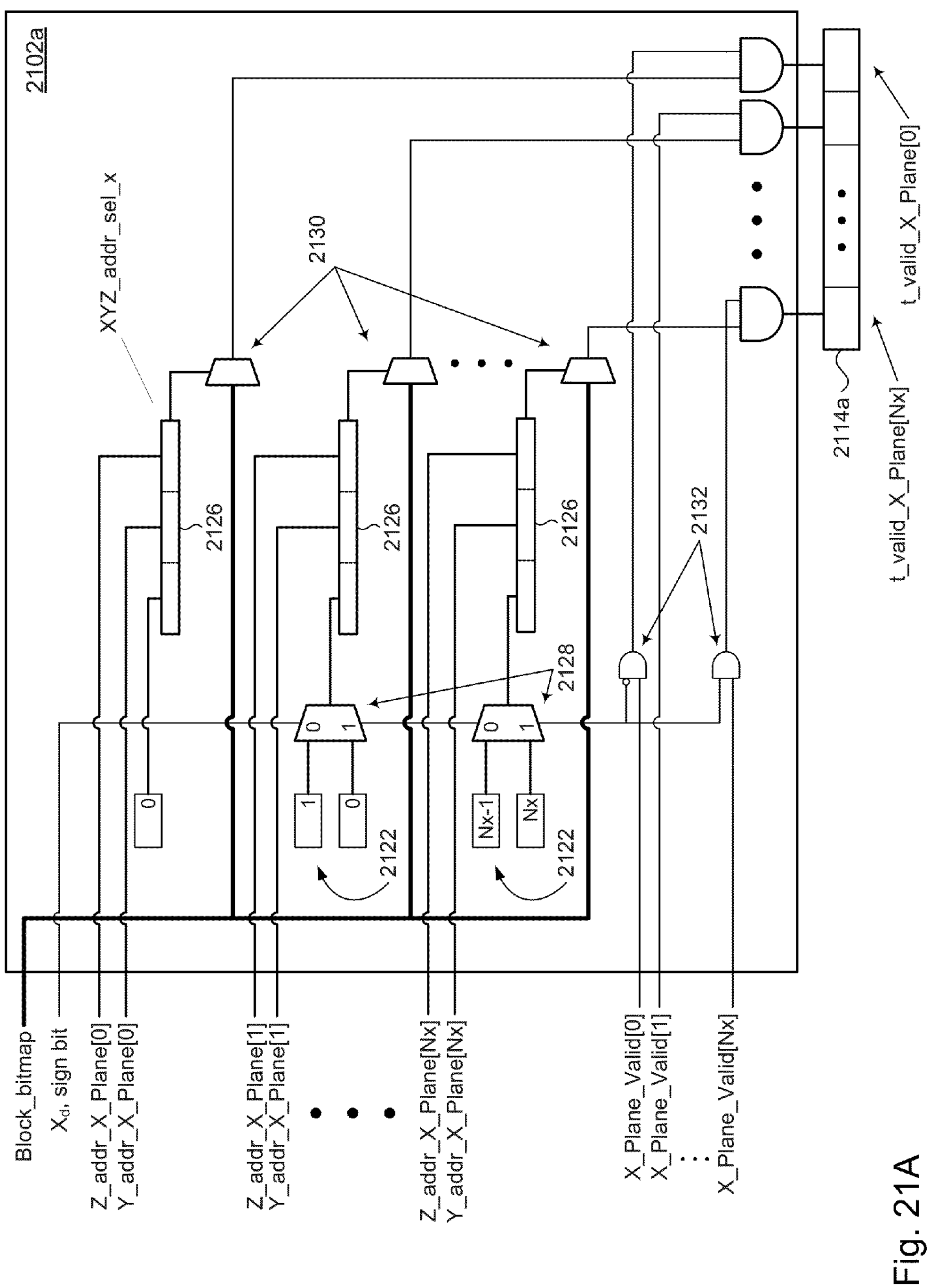

FIGS. 21 and 21A show details of MUX module 1454, in accordance with some embodiments, for performing the operations shown in the above pseudo-code fragment. These figures serve to illustrate that the pseudo-code can be implemented in digital logic circuitry (rather than as software executing on a CPU), but should not be construed as being limited to any particular implementation of the priority encoder module 1444*a*. Referring to FIG. 21, the MUX module 1454 may comprise three MUX arrays 2102*a*, 2102*b*, 2102*c* for processing respective X-, Y-, and Z-partitioning planes. The MUX array 2102*a* produces the t_valid bits for the X_Plane. Similarly, the MUX array 2102*b* produces the t_valid bits for the Y_Plane, and the MUX array 2102*c* produces the t_valid bits the Z_Plane. The valid bits may be gated to the data output section 1406, and stored in registers 2114*a*, 2114*b*, 2114*c* (or other data stores) comprising the data output section. FIG. 21A shows additional details of the digital logic circuits for MUX array 2102*a* for processing X-partitioning planes. It will be appreciated by one of ordinary skill that the digital logic circuits for MUX arrays 2102*b* and 2102*c* may be similarly constructed for processing respective Y- and Z-partitioning planes.

Referring to FIG. 21A, the MUX array 2102*a* comprises pairs of constant-value generators 2122 and corresponding selectors 2128. Each pair of constant-value generators 2122 and its corresponding selector 2128 is used to generate the X_addr component of the XYZ_addr_sel_x address 2126. The XYZ_addr_sel_x address selects a bit from the Block_bitmap, which is AND'd with a corresponding X_Plane_Valid[ ] bit to generate a bit value for t_valid X_Plane[ ].

As can be seen in the above pseudo-code, for positive $X_d$ only bit values are generated for t_valid X_Plane[ ] in the range from 0–($N_x$–1), and for negative $X_d$, only bit values are generated for t_valid X_Plane[ ] in the range from 1-$N_x$. Selectors 2128 and AND gates 2132 ensure that either the [0] or [$N_x$] plane valid bit is set to zero to provide selection of the two ranges based on the sign bit, assuming the convention that '0' is for positive and '1' is for negative.

7. Ray/Grid Block

Figure 15G:
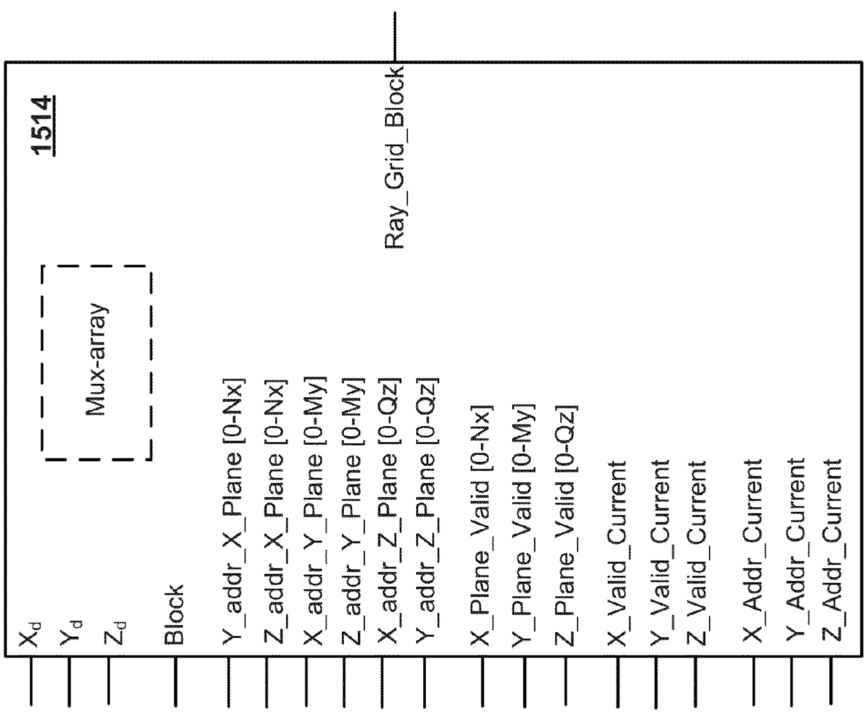

Referring to FIG. 15G, data generated in block 1514 use inputs shown in the figure to produce the output described above and shown in the figure. The following pseudo-code fragment illustrates how block 1514 may be implemented and how the data may be generated in the block:

PSEUDO-CODE FRAGMENT XVIII.

```
// Parallel
If ( Xd Pos )
  For ( i = 0; i < Nx; i++ )
    XYZ_addr_sel_x = { i, Y_addr_X_Plane [ i ], Z_addr_X_Plane [ i ] };
    Ray_Grid_Block_x [ XYZ_addr_sel_x ] = X_Plane_Valid [ i ];
  End For
Else // Xd Neg
  For ( i = Nx; i > 0; i-- )
    XYZ_addr_sel_x = {i - 1, Y_addr_X_Plane [ i ],
    Z_addr_X_Plane [ i ] };
    Ray_Grid_Block_x [ XYZ_addr_sel_x ] = X_Plane_Valid [ i ];
  End For
End If // Xd
If ( Yd Pos )
  For ( i = 0; i < My; i++ )
    XYZ_addr_sel_y = { X_addr_Y_Plane [ i ], i, Z_addr_Y_Plane [ i ] };
    Ray_Grid_Block_y [ XYZ_addr_sel_y ] = Y_Plane_Valid [ i ];
  End For
Else // Yd Neg
  For ( i = My; i > 0; i-- )
    XYZ_addr_sel_y = { X_addr_Y_Plane [ i ], i - 1,
    Z_addr_Y_Plane [ i ] };
    Ray_Grid_Block_y [ XYZ_addr_sel_y ] = Y_Plane_Valid [ i ];
  End For
End If // Yd
If ( Zd Pos )
  For ( i = 0; i < Qz; i++ )
    XYZ_addr_sel_z = {X_addr_Z_Plane [ i ], Y_addr_Z_Plane [ i ], i };
    Ray_Grid_Block_z [ XYZ_addr_sel_z ] = Z_Plane_Valid [ i ];
  End For
Else // Zd Neg
  For ( i = Qz; i > 0; i-- )
    XYZ_addr_sel_z = { X_addr_Z_Plane [ i ],
    Y_addr_Z_Plane [ i ], i - 1 };
    Ray_Grid_Block_z [ XYZ_addr_sel_z ] = Z_Plane_Valid [ i ];
  End For
End If // Zd
Ray_Grid_Block = Ray_Grid_Block_x | Ray_Grid_Block_y |
Ray_Grid_Block_z;
If ( X_Valid_Current & Y_Valid_Current & Z_Valid_Current )
    Ray_Grid_Block [ { X_Addr_Current, Y_Addr_Current,
    Z_Addr_Current } ] = '1';
// End Parallel
```

Figure 22:
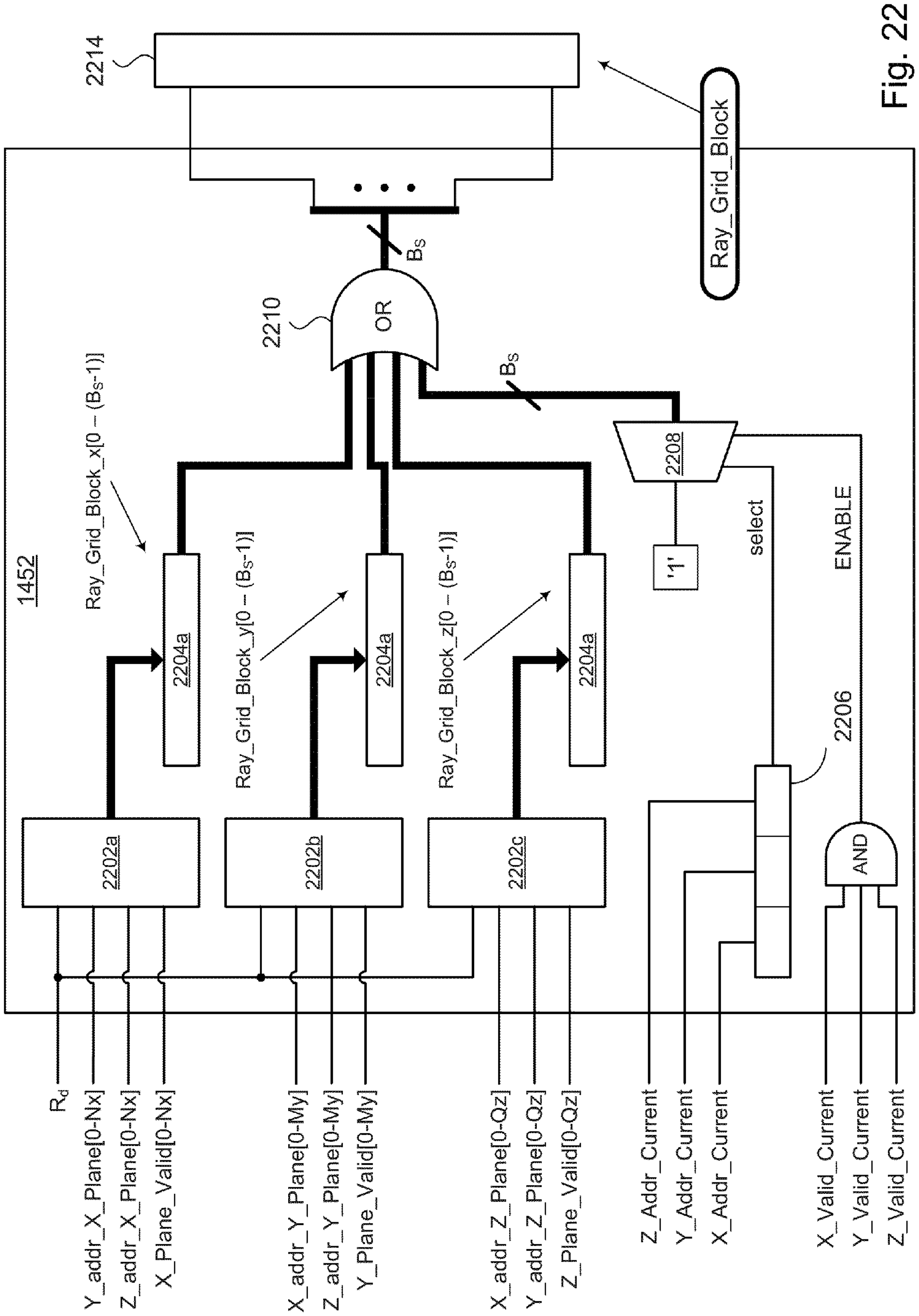
FIGS. 22 and 22A show additional details for MUX module 1452 shown in FIG. 14.
Figure 22A:
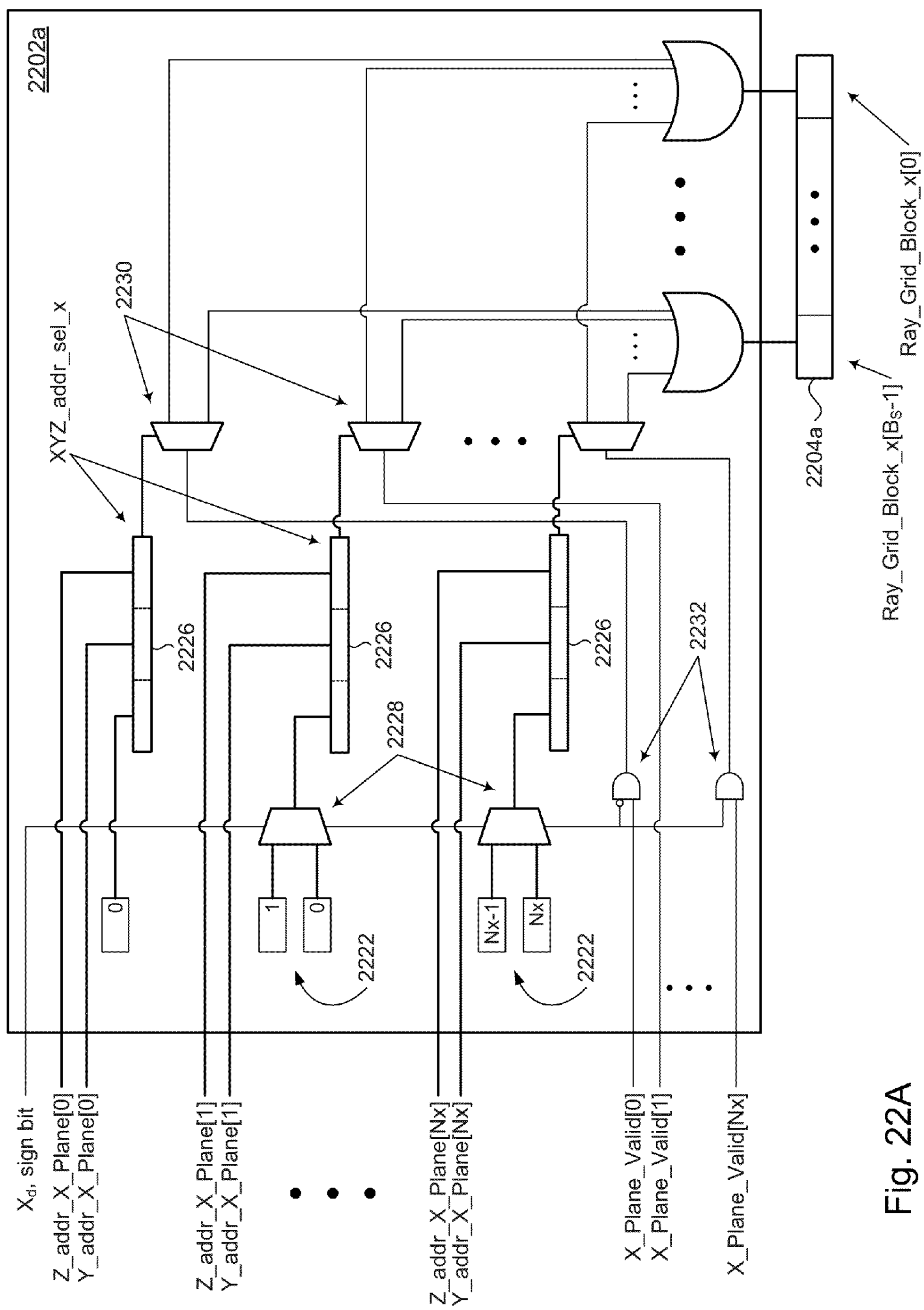

FIGS. 22 and 22A show details of MUX module 1452, in accordance with some embodiments, for performing the operations shown in the above pseudo-code fragment. These figures serve to illustrate that the pseudo-code can be implemented in digital logic circuitry (rather than as software executing on a CPU), but should not be construed as being limited to any particular implementation of the MUX module 1452. Referring to FIG. 22, the MUX module 1452 may comprise three arrays of mux's 2202*a*, 2202*b*, 2202*c* for processing address components on respective X-, Y-, and Z-partitioning planes. Each mux array 2202*a*-2202*c* outputs a respective X-, Y-, and Z-intermediate block bitmap 2204*a*, 2204*b*, 2204*c*, which can be stored in a corresponding $B_S$-bit register. The bits of each intermediate block bitmap 2204*a*, 2204*b*, 2204*c* may be OR'd by OR gate 2210 with corresponding bits of the other intermediate block bitmaps.

The cell address components of the cell that contains the current ray position are assembled in register 2206. If the cell is valid (as determined by the AND gate), then selector 2208 is enabled to put a '1' bit on the bit line of the $B_S$-bit bus that is selected by the address in register 2206. The bit is OR'd with the intermediate block bitmaps to ensure that at least the cell containing the current ray position is included. The output of the OR gate 2210 constitutes the GTU output Ray_Grid_Block, which may be stored in a $B_S$-bit register 2214 comprising the data output section 1406. As explained above, the Ray_Grid_Block is a bitmap of the cells in the grid of interest that are intersected by the ray.

FIG. 22A shows additional details of the digital logic circuits for MUX array 2202*a* for processing X-partitioning planes. It will be appreciated by one of ordinary skill that the digital logic circuits for MUX arrays 2202*b* and 2202*c* may be similarly constructed for processing respective Y- and Z-partitioning planes. The MUX array 2202*a* comprises pairs of constant-value generators 2222 and corresponding selectors 2228. Each pair of constant-value generators 2222 and its corresponding selector 2228 are used to generate the X_addr component of the XYZ_addr_sel_x address register 2226. A selector 2230 is provided for each plane valid bit X_Plane_Valid[ ]. The corresponding address register 2226 operates the selector 2230 to place the plane valid bit in the bit position in the intermediate block bitmap 2204*a* associated with the cell bounded by the partitioning plane that corresponds to the plane valid bit.

As can be seen in the above pseudo-code, for positive $X_d$ the valid values of the X_addr component of the XYZ_addr_sel_x are in the range from $0-(N_x-1)$, and for negative $X_d$, the valid values are in the range from $1\text{-}N_x$. Selectors 2228 and AND gates 2232 ensure that either the [0] or $[N_x]$ plane valid bit is set to zero to provide selection of the two ranges based on the sign bit, assuming the convention that '0' means positive and '1' means negative.

8. Get Ray Distance Exiting Grid

Figure 15H:
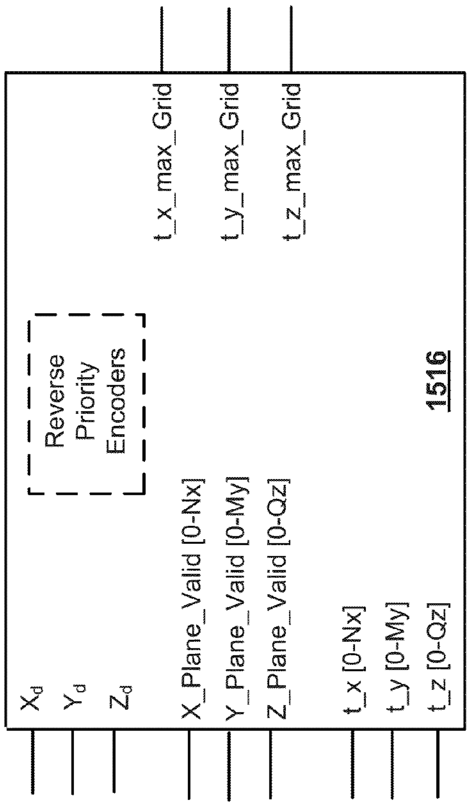

Referring to FIG. 15H, data generated in block 1516 use inputs shown in the figure to produce the output described above and shown in the figure. The following pseudo-code fragment illustrates how block 1516 may be implemented and how the data may be generated in the block:

PSEUDO-CODE FRAGMENT XIX.

```
Priority encoder unit: Pos_Reverse_Priority_Encode
Input: A [ 0 – K ]
Output: Addr
Addr = 0
For ( i = K; i >= 0; i–– )
   If ( A [ i ] == 1)
Addr = i;
Return Addr
End Pos_ Reverse_Priority_Encode
Priority encoder unit: Neg_Reverse_Priority_Encode
```

-continued

PSEUDO-CODE FRAGMENT XIX.

```
Input: A [ 0 – K ]
Output: Addr
Addr = 0
For ( i = 0; i <= K; i++ )
   If ( A [ i ] == 1 )
Addr = i;
Return Addr
End Neg_Reverse_Priority_Encode
// Parallel
If ( Xd Pos )
   t_x_max_Grid = t_x [ Pos_Reverse_Priority_Encode
   ( X_Plane_Valid [ 0 – Nx ] ) ]
Else
   t_x_max_Grid = t_x [ Neg_Reverse_Priority_Encode
   ( X_Plane_Valid [ 0 – Nx ] ) ]
If ( Yd Pos )
   t_y_max_Grid = t_y [ Pos_Reverse_Priority_Encode
   ( Y_Plane_Valid [ 0 – My ] ) ]
Else
   t_y_max_Grid = t_y [ Neg_Reverse_Priority_Encode
   ( Y_Plane_Valid [ 0 – My ] ) ]
If ( Zd Pos )
   t_z_max_Grid = t_z [ Pos_Reverse_Priority_Encode
   ( Z_Plane_Valid [ 0 – Qz ] ) ]
Else
   t_z_max_Grid = t_z [ Neg_Reverse_Priority_Encode
   ( Z_Plane_Valid [ 0 – Qz ] ) ]
// End Parallel
```

The positive reverse priority encoder gives the bit position (starting with 0) in a (K+1)-bit input bitstream ($b_O, b_1, \ldots b_K$) of the first '1' bit encountered when reading the bitstream in one direction (e.g., right to left). For example, a bitstream of '0 0 1 1 0 1' (K=5), will produce an output value of 5 because the first '1' bit occurs in bit position 5 when reading the bitstream from right to left. The negative reverse priority encoder gives a bit position in the (K+1)-bit input of the first '1' bit encountered when reading the bitstream in the other direction, namely left to right in our example. Thus, the same bitstream '0 0 1 1 0 1' will produce an output value of 2 because the first '1' bit occurs in bit position 2 when reading the bitstream from left to right.

Figure 23:
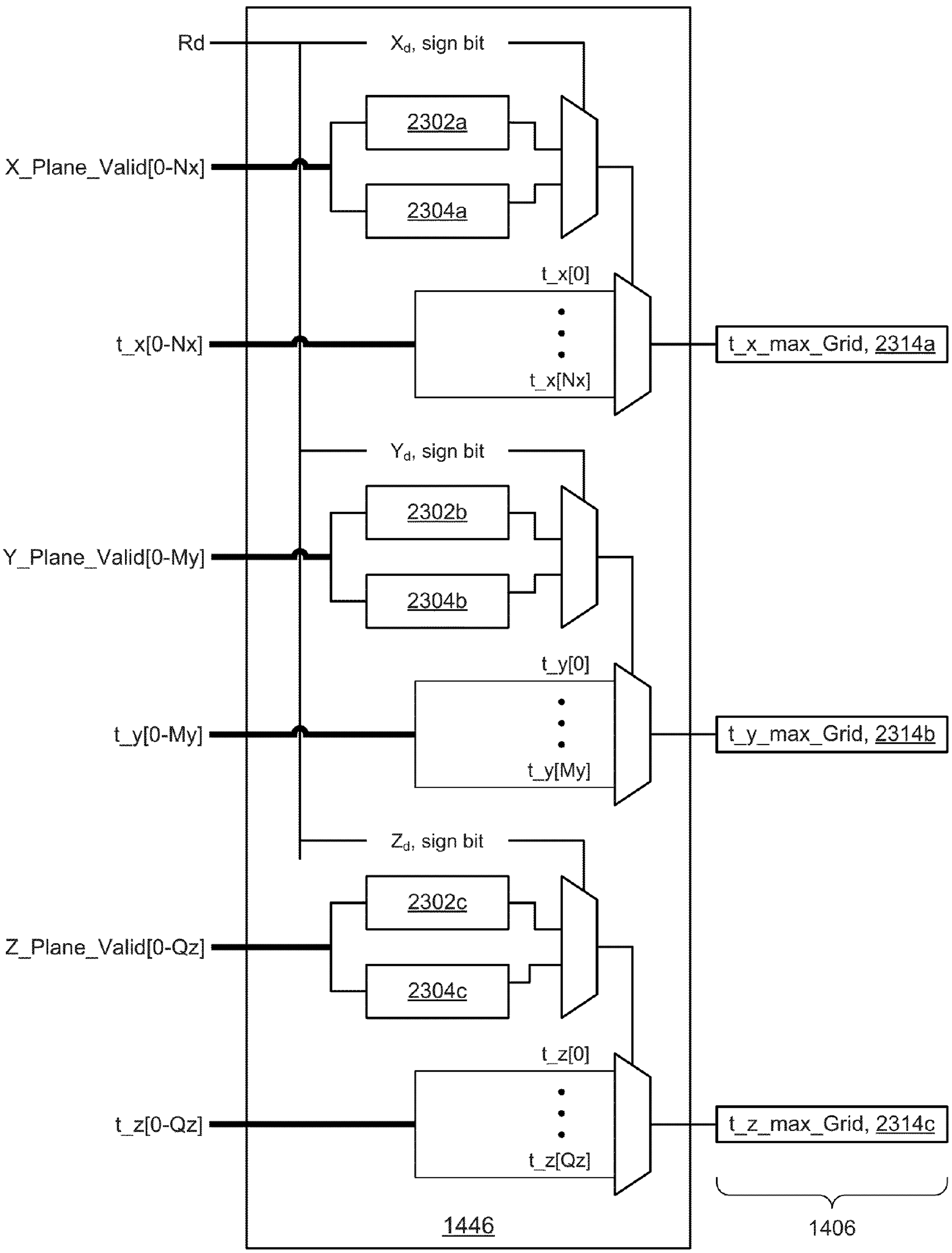
FIG. 23 shows additional details for reverse priority module 1446 shown in FIG. 14.

FIG. 23 shows details of reverse priority encoder module 1446, in accordance with some embodiments, for performing the operations shown in the above pseudo-code fragment. The figure serves to illustrate that the pseudo-code can be implemented in digital logic circuitry, but should not be construed as being limited to any particular implementation of the reverse priority encoder module 1446. In some embodiments, the reverse priority encoder module 1446 may comprise three pairs of positive and negative reverse encoders 2302*a*/2304*a*, 2302*b*/2304*b*, and 2302*c*/2304*c*. The plane valid bits for each partitioning plane are encoded by their respective positive and negative reverse encoders. The sign bits from the X-, Y-, and Z-components of the ray direction vector $R_d$ control respective selectors to produce the positive or negative outputs from the reverse encoders, which then control selectors to select respective plane intersect distances 2314*a*, 2314, b, 2314*c* as the distance at grid exit.

9. Get Closest Dirty Cell Distance

Figure 15I:
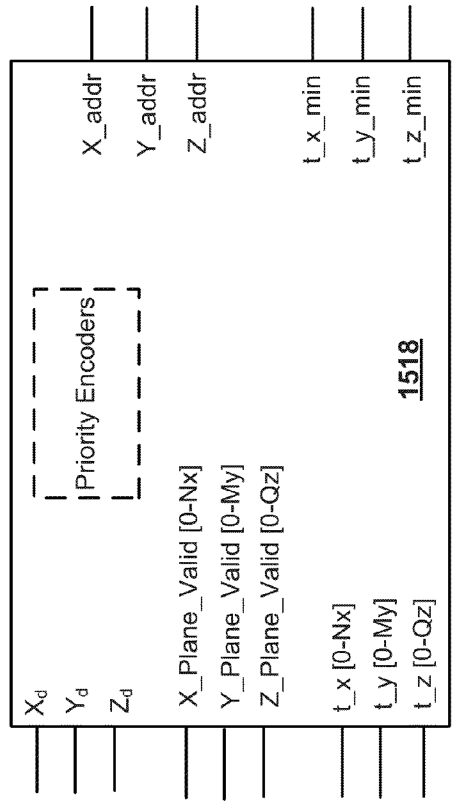

Referring to FIG. 15I, data generated in block 1518 use inputs shown in the figure to produce the output described above and shown in the figure. The following pseudo-code fragment illustrates how block 1518 may be implemented and how the data may be generated in the block:

PSEUDO-CODE FRAGMENT XX.

```
    // Parallel
    If ( Xd Pos )
      X_addr = Pos_Priority_Encode ( t_valid_X_Plane [ 0 – Nx ] );
      t_x_min = t_x [ X_Addr ] );
    Else
      X_addr = Neg_Priority_Encode ( t_valid_X_Plane [ 0 – Nx ] );
      t_x_min = t_x [ X_Addr + 1 ] );
    If ( Yd Pos )
      Y_addr = Pos_Priority_Encode ( t_valid_Y_Plane [ 0 – My ] );
      t_y_min = t_x [ Y_Addr ] );
    Else
      Y_addr = Neg_Priority_Encode ( t_valid_Y_Plane [ 0 – My ] );
      t_y_min = t_y [ Y_Addr + 1 ] );
    If ( Zd Pos )
      Z_addr = Pos_Priority_Encode ( t_valid_Z_Plane [ 0 – Qz ] );
      t_z_min = t_z [ Z_Addr ] );
    Else
      Z_addr = Neg_Priority_Encode ( t_valid_Z_Plane [ 0 – Qz ] );
      t_z_min = t_z [ Z_Addr + 1 ] );
    // End Parallel
```

Figure 24:
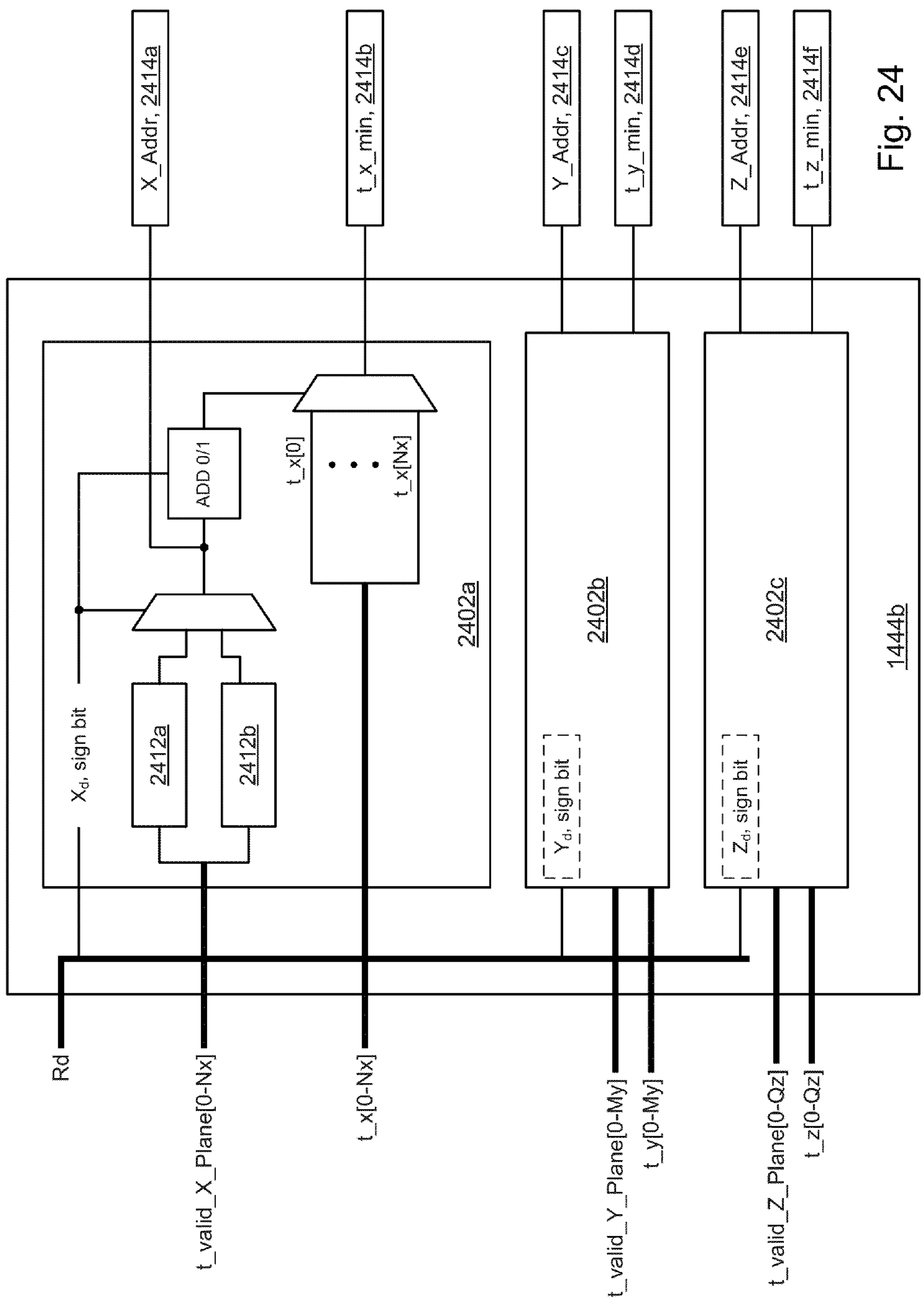
FIG. 24 shows additional details for priority encoder 1444*b* shown in FIG. 14.

The positive and negative priority encoder digital logic has been described above in connection with FIG. 20A. FIG. 24 shows details of priority encoder module 1444*b*, in accordance with some embodiments, for performing the operations shown in the above pseudo-code fragment. The figure serves to illustrate that the pseudo-code can be implemented in digital logic circuitry, but should not be construed as being limited to any particular implementation of the priority encoder module 1444*b*. In some embodiments, the priority encoder module 1444*b* may comprise encoder units 2402*a*, 2402*b*, 2402*c* to produce X, Y, Z address component 2414*a*, 2414*c*, 2414*e* and minimum distance values 2414*b*, 2414*d*, 2414*f* to the closest dirty cell intersected by the ray. The figure shows additional details of the digital logic circuits for encoder unit 2402*a* for processing X-partitioning planes. It will be appreciated by one of ordinary skill that the digital logic circuits for encoder unit 2402*b* and 2402*c* may be similarly constructed for processing respective Y- and Z-partitioning planes.

In some embodiments, the encoder unit 2402*a* may include a positive and negative priority encoder 2412*a* and 2412*b*. A selector selects the output of the positive or negative priority encoder 2412*a*, 2412*b* according to the sign bit of the X-direction component of the ray direction vector $R_d$. An adder, also controlled by the sign bit, adds '0' or '1' in accordance with the pseudo-code. The resulting address is used to select the intersection distance from the array of plane intersect distances t_x[0-$N_x$] that corresponds to the closest intersected dirty cell.

10. Generate t_min_cell, t_max_cell, XYZ_Addr, Hit/Miss

Figure 15J:
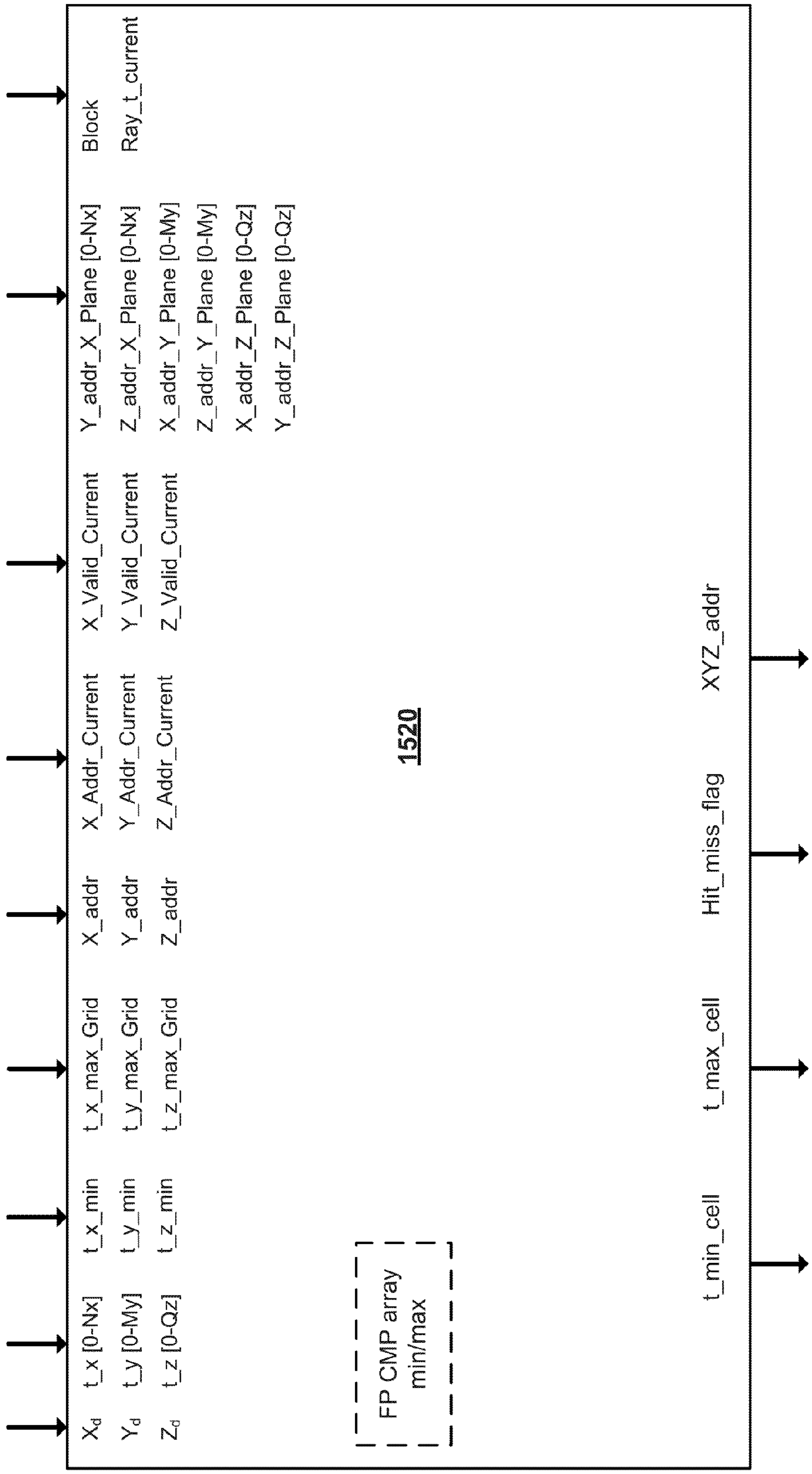

Referring to FIG. 15J, data generated in block 1520 use inputs shown in the figure to produce the output described above and shown in the figure. The following pseudo-code fragment illustrates how block 1520 may be implemented and how the data may be generated in the block:

PSEUDO-CODE FRAGMENT XXI.

```
// Parallel
// Adjust t_min values
If (t_valid_X_Plane == all 0's ) t_x_min = MAX_Value;
If (t_valid_Y_Plane == all 0's ) t_y_min = MAX_Value;
If (t_valid_Z_Plane == all 0's ) t_z_min = MAX_Value;
```

-continued

PSEUDO-CODE FRAGMENT XXI.

```
XYZ_Addr_Current =
{ X_Addr_Current, Y_Addr_Current, Z_Addr_Current };
Valid_Current = 0;
If ( ( X_Valid_Current & Y_Valid_Current & Z_Valid_Current ) &&
  Block [ XYZ_Addr_Current ] )     // If Rc in Grid, and cell is Dirty
  X_addr_next              = X_Addr_Current;
  Y_addr_next              = Y_Addr_Current;
  Z_addr_next              = Z_Addr_Current;
  t_min_cell               = Ray_t_current;
  Valid_Current = 1;
Else
  If ( t_x_min < t_y_min )
    t_min_cell             = t_x_min;
    X_addr_next            = X_addr
    Y_addr_next            = Y_addr_X_Plane [ X_addr ];
    Z_addr_next            = Z_addr_X_Plane [ X_addr ];
  Else
    t_min_cell             = t_y_min;
    Y_addr_next            = Y_addr
    X_addr_next            = X_addr_Y_Plane [ Y_addr ];
    Z_addr_next            = Z_addr_Y_Plane [ Y_addr ];
  If ( t_z_min < t_min_cell )
    t_min_cell             = t_z_min;
    Z_addr_next            = Z_addr
    X_addr_next            = X_addr_Z_Plane [ Z_addr ];
    Y_addr_next            = Y_addr_Z_Plane [ Z_addr ];
XYZ_addr = { X_addr_next, Y_addr_next, Z_addr_next }
// Find t_max_cell . . . t value exiting bounding cell
If ( Xd Pos )
  t_x_next = t_x [ X_addr_next + 1 ];
Else
  t_x_next = t_x [ X_addr_next ];
If ( Yd _Pos )
  t_y_next = t_y [ Y_addr_next + 1 ];
Else
  t_y_next = t_y [ Y_addr_next ];
If ( Zd _Pos )
  t_z_next = t_z [ Z_addr_next + 1 ];
Else
  t_z_next = t_z [ Z_addr_next ];
If ( t_x_next < t_y_next )
  t_max_cell = t_x_next;
Else
  t_max_cell = t_y_next;
If ( t_z_next < t_max_cell )
  t_max_cell = t_z_next;
If ( Valid_Current )
  Hit_Miss_flag = 1;
Else If ( t_valid_X_Plane == 0 && t_valid_Y_Plane == 0 &&
t_valid_Z_plane == 0)
  Hit_Miss_flag = 0;
  t_max_cell = t_x_max_Grid;
  if ( t_y_max_Grid > t_max_cell )
    t_max_cell = t_y_max_Grid;
  if ( t_z_max_Grid > t_max_cell )
    t_max_cell = t_z_max_Grid;
Else
  Hit_Miss_flag = 1;
// End Parallel
```

Figure 25:
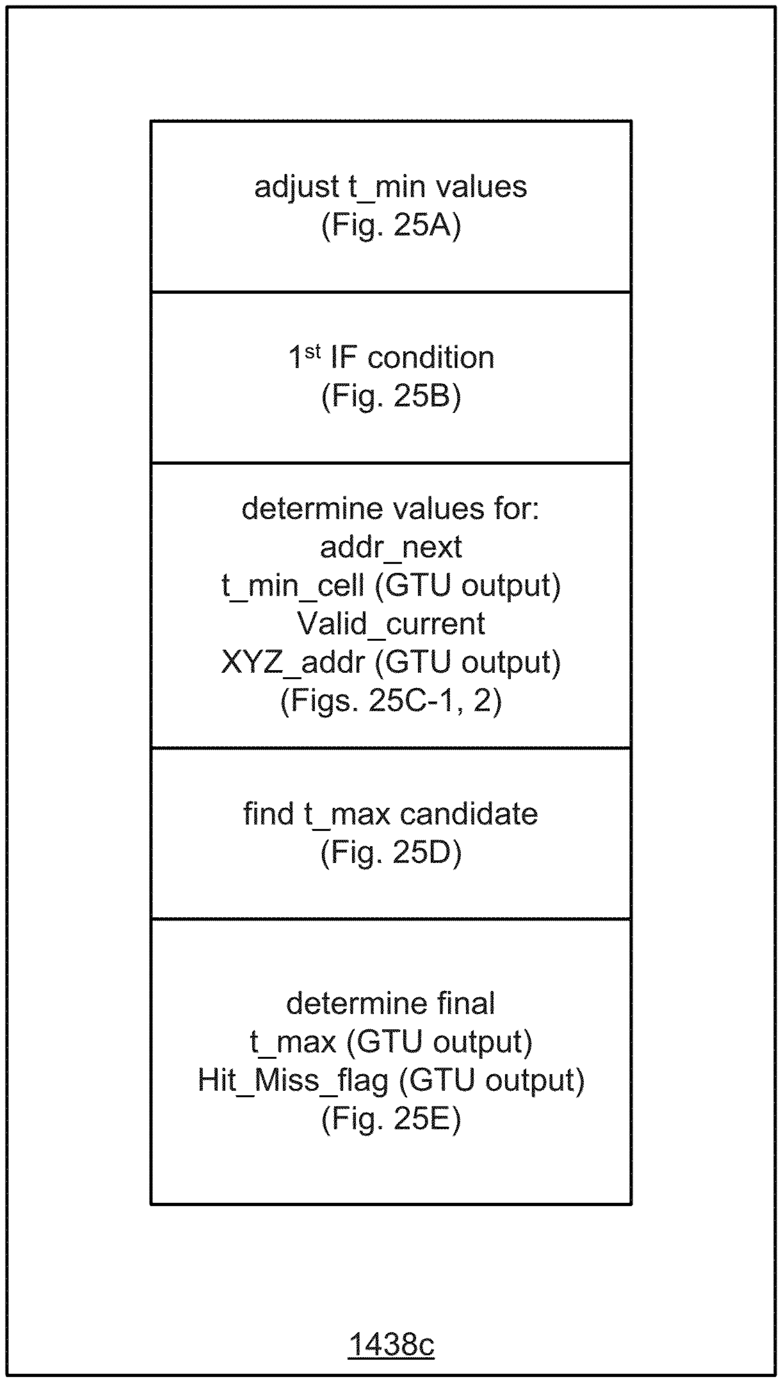

FIGS. 25 and 25A-25E show details of comparator module 1438*c*, in accordance with some embodiments, for performing the operations shown in the above pseudo-code fragment. These figures serve to illustrate that the pseudo-code can be implemented in digital logic circuitry (rather than as software executing on a CPU), but should not be construed as being limited to any particular implementation of the comparator module 1438*c*. FIG. 25 provides a "roadmap" of FIGS. 25A-25E. The highlighted boxed elements in FIGS. 25A-25E represent the inputs to the comparator module 1438*c*.

Figure 25A:
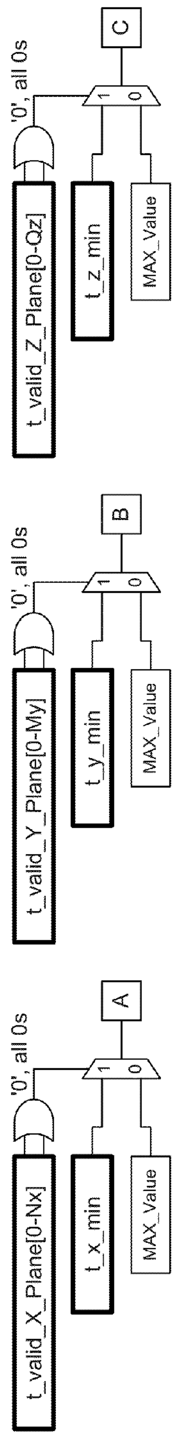

The digital logic shown in FIG. 25A illustrates an implementation of the portion of the above pseudo-code for adjusting the t_x_min, t_y_min, and t_z_min values generated in block 1518. The OR gates test the input bits (e.g., t_valid X_Plane[ ]) for an all 0's condition. The adjusted t_x_min, t_y_min, and t_z_min values are represented by the continuation (circled) connectors A, B, C, which appear in FIG. 25C-1.

Figure 25B:
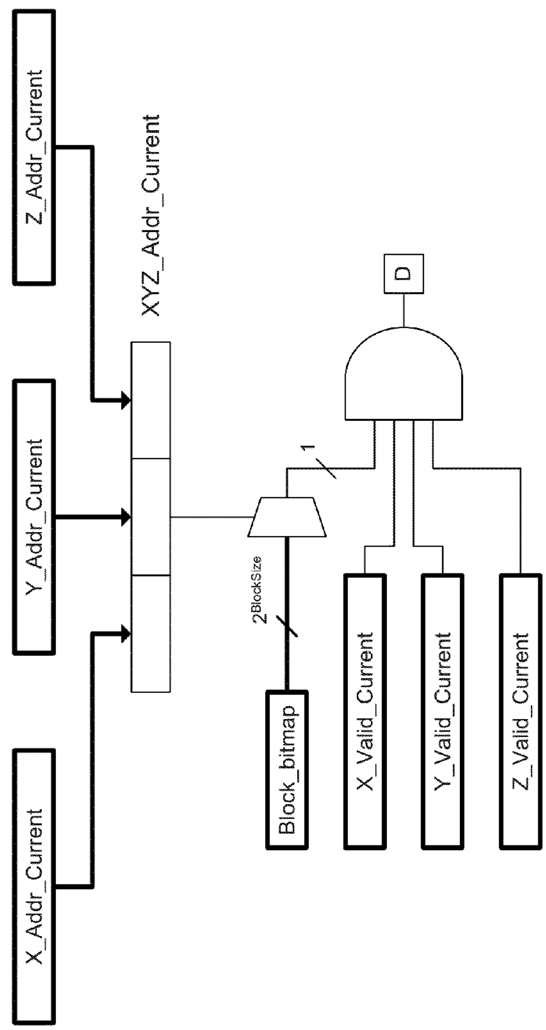

The digital logic shown in FIG. 25B illustrates an implementation of the portion of the above pseudo-code for generating the internal address XYZ_Addr_Current, and for generating the condition in the first IF statement. The outcome of the AND gate is represented by the continuation connector D, which appears in FIG. 25C-1 as a mux selector signal.

Figures 1, 25C:
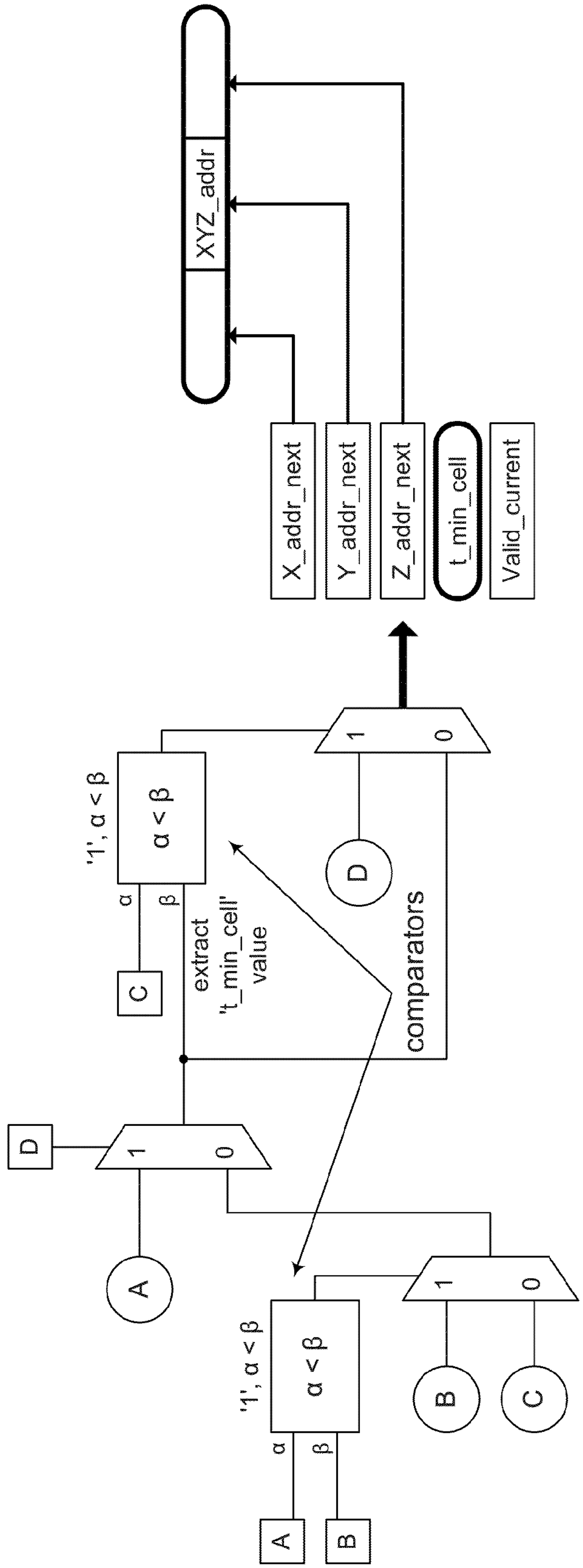
Figures 2, 25C:
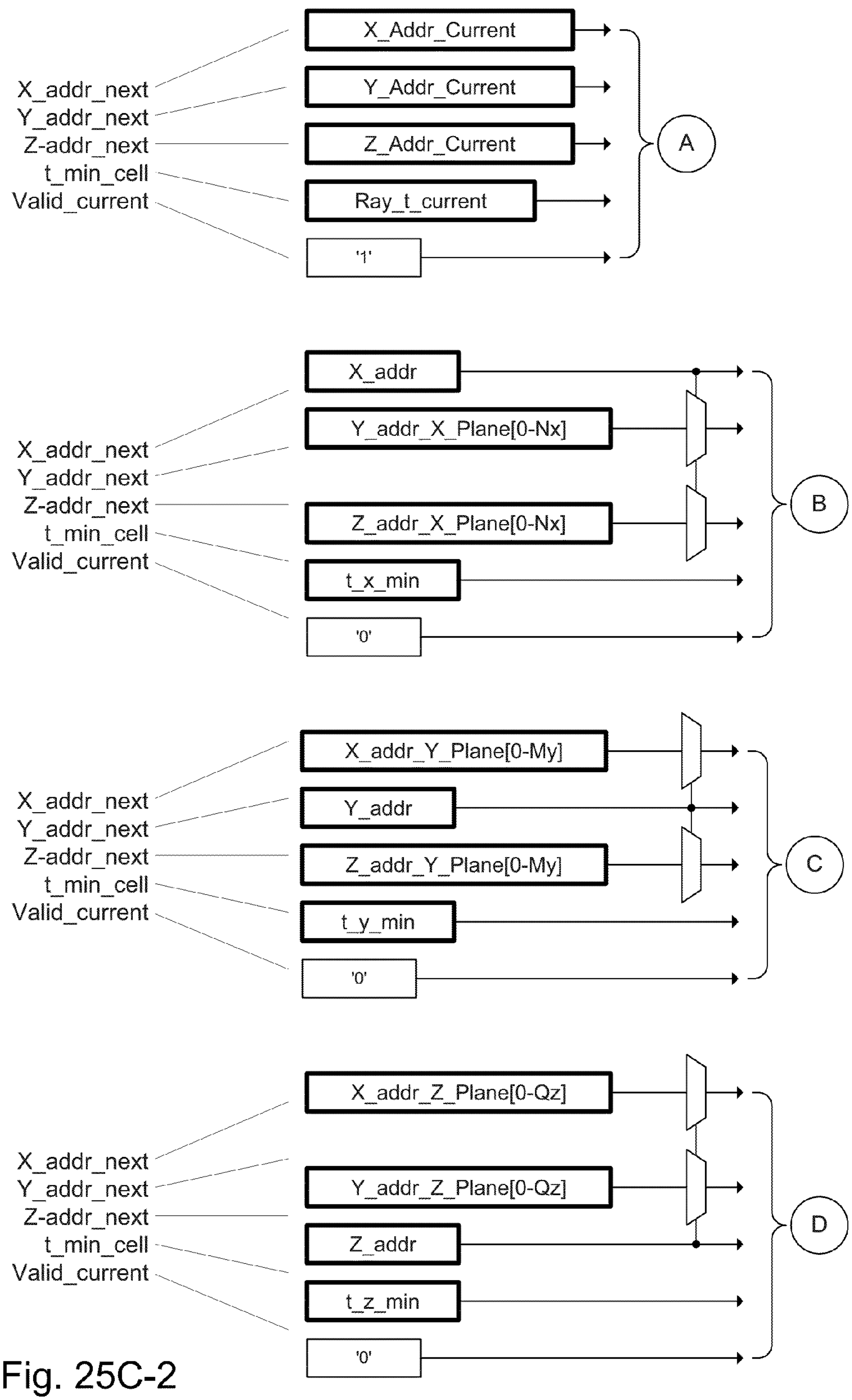

The digital logic shown in FIG. 25C-1 illustrates an implementation of the first series of IF-ELSE statements in the above pseudo-code. The circled A, B, C, and D represent the different values for X_addr_next, Y_addr_next, Z_addr_next, t_min_cell, and Valid current, as illustrated in FIG. 25C-2. The GTU outputs t_min_cell and XYZ_Addr may be generated from the logic shown in FIG. 25C-1.

Figure 25D:
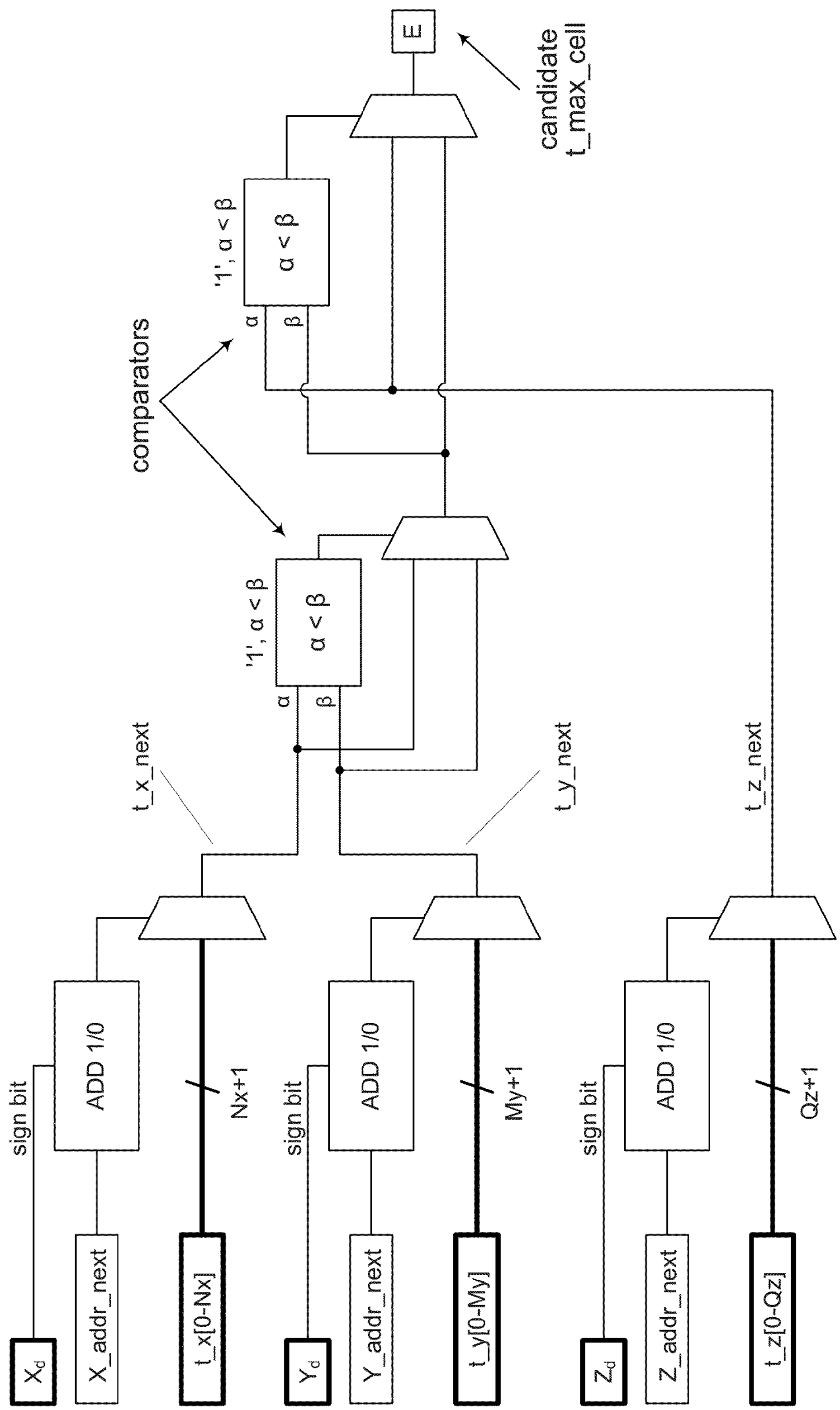
Figure 25E:
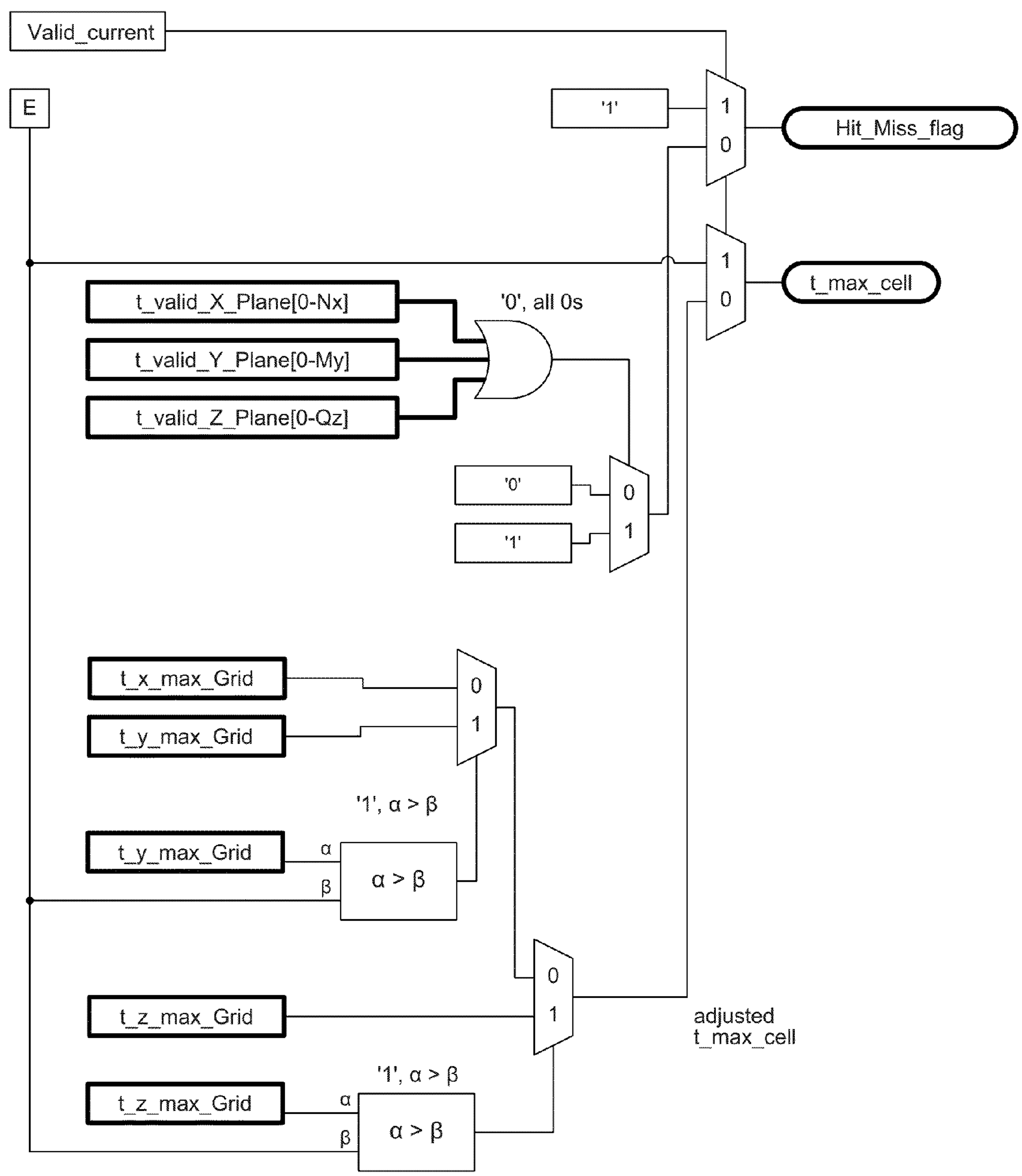

The digital logic shown in FIG. 25D illustrates an implementation of the IF-ELSE statements for setting a candidate value for t_max_cell, which is represented by the continuation connector E and appears in FIG. 25E.

The digital logic shown in FIG. 25E illustrates an implementation of the IF-ELSE statements for adjusting t_max_cell and setting the Hit_Miss_flag, which are both GTU outputs. The OR gate is a $(N_x+M_y+Q_z)$-bit OR gate to test for an all 0's condition.

11. Floating Point GTU Resources

As indicated above in connection with FIGS. 15B and 15C, in accordance with the present disclosure, the floating point resources may be based on the number of partitioning planes in order to facilitate parallel processing. In a particular implementation of the GTU 1002, for example, the resources may be provided based on the number of partitioning planes as follows:

Partitioning_Planes=#X_Planes+#Y_Planes+#Z_Planes

Partitioning_Planes=$(N_x+1)+(M_y+1)+(Q_z+1)$

FP Comparator Resources:

X_Per_Plane_FPCMPs=(#Y_Planes+#Z_Planes+2)

X_Per_Plane_FPCMPs=$((M_y+1)+(Q_z+1)+2)$

X_Plane_FPCMPs=#X_Per_Plane_FPCMPs× #X_Planes

X_Plane_FPCMPs=$((M_y+1)+(Q_z+1)+2)\times(N_x+1))$

Y_Per_Plane_FPCMPs=(#X_Planes+#Z_Planes+2)

Y_Per_Plane_FPCMPs=$((N_x+1)+(Q_z+1)+2)$

Y_Plane_FPCMPs=#Y_Per_Plane_FPCMPs× #Y_Planes

Y_Plane_FPCMPs=$((N_x+1)+(Q_z+1)+2)\times(M_y+1)$

Z_Per_Plane_FPCMPs=(#X_Planes+#Y_Planes+2)

Z_Per_Plane_FPCMPs=$((N_x+1)+(M_y+1)+2)$

Z_Plane_FPCMPs=#Z_Per_Plane_FPCMPs× #Z_Planes

Z_Plane_FPCMPs=$((N_x+1)+(M_y+1)+2)\times(Q_z+1)$

Min_Max_FPCMPs=6

Total_FPCMPs=#X_Plane_FPCMPs+#Y_Plane_FPCMPs+#Z_Plane_FPCMPs+#Min_Max_FPCMPs

FP Multiplier Resources:

Per_Plane_FPMULs=3

X_Plane_FPMULs=#Per_Plane_FPMULs× #X_Planes=$3\times(N_x+1)$

Y_Plane_FPMULs=#Per_Plane_FPMULs× #Y_Planes=$3\times(M_y+1)$

Z_Plane_FPMULs=#Per_Plane_FPMULs× #Z_Planes=$3\times(Q_z+1)$

Current_Position_FPMULs=3

Total_FPMULs=#X_Plane_FPMULs+Y_Plane_FPMULs+#Z_Plane_FPMULs+#Current_Position_FPMULs

Total_FPMULs=$(((N_x+1)+(M_y+1)+(Q_z+1))\times3)+3$

FP Adder Resources:

Per_Plane_FPADDs 3

X_Plane_FPADDs=#Per_Plane_FPADDs× #X_Planes=$3\times(N_x+1)$

Y_Plane_FPADDs=#Per_Plane_FPADDs× #Y_Planes=$3\times(M_y+1)$

Z_Plane_FPADDs=#Per_Plane_FPADDs× #Z_Planes=$3\times(Q_z+1)$

Current_Position_FPADDs=3

Total_FPADDs=#X_Plane_FPADDs+Y_Plane_FPADDs+#Z_Plane_FPADDs+#Current_Position_FPADDs

Total_FPADDs=$(((N_x+1)+(M_y+1)+(Q_z+1))\times3)+3$

FP Divider Resources:

Total_FPDIVs=3;

This concludes the description of illustrative embodiments of the digital logic modules 1432-1454 comprising the GTU. The discussion will now turn to a description of ray traversal through a scene in accordance with the present disclosure. The scene is assumed to have been processed and represented in a database as discussed above.

IV. Ray Traversal Processing

The discussion will now turn to a high level overview of ray traversal processing in accordance with the present disclosure. The basic idea of ray traversal is to "shoot" a ray through the scene starting from the ray origin $R_O$ and in the direction of the ray direction vector $R_d$. At each partitioning level, beginning with level 1, if the ray intersects a dirty cell, then the ray is traversed through that cell at the next partitioning level. This continues until we reach the last partitioning level; e.g., level 3 in some embodiments, level 4 in other embodiments. The dirty cell at the last partitioning level is analyzed to identify the closest intersected primitive object (if any) contained in that dirty cell, where "closest" is determined with respect to the ray origin and the ray direction. If, at any given partitioning level (e.g., level n), the ray does not intersect any dirty cells, then ray traversal returns back to the previous partitioning level (level n−1) to continue traversing the ray to find another dirty cell in the previous partitioning level.

When a ray/object intersection misidentified, the ray traversal process will stop and output intersect addresses 14 (FIG. 2) of the dirty cells intersected by the ray, along with other data—e.g., a hit/miss flag called Ray_Hit_Miss; a distance value between $R_O$ and the intersection point called t_Ray; and an identifier of the intersected primitive object called Object_Ray.

Figure 26:
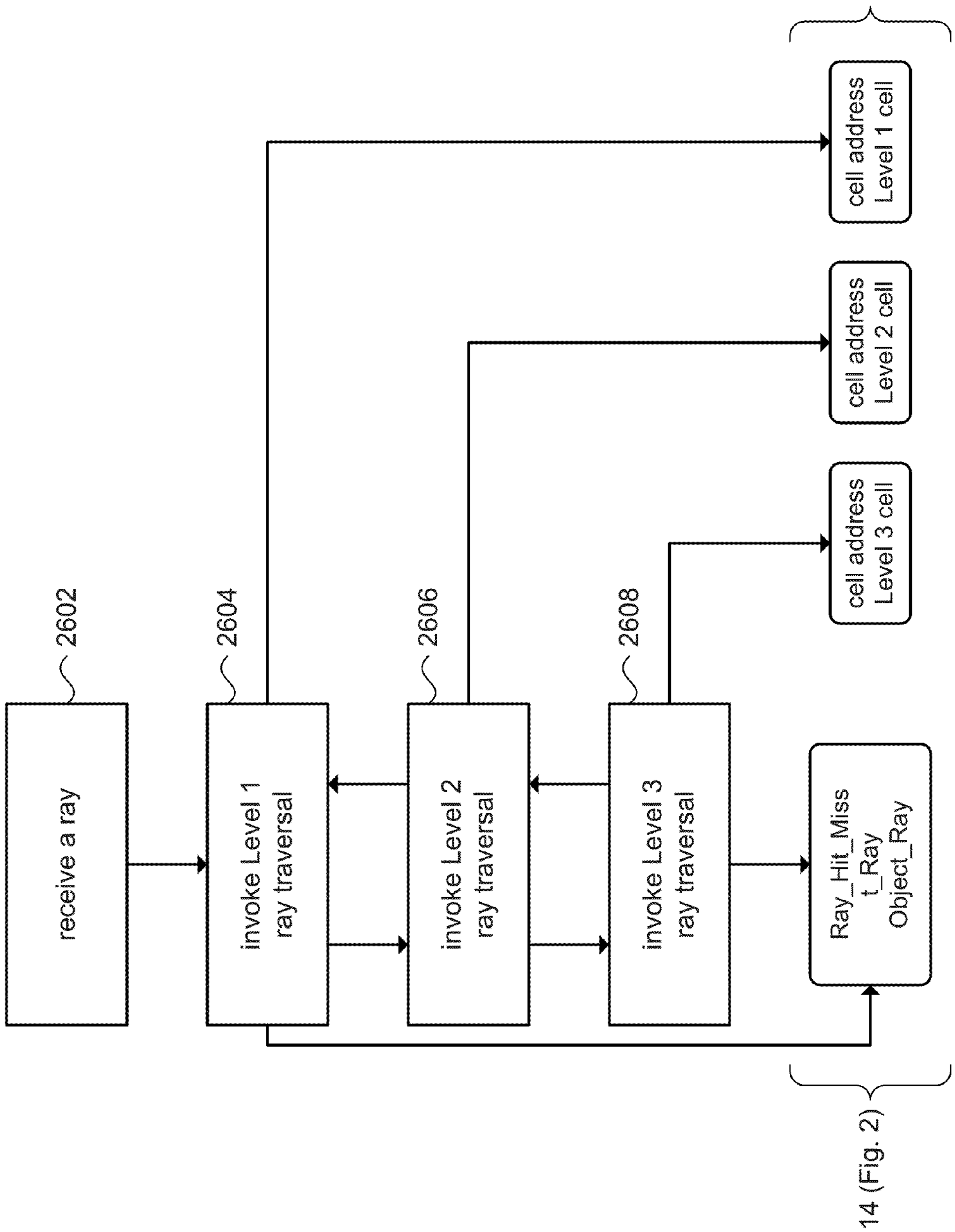
FIG. 26 depicts a high level process flow for ray traversal in accordance with the present disclosure.

FIG. 26 shows a high level flow for ray traversal processing in accordance with the present disclosure. At block 2602, the ray traversal process may begin by receiving a ray. See, for example, block 106 in FIG. 1 where the block may generate a ray that is passed on to block 108. In some embodiments, a generated ray may be defined by the parameters:

ray origin, $R_O$ Xo, Yo, Zo ray direction vector, $R_d$ Xd, Yd, Zd

The current distance of ray, Ray_t_current, may be initialized to 0 before traversing the ray through the scene. In addition, Ray_Hit_Miss is reset (e.g., '0') to indicate that the ray has not intersected an object. The following pseudo-code fragment illustrates how block 2602 may be implemented using digital circuitry rather than as software executing on a CPU:

PSEUDO-CODE FRAGMENT XXII.

```
// Ray_Traversal( )
Ray_Hit_Miss = 0; // the Ray has not intersected an object
Ray_t_current = 0;
Invoke Level_1_Traversal( );   // test for ray intersection
                               with Level 1 dirty cells
If ( Ray_Hit_Miss == 1) {      // Valid Ray Intersection,
                               Ray has hit an object
   Return Ray_Hit_Miss         // indication of Ray Hit / Miss
   Return t_Ray                // R( t_Ray ) = Ro + Rd ( t_Ray );
   Return Object_Ray           // Object that intersected with the ray
   }
Else
   Return Ray_Hit_Miss;        // Ray has not hit an object
                               // other returned parameters
                               are in don't care states
// End Ray_Traversal( )
```

Block 2602 may begin processing by testing if the ray intersects any level 1 dirty cells.

Accordingly, at block 2604, ray traversal is processed at partitioning level 1, which is the entire scene. If the ray passes through the scene without intersecting a dirty cell at partitioning level 1, then the ray did not intersect any object in the scene and so Ray_Hit_Miss will remain reset (e.g., '0'); ray traversal for the ray may conclude. If the ray intersects a dirty cell in partitioning level 1, then processing continues at the next partitioning level, namely partitioning level 2, using the level 1 dirty cell that was intersected by the ray as the level 2 grid (e.g., by invoking Level__2_Traversal( )). In addition, the cell address of the level 1 dirty cell is output (e.g., as L1_XYZ_Addr) to 14 (FIG. 2). The following pseudo-code fragment illustrates how block 2604 may be implemented using digital circuitry rather than as software executing on a CPU:

PSEUDO-CODE FRAGMENT XXIII.

```
// Level_l_Traversal( )

// L1_Block is the block bitmap for the entire scene (Level 1 bitmap)

L1 Block = Block_Leveli

// these are the level 1 partitioning planes

L1_X_Planes[ ]                    = Level 1 X_Planes[ ]
L1_Y_Planes[ ]                    = Level 1 Y_Planes[ ]
L1_Z_Planes[ ]                    = Level 1 Z_Planes[ ]
L1_Hit_Miss, L1_XYZ_Addr, L1_t_min_cell, L1_t_max_cell =
   GTU( Ray_t_current, Ro, Rd, L1_Block, L1_X_Planes [ ], L1_Y_Plane [ ], L1_Z_Planes[ ] );

If ( L1_Hit_Miss == 1 ) // Ray Hit a Dirty Level 1 Cell
   If ( L1_t_min_cell > Ray_t_current )

      Ray_t_current = L1_t_min_cell; // advance Ray_t_current to the cell's entry point

While ( L1_Hit_Miss == 1 && Ray_Hit_Miss == 0) { // Level 1

   Invoke Level_2_Traversal( ); // test for ray intersection with Level 1 dirty cells
   L1_Hit_Miss, L1_XYZ_Addr, L1_t_min_cell, L1_t_max_cell =
      GTU( Ray_t_current, Ro, Rd,
         L1_Block, L1_X_Planes [ ], L1_Y_Plane [ ], L1_Z_Planes [ ] );
If ( L1_Hit_Miss == 1 ) // Ray Hit a Dirty Level 1 Cell
   If ( L1_t_min_cell > Ray_t_current )
      Ray_t_current = L1_t_min_cell; // advance Ray_t_current
} // End While Level 1
If ( L1_Hit_Miss == 0 )
      Ray_t_current = L1_t_max_cell; // advance Ray_t_current to the cell's exit point
// End Level_1_Traversal( )
```

In some embodiments, the GTU (FIG. 14) that was used to construct the database may be reconfigured for ray traversal. In accordance with the present disclosure, the GTU resources for performing the operations for database construction may be reconfigured to provide resources for ray traversal. This is represented in the above pseudo-code by the invocation of GTU( ). The GTU( ) generates or otherwise sets values for Hit_Miss_Flag, XYZ_Addr, t_min_cell, and t_max_cell, which may be stored in respective level 1 data stores D_Hit_Miss, D_XYZ_Addr, L1_t_min_cell, L1_t_max_cell. The WHILE loop continues for each level 1 dirty cell that the ray intersects (namely, D_Hit_Miss==1) and as long as the ray has not intersected an object (namely, Ray_Hit_Miss==0).

At block 2606, processing continues at partitioning level 2 by traversing the ray through the level 1 dirty cell that was identified in block 2604. At partitioning level 2, the level 1 dirty cell serves as a level 2 grid, which in turn is subdivided into level 2 cells. If the ray intersects a dirty cell in the level 2 grid, then the level 2 dirty cell is processed at the next partitioning level, namely partitioning level 3, at block 2608 (e.g., by invoking Level_3_Transversal( )). In addition, the cell address of the level 2 dirty cell is output, e.g., as L2_XYZ_Addr, to 14 (FIG. 2). If, on the other hand, the ray passes through the level 2 grid without intersecting any level 2 dirty cells, then processing in block 2606 completes and returns to block 2604 since the ray did not intersect any object in that level 1 dirty cell. Processing then continues in block 2604 as described above in order to traverse the ray through the remainder of the scene (partitioning level 1) in the WHILE loop. The following pseudo-code fragment illustrates how block 2606 may be implemented using digital circuitry rather than as software executing on a CPU:

PSEUDO-CODE FRAGMENT XXIV.

```
// Level_2_Traversal( )
// find a relative offset using absolute cell address of the level 1 cell
L2_Relative_Addr = AtRE ( L1_XYZ_Addr, 1_1_Block ); // get relative offset
// access block bitmap
L2_Block_Mem_Addr = Address_Offset_Mem [ L1_Block_Mem_Addr ] + L2_Relative_Addr;
L2_Block = Block_Mem [ L2_Block_Mem_Addr ];
// these are the level 2 partitioning planes that bound the level 1 cell
L2_X_Planes[ ] = Level 2 Bin [ L1_XYZ_Addr ] X_Planes[ ]
L2_Y_Planes[ ] = Level 2 Bin [ L1_XYZ_Addr ] Y_Planes[ ]
L2_Z_Planes[ ] = Level 2 Bin [ L1_XYZ_Addr ] Z_Planes[ ]
L2_Hit_Miss, L2_XYZ_Addr, L2_t_min_cell, L2_t_max_cell =
   GTU( Ray_t_current, Ro, Rd, L2_Block, L2_X_Planes [ ], L2_Y_Planes[ ], L2_Z_Planes[ ] );
If ( L2_Hit_Miss == 1 )// Ray Hit a Dirty Level 2 Cell
   If ( L2_t_min_cell > Ray_t_current )
      Ray_t_current = L2_t_min_cell; // advance Ray_t_current to the cell's entry point
While ( L2_Hit_Miss == 1 && Ray_Hit_Miss == 0 ){ // Level 2
   Invoke Level_3_Traversal(); // test for ray intersection with Level 1 dirty cells
   L2_Hit_Miss, L2_XYZ_Addr, L2_t_min_cell, L2_t_max_cell =
      GTU( Ray_t_current, Ro, Rd, L2_Block,
         L2_X_Planes [ ], L2_Y_Planes[ ], L2_Z_Planes[ ] );
   If ( L2_Hit_Miss == 1 )// Ray Hit a Level 2 Dirty Cell
      If ( L2_t_min_cell Ray_t_current )
         Ray_t_current = L2_t_min_cell; // advance Ray_t_current
} // End While Level 2
If ( L2_Hit_Miss == 0 )
   Ray_t_current = L2_t_max_cell; // advance Ray_t_current to the cell's exit point
// End Level_2_Traversal( )
```

The level 1 dirty cell identified at block 2604 is referenced by its (absolute) cell address L1_XYZ_Addr. However, in order to access the corresponding block bitmap in the Block_Mem data store 214 (FIG. 2, 9A-9G), a relative offset is used. The translation results in identifying the level 1 dirty cell, whose cell address is L1_XYZ_Addr, as being the $n^{th}$ dirty bit in the level 1 block bitmap. Logically, the translation amounts to marching down the bitmap one bit at a time, finding a dirty ('1') bit, testing the bit position of that dirty bit, and continuing until the bit position matches the cell address L1_XYZ_Addr. The ordinal position of the matched dirty bit among all the dirty bits in the bitmap is the relative offset of interest.

To facilitate the translation of a cell address to a relative offset (index), the AtRE encoder 210 explained in FIGS. 5 and 6 may be used. An advantageous aspect of the AtRE encoder 210 is that the translation time from cell address to bitmap is the same regardless of the size of the bitmap. In other words, the translation from cell address to relative offset occurs in one cycle whether the bitmap is four bits (as in FIG. 5) or 512 bits in the same as the RtAE encoder described above. By comparison, a software or other programmatic implementation of the translation would typically involve an iterative march through the bitmap, or involve pointer tables. In a practical implementation, the bitmap may be on the order to $2^9$=512 bits. An iterative approach can easily slow down the traversal, and the use of pointer tables can quickly blow up the memory requirements of the system.

At block 2608, processing continues at partitioning level 3 by traversing the ray through the level 2 dirty cell identified in block 2606. At partitioning level 3, the level 2 dirty cell becomes a level 3 grid, which in turn is subdivided into level 3 cells. If the ray intersects a dirty cell in partitioning level 3, a test is made to determine if the ray intersects any primitive objects or portions thereof bounded by that dirty cell. If a ray/object intersection is identified, then the Ray_Hit_Miss_flag is set (e.g., '1') to indicate an intersection with an object. The distance t_Ray is set to indicate how far the intersection is from the ray origin, $R_O$. And Object_Ray identifies the object that was intersected. In addition, the cell address of the level 3 cell is output to 14 (FIG. 2). If, on the one hand, the ray passes through the level 3 dirty cell without intersecting an object, then processing in block 2608 completes and returns to block 2606, without setting the Ray_Hit_Miss_flag, since the ray did not intersect any object in that level 2 dirty cell. Processing then continues in block 2606 as described above in order to traverse the ray through the remainder of the level 2 cell (e.g., via the WHILE loop). The following pseudo-code fragment illustrates how block 2608 may be implemented using digital circuitry rather than as software executing on a CPU:

PSEUDO-CODE FRAGMENT XXV.

```
// Level_3_Traversal( )
// find a relative offset using absolute cell address of the level 2 cell
L3_Relative_Addr = AtRE ( L2_XYZ_Addr, L2_Block ); //get relative offset
// access block bitmap
L3_Block_Mem_Addr = Address_Offset_Mem [ L2_Block_Mem_Addr ] + L3_Relative_Addr;
L3_Block = Block_Mem [ L3_Block_Mem_Addr ];
// these are the level 3 partitioning planes that bound the level 2 cell
L3_X_Planes[ ] = Level 3 Bin [ Ll_XYZ_Addr, L2_XYZ_Addr ] X_Planes[ ]
L3_Y_Planes[ ] = Level 3 Bin [ Ll_XYZ_Addr, L2_XYZ_Addr ] Y_Planes[ ]
L3_Z_Planes[ ] = Level 3 Bin [ Ll_XYZ_Addr, L2_XYZ_Addr ] Z_Planes[ ]
L3_Hit_Miss, L3_XYZ_Addr, L3_t_min_cell, L3_t_max_cell =
  GTU( Ray_t_current, Ro, Rd, L3_Block, L3_X_Planes [ ], L3_Y_Planes[ ], L3_Z_Planes[ ] );
If ( L3_Hit_Miss == 1) // Ray Hit a Level 3 Dirty Cell
  If ( L3_t_min_cell > Ray_t_current )
    Ray_t_current = L3_t_min_cell; // advance Ray_t_current to the cell's entry point
While ( L3_Hit_Miss == 1 && Ray_Hit_Miss == 0) { // Level 3
  Invoke Ray_Intersect( ); // look for ray/object intersection in the Level 3 dirty cell
  L3_Hit_Miss, L3_XYZ_Addr, L3_t_min_cell, L3_t_max_cell =
    GTU( Ray_t_current, Ro, Rd,
      L3_Block, L3_X_Planes [ ], L3_Y_Planes[ ], L3_Z_Planes[ ] );
  If ( L3_Hit_Miss == 1) // Ray Hit a Level 3 Dirty Cell
    If ( L3_t_min_cell > Ray_t_current )
      Ray_t_current = L3_t_min_cell; // advance Ray_t_current
} // End While Level 3
If ( L3_Hit_Miss == 0 )
  Ray_t_current = L3_t_max_cell; // advance Ray_t_current to the cell's exit point
// End Level_3_Traversal( )
```

As in the previous discussion, the level 2 cell identified at block 2606, which contains the ray/object intersection, is referenced by its (absolute) cell address L2_XYZ_Addr. Accordingly, the cell address is used as a relative offset in order to access the Block_Mem data store 214, and so the AtRE encoder 210 may be employed to do the translation.

The level 3 dirty cell identified at block 2608, by definition, contains one or more primitive objects or portions of primitive objects. Ray_Intersect( ) shown above identifies the primitive object (if any) in the level 3 dirty cell that is intersected by the ray; note, although the level 3 cell contains a primitive object, the ray that passes through the level 3 cell may nonetheless miss the object. If the ray intersects multiple primitive objects, then Ray_Intersect( ) will identify the closest intersected primitive object. The following pseudo-code fragment is illustrative of how Ray_Intersect( ) can be implemented:

PSEUDO-CODE FRAGMENT XXVI.

```
// Ray_Intersect( )
//
// generate index (Data_Mem_Addr) into Data_Mem that is the beginning
of the list of
// primitive objects (whole or partial) that are bounded by the level 3 dirty
cell
//
Data_Relative_Addr = AtRE ( L3_XYZ_Addr, L3_Block ); //get relative
offset
Data_Mem_Base_Addr =Address_Offset_Mem [ L3_Block_Mem_Addr ];
Triangle_Max = Format_Codes [ L3 _Block_Mem_Addr ];
Data_Relative_Addr_adjust = Data_Relative_Addr * Triangle_Max;
Data_Mem_Addr = Data_Mem_Base_Addr + Data_Relative_Addr_adjust;
//
// initialize some variables
//
t_Ray= t_max_cell; // set intersect point to cell boundary
Triangle_Count = 0;
//
// find closest intersected primitive object (if any)
//
```

-continued

PSEUDO-CODE FRAGMENT XXVI.

```
While ( Triangle_Count <Triangle_Max ) {
  //
  // get a candidate primitive object, NULL means end of list
  //
  Triangle_test = Data_Mem [ Data_Mem_Addr ];
  If ( Triangle_test !+ NULL) { // Triangle intersect test
    Intersect_Ray_with_Triangle_test( ); // determine intersect point with
    the candidate
    t_intersect =Get_t_intersect ( ); // distance between ray origin and
    intersect point
    If ( t_intersect > L3_t_max_cell || t_intersect < Ray_t_current );
      // test if the intersect point is within the dirty cell, or
      // is behind the current position of the ray
    Else If ( Intersect_Point_in_Triangle_test( ) ) { // inside the triangle?
      If ( t_intersect <t_Ray ) { // closer than current intersect point?
        t_Ray = t_intersect;
        Object_Ray =Triangle_test;
        Ray_Hit_Miss = 1; // ray/object intersection found
      } // End IF
    } // End Else If In/Out Triangle
    Data_Mem_Addr ++;
    Triangle_Count ++;
  } // End If Triangle intersect test
  Else Triangle_Count = Triangle_Max; // Exit While loop
                                      // Triangle == NULL
} // End While
If ( Ray_Hit_Miss == 1 )
  Ray_t_current = t_Ray; / advance ray to the ray/object intersection
  position
// End Ray_Intersect( )
```

The modules Intersect_Ray_with_Triangle_test( ) and Get_ t_intersect( ) may employ any conventionally known algorithms for performing intersection tests. The module Intersect_Ray_with_Triangle_test( ) determines if the ray projected along the ray direction vector $R_d$ intersects a candidate primitive object. In some embodiments, the primitive objects may be represented by triangles. The module Get_ t_intersect( ) determines the intersect distance (t_intersect) between the ray origin $R_O$ and where the ray first intersects the triangle (intersect point). The module Intersect_Point_in_ Triangle_test( ) determines if the intersect point is within the triangle.

V. Expanding Spatial Resolution

The discussion will now turn to expanding the spatial resolution of the foregoing in terms of practical implementations of the disclosed embodiments. A basic 3D grid structure is sometimes referred to as an Octree; a 3D bounding cube partitioned into eight spatial cells. An Octree (8-tree) is defined by $2^1\times2^1\times2^1=2^3=8$ cells. Having three levels of Octree indexing (partitioning levels) allows an effective resolution $X\times Y\times Z=2^3\times2^3\times2^3=2^9=512$ cells.

It can be appreciated, however, that a 3-level index Octree may not provide adequate spatial resolution needed for real-world ray traversal. Ways to increase the spatial resolution include: increasing the number index levels; and increasing the resolution of each indexing level. Increasing the number of index levels can increase the traversal time. This is contrary to the goal of decreasing traversal time. So that leaves the second method of increasing the spatial resolution at each level, while keeping the number of indexing levels low.

The next step in spatial resolution is from $2^1\times2^1\times2^1$ to $2^2\times2^2\times2^2=2^6$, which defines a “64-tree.” In a 64-tree architecture, the Block size $(B_S)=2^6$ bits will be the smallest spatial resolution Block (block bitmap) used. If the spatial resolution is less than $2^6$, then the overhead of Address_Offset (Address_Offset 216 data store) and Format_Codes (Format_Codes 218 data store) can be greater than the block size. In some embodiments, for example, higher resolutions may be used:

Block 3D-Tree X×Y×Z
Octree$\times2^1\times2^1$
-tree$\times2^2\times2^2$
-tree$\times2^3\times2^3$
-tree$\times2^4\times2^4$ For example, in a 4096-tree, the block bitmap contains 4096 bits. In some embodiments, it can therefore be appreciated that the RtAE 208 and AtRE 210 encoders can realize significant savings in processing time.

A. Fail Safe

In some embodiments, a Fail Safe may be provided. The Fail Safe refers to the size of the on-chip memory to support the worst case of a 3D scene with no empty space using a predetermined minimum grain of spatial resolution. For this discussion, the Fail Safe will be $X\times Y\times Z=2^8\times2^8\times2^8=2^{24}$ 16M cells of spatial resolution. Even though Absolute/Relative Encoding will remove the empty space, a worst case scenario of a scene with NO empty space needs to be supported, requiring 16M bits=2M Bytes of L3 storage in Block_Mem (Block_Mem data store 214).

From the previous sections, it can be seen that there is an overhead associated with each block, namely Address_Offset and Format_Codes. The Worst-Case Overhead should be, but not limited to, 1-bit of overhead for 1-bit in Block_Mem. Taking a look at $2^2\times2^2\times2^2=2^6$=64-tree has a block size $(B_S)$ of 64-bits. Assign 32-bits to the Address_Offset leaving 32-bits for the Format_Codes. The Overhead and block memory may be separate memories. However, they could be appended together in a single-memory; e.g., a 64-bit block, with a 64-bit Overhead would be a 128-bit word in memory.

However, when going to larger blocks, such as 512-bit block, the Overhead can be as small as ⅛$^{th}$ the size of the block, and a 4096-bit block could have the Overhead could be as small as 1/64$^{th}$ the size. The decisions on this ratio can be made by the architect/engineer and the approach to remove the NULL space from the Data_Mem. The larger the Format_Codes, the more on-chip memory per block, but more bits allow more options & control. A 512-bit block could have an Overhead ranging from 512-bits to 64-bits, and a 4096-bit block could have an Overhead ranging from 4096-bits to 64-bits. The Address_Offset would remain 32-bits, but the Format_Codes can range from 32-bits to Block size—32-bits. As the architecture expands, it is a practical view that the Overhead size will be the same size as the block size.

B. Indexing Resolution

Targeting the Fail Safe of $2^{24}$=16M, we can get to this by:

2 Levels of Indexing:

$L1\times L2=2^{12}\times2^{12}=2^{24}$=16M bits wide Block_Mem—This would be the fastest for traversing since there are only 2 Levels to search. This may be suitable for 3D developers when attention is given to LOD (Level of Detail) so that high polygon densities do not get placed in small areas.

3 Levels of Indexing:

$L1\times L2\times L3=2^9\times2^9\times2^6=2^{24}$=16M bits wide Block_Mem—This has adaptive flexibility to increase spatial resolution beyond the Fail Safe resolution. This may be suitable for 3D developers when attention is not applied to LOD, and high polygon densities are placed in small areas.

4 Levels of Indexing:

$L1\times L2\times L3\times L4=2^6\times2^6\times2^6\times2^6=2^{24}$=16M bits wide Block_Mem. This offers the smallest data sets to work w ith . . . so the lowest cost in terms of resources. The disadvantage is another level of indexing, whereas the goal is to decrease traversal time.

The following discussion will use three levels of indexing as an example. L1, L2, and L3, in some contexts, may refer to memory.

L1 should get the largest data set, and L3 the smallest data set. Getting the most resolution in L1, then L2 will decrease traversal time as the resolution to discard the empty space is increased. And Traversal could end in a Ray Miss in L1 or L2 before an L3 test. If we use the Worst Case of Block_Mem and Overhead . . . 16M bits block with 16M bits Overhead=32M bits=4M Bytes L3 Memory (Block+Overhead). Total Memory will add on Memory for L2. However most 3D scenes have lots of Empty Space and much of the 4M Bytes will be unused. This unused memory can be used to increase spatial resolution.

C. Adaptive Radix

In some embodiments, during database construction, all level 2 was binned before any level 3 binning started. In other embodiments, level 3 binning can begin after a level 2 partition has been processed. The reason is that a Total Count of all the 1’s (dirty bits) in L2 provide the exact number of L3 blocks. So the amount of memory required for L3 is known before L3 is binned. Therefore, the amount of empty unused L3 Memory is known as well.

Each L2 block will have a Block_Triangle_Count. When this Triangle Count crosses a Threshold, or user-guided directives, the L3 block can be bumped up in Resolution from $2^6$ to $2^9$, from 64-bits to 512-bits. Now there’s a mechanism to get $2^9\times2^9\times2^9=2^{27}$=128M bits of Resolution into 2M Bytes of block memory. This will use memory resources 8× as fast as the Fail Safe Resolution.

A more adaptive alternative is that Spatial Resolution could be increased independently with X, Y, Z getting different Resolutions variable from $2^7$, $2^8$, to $2^9$. block size would be from 128-bits, 256-bits, to 512-bits. An example modification of the Format_Codes to do this:

Format_Codes[0]='0' $X=2^2$, '1' $X=2^3$

Format_Codes[1]='0' $Y=2^2$, '1' $Y=2^3$

Format_Codes[2]='0' $Z=2^2$, '1' $Z=2^3$

Or

Format_Codes[0]='0' block 64-bit, '1' block 512-bit.

The Fail Safe is the Fail Safe, and should be looked at as the minimum memory allocation. 2M Bytes of block memory is the minimum Fail Safe for $X\times Y\times Z=2^8\times 2^8\times 2^8=2^{24}$=16M bits. But allocating more memory than the Fail Safe, allows more room for the algorithm to breathe, and adaptively increase the spatial resolution. More memory, more options, more adaptive. The Threshold can be adjusted dynamically if remaining memory fills up to quickly, or slowly.

16M Bytes of block memory allows a Fail Safe of have $L1\times L2\times L3=2^9\times 2^9\times 2^9=2^{27}$=128M bits, or $2^{12}\times 2^9\times 2^6=2^{27}$=128M bits of Resolution, and the mechanism to adaptively increase to $2^{3o}$=1G bits of Spatial Resolution.

Starting with a Fail Safe of for $X\times Y\times Z=2^8\times 2^8\times 2^8={}^{224}$ 16M bits of Resolution, the adaptive increases can be bumped up another magnitude to $2^{30}$=1G bits of Spatial Resolution. This will use memory resources 64× as fast as the Fail Safe Resolution.

D. Format Codes

So far, only Format_Codes for level 3 have been presented. Implementations could include separate Format_Codes for level 1 & level 2, whereas each Level could have independent adaptive sized blocks & Spatial Resolutions. The architecture provides the mechanism of where to put it, and how to index it. While real-world implementations could include Format_Codes for shading attributes, or different surfaces, or triangles defined as meshes, or a pointer or parameter for a program, etc., for simplicity, we present two different examples of Format_Codes, looking only at Triangle_ Counts.

In the first example, we consider a 64-bit block bitmap, a 32-bit Address_Offset, and a 32-bit Format_Code. The format codes may look like the following:

Format_Codes [0] = '0' for 64-bit Block, '1' for 512-bit Block

Format_Codes [0] = 0;

Format_Codes [1-15] = Triangle_Max_Bin_Count;

Format_Codes [16-17] = Local_Triangle_Max_Bin_Count for Block [0-7]
= Triangle_Max_Bin_Count >> Format_Codes [16-17]

Format_Codes [18-19] = Local_Triangle_Max_Bin_Count for Block [8-15]
= Triangle_Max_Bin_Count >> Format_Codes [18-19]

Format_Codes [20-21] = Local_Triangle_Max_Bin_Count for Block [16-23]
= Triangle_Max_Bin_Count >> Format_Codes [20-21]

Format_Codes [22-23] = Local_Triangle_Max_Bin_Count for Block [24-31]
= Triangle_Max_Bin_Count >> Format_Codes [22-23]

Format_Codes [24-25] = Local_Triangle_Max_Bin_Count for Block [32-39]
= Triangle_Max_Bin_Count >> Format_Codes [24-25]

Format_Codes [26-27] = Local_Triangle_Max_Bin_Count for Block [4047]
= Triangle_Max_Bin_Count >> Format_Codes [26-27]

Format_Codes [28-29] = Local_Triangle_Max_Bin_Count for Block [48-55]
= Triangle_Max_Bin_Count >> Format_Codes [28-29]

Format_Codes [30-31] = Local_Triangle_Max_Bin_Count for Block [56-63]
= Triangle_Max_Bin_Count >> Format_Codes [30-31]

In the next example, we consider a 512-bit block bitmap, a 32-bit Address_Offset, and a 480-bit Format_Code. The format codes may be set according to the following:

PSEUDO-CODE FRAGMENT XXVII.

```
Format_Codes [ 0 ] = '1' - 512-bit
If ( Triangle_Max_Bin_Count < 128 )
  Format_Codes [ 1 – 2 ] == 00
Else If ( Triangle_Max_Bin_count < 16K )
  Format_Codes [ 1 – 2 ] = 01
Else
  Format_Codes [ 1 – 2 ] = 10
If Format_Codes [ 1 – 2 ]= = 00 // 64-bins,
                        // 7-bit - Local_Triangle_Max_Bin_Count
                        // Block 8-bits per bin
  K = 3 ;
  Block_Index = 0 ;
  For ( i = 0; i < 64; i++ )
    Format_Codes [ K – ( K + 6 ) ] = Local_Triangle_Max_Bin_Count for
      Block [ Block_Index – (Block_Index + 3 ) ]
    K = K +7 ;
    Block_Index= Block_Index + 8 ;
  End For
Else If ( Format_Codes [ 1 – 2 ] == 01) // 32-bins,
                           // 14-bit -
                           Local_Triangle_Max_Bin_Count
                           // Block 16-bits per bin
  K = 3 ;
  Block_Index = 0 ;
  For ( i = 0; i < 32; i++)
    Format_Codes [ K – ( K + 13) ] = Local_Triangle_Max_Bin_Count for
      Block [Block_Index – (Block_Index + 15) ]
    K = K + 14
    Block_Index= Block_Index + 16 ;
  End For
Else If ( Format_Codes [ 1 – 2 ] == 10) // 16-bins,
                           // 29-bit -
                           Local_Triangle_Max_Bin_Count
                           // Block 32-bits per bin
  K = 3 ;
  Block_Index = 0 ;
  For ( i = 0; i < 16; i++ )
    Format_Codes [ K – ( K + 28) ] = Local_Triangle_Max_Bin_Count for
      Block ]Block_Index – (Block_Index + 31) ]
    K = K + 29 ;
    Block_Index= Block_Index + 32 ;
  End For
```

Low Indexing Levels, Fine Grain Spatial Resolution, with mechanisms for adaptive increases in Spatial Resolution as a function of Empty Space, Memory Space, and block object density. Bounding Volumes/Grids at the same Level, and that are the same size in Spatial Dimensions, can be Subdivided and stored with different Grains.

E. MisMatch

A MisMatch alternative is to provide finer grain rejection tests for individual rays, then use a coarser grain, but larger shared data set for the surviving shared proximity rays. This would be useful for Ray Coherency when due to object replication, moving finer grain data sets for individual rays becomes more expensive than moving a coarser shared data set. For example, a Data Structure with $L1\times L2\times L3=2^9\times 2^9\times 2^6=2^{24}$=16M bits of Resolution, but have an ability to adaptively increase the resolution of the pointer structure for Ray_Traversal( ) with $L1\times L2\times L3=2^9\times 2^9\times 2^9=2^{27}$=128M bits of Resolution. Where 8-bits, either consecutive, or using spatial locations as an octree, will point to the same coarser grain spatial bounding volume.

Or a simpler view is to store Data Objects at level 2, but use level 3 as purely spatial data for Ray_Traversal( ). Ray attribute t_max_cell will need to be recalculated to the coarser grain cell. In other words, if t_max_cell is generated for the exit point at a level 3 cell and data is stored at level 2 resolution, then t_max_cell may be regenerated for the exit point at the level 2 grid that contains the level 3 cell.

These examples are the start of Ultra-Fine Grain, when the resolution for Ray_Traversal( ) is at a finer grain than the pointer structure for storing data.

F. Shared Object Structure with Object Pointers Encoding

This is an alternative to storing individual Triangles separately at level 3. Format Codes can be used to allow adaptively sized bit-widths, but this research paper will use 512-bits.

If the number of Objects in a level 2 cell is 512 or less, then store all Objects in a ordered data structure. If a Triangle is 64 Bytes, then the data structure would be up to 32K Bytes. The Triangles will be referenced by the order they are in the data structure.

At level 3, instead of storing individual Triangles, a single 512-bit bitmap is stored instead for every level 3 Dirty cell. For example, if the level 3 Dirty cell had 7 Triangles in it, the 512-bit word would have 7-bits set to '1'. The position of the bits would directly map to the Individual Triangles in the level 2 Shared Object Structure.

This encoding would be very useful for Ray Mailboxing (Not having the Rays re-test Data). An extra BitMap could be attached to the Ray that indicates which Triangles have already been tested. Or if level 4 is not being used, and the number of Triangles is 64 or less, it could use the 64-bits of space allocated for L4_Block_Ray.

VI. Ultra-Fine Grain

Figure 27:
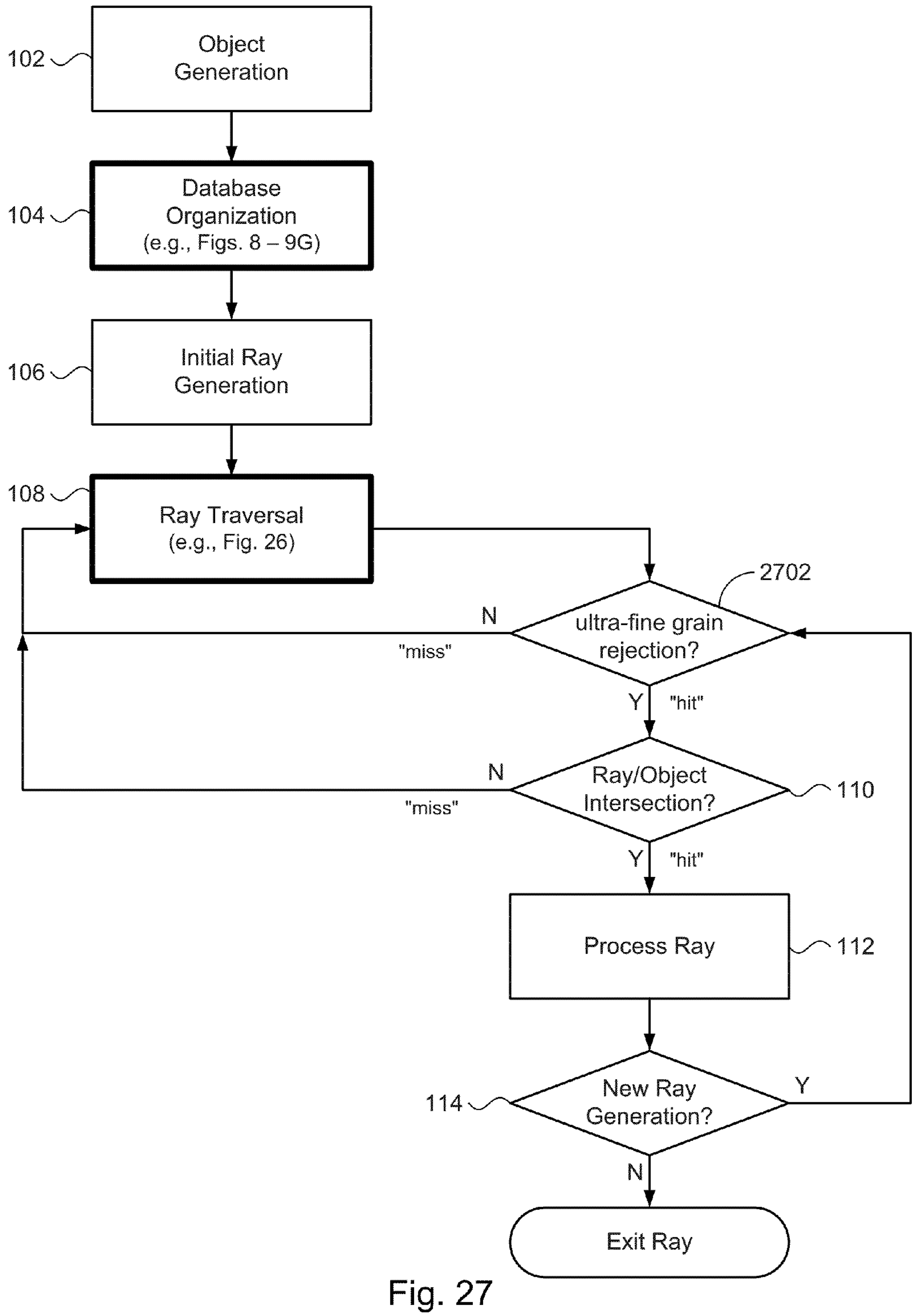
FIG. 27 illustrates a high level flow for ray traversal in accordance with the present disclosure using ultra-fine grain.

In some embodiments, Ultra-Fine Grain may be employed when the Grain of Spatial Resolution for Ray_Traversal( ) is finer than the Grain for the pointer structure. FIG. 27 illustrates how the process of FIG. 1 may be adapted to include Ultra-Fine Grain. For example, at block 2702, prior to determining whether there is a ray/object intersection (block 110), the process may include determining whether to reject the ray. The rejection test at block 2702 will be explained below.

When expanding, the pointer structure can degrade performance. To get around this, the Ultra-Fine Grain pointer structure functions only as spatial data. The following discussion assumes 3 levels of indexing.

On-chip memory resources have been allocated for 3 Levels of a pointer structure. Adding on a level 4 will force the pointer structure to go off-chip. This brings latency for random off-chip memory access, along with the data structure exploding in size. Challenges include: lookup of an off-chip level 4 pointer structure due to latency; and Subdivide of the data structure into a level 4 due to size requirements.

A. Level 4

As explained, bits in each block had dual-use as Absolute Data, then as a Relative Pointer. From the above, level 4 cannot be used as a Relative Pointer. Only the absolute data values will now be used. Stripping away the Relative Pointer values also means there's no more need for the Overhead associated with each block.

For now, level 4 blocks will be stored in the level 3 data structure. This will avoid any new latency for accessing level 4. There are 3 ways to store level 4:

1) As an Attribute
2) As a Header
3) Combine the Header and Attributes

Format_Codes can be defined to support each option.

1. Level 4 as an Attribute

Assign an attribute L4_Block_Object to every individual object stored in Data_Mem. In other words, L4_Block_Object is a bitmap that represents all the level 4 cells that encompass at least a portion of a given object in a given level 3 cell. Each object will have its own L4_Block_Object. As each object is being written to the data structure for level 3, perform a Subdivide for level 4, and use the resulting Block_Subdivide_reg as L4 BlockObject, which can be associated as an attribute of the object as it is stored in the level 3 data structure.

A 64-bit L4 block of Dirty Bits will extend Spatial Resolution of X×Y×Z by $2^2\times2^2\times2^2=2^6=64$-cells. Starting with a Fail Safe of $2^8\times2^8\times2^8=2^{24}=16$M cells, increasing the Spatial Resolution by $2^6$ will equate to $2^{24}\times2^6=2^{30}=1$G cells of Spatial Resolution:

L1×L2×L3×L4=$2^9\times2^9\times2^6\times2^6=2^{30}=1$G cells 1K×1K×1K Grid

For the level 3 blocks that have been adaptively bumped up in Spatial Resolution to $2^{27}=128$M bits, increasing the Spatial Resolution by $2^6$ will equate to $2^{27}\times2^6=2^{33}=8$G cells of Spatial Resolution:

L1×L2×L3×L4=$2^9\times2^9\times2^9\times2^6=2^{33}=8$G cells 2K×2K×2K Grid

2. Level 4 as a Header

Assign a header L4_Block_Header to represent all objects stored for each L3 Relative Pointer to the level 3 data structure. In other words, L4_Block_Header is a bitmap that represents the bit-wise OR of each L4_Block_Object in a given level 3 cell. There will a L4_Block_Header for every dirty bit in a level 3 block. Thus, for example:

At L3 Relative_ptr=0

Set L4_Block_Header to all '0's

As each object is being written to the data structure for a level 3 block, perform a Subdivide for level 4, but only use the output Block_Subdivide_reg for level 4. Thus, for example:

L4_Block_Header=L4_Block_Header|Block_ Subdivide_reg;//bit-wise OR

Repeat for Local_Triangle_Count;

Write L4_Block_Header to Data_Mem;

L3_Relative_ptr++;

Set L4_Block_Header to all '0's

Repeat while L3_Relative_ptr<Block_Count (level 3 block)

As a Header, L4_Block_Header could be:

$2^6=64$-bits, or $2^9=512$-bits.

Starting from the Fail Safe of $2^{24}=16$M cells, 1) increasing the Spatial Resolution by $2^6$ will equate to $2^{24}\times2^6=2^{30}=1$G cells 2) increasing the Spatial Resolution by $2^9$ will equate to $2^{24}\times2^9=2^{33}=8$G cells For the level 3 blocks that have been adaptively bumped up in Spatial Resolution to $2^{27}=128$M bits, 1) increasing the Spatial Resolution by $2^6$ will equate to $2^{27}\times2^6=2^{33}=8$G cells 2) increasing the Spatial Resolution by $2^9$ will equate to $2^{27}\times2^9=2^{36}=64$G cells A 64-bit Attribute L4_Block_Ray can be assigned to the Ray. The 512-bit L4_Block_Ray would need to be calculated when the Ray is used.

B. Executing Level 4

As the data for a Dirty level 3/Ray Intersection is being fetched, the GTU can be used for the Ray/level 4 Grid intersection. The output will be, Ray_Grid_Block, a block of Dirty Bits that represents which level 4 cells the Ray Intersects. These intersection cells are in front of, and including, Current Ray Position. The L4 block can be a 64-bit level 4 as a Grid Attribute. Or the L4 block can a 64-bit, or 512-bit level 4 as a Grid Header. Thus, for example, this may be expressed as:

L4_Block_Ray=Ray_Grid_Block, which is output from:
GTU (Ro, Rd, L4_X_Planes[ ], L4_Y_Planes[ ], L4_Z_Planes[ ])
//Output Block of Dirty bits where Ray Intersects L4 Grid
//does not need a Block Input L4_Block_Ray is a block bitmap that identifies all the level 4 cells that the ray intersects at a distance≥Ray_t_current. The bits in L4_Block_Ray do not represent dirty cells, however; the test for dirty cells is performed in block 2702 (FIG. 27) after ray traversal (block 108) completes.

1. Level 4 as an Attribute

Referring to FIG. 27, before the ray is tested against the object for an intersection (e.g., in Ray_Intersect( )) at block 110, a 64-bit, bit-wise AND operation is performed with L4_Block_Ray and L4_Block_Object. If the result is NOT equal to zero, then the ray is tested against the object for an intersection at block 110 in FIG. 27, otherwise processing proceeds to block 114. This is a simple inexpensive operation that bumps up the Spatial Resolution for the ray/object rejection test (block 110). Thus, for example, block 2702 in FIG. 27 may be expressed as:

Ultra-Fine Rejection=NOT ((Ray-L123_XYZ_Addr==Object-L123_XYZ_Addr) && ((Ray-L4_Block_Ray bit-wise-AND Object-L4_Block_Object)!=0))

where

Ray- refers to the ray

Object- refers to the object

L123_XYZ_Addr is shorthand notation referring to the address of: a level 3 cell; the level 2 cell containing that level 3 cell; and the level 1 cell that contains that level 2 cell L4_Block_Ray is a block bitmap of intersected level 4 cells, dirty and clean L4_Block_Object is explained above The "==" operation tests whether the ray has intersected a dirty level 4 cell. The "bit-wise AND" operation evaluates to non-zero when the ray intersects that dirty level 4 cell.

2. Level 4 as a Header

A 64-bit or 512-bit, bit-wise AND operation is performed with L4_Block_Ray and L4_Block_Header. If the result is NOT equal to zero, than all the objects for Triangle Count will be tested against the ray for intersection. If the result equals zero, then none of the objects intersect with ray.

Format_codes will be defined for Attribute, Header, 64-bit, or 512-bit. Thus, for example, block 2702 in FIG. 27 may be expressed as:

Ultra-Fine Rejection=NOT ((Ray-L123_XYZ_Addr==Object-L123_XYZ_Addr) && ((Ray-L4_Block_Ray bit-wise-AND L4_Block_Header)!=0))

where

Ray- refers to the ray

Object- refers to the object

L123_XYZ_Addr is shorthand notation referring to the address of: a level 3 cell; the level 2 cell containing that level 3 cell; and the level 1 cell that contains that level 2 cell L4_Block_Ray is a block bitmap of intersected level 4 cells, dirty and clean L4_Block_Header is explained above The "==" operation tests whether the ray has intersected a dirty level 4 cell. The "bit-wise AND" operation evaluates to non-zero when the ray intersects any dirty level 4 cell.

C. Multiple Rays

Using either Attribute or Header, many Rays could do Ultra-Fine Grain level 4 rejection tests in parallel against an object, or many objects could be level 4 rejection tested in parallel against a Ray. The operation is inexpensive and inherently parallel. This is a real benefit of this Encoding where many Ray/Object Ultra-Fine Grain rejection tests are now inexpensive and performed in parallel.

D. MisMatch

As described above, the Level 3 pointer structure can store a Triangle position Encoded Bitmap, but the data structure may be stored at a coarser grain.

E. Shared Object Structure with Object Pointers Encoding

As described above, the level 3 pointer_structure can store a Triangle position Encoded Bitmap, but the data structure is stored at a coarser grain. Level 4 Options for mismatch:

1) A Level 4 Header could be used
2) Using a parameter such as Triangle_Count described above, for every dirty level 3 cell, instead of storing each triangle, only store the triangle's attribute L4_Object_Block. The triangle is already stored in a coarser grain.
3) Or both VII. Ray Attributes Following are typical attributes for rays. It will be appreciated that different or additional attributes may be defined.

B. Objects

Triangle (P0, P1, P2, flags) return Object_Handle

C. Ray Casting

Ro—Ray Origin(x, y, z)

Rd—Ray Direction(x, y, z)

Ray Flags—28-bit flag values, 2-bit for or/and/exact

Or—if any ray flag is in object flags

And—if all ray flags contained in object flags

Exact—ray flags==object flags

Ray_t_max—maximum distance ray can travel

Closest—closest object intersection is returned

Any—return first object determined to be intersected with ray.

Object_Handle1 can be the same as Object_Handle2

Ray_Cast_Closest(Ro, Rd, Ray_t_min, Ray_t_max, or/and/exact, flags)

Returns Object_Handle, Normal, intersection point, and Ray Distance from origin Closest object intersection is returned Ray_Cast_Closest_Ignore(Ro, Rd, Ray_t_min, Ray_t_max, Object_Handle1, Object_Handle2, or/and/exact, flags)

VIII. RAY CASTING APPLICATIONS PROGRAMMING INTERFACE (API)

| | | |
|---|---|---|
| Ray # | - 32 bits | - Ray Identifier |
| Xo | - 32 bits | - Ray X Origin |
| Yo | - 32 bits | - Ray Y Origin |
| Zo | - 32 bits | - Ray Z Origin |
| Xd | - 32 bits | - Ray X Direction |
| Yd | - 32 bits | - Ray Y Direction |
| Zd | - 32 bits | - Ray Z Direction |
| Ray_t_max | - 32 bits | - Max distance a Ray can travel |
| t_max_cell | - 32 bits | - value of t when Ray exits closest dirty cell, or exits Grid |
| Ray_t_current | - 32 bits | - Current distance of Ray |
| Level 1, 2, 3 XYZ_Addr | | - 32 bits, Current Ray/Grid Address |
| | | - 3-bits for each X, Y, Z at each Level |
| | | - L1_XYZ_Addr = [ L1_X_Addr, L1_Y_Addr, L1_Z_Addr ] |
| | | - = 9-bits |
| | | - [ (L1_XYZ_Addr), ( L2_XYZ_Addr), ( L3_XYZ_Addr)] |
| | | - = 27-bits |
| | | - extra 5-bits can be user-defined, or kept reserved for future |
| | | - expansion of XYZ_Addr |
| Object_Handle_1 | | - 32-bits |
| | | - Ignore this object when normal faces Ray |
| | | - e.g., Rays reflecting from an Object |
| | | - Remove this Object from valid Intersection test |
| Object_Handle_2 | | - 32-bits |
| | | - Ignore this object when normal faces away from Ray |
| | | - Object_Handle_1 can be the same as Object_Handle_2 |
| Control/Flags | | - 32 bits |
| Closest/Any | - 1-bit | - '0' Closest, '1' Any |
| Closest | | - closest object intersection is returned |
| Any | | - return first object determined to be intersected with ray. |
| Ignore | | - 1-bit - '0' normal, '1' Ignore |
| | | - Ray will Ignore Object_Handle_1 & 2 |
| Or/And/Exact | - 2-bits | - '00' Or, '01' And, '10' Exact |
| Or | | - if any ray flag is in object flags |
| And | | - if all ray flags contained in object flags |
| Exact | | - if ray flags = object flags |
| Ray Flags | - 28 bits | |
| L4_Block_Ray | | - 64-bits, Level 4 Ray_Grid_Block |

Following is a brief description of some APIs for ray casting in accordance with the present disclosure. Within this API all objects are defined with a set of flags. This allows different databases for different types of rays. For instance, certain objects can be used for shadows, while others for primary rays. Or for changing objects in Animation. Or Static and Dynamic databases.

A. Primitives

Flags=28-bits

Object_Handle=32-bits

P=(float)(x,y,z)

Returns Object_Handle, Normal, intersection point, and Ray Distance from origin

Closest object intersection is returned

Object_Handle1 will be ignored for intersection tests if normal faces ray

Object_Handle2 will be ignored for intersection tests if normal faces away from ray Ray_Cast_Any(Ro, Rd, Ray_t_min, Ray_t_max, or/and/exact, flags)

Returns Object_Handle, Normal, intersection point, and Ray Distance from origin

Return first object determined to be intersected with ray

Ray_Cast_Any Ignore (Ro, Rd, Ray_t_min, Ray_t_max, Object_Handle1, Object_Handle2, or/and/exact, flags)

Returns Object_Handle, Normal, intersection point, and Ray Distance from origin

Return first object determined to be intersected with ray

Object_Handle1 will be ignored for intersection tests if normal faces ray

Object_Handle2 will be ignored for intersection tests if normal faces away from ray

Part II—Database Engine

This part describes how to use the resources of the Grid Traversal Unit (GTU) as a database engine at any level of the hierarchy explained in Part I. In database creation, primitive objects (we wan use triangles as primitive objects without loss of generality) comprising a scene are binned according to the cells (level 1 cells, level 2 cells, etc.) that contain them in whole or in part. Each triangle (there could be millions to billions, depending on the complexity of the scene) will be binned into one or more level 1 cells, one or more level 2 cells in those level 1 cells, one or more level 3 cells in those level 2 cells, and so on. Recall, a cell is "dirty" if it contains a portion of a triangle.

In accordance with the present disclosure, the GTU may be configured to operate as a triangle binning engine. In accordance with principles of the present disclosure, the triangle binning engine may perform triangle binning by casting rays. Generally, the triangle edges are cast as rays to intersect with the grid of interest (e.g., may be a level 2 grid or a level 3 grid). The rays are then cast from these intersection points, triangle edge to triangle edge across each intersecting X, Y, and Z axis. Dirty cells intersect the rays.

Relative to the size of the grid, small triangles can bin in 1-cycle, and triangles in more than 2 bins may bin effectively in 16-cycles for a 512-cell grid. In some embodiments, the GTU may be used as the triangle binning engine. Enhancements may be made. For example, the resources of the GTU may be enhanced, multiple GTU units can be provided to run in parallel to reduce the number of cycles to bin a large triangle, and so on. In implementation, additional first-in-first-out buffers (FIFOs) and/or register buffers may be needed for scheduling.

A parallel on-chip memory structure may be set up to support writing to a 512-cell grid in 16-cycles. The memory structure could also be made more parallel if reduced cycles are needed. Ideally, this would be setup for 1-cycle, with 512 separate memory partitions.

Fast database performance may be achieved by organizing the data, processing the data at the speed of data, and with minimal movement of the data. As will be explained, data will be organized into packets and touched only once per level of hierarchy. Pointers to these data packets will be organized linearly into pointer packets. As the pointer packets grow large, they will be stored in linear order as data packets referenced by another level of pointer packets.

If the GTU resources are oversized for the current grid size, then extra resources may be provided to reduce the number of cycles for worst case execution of the smaller grids, either by reducing the number of cycles of the smaller grid, or executing multiple smaller grids in parallel. For example, if we have 512-cell grid resources for a 64-cell grid, then multiple smaller grids could be executed in parallel. With the current GTU resources of a 512-cell grid, 3-independent 64-cell grids could be executed in parallel.

I. Triangle Binning

The discussion will now turn to a description of triangle binning, which was referenced above as Subdivide( ). This aspect of the present disclosure includes a discussion of a novel method to identify the cell or cells that bound a triangle or a portion of a triangle. In some embodiments, the parallel processing resources of the GTU described above may be used to perform triangle binning in accordance with the present disclosure.

Figure 28:
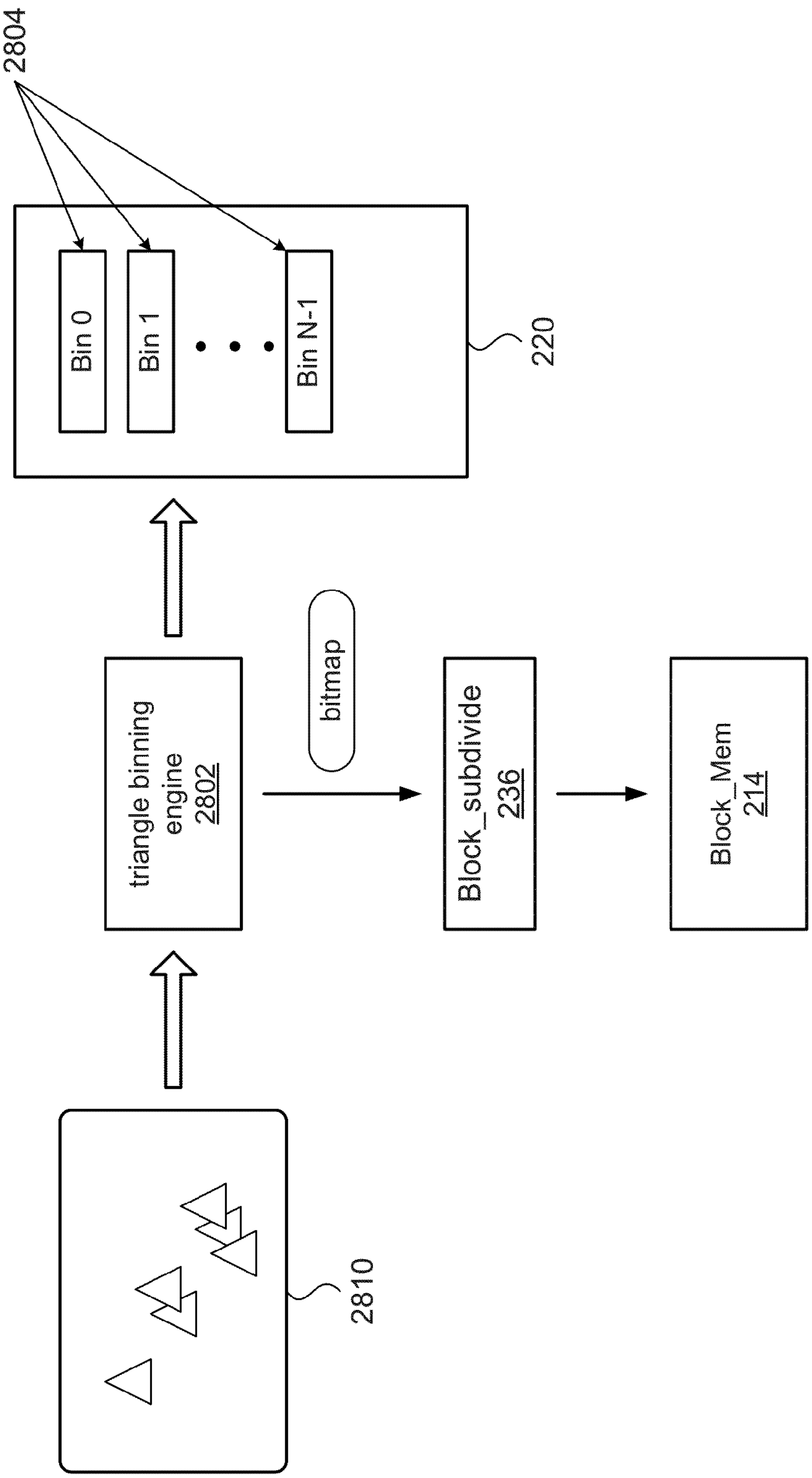
FIG. 28 illustrates a high level block diagram of a triangle binning engine in accordance with the present disclosure

FIG. 28 shows a high level block diagram of a triangle binning engine 2802 to implement Subdivide( ) in accordance with an embodiment. As noted above, in some embodiments, resources comprising the triangle binning engine 2802 may be provided by the GTU. Triangles in a scene 2810 feed into the triangle binning engine 2802, for example, during the database construction process discussed above. As explained, in some embodiments, triangle binning occurs during Subdivide( ) when a grid is subdivided into cells. An output of triangle binning is the storing of triangle data (e.g., coordinates of the triangle, etc.) of triangles contained or bounded by the grid of interest into bins 2804. Another output is the bitmap for the grid of interest, which may be stored in the Block_Subdivide register 236, and eventually into the Block_Mem data store 214.

Figure 29:
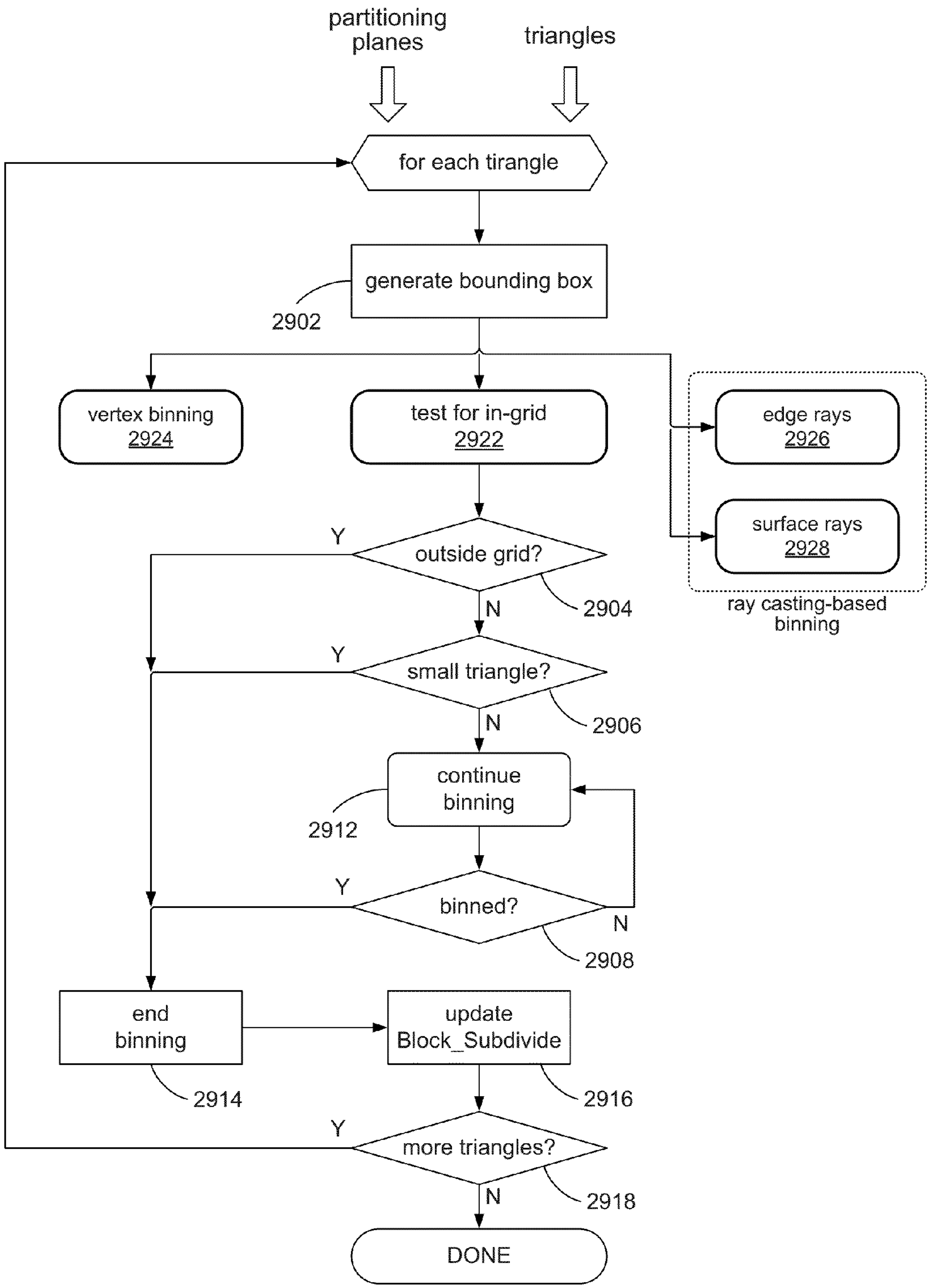
FIG. 29 shows a process flow for triangle binning.

FIG. 29 represents a process flow for triangle binning in accordance with the present disclosure. Triangle binning bins triangles into the cells comprising a given grid. In some embodiments, the triangles are serially binned in pipeline fashion. As will be explained, the binning processing of each triangle occurs largely in parallel.

Inputs to the triangle binning process includes a list of partitioning planes that define the cells comprising the given grid. In order to keep the discussion manageable, we can assume without loss of generality a 2D scene represented by a hierarchy of cells having three partitioning levels, and 2×2 cells at each partitioning level. Referring to FIG. 11A, for example, the partitioning planes that define the level 1 grid 1102 at cell address (1, 0) are X_Plane[1] and X_Plane[2] on the X-axis and by Y_Plane[1] and Y_Plane[0] on the Y-axis. Similarly, as can be seen in FIG. 11A, the partitioning planes that define the level 2 grid at cell address (1, 0) in the level 1 grid 1102 are X_Plane[1], X_Plane[1]+(X_Plane[2]−X_Plane[1])/2, and X_Plane[2] on the X-axis and by Y_Plane[0] and Y_Plane[0]+(Y_Plane[1]−Y_Plane[0])/2, and Y_Plane[1] on the Y-axis. In some embodiments, the partitioning planes for a given cell may be determined using the cell address of the given cell.

Continuing with FIG. 29, another input to the triangle binning process includes the triangles that are bounded by the given grid. Triangles identified (binned) from processing at a previous partitioning level become the input triangles for processing at the next partitioning level. Thus, with respect to the level resolutions described herein, the initial scene (the level 1 grid) is subdivided into four level 1 cells. All the triangles in the scene are binned into one or more of the level 1 cells. Each dirty level 1 cell then becomes a level 2 grid, and triangle binning is performed for each level 2 grid. Thus, for each level 2 grid, the partitioning planes defining that level 2 gird are input to the triangle binning process and the triangles that were binned into the corresponding level 1 cell are input to the process, and so on for subsequent partitioning levels.

Figure 30A:
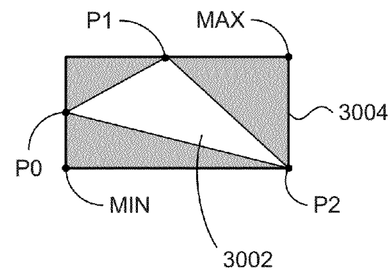
FIGS. 30A-30C illustrate examples of triangle binning.

At block 2902, each triangle is initially processed to determine a triangle bounding box for that triangle. In some embodiments, the triangle may be represented in terms of its vertices expressed using the world coordinates of a scene (e.g., 302, FIG. 3A). The triangle bounding box may be defined using coordinates of the triangle vertices. FIG. 30A illustrates an example of a triangle 3002 and its bounding box 3004 in 2D. The triangle vertices P0, P1, and P2 may be expressed in world coordinates (X, Y) of the scene. The MIN and MAX points of the bounding box 3004 may be determined from the triangle vertices P0, P1, and P2. The following pseudo-code fragment may be used to implement digital logic circuits (rather than software executing on a CPU) that generates a triangle bounding box for 3D world coordinates:

PSEUDO-CODE FRAGMENT XXVIII.

```
// enumerated values:
//    P0 = '100'
//    P1 = '010'
//    P2 = '001'
// Parallel
If ( P0x < P1x )
   Xmin = P0x ;
   Xmin_Position = P0 ;
Else
   Xmin = P1x ;
   Xmin_Position = P1 ;
If ( P2x < Xmin )
   Xmin = P2x ;
   Xmin_Position = P2 ;
If ( P0x > P1x )
   Xmax = P0x ;
   Xmax_Position = P0 ;
Else
   Xmax = P1x ;
   Xmax_Position = P1 ;
If ( P2x > Xmax )
   Xmax = P2x ;
   Xmax_Position = P2 ;
If ( P0y < P1y )
   Ymin = P0y ;
   Ymin_Position = P0 ;
Else
   Ymin = P1y ;
   Ymin_Position = P1 ;
If ( P2y < Ymin )
   Ymin = P2y ;
   Ymin_Position = P2 ;
If ( P0y > P1y )
   Ymax = P0y ;
   Ymax_Position = P0 ;
Else
   Ymax = P1y ;
   Ymax_Position = P1 ;
If ( P2y > Ymax )
   Ymax = P2z ;
   Ymax_Position = P2 ;
If ( P0z < P1z )
   Zmin = P0z ;
   Zmin_Position = P0 ;
Else
   Zmin = P1z ;
   Zmin_Position = P1 ;
If ( P2z < Zmin )
   Zmin = P2z ;
   Zmin_Position = P2 ;
If ( P0z > P1z )
   Zmax = P0z ;
   Zmax_Position = P0 ;
Else
   Zmax = P1z ;
   Zmax_Position = P1 ;
If ( P2z > Zmax )
   Zmax = P2z ;
   Zmax_Position = P2 ;
// End Parallel
```

Here, the triangle vertices P0, P1, and P2 are expressed in terms of 3D world coordinates, namely P0=(P0x, P0y, P0z), P1=(P1x, P1y, P1z), and P2=(P2x, P2y, P2z). The MIN and MAX points of the bounding box may similarly be expressed in terms of 3D world coordinates, namely MIN=(Xmin, Ymin, Zmin) and MAX=(Xmax, Ymax, Zmax). The Xmin_Position and Xmax_Position refer to the vertices of the triangle having the minimum and maximum X-coordinate values, respectively. The Ymin_Position, Ymax_Position, Zmin_ Position, and Zmax_Position, likewise, are for Y- and Z-coordinates. The vertex positions of the minimum and maximum coordinate values ("min" and "max" positions) may be represented using the following enumerated values: "P0" is a bit pattern ('100') that represents the position of the P0 vertex, "P1" is a bit pattern ('010') that represents the position of the P1 vertex, and "P2" is a bit pattern ('001') that represents the position of the P2 vertex. These enumerated values are used below.

In some embodiments, binning modules 2922, 2924, 2926, 2928 may be launched in parallel to perform triangle binning in the grid of interest. Each triangle may be provided to the binning modules 2922-2928. In some embodiments, the GTU (e.g., 206, FIG. 2) provides sufficient logic resources so that binning module 2922-2928 can be performed concurrently. In addition, triangle processing in each binning module 2922-2928 may be pipelined so that several triangles may be concurrently processed at different stages in the binning module.

In some embodiments, a bit called Outside_Grid may be used by the binning modules 2922-2928 to indicate the outcome of the module. The bit value of Outside_Grid may be set to '1' to indicate the most current triangle being processed in the pipeline of a binning module 2922-2928 has been determined to be outside the given grid, or '0' to indicate the most current triangle is bounded by the given grid. Thus, at block 2904, as soon as one of the binning modules 2922-2928 has determined that the most current triangle is outside the given grid, then further processing of the most current triangle by the other binning modules should terminate (block 2914). For example, Outside_Grid may be used to signal that portions of the pipelines for each binning module 2922-2928 that is processing the most current triangle should be flushed.

If the triangle is determined to be within the given grid (e.g., Outside_Grid='0'), then the binning modules 2924-2928 continue processing until the triangle has been binned; processing continues until all the cells comprising the given grid that contain a portion of the triangle have been identified (binned). In some embodiments, a "small triangle" condition may be tested for at block 2906. This condition will be explained in conjunction with in-grid module 2922. Briefly, if the small triangle condition exists, then the triangle will be binned and further processing of the triangle by the other binning modules may terminate via block 2914, since the triangle has been completely binned. Otherwise, the binning modules 2924-2928 will continue until the triangle has been binned (via the processing loop of 2908 and 2912) by each binning module.

When triangle binning terminates (block 2914), then at block 2916 the Block_Subdivide register 236 (FIG. 2) may be updated with the dirty bits associated with the binned triangle. As will be explained, each of the binning modules 2922-2928 maintains a "working" bitmap Object_Grid_Block that represents the dirty bits identified for the triangle being binned. The working bitmap generated by each binning module can be OR'd into the Block-Subdivide register 236. If the binning process for a given triangle terminates because the triangle was outside the grid ('Y' branch of block 2904), then the Block_Subdivide resister 236 is not updated. The binning process may continue with the next triangle via block 2918.

Figure 30B:
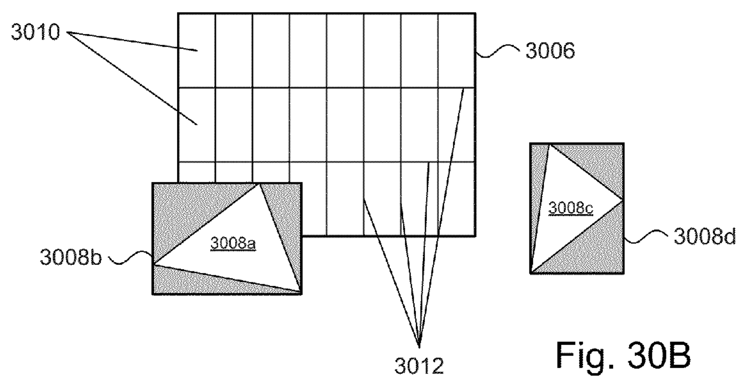

The in-grid module 2922 determines if the triangle is outside the given grid. More particularly, the module uses the triangle bounding box (e.g., 3004, FIG. 30A) generated in block 2902 to quickly determine if the triangle is outside the given grid. If the entire bounding box lies outside of the given grid, then the triangle also lies outside of the given grid and Outside_Grid is set to '1'. FIG. 30B illustrates an example of a 2D grid 3006 comprising cells 3010 defined by X-, Y-partitioning planes 3012. Bounding box 3008*b* overlaps the grid 3006, and so at least a portion of triangle 3008*a* is bounded by the grid. Bounding box 3008*d* is completely outside of grid 3006, and so it follows that triangle 3008*c* is also outside of the grid. The following pseudo-code fragment represents an illustrative embodiment of the in-grid module 2922 for 3D world coordinates:

PSEUDO-CODE FRAGMENT XXIX.

```
// Initial conditions:
Xmin_GTE_X_Plane [ 0 – Nx ] = 0;
Ymin_GTE_Y_Plane [ 0 – My ] = 0;
Zmin_GTE_Z_Plane [ 0 – Qz ] = 0;
Xmax_GTE_X_Plane [ 0 – Nx ] = 0;
Ymax_GTE_Y_Plane [ 0 – My ] = 0;
Zmax_GTE_Z_Plane [ 0 – Qz ] = 0;
Outside_Grid = 0;
// Parallel
For ( i = 0; i <= Nx; i++ )
   If ( Xmin >= X_Plane [ i ] ) Xmin_GTE_X_Plane [ i ] = 1 ;
   If ( Xmax >= X_Plane [ i ] ) Xmax_GTE_X_Plane [ i ] = 1 ;
For ( i = 0; i <= My; i++ )
   If ( Ymin >= Y_Plane [ i ] ) Ymin_GTE_Y_Plane [ i ] = 1 ;
   If ( Ymax >= Y_Plane [ i ] ) Ymax_GTE_Y_Plane [ i ] = 1 ;
For ( i = 0; i <= Qz; i++ )
   If ( Zmin >= Z_Plane [ i ] ) Zmin_GTE_Z_Plane [ i ] = 1 ;
   If ( Zmax >= Z_Plane [ i ] ) Zmax_GTE_Z_Plane [ i ] = 1 ;
// End Parallel
// Parallel
If ( Xmin_GTE_X_Plane [ 0 – Nx ] == all 1's ) Outside_Grid = 1;
If ( Ymin_GTE_Y_Plane [ 0 – My ] == all 1's ) Outside_Grid = 1;
If ( Zmin_GTE_Z_Plane [ 0 – Qz ] == all 1's ) Outside_Grid = 1;
If ( Xmax_GTE_X_Plane [ 0 – Nx ] == 0 ) Outside_Grid = 1;
If ( Ymax_GTE_Y_Plane [ 0 – My ] == 0 ) Outside_Grid = 1;
If ( Zmax_GTE_Z_Plane [ 0 – Qz ] == 0 ) Outside_Grid = 1;
If ( Outside_Grid == 1 )
   Return ; // with Object Outside Grid
// End Parallel
```

It can be appreciated that the foregoing comparisons and tests may be provided using functionality provided by the logic comprising the GTU 206. For example, the "all 1's" operation may be provided by the check module 1442 described above.

Figure 30C:
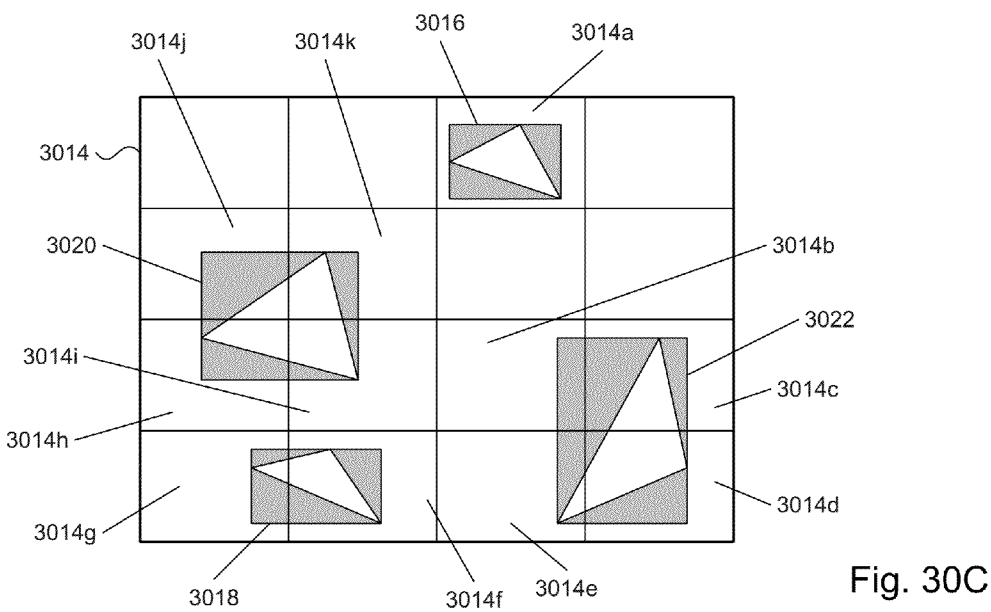

Referring to block 2906, a "small triangle" condition exists if the triangle bounding box is bounded by one or two cells comprising the given grid. When this condition exists, the triangle is completely binned into the one (or two) cells that contain the bounding box and the binning process may terminate ('Y' branch of block 2908). However, if the bounding box spans more than two cells, then the triangle cannot be guaranteed to be completely binned and the binning process must continue. The small triangle condition is illustrated in examples shown in FIG. 30C, which shows several examples of bounding boxes 3016, 3018, 3020, 3022 in grid 3014. Bounding box 3016 spans only one cell 3014*a*, and thus the triangle bounded by the bounding box is completely binned into the cell that contains the bounding box (i.e., the small triangle condition exists). Likewise, bounding box 3018 is fully contained within two cells 3014*f* and 3014*g*, and so the triangle is completely binned into those two cells.

However, consider bounding boxes 3018 and 3022. Bounding box 3018 spans four cells, 3014*h*, 3014*i*, 3014*j*, and 3014*k*, which also bound the particular triangle that defines the bounding box. On the other hand, bounding box 3022, which also spans four cells 3014*b*, 3014*c*, 3014*d*, and 3014*e*, is defined by a triangle that is bound by only three cells 3014*c*, 3014*d*, and 3014*e*. Therefore when the bounding box of a triangle spans more than two cells, additional/different processing is performed to adequately bin that triangle, since there is no guarantee as to which cells bound the triangle.

It will be appreciated that the in-grid binning 2922 works in conjunction with the small triangle test 2906 to determine if the triangle can be binned under the small triangle condition. The following pseudo-code fragment represents an example of how the small triangle condition can be implemented using digital logic circuits (rather than software executing on a CPU):

PSEUDO-CODE FRAGMENT XXX.

```
Function Count_Ones ( GTE_Plane [ 0 – K ] ) // In implementation
a parallel adder
   Ones_Count = 0;
   For ( i = 0; i < K; i++ )
      Ones_Count = Ones_count + GTE_Plane [ i ] ;
Return Ones_Count;
Function Addr_GTE ( GTE_Plane [ 0 – K ] ) // In implementation
an Encoder
   Addr = 0 ;
   For ( i = 0; i < K; i++ )
      If ( GTE_Plane [ i ] == 1 ) Addr = i ;
   If ( GTE_Plane [ K ] == 1 ) Addr = K – 1 ;
Return Addr;
// Parallel
X_Grid_Count = Count_Ones ( Xmin_GTE_X_Plane XOR
Xmax_GTE_X_Plane ) ;
Y_Grid_Count = Count_Ones ( Ymin_GTE_Y_Plane XOR
Ymax_GTE_Y_Plane ) ;
Z_Grid_Count = Count_Ones ( Zmin_GTE_Z_Plane XOR
Zmax_GTE_Z_Plane ) ;
Grid_Count = X_Grid_Count + Y_Grid_Count + Z_Grid_Count ;
Vertices_In_Grid = 1 ;
If ( Xmax_GTE_X_Plane [ Nx ] == 1 )        Vertices_In_Grid = 0;
If ( Ymax_GTE_Y_Plane [ My ] == 1 )        Vertices_In_Grid = 0;
If ( Zmax_GTE_Z_Plane [ Qz ] == 1 )        Vertices_In_Grid = 0;
If ( Xmin_GTE_X_Plane [ 0 ] == 0 )         Vertices_In_Grid = 0;
If ( Ymin_GTE_Y_Plane [ 0 ] == 0 )         Vertices_In_Grid = 0;
If ( Zmin_GTE_Z_Plane [ 0 ] == 0 )         Vertices_In_Grid = 0;
If ( Vertices_In_Grid )          // All Triangle Vertices in Grid
   If ( Grid_Count <= 1 )        // Triangle Bounding Box in
                                 one or two Grid cells.
      // Get first Grid Cell
      X_addr = Addr_GTE ( Xmin_GTE_X_Plane )
      Y_addr = Addr_GTE ( Ymin_GTE_Y_Plane )
      Z_addr = Addr_GTE ( Zmin_GTE_Z_Plane )
      Object_Grid_Block [ X_addr, Y_addr, Z_addr ] = 1 ;
      // Get second Grid Cell - may be same as first Grid Cell
      X_addr = Addr_GTE ( Xmax_GTE_X_Plane )
      Y_addr = Addr_GTE ( Ymax_GTE_Y_Plane )
      Z_addr = Addr_GTE ( Zmax_GTE_Z_Plane )
      Object_Grid_Block [ X_addr, Y_addr, Z_addr ] = 1 ;
      Set Object Binned          // terminates further triangle binning
   End If        // Grid Count <= 1
End If           // Vertices_In_Grid
// End Parallel
```

Object_Grid_Block is a ($N_x \times M_y \times Q_z$)-bit array, that is local to the small triangle logic and represents each cell in the given grid in terms of its X-, Y-, and Z-cell address. As noted above, the Object_Grid_Block is a working bitmap that is generated by this specific module and will be combined with Object_Grid_Block from other modules to construct the block bitmap for the given grid. A bit is set (e.g., '1') if the cell bounds a portion of the triangle; i.e., is dirty. The hardware logic effectively identifies the cells into which the triangle is binned during the process by setting appropriate bits in Object_Grid_Block. In some embodiments, the Object_Grid_Block working bitmap is one of five working bitmaps, which will be combined to create the block bitmap that represents the given grid. The other working bitmaps will be introduced below in connection with their respective modules. The flag Object Binned may be a semaphore or other signaling mechanism to signal the other processing blocks to terminate binning on the current triangle.

The discussion will now to turn a description of each of the binning modules 2924-2928. As will be appreciated, no one of the binning modules 2924-2928 can guarantee complete binning of a triangle. Accordingly, in accordance with the present disclosure, binning in each binning module 2924-2928 continues to completion. The binning modules 2926 and 2928 may be collectively referred to as "ray casting-based" binning modules. As will be explained in more detail below, processing in the ray processing binning modules 2926 and 2928 in accordance with principles of the present disclosure involves casting rays from the triangle into the given grid and identifying intersections with the constituent cells.

A. Triangle Vertices in Grid

Figure 31:
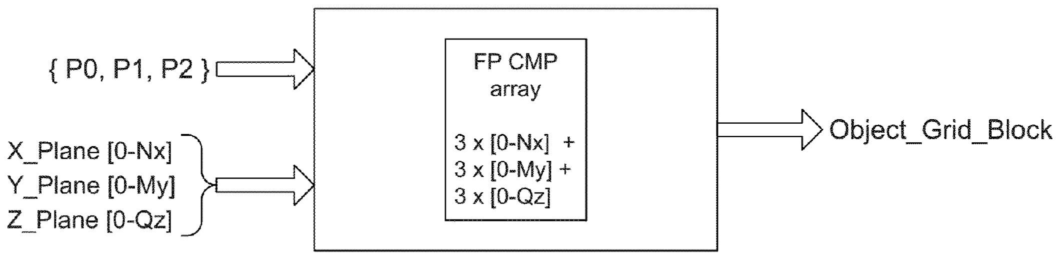
FIG. 31 illustrates input and outputs of a logic block for vertex binning.

Consider, first, the vertex binning module 2924. As illustrated in FIG. 31, the module may be implemented using hardware logic. In some embodiments, for example, the GTU 1402 (FIG. 14) may be configured to deploy one or more of the floating point comparator circuits 1438*a*-1438*c* to perform the vertex binning module 2924. The data generated in accordance with the vertex binning module 2924 may use inputs and produce outputs shown in the figure in accordance with the following pseudo-code fragment, which can be used to implement digital logic circuits (rather than software executing on a CPU):

PSEUDO-CODE FRAGMENT XXXI.

```
// Parallel
Object_Grid_Block = ( 0 − (Mx×Ny×Qz) − 1) ) = 0 ;
For ( i = 0; i <= Mx; i++ )
   If ( P0x >= X_Plane [ i ] )        P0x_GTE_X_Plane [ i ] = 1 ;
   If ( P1x >= X_Plane [ i ] )        P1x_GTE_X_plane [ i ] = 1 ;
   If ( P2x >= X_Plane [ i ] )        P2x_GTE_X_plane [ i ] = 1 ;
For ( i = 0;i <= Ny; i++ )
   If ( P0y >= Y_Plane [ i ] )        P0y_GTE_Y_Plane [ i ] = 1 ;
   If ( P1y >= Y_Plane [ i ] )        P1y_GTE_Y_plane [ i ] = 1 ;
   If ( P2y >= Y_Plane [ i ] )        P2y_GTE_Y_plane [ i ] = 1 ;
For ( i = 0; i <= Qz; i++ )
   If ( P0z >= Z_Plane [ i ] )        P0z_GTE_Z_Plane [ i ] = 1 ;
   If ( P1z >= Z_Plane [ i ] )        P1z_GTE_Z_plane [ i ] = 1 ;
   If ( P2z >= Z_Plane [ i ] )        P2z_GTE_Z_plane [ i ] = 1 ;
Outside_Grid = 0;
If ( P0x_GTE_X_Plane [ 0 − Mx ] == all 0's ||
P0x_GTE_X_Plane [ 0 − Mx ] == all 1's )
   Outside_Grid = 1;
If ( P0y_GTE_Y_Plane [ 0 − Ny ] == all 0's ||
P0y_GTE_Y_Plane [ 0 − Ny ] == all 1's )
   Outside_Grid = 1;
If ( P0z_GTE_Z_Plane [ 0 − Qz ] == all 0's ||
P0z_GTE_Z_Plane [ 0 − Qz ] == all 1's )
   Outside_Grid = 1;
If ( Outside_Grid == 0 )
   X_addr = Addr_GTE ( P0x_GTE_X_Plane [ 0 − Mx ] )
   Y_addr = Addr_GTE ( P0y_GTE_Y_Plane [ 0 − Ny ] )
   Z_addr = Addr_GTE ( P0z_GTE_Z_Plane [ 0 − Qz ] )
   Object_Grid_Block [ X_addr, Y_addr, Z_addr ] = 1 ;
End If
Outside_Grid = 0;
If ( P1x_GTE_X_Plane [ 0 − Mx ] == all 0's ||
P1x_GTE_X_Plane [ 0 − Mx ] == all 1's )
   Outside_Grid = 1;
If ( P1y_GTE_Y_Plane [ 0 − Ny ] == all 0's ||
P1y_GTE_Y_Plane [ 0 − Ny ] == all 1's )
Outside_Grid = 1;
If ( P1z_GTE_Z_Plane [ 0 − Qz ] == all 0's ||
P1z_GTE_Z_Plane [ 0 − Qz ] == all 1's )
   Outside_Grid = 1;
```

-continued

PSEUDO-CODE FRAGMENT XXXI.

```
If ( Outside_Grid == 0 )
   X_addr = Addr_GTE ( P0x_GTE_X_Plane [ 0 − Mx ] )
   Y_addr = Addr_GTE ( P0y_GTE_Y_Plane [ 0 − Ny ] )
   Z_addr = Addr_GTE ( P0z_GTE_Z_Plane [ 0 − Qz ] )
   Object_Grid_Block [ X_addr, Y_addr, Z_addr ] = 1 ;
End If
Outside_Grid = 0;
If ( P2x_GTE_X_Plane [ 0 − Mx ] == all 0's ||
P2x_GTE_X_Plane [ 0 − Mx ] == all 1's )
   Outside_Grid = 1;
If ( P2y_GTE_Y_Plane [ 0 − Ny ] == all 0's ||
P2y_GTE_Y_Plane [ 0 − Ny ] == all 1's )
   Outside_Grid = 1;
If ( P2z_GTE_Z_Plane [ 0 − Qz ] == all 0's ||
P2z_GTE_Z_Plane [ 0 − Qz ] == all 1's )
   Outside_Grid = 1;
If ( Outside_Grid == 0 )
   X_addr = Addr_GTE ( P2x_GTE_X_Plane [ 0 − Mx ] )
   Y_addr = Addr_GTE ( P2y_GTE_Y_Plane [ 0 − Ny ] )
   Z_addr = Addr_GTE ( P2z_GTE_Z_Plane [ 0 − Qz ] )
   Object_Grid_Block [ X_addr, Y_addr, Z_addr ] = 1 ;
End If
// End Parallel
```

The Object_Grid_Block working bitmap is another of the five working bitmaps mentioned above, which will be combined to create the block bitmap that represents the given grid.

B. Ray Casting-Based Binning

Figure 32:
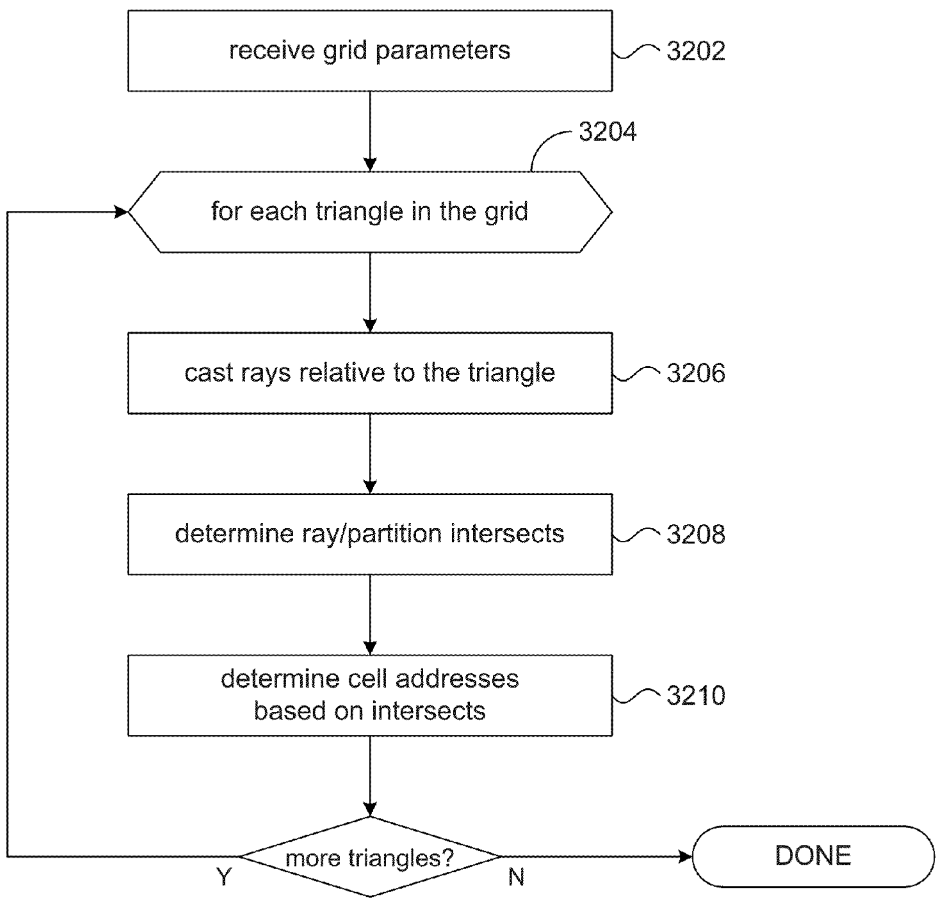
FIG. 32 illustrates a high level flow for ray casting-based triangle binning.

In accordance with the principles of the present disclosure, ray casting may be employed to bin the triangles (or portions thereof) bounded by a given grid into the constituent cells of the given grid. Ray casting involves casting rays that originate from the periphery of the triangles and binning the triangles into cells based on the traversal of those rays. In some embodiments, the operations may be facilitated using hardware logic circuits (e.g., GTU 1402, FIG. 14). In some embodiments, ray casting-based binning includes edge ray binning 2926 and surface ray binning 2928. FIG. 32 illustrates the general flow of ray casting-based binning in accordance with the present disclosure.

At block 3202, the process may receive parameters that describe or otherwise characterize the given grid. For example, grid parameters may include the partitioning planes that define the given grid. The partitioning planes, in turn, define the cells that comprise the given grid. A list of triangles may be included in the grid parameters, identifying those triangles that are wholly or partially bound by the grid.

At block 3204, each triangle is processed to bin the triangle in one or more cells that comprise the given grid. At block 3206, one or more rays are cast relative to the triangle. As will be explained in more detail below, rays may be defined along the triangle's edges (edge rays). Rays may be defined from one edge to another edge (surface rays). At block 3208, intersection points between the rays and the partitioning planes are determined. Based on the intersection points, cells addresses of cells that contain at least a part of the triangle are determined.

1. Edge Ray Binning

Figure 33:
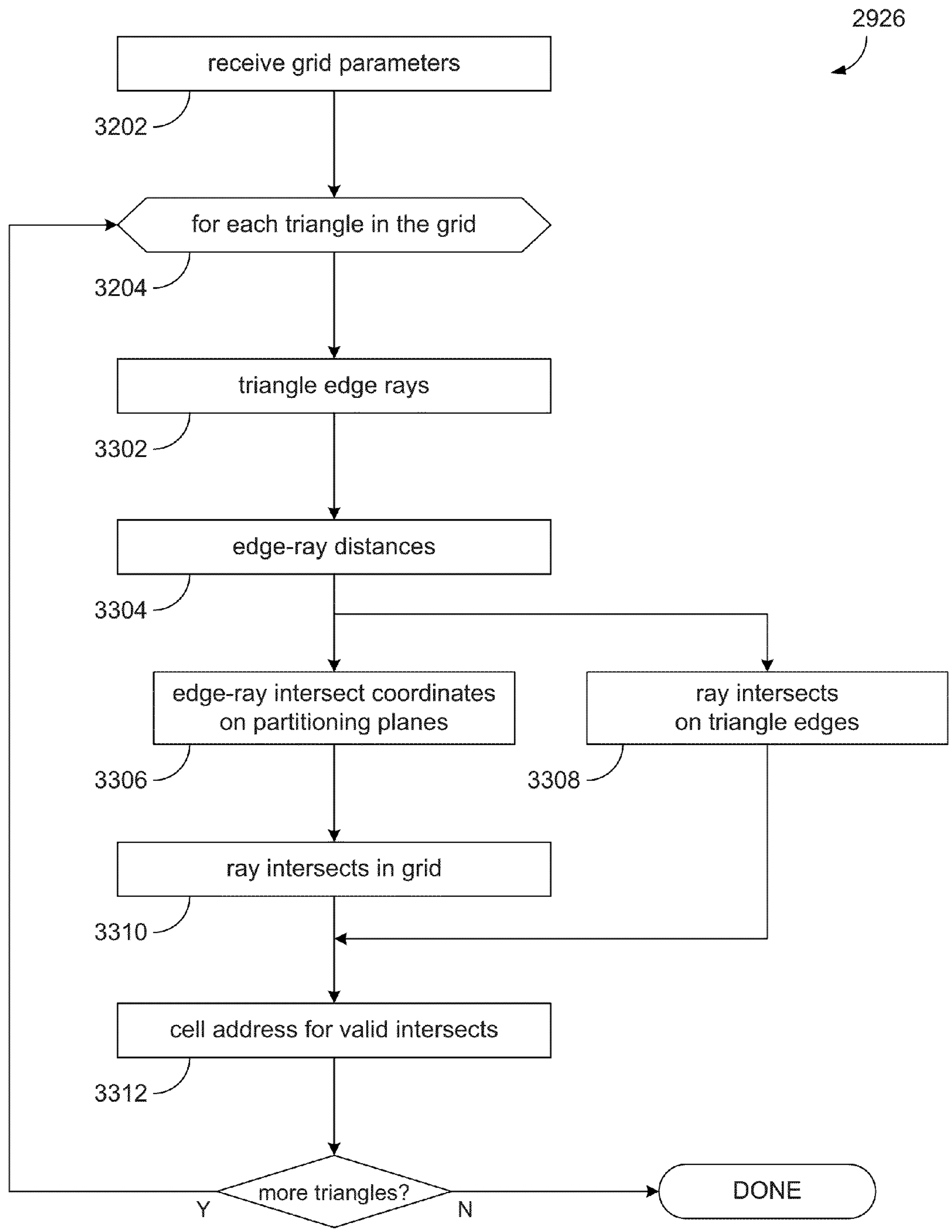
FIGS. 33 and 33A-33J illustrate various aspects of edge ray binning.

Referring now to FIG. 33, one of the modules for ray casting-based binning, called "edge ray binning" (block 2926, FIG. 29), will be described. Generally, the idea of edge ray binning is to cast rays along the peripheries of a given primitive object (e.g., triangle). The cells into which the given primitive object is binned can be identified based on the intersections of the rays with the partitioning planes of the grid. The edge ray binning process may be performed concurrently with another ray casting-based binning module called "surface ray binning," which will be described below. In some hardware implementations, for example, edge ray binning may be performed with hardware logic separate from hardware logic used to perform surface ray binning Edge ray binning may have a common starting point with surface ray binning, namely, the receiving of grid parameters (e.g., block 3202) and the setting up for processing each triangle associated with the given grid (e.g., block 3204).

a) Get Triangle Edges

Figure 33A:
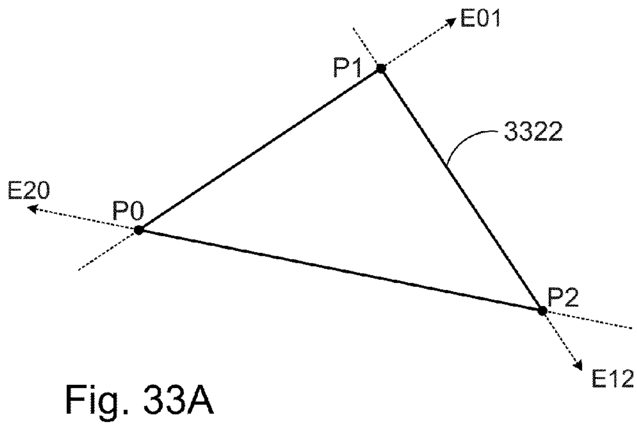

At block 3302, edge rays of the triangle are generated. In accordance with principles of the present disclosure, an "edge ray" is a ray directed along (collinear with) a periphery of a primitive object. In some embodiments, for example, where the primitive object is a triangle, an edge ray is a ray directed along an edge of the triangle. The edge ray may be defined between two vertices of the triangle. The edge ray is directed (has a direction) in terms of a starting vertex and an ending vertex. FIG. 33A, for example, illustrates an example of triangle edge rays in accordance with the present disclosure. As explained above a triangle 3322 may be defined in the world coordinates of a scene by its vertices P0, P1, P2. Edge rays along the edges of the triangle may be defined in terms of those vertices. Thus, for example, edge ray E01 defines a ray from P0 (starting vertex) to P1. Edge ray E12 defines a ray from P1 (starting vertex) to P2, and edge ray E20 defines a ray from P2 (starting vertex) to P0.

Figure 33B:
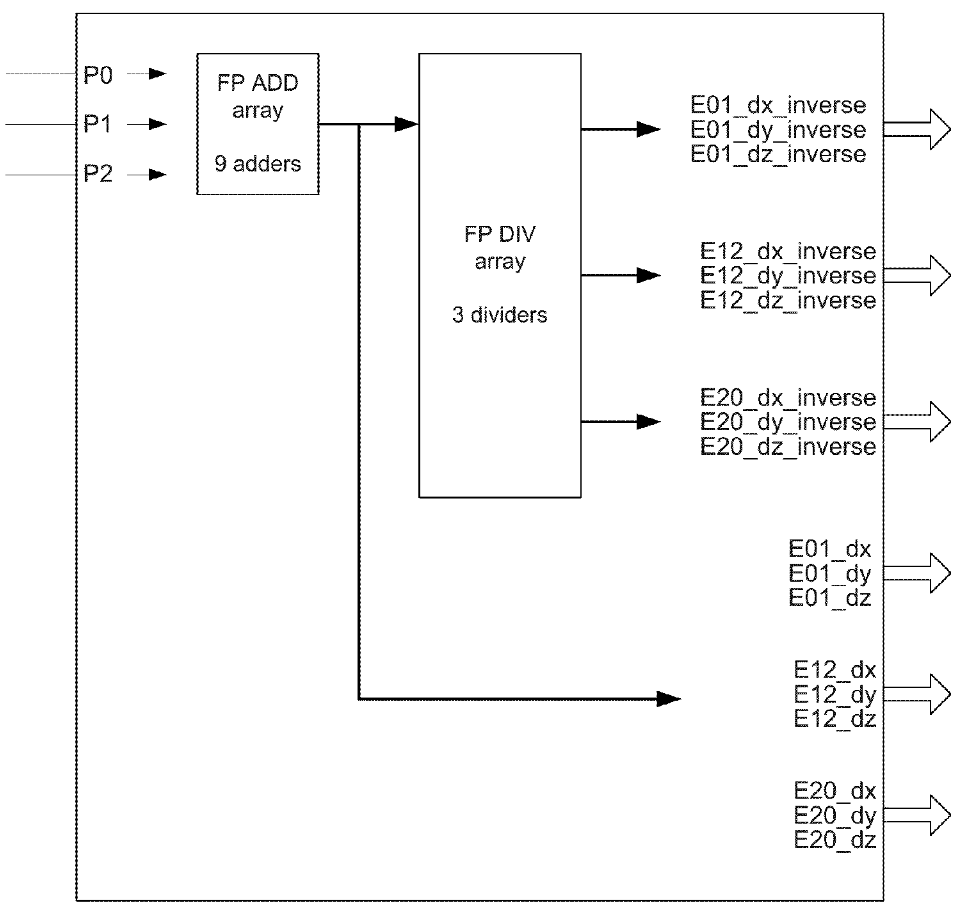

FIG. 33B shows how the edge determination block 3302 may be implemented using digital logic circuits (rather than software executing on a CPU). In some embodiments, for example, the GTU 1402 (FIG. 14) may be configured to deploy the floating point adder module 1434 and floating point divider module 1432. The data generated in the edge determination block 3302 may use inputs and produce outputs shown in the figure in accordance with the following pseudo-code fragment:

PSEUDO-CODE FRAGMENT XXXII.

```
// generate edge rays:
//    E01 = P1 – P0
//    E12 = P2 – P1
//    E20 = P0 – P2
// Parallel 1 cycle
E01_dx = P1x – P0x
E01_dy = P1y – P0y
E01_dz = P1z – P0z
E12_dx = P2x – P1x
E12_dy = P2y – P1y
E12_dz = P2z – P1z
E20_dx = P0x – P2x
E20_dy = P0y – P2y
E20_dz = P0z – P2z
// End Parallel
// 9 divides
// Parallel 3 cycles
E01_dx_inverse = 1 / E01_dx
E01_dy_inverse = 1 / E01_dy
E01_dz_inverse = 1 / E01_dz
E12_dx_inverse = 1 / E12_dx
E12_dy_inverse = 1 / E12_dy
E12_dz_inverse = 1 / E12_dz
E20_dx_inverse = 1 / E20_dx
E20_dy_inverse = 1 / E20_dy
E20_dz_inverse = 1 / E20_dz
// End Parallel
```

In an embodiment, the logic may include nine floating point (FP) adders acting in parallel to generate the edge rays E01, E12, and E20 in one ADD cycle. The logic may include three FP dividers, which can perform the nine division operations in three cycles in pipeline fashion.

b) Get Edge Ray Distances

Returning to FIG. 33, at block 3304, edge ray distances are generated. In accordance with principles of the present disclosure, an edge ray distance measures the distance from a starting vertex (e.g., vertex P0, FIG. 33A) to a partitioning grid (e.g., X-axis partitioning grid). At block 3304, distances are generated from each vertex P0, P1, P2 to each intersection between edge ray and partitioning plane.

Figure 33C:
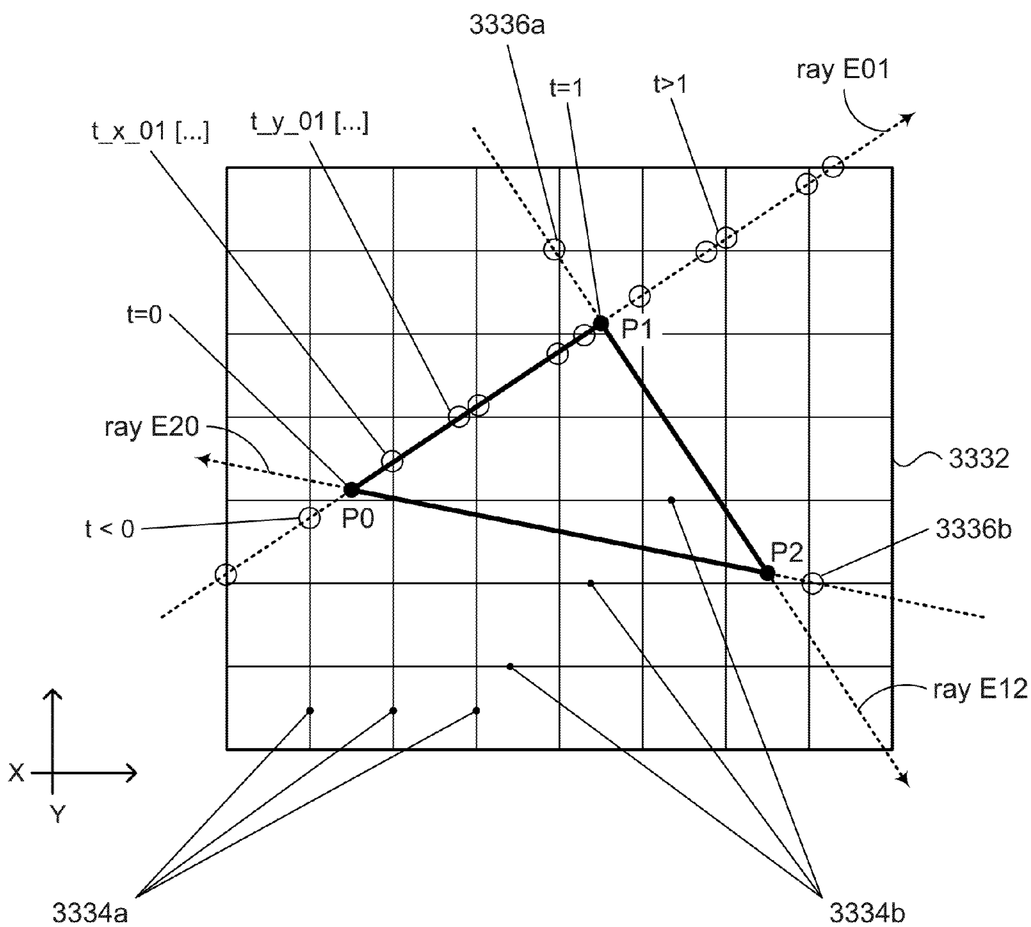

FIG. 33C illustrates an example of edge ray E01 defined by vertices P0 and P1, being cast through grid 3332. The figure shows X-axis partitioning planes 3334*a* and Y-axis partitioning planes 3334*b*. In the case of a 3D grid, there would be Z-axis partitioning planes. A sampling of intersections between the edge ray E01 and the partitioning planes 3334*a* and 3334*b* are circled. For edge ray E01, the ray origin may be defined at vertex P0, and the distance (t) from P0 to P1 may be defined as 1 unit. The intersect distances may then be scaled accordingly. Intersection points that occur behind vertex P0 have negative distance (t<0). An intersection point is "behind" a starting vertex (e.g., P0) in the sense that the intersection occurs before the vertex traversing in the direction of the edge ray (in this case E01) defined by that starting vertex. For example, intersection 3336*a* is behind vertex P1 relative to the direction of edge ray E12. Likewise, intersection 3336*b* is behind vertex P2 relative to the direction of edge ray E20.

Figure 33D:
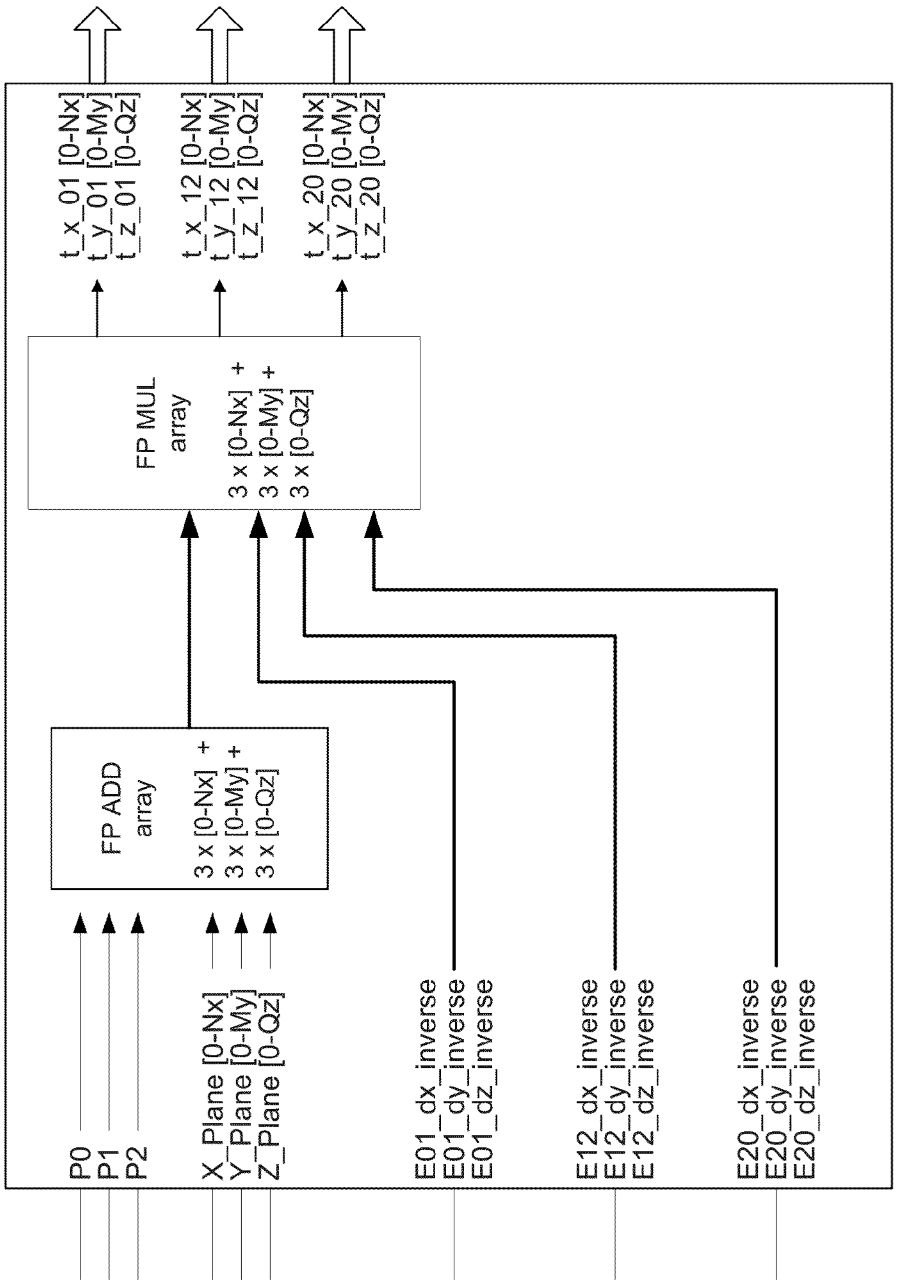

FIG. 33D shows how block 3304 may be implemented using digital logic circuits (rather than software executing on a CPU). In some embodiments, for example, the GTU 1402 may be configured to deploy the floating point adder module 1434 and floating point multiplier module 1436. The data generated in block 3304 may use inputs and produce outputs shown in FIG. 33D in accordance with the following pseudo-code fragment:

PSEUDO-CODE FRAGMENT XXXIII.

```
// the following for loop is performed for each axis and each edge ray:
//    For ( i = 0 ; i <= Nx ; i++ )
//        t_x [ i ] = – ( Px – X_Plane [ i ] ) * E_dx_inverse
// Parallel
t_x _01 [ 0 – Nx ] = – ( P0x – X_Plane [ 0 – Nx ] ) * E01_dx_inverse ;
t_y _01 [ 0 – My ] = – ( P0y – Y_Plane [ 0 – My ] ) * E01_dy_inverse ;
t_z _01 [ 0 – Qz ] = – ( P0z – Z_Plane [ 0 – Qz ] ) * E01_dz_inverse ;
t_x _12 [ 0 – Nx ] = – ( P1x – X_Plane [ 0 – Nx ] ) * E12_dx_inverse ;
t_y _12 [ 0 – My ] = – ( P1y – Y_Plane [ 0 – My ] ) * E12_dy_inverse ;
t_z _12 [ 0 – Qz ] = – ( P1z – Z_Plane [ 0 – Qz ] ) * E12_dz_inverse ;
t_x _20 [ 0 – Nx ] = – ( P2x – X_Plane [ 0 – Nx ] ) * E20_dx_inverse ;
t_y _20 [ 0 – My ] = – ( P2y – Y_Plane [ 0 – My ] ) * E20_dy_inverse ;
t_z _20 [ 0 – Qz ] = – ( P2z – Z_Plane [ 0 – Qz ] ) * E20_dz_inverse ;
// End Parallel
```

The notation t_×_01[0-Nx] represents an array of distance values from vertex P0 along edge ray E01 to each of the ($N_x$+1) X-axis partitioning planes. Similarly, the notation t_y_01[0-My] represents an array of distance values from vertex P0 along edge ray E01 to each of the ($M_y$+1) Y-axis partitioning planes, and the notation t_z_01[0-Qz] represents an array of distance values from vertex P0 along edge ray E01 to each of the ($Q_z$+1) Z-axis partitioning planes. A similar set of arrays are generated for the edge rays E12 and E20. In some embodiments, the FP adder array may comprise $3\times(N_x+1)+3\times(M_y+1)+3\times(Q_z+1)$ FP adder units, and similarly, the FP multiplier array may comprise $3\times(N_x+1)+3\times(M_y+1)+3\times(Q_z+1)$ FP multiplier units. This high degree of parallelism allows the distance arrays to be generated in one cycle.

c) Get Edge Ray Intersections on Partitioning Planes

Returning to FIG. 33, at block 3306, using the distance values generated in block 3304, the coordinates of the intersection points between the edge rays and the partitioning planes are generated. For example, the Y-, Z-coordinates are generated for each X-partitioning plane intersected by edge ray E01. Similarly, the Y-, Z-coordinates are generated for each X-partitioning plane intersected by edge ray E12, and by edge ray E20. Likewise, the X-, Z-coordinates are generated for each Y-partitioning plane intersected by edge ray E01, by edge ray E12, and by edge ray E20. And Y-, Z-coordinates are generated for edge ray intersection points (intersects) with the Z-partitioning planes.

Figure 33E:
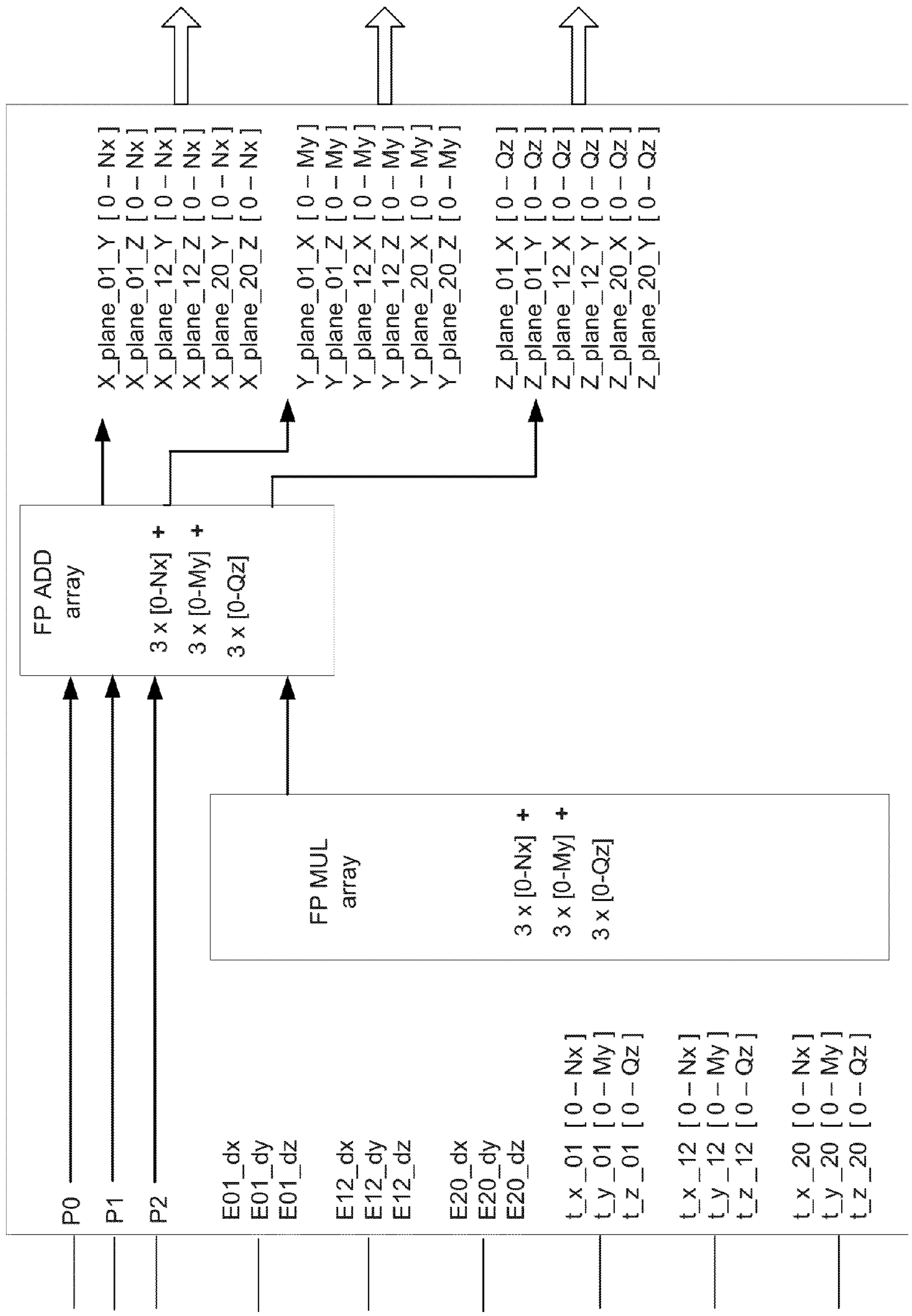

FIG. 33E shows how block 3306 may be implemented using digital logic circuits (rather than software executing on a CPU). In some embodiments, for example, the GTU 1402 may be configured to deploy the floating point adder module 1434 and floating point multiplier module 1436. The data generated in block 3306 may use inputs and produce outputs shown in FIG. 33E in accordance with the following pseudo-code fragment:

PSEUDO-CODE FRAGMENT XXXIV.

```
// the following general operation performed for each axis
and each edge ray:
//    For ( i = 0 ; i <= Nx ; i++ )
//        X[ i ] = Px + (t_x [ i ] * E_dx ) ;
// Parallel 2 cycles
X_plane_01_Y [ 0 – Nx ]  = P0y + ( t_x_01 [ 0 – Nx ] * E01_dy ) ;
X_plane_01_Z [ 0 – Nx ]  = P0z + ( t_x_01 [ 0 – Nx ] * E01_dz ) ;
X_plane_12_Y [ 0 – Nx ]  = P1y + ( t_x_12 [ 0 – Nx ] * E12_dy ) ;
X_plane_12_Z [ 0 – Nx ]  = P1z + ( t_x_12 [ 0 – Nx ] * E12_dz ) ;
X_plane_20_Y [ 0 – Nx ]  = P2y + ( t_x_20 [ 0 – Nx ] * E20_dy ) ;
X_plane_20_Z [ 0 – Nx ]  = P2z + ( t_x_20 [ 0 – Nx ] * E20_dz ) ;
Y_plane_01_X [ 0 – My ]  = P0x + ( t_y_01 [ 0 – My ] * E01_dx ) ;
Y_plane_01_Z [ 0 – My ]  = P0z + ( t_y_01 [ 0 – My ] * E01_dz ) ;
Y_plane_12_X [ 0 – My ]  = P1x + ( t_y_12 [ 0 – My ] * E12_dx ) ;
Y_plane_12_Z [ 0 – My ]  = P1z + ( t_y_12 [ 0 – My ] * E12_dz ) ;
Y_plane_20_X [ 0 – My ]  = P2x + ( t_y_20 [ 0 – My ] * E20_dx ) ;
Y_plane_20_Z [ 0 – My ]  = P2z + ( t_y_20 [ 0 – My ] * E20_dz ) ;
Z_plane_01_X [ 0 – Qz ]  = P0x + ( t_z_01 [ 0 – Qz ] * E01_dx ) ;
Z_plane_01_Y [ 0 – Qz ]  = P0z + ( t_z_01 [ 0 – Qz ] * E01_dz ) ;
Z_plane_12_X [ 0 – Qz ]  = P1x + ( t_z_12 [ 0 – Qz ] * E12_dx ) ;
Z_plane_12_Y [ 0 – Qz ]  = P1z + ( t_z_12 [ 0 – Qz ] * E12_dz ) ;
Z_plane_20_X [ 0 – Qz ]  = P2x + ( t_z_20 [ 0 – Qz ] * E20_dx ) ;
Z_plane_20_Y [ 0 – Qz ]  = P2z + ( t_z_20 [ 0 – Qz ] * E20_dz ) ;
// End Parallel
```

The notation X_plane__01_Y[0-Nx] represents an array of Y-coordinates of the intersection points between the edge ray E01 and the X-partitioning planes, and X_plane__01_Z[0-Qz] represents an array of Z-coordinates of those intersection points. The notational conventional extends to the Y- and Z-partitioning planes, and to the other edge rays E12, E20. In an embodiment that employs $3\times(N_x+1)+3\times(M_y+1)+3\times(Q_z+1)$ FP adder units and $3\times(N_x+1)+3\times(M_y+1)+3\times(Q_z+1)$ FP multiplier units, these operations can be performed in 2 cycles.

d) Ray Intersection Points on Triangle Edge

Figure 33F:
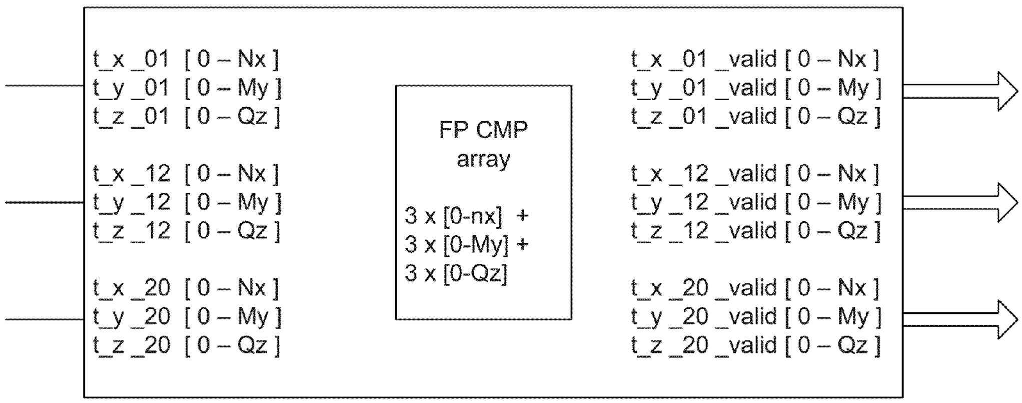

Returning to FIG. 33, at block 3308 the intersect distances generated in block 3304 are evaluated to identify "valid" distances. An intersect distance is valid if the distance is >0 and <1; in other words if the intersect point lies within the edge of the triangle. Referring for a moment to FIG. 33C, one of ordinary skill can appreciate that intersection points that are <0 and >1 fall outside of the triangle, and therefore are deemed invalid for binning purposes. FIG. 33F shows how block 3308 may be implemented using digital logic circuits (rather than software executing on a CPU). In some embodiments, for example, the GTU 1402 may be configured to deploy one of the comparator modules 1438$a$-1438$c$ 1436. The data generated in block 3308 may use inputs and produce outputs shown in FIG. 33F in accordance with the following pseudo-code fragment:

PSEUDO-CODE FRAGMENT XXXV.

```
// Parallel
For (i = 0; i <= Nx ; i++ )
  if ( t_x_01 [ i ] > 0 && t_x_01 [ i ] < 1 )
    t_x_01_Valid [ i ] = 1;
  if ( t_x_12 [ i ] > 0 && t_x_12 [ i ] < 1 )
    t_x_12_Valid [ i ] = 1;
  if ( t_x_20 [ i ] > 0 && t_x_20 [ i ] < 1 )
    t_x_20_Valid [ i ] = 1;
End For
For (i = 0; i <= My ; i++ )
  if ( t_y_01 [ i ] > 0 && t_y_01 [ i ] < 1 )
    t_y_01_Valid [ i ] = 1;
  if ( t_y_12 [ i ] > 0 && t_y_12 [ i ] < 1 )
    t_y_12_Valid [ i ] = 1;
  if ( t_y_20 [ i ] > 0 && t_y_20 [ i ] < 1 )
    t_y_20_Valid [ i ] = 1;
End For
For (i = 0; i <= Qz ; i++ )
  if ( t_z_01 [ i ] > 0 && t_z_01 [ i ] <= 1 )
    t_z_01_Valid [ i ] = 1;
  if ( t_z_12 [ i ] > 0 && t_z_12 [ i ] <= 1 )
    t_z_12_Valid [ i ] = 1;
  if ( t_z_20 [ i ] > 0 && t_z_20 [ i ] <= 1 )
    t_z_20_Valid [ i ] = 1;
End For
// End Parallel
```

e) Ray Intersection in Grid

Figure 33G:
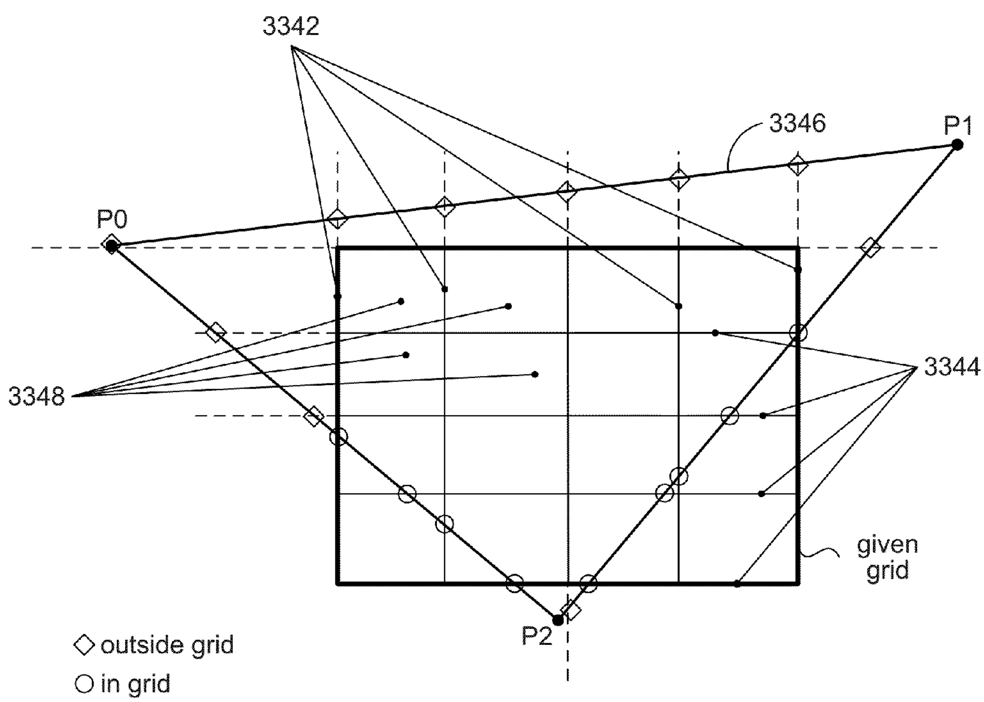

At block 3310 the intersect coordinates generated at 3306 are used to identify in-grid intersection points and the corresponding partitioning planes. FIG. 33G illustrates examples of in-grid intersections and out-of-grid intersections. It can be appreciated that for binning purposes, the out-of-grid intersections should be ignored since they exist outside of the bounds of the given grid. It is noted that intersections between an edge ray and a boundary of the given grid is considered in-grid. The partitioning planes corresponding to the in-grid intersections are marked as valid.

Figure 33H:
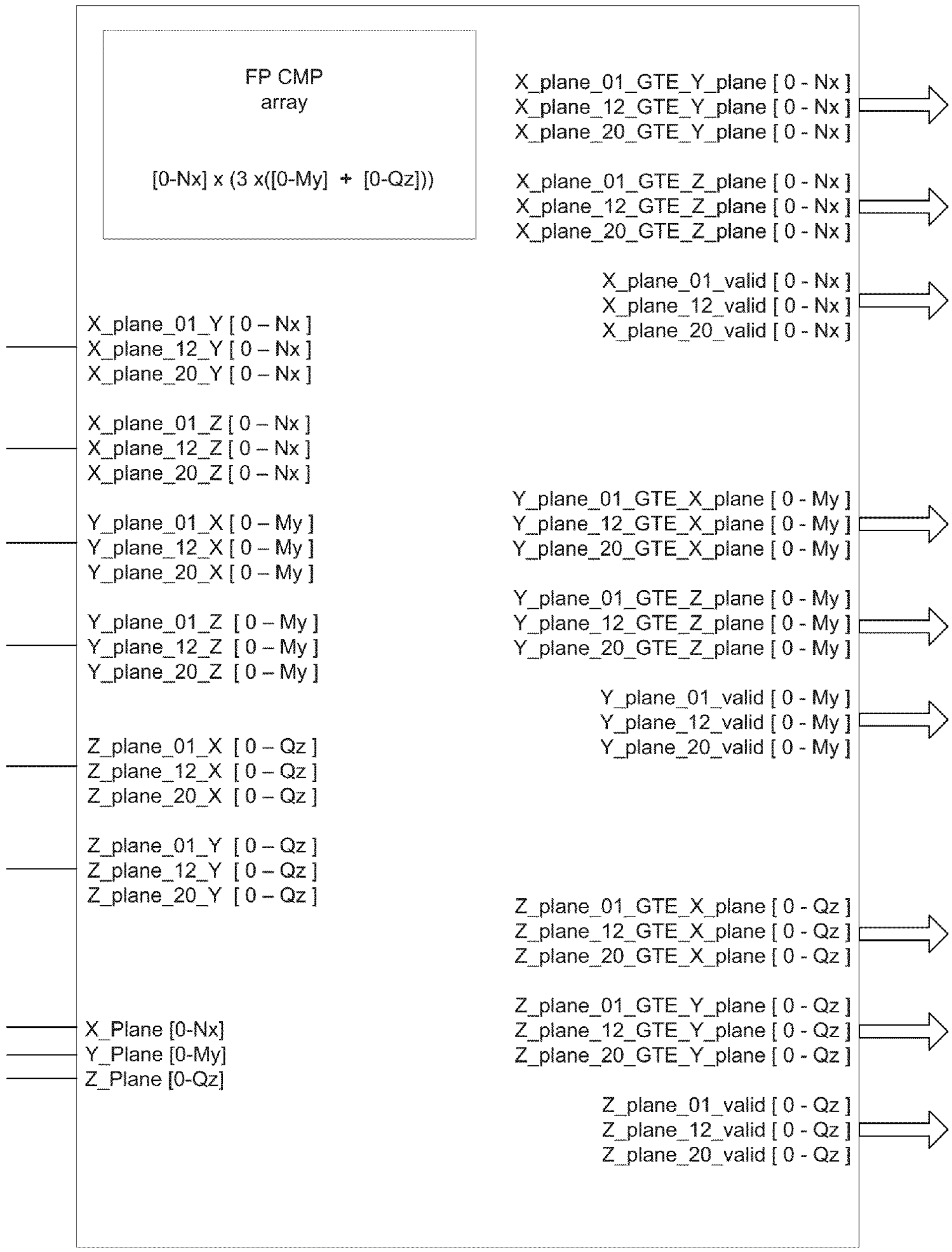

FIG. 33H shows how block 3310 may be implemented using digital logic circuits (rather than software executing on a CPU). In some embodiments, for example, the GTU 1402 may be configured to deploy one of the comparator modules 1438$a$-1438$c$ 1436. The data generated in block 3310 may use inputs and produce outputs shown in FIG. 33H in accordance with the following pseudo-code fragment:

PSEUDO-CODE FRAGMENT XXXVI.

```
Function Not_All_1s_0s
Input Value [ 0 – K ]
  If ( Value == All 1s || Value == All 0s )
    Return 0;
  Else
    Return 1;
End Not_All_1s_0s
/ arrays for edge ray E01
X_plane_01_Valid [ 0 – Nx ]
X_plane_01_GTE_Y_Plane [ 0 – Nx , 0 – My ]
X_plane_01_GTE_Z_Plane [ 0 – Nx , 0 – Qz ]
Y_plane_01_Valid [ 0 – My ]
Y_plane_01_GTE_X_Plane [ 0 – My , 0 – Nx ]
Y_plane_01_GTE_Z_Plane [ 0 – My , 0 – Qz ]
```

-continued

PSEUDO-CODE FRAGMENT XXXVI.

```
Z_plane_01_Valid [ 0 – Qz ]
Z_plane_01_GTE_X_Plane [ 0 – Qz , 0 – Nx ]
Z_plane_01_GTE_Y_Plane [ 0 – Qz , 0 – My ]
// arrays for edge ray E12
X_plane_12_Valid [ 0 – Nx ]
X_plane_12_GTE_Y_Plane [ 0 – Nx , 0 – My ]
X_plane_12_GTE_Z_Plane [ 0 – Nx , 0 – Qz ]
Y_plane_12_Valid [ 0 – My ]
Y_plane_12_GTE_X_Plane [ 0 – My , 0 – Nx]
Y_plane_12_GTE_Z_Plane [ 0 – My , 0 – Qz ]
Z_plane_12_Valid [ 0 – Qz ]
Z_plane_12_GTE_X_Plane [ 0 – Qz , 0 – Nx ]
Z_plane_12_GTE_Y_Plane [ 0 – Qz , 0 – My ]
// arrays for edge ray E20
X_plane_20_Valid [ 0 – Nx ]
X_plane_20_GTE_Y_Plane [ 0 – Nx , 0 – My ]
X_plane_20_GTE_Z_Plane [ 0 – Nx , 0 – Qz ]
Y_plane_20_Valid [ 0 – My ]
Y_plane_20_GTE_X_Plane [ 0 – My , 0 – Nx ]
Y_plane_20_GTE_Z_Plane [ 0 – My , 0 – Qz ]
Z_plane_20_Valid [ 0 – Qz ]
Z_plane_20_GTE_X_Plane [ 0 – Qz , 0 – Nx ]
Z_plane_20_GTE_Y_Plane [ 0 – Qz , 0 – My ]
// Parallel 3-cycle
For ( i = 0; i <= Nx ; i++)
  GTE_01_Y_plane [ 0 – My ] = 0;
  GTE_12_Y_plane [ 0 – My ] = 0;
  GTE_20_Y_plane [ 0 – My ] = 0;
  GTE_01_Z_plane [ 0 – Qz ] = 0;
  GTE_12_Z_plane [ 0 – Qz ] = 0;
  GTE_20_Z_plane [ 0 – Qz ] = 0;
  For ( j = 0 ; j <= My ; j++)
    If ( X_plane_01_Y [ i ] >= Y_Plane [ j ] )
      GTE_01_Y_plane [ j ] = 1 ;
    If ( X_plane_12_Y [ i ] >= Y_Plane [ j ] )
      GTE_12_Y_plane [ j ] = 1 ;
    If ( X_plane_20_Y [ i ] >= Y_Plane [ j ] )
      GTE_20_Y_plane [ j ] = 1 ;
  End For
  For ( j = 0 ; j <= Qz ; j++)
    If ( X_plane_01_Z [ i ] >= Z_Plane [ j ] )
      GTE_01_Z_plane [ j ] = 1 ;
    If ( X_plane_12_Z [ i ] >= Z_Plane [ j ] )
      GTE_12_Z_plane [ j ] = 1 ;
    If ( X_plane_20_Z [ i ] >= Z_Plane [ j ] )
      GTE_20_Z_plane [ j ] = 1 ;
  End For
  X_plane_01_GTE_Y_plane [ i ] = GTE_01_Y_plane [ 0 – My ] ;
  X_plane_12_GTE_Y_plane [ i ] = GTE_12_Y_plane [ 0 – My ] ;
  X_plane_20_GTE_Y_plane [ i ] = GTE_20_Y_plane [ 0 – My ] ;
  X_plane_01_GTE_Z_plane [ i ] = GTE_01_Z_plane [ 0 – Qz ] ;
  X_plane_12_GTE_Z_plane [ i ]= GTE_12_Z_plane [ 0 – Qz ] ;
  X_plane_20_GTE_Z_plane [ i ] = GTE_20_Z_plane [ 0 – Qz ] ;
  X_plane_01_valid [ i ] =
      Not_All_1s_0s ( GTE_01 _Y_plane ) && Not_All_1s_0s
      ( GTE_01 _Z_plane )
  X_plane_12_valid [ i ] =
      Not_All_1s_0s ( GTE_12_Y_plane ) && Not_All_1s_0s
      ( GTE_12_Z_plane )
  X_plane_20_valid + i + =
      Not_All_1s_0s ( GTE_20_Y_plane ) && Not_All_ls_0s
      ( GTE_20_Z_plane )
End For
For ( i = 0; i <= My ; i++)
  GTE_01_X_plane [ 0 – Nx ] = 0;
  GTE_12_X_plane [ 0 – Nx ] = 0;
  GTE_20_X_plane [ 0 – Nx ] = 0;
  GTE_01_Z_plane [ 0 – Qz ] = 0;
  GTE_12_Z_plane [ 0 – Qz ] = 0;
  GTE_20_Z_plane [ 0 – Qz ] = 0;
  For ( j = 0 ; j <= Nx ; j++)
    If ( Y_plane_01_X [ i ] >= X_Plane [ j ] )
      GTE_01_X_plane [ j ] = 1 ;
    If ( Y_plane_12_X [ i ] >= X_Plane [ j ] )
      GTE_12_X_plane [ j ] = 1 ;
    If ( Y_plane_20_X [ i ] >= X_Plane [ j ] )
      GTE_20_X_plane [ j ] = 1 ;
  End For
  For ( j = 0 ; j <= Qz ; j++)
    If ( Y_plane_01_Z [ i ] >= Z_Plane [ j ] )
      GTE_01_Z_plane [ j ] = 1 ;
    If ( Y_plane_12_Z [ i ] >= Z_Plane [ j ] )
      GTE_12_Z_plane [ j ]= 1 ;
    If ( Y_plane_20_Z [ i ] >= Z_Plane [ j ] )
      GTE_20_Z_plane [ j ] = 1 ;
  End For
  Y_plane_01_GTE_X_plane [ i ] = GTE_01_X_plane ;
  Y_plane_12_GTE_X_plane [ i ] = GTE_12_X_plane ;
  Y_plane_20_GTE_X_plane [ i ] = GTE_20_X_plane ;
  Y_plane_01_GTE_Z_plane [ i ] = GTE_01_Z_plane ;
  Y_plane_12_GTE_Z_plane [ i ] = GTE_12_Z_plane ;
  Y_plane_20_GTE_Z_plane [ i ] = GTE_20_Z_plane ;
  Y_plane_01_valid [ i ] =
      Not_All_1s_0s ( GTE_01 _X_plane ) && Not_All_1s_0s
      ( GTE_01 _Z_plane )
  Y_plane_12_valid [ i ] =
      Not_All_1s_0s ( GTE_12_X_plane ) && Not_All_1s_0s
      ( GTE_12_Z_plane )
  Y_plane_20_valid [ i ] =
      Not_All_1s_0s ( GTE_20_X_plane ) && Not_All_1s_0s
      ( GTE_20_Z_plane )
End For
For ( i = 0 ; i <= Qz ; i++)
  GTE_01_X_plane [ 0 – Nx ] = 0;
  GTE_12_X_plane [ 0 – Nx ] = 0;
  GTE_20_X_plane [ 0 – Nx ] = 0;
  GTE_01_Y_plane [ 0 – My ] = 0;
  GTE_12_Y_plane [ 0 – My ] = 0;
  GTE_20_Y_plane [ 0 – My ] = 0;
  For ( j = 0 ; j <= Nx ; j++)
    If ( Z_plane_01_X [ i ] >= X_Plane [ j ] )
      GTE_01_X_plane [ j ] = 1 ;
    If ( Z_plane_12_X [ i ] >= X_Plane [ j ] )
      GTE_12_X_plane [ j ] = 1 ;
    If ( Z_plane_20_X [ i ] >= X_Plane [ j ] )
      GTE_20_X_plane [ j ] = 1 ;
  End For
  For ( j = 0 ; j <= My ; j++)
    If ( Z_plane_01_Y [ i ] >= Y_Plane [ j ] )
      GTE_01_Y_plane [ j ] = 1 ;
    If ( Z_plane_12_Y [ i ] >= Y_Plane [ j ] )
      GTE_12_Y_plane [ j ] = 1 ;
    If ( Z_plane_20_Y [ i ] >= Y_Plane [ j ] )
      GTE_20_Y_plane [ j ] = 1 ;
  End For
  Z_plane_01_GTE_X_plane [ i ] = GTE_01_X_plane ;
  Z_plane_12_GTE_X_plane [ i ] = GTE_12_X_plane ;
  Z_plane_20_GTE_X_plane [ i ] = GTE_20_X_plane ;
  Z_plane_01_GTE_Y_plane [ i ] = GTE_01_Y_plane ;
  Z_plane_12_GTE_Y_plane [ i ] = GTE_12_Y_plane ;
  Z_plane_20_GTE_Y_plane [ i ] = GTE_20_Y_plane ;
  Z_plane_01 _valid [ i ] =
      Not_All_1s_0s ( GTE_01_X_plane ) && Not_All_1s_0s
      ( GTE_01 _Y_plane )
  Z_plane_12_valid [ i ] =
      Not_All_1s_0s ( GTE_12_X_plane ) && Not_All_1s_0s
      ( GTE_12_Y_plane )
  Z_plane_20_valid [ i ] =
      Not_All_1s_0s ( GTE_20_X_plane ) && Not_All_1s_0s
      ( GTE_20_Y_plane )
End For
// End Parallel
```

The module Not_All1s__0s receives a (K+1)-bit input, and outputs a ‘0’ if the input is all 1’s or all 0’s. In some embodiments, the module Not_All1s__0s can be implemented using a (K+1)-input AND gate to detect the all 1’s condition and a (K+1)-input NAND gate to detect the all 0’s condition. The outputs may feed into a 2-input NOR gate to produce the outcome. In some embodiments, the number of comparators is $(N_x+1)\times(3\times((M_y+1)+(Q_z+1)))$.

The notation X_plane__01_Valid[0-Nx] refers to an array of bits that is associated with edge ray E01, one bit for each of the ($N_x$+1) X-axis partitioning planes. A bit is set (e.g., '1') if the edge ray intersect the corresponding X-axis partitioning plane within the given grid. Likewise, X_plane__12_Valid[0-Nx] and X_plane__20_Valid[0-Nx] refer to arrays for edge rays E12 and E20. Similar arrays are defined for the Y- and Z-axis partitioning planes.

The notation X_plane__01_GTE_Y_Plane[0-Nx, 0-My] refers to an array of ($M_y$+1)-bit arrays that is associated with edge ray E01; there is one ($M_y$+1)-bit array for each of the ($N_x$+1) X-axis partitioning planes. For a given X-axis partitioning plane, the ($M_y$+1)-bit array indicates whether the coordinate of a Y-axis partitioning plane is greater than or equal to the Y-coordinate at the intersection of the edge ray and the given X-axis partitioning plane. If the ($M_y$+1)-bit array for the given X-axis partitioning plane is all 0's or all 1's, this means the intersection point occurs outside of the grid; otherwise, the array will be a string of one or more 0's (meaning that that the Y-coordinate of the intersect point is less than the Y-coordinate of the partitioning planes) followed by a string of one or more1's (meaning that that the Y-coordinate of the intersect point is greater than or equal to the Y-coordinate of the partitioning planes). Similarly, the notation X_plane__01_GTE_Z_Plane[0-Nx, 0-Qz] refers to an array of ($Q_z$+1)-bit arrays that is associated with edge ray E01; there is one ($Q_z$+1)-bit array for each of the ($N_x$+1) X-axis partitioning planes and applies to the Z-partitioning planes. Similar arrays are defined for intersections of edge ray E01 with the Y- and Z-axis partitioning planes, and again for edge rays E12 and E20.

f) Get XYZ__ Addr for Valid Intersections

Figure 33I:
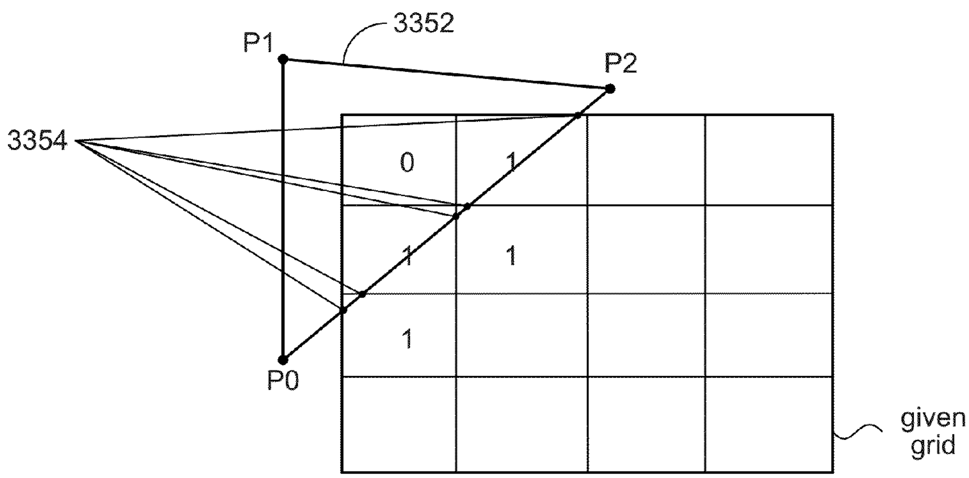

At block 3312, the valid intersect distances (generated in block 3304) and valid intersect points (generated in block 3310) are used to identify a set of dirty cells that bound at least a portion of the triangle. Block 3312 determines the cell addresses of these dirty cells and sets dirty bits corresponding to the dirty cells. FIG. 33I shows an example, of intersects 3354 that are valid; they lie within the bounds of the edges of the triangle 3352 and intersect partitioning planes within the bounds of the given grid (in-grid intersections).

Figure 33J:
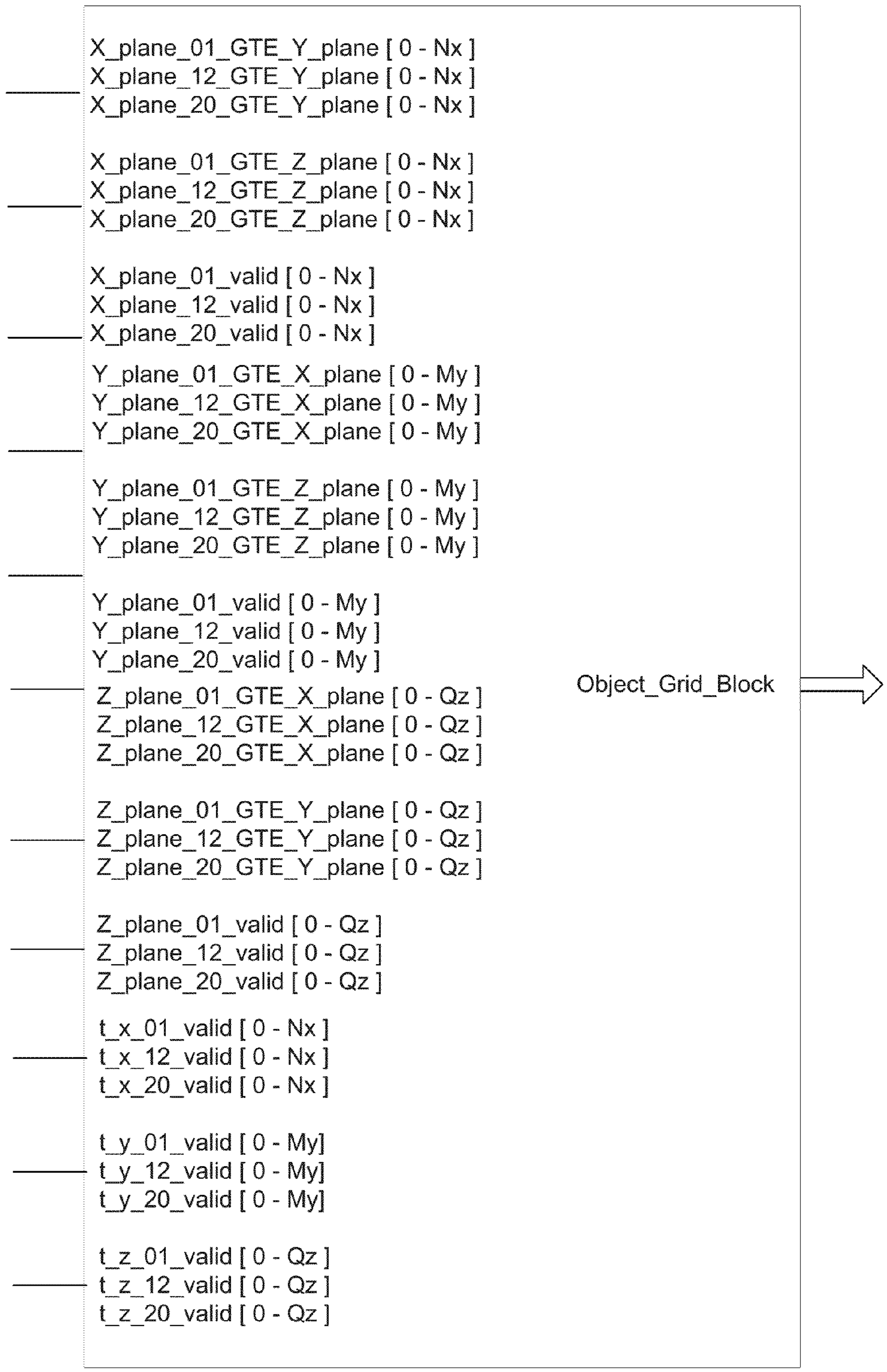

FIG. 33J shows how block 3312 may be implemented with digital logic circuits (rather than software executing on a CPU), using inputs and producing outputs shown in the figure in accordance with the following pseudo-code fragment:

PSEUDO-CODE FRAGMENT XXXVII.

```
// Parallel
For ( i = 0 ; i <= Nx ; i++ )
   If ( X_plane_01_valid [ i ] && t_x_01_valid [ i ] )
      Y_addr = Addr_GTE ( X_plane_01_GTE_Y_plane [ i ] ) ;
      Z_addr = Addr_GTE ( X_plane_01_GTE_Z_plane [ i ] ) ;
      Object_Grid_Block_x [ i , Y_addr, Z_addr ] = 1 ;
   End If
   If ( X_plane_12_valid [ i ] && t_x_12_valid [ i ] )
      Y_addr = Addr_GTE ( X_plane_12_GTE_Y_plane [ i ] ) ;
      Z_addr = Addr_GTE ( X_plane_12_GTE_Z_plane [ i ] ) ;
      Object_Grid_Block_x [ i , Y_addr, Z_addr ] = 1 ;
   End If
   If ( X_plane_20_valid [ i ] && t_x_20_valid [ i ] )
      Y_addr = Addr_GTE ( X_plane_20_GTE_Y_plane [ i ] ;
      Z_addr = Addr_GTE ( X_plane_20_GTE_Z_plane [ i ] ) ;
      Object_Grid_Block_x [ i , Y_addr, Z_addr ] = 1 ;
```

-continued

PSEUDO-CODE FRAGMENT XXXVII.

```
   End If
End For
   For ( i = 0 ; i <= My ; i++ )
      If ( Y_plane_01_valid [ i ] && t_y_01_valid [ i ] )
         X_addr = Addr_GTE ( Y_plane_01_GTE_X_plane [ i ] ) ;
         Z_addr = Addr_GTE ( Y_plane_01_GTE_Z_plane [ i ] ) ;
         Object_Grid_Block_y [ X_addr, i , Z_addr ] = 1 ;
      End If
      If ( Y_plane_12_valid [ i ] && t_y_12_valid [ i ] )
         X_addr = Addr_GTE ( Y_plane_12_GTE_X_plane [ i ] ) ;
         Z_addr = Addr_GTE ( Y_plane_12_GTE_Z_plane [ i ] ) ;
         Object_Grid_Block_y [X_addr, i , Z_addr] = 1 ;
      End If
      If ( Y_plane_20_valid [ i ] && t_y_20_valid [ i ] )
         X_addr = Addr_GTE ( Y_plane_20_GTE_X_plane [ i ] ) ;
         Z_addr = Addr_GTE ( Y_plane_20_GTE_Z_plane [ i ] ) ;
         Object_Grid_Block_y [ X_addr, i , Z_addr ] = 1 ;
      End If
      End For
      For (i = 0 ; i<= Qz ; i++ )
      If ( Z_plane_01_valid [ i ] && t_z_01_valid [ i ] )
         X_addr = Addr_GTE ( Z_plane_01_GTE_X_plane [ i ] ) ;
         Y_addr = Addr_GTE ( Z_plane_01_GTE_Y_plane [ i ] ) ;
         Object_Grid_Block_z [ X_addr, Y_addr, i ] = 1 ;
      End If
      If ( Z_plane_12_valid [ i ] && t_z_12_valid [ i ] )
         X_addr = Addr_GTE ( Z_plane_12_GTE_X_plane [ i ] ) ;
         Y_addr = Addr_GTE ( Z_plane_12_GTE_Y_plane [ i ] ) ;
         Object_Grid_Block_z [ X_addr, Y_addr, i ] = 1 ;
      End If
      If ( Z_plane_20_valid [ i ] && t_z_20_valid [ i ] )
         X_addr = Addr_GTE ( Z_plane_20_GTE_X_plane [ i ] ) ;
         Y_addr = Addr_GTE ( Z_plane_20_GTE_Y_plane [ i ] ) ;
         Object_Grid_Block_z [ X_addr, Y_addr, i ] = 1 ;
      End If
End For
// End Parallel
Object_Grid_Block =     Object_Grid_Block_x   bit-wise OR
                        Object_Grid_Block_y   bit-wise OR
                        Object_Grid_Block_z
```

The module Addr_GTE( ) has been defined above in connection with block 2906 in FIG. 29 and generates the X-, Y-, or Z-component of the cell address of a cell that is bounded by the X-, Y-, or Z-axis partitioning plane indicated by the input parameter to the module. In a particular implementation, the foregoing processing may be implemented using AND gates to provide the IF statements, registers, and the Addr_GTE( ) module has been described above. The notation Object_ Grid_ Block_x refers to a ($N_x$×$M_y$×$Q_z$)-bit-bit array and represents each cell in the given grid in terms of its X-, Y-, and Z-cell address. In particular, Object_Grid_Block_x is a local array that is used to identify cells in terms of the X-axis partitioning planes. Similar arrays Object_Grid_Block_y and Object_ Grid_Block_z are defined, respectively, for the Y- and Z-axis partitioning planes. Object_Grid_Block_x, Object_Grid_ Block_y, and Object_Grid_Block_z are OR'd into Object_ Grid_Block which is a working bitmap that is local to this process. As explained above, Object_Grid_Block is one of five working bitmaps used to construct the block bitmap for the given grid. This concludes the discussion of the edge ray binning 2. Surface Ray Binning for Surface Rays Along X_Planes The description will now turn to a discussion of surface ray binning in accordance with principles of the present disclosure. As explained above, edge ray binning casts edge rays directed along the edges of a triangle to identify dirty cells based on the rays' intersects with the partitioning planes that comprise the given grid. Referring for a moment to FIG. 33G (also FIG. 331), it can be appreciated that some cells may not be identified using edge ray binning. For example, cells 3348 are dirty cells, but will not identified using edge ray binning because the edges of the triangle 3346 do not intersect, within the perimeter of the given grid, any of the partitioning planes that bound those cells. The cells 3348 can be picked up, however, using surface ray binning As explained above, surface ray binning (block 2928, FIG. 29) is another ray casting-based binning module, in addition to edge ray binning Generally, in some embodiments, surface ray binning involves casting rays that originate from one edge of the triangle to the other edges. Surface rays from an edge are cast on the X-, Y-, and Z-partitioning planes that comprise the grid of interest. The X-, Y-, and Z-coordinates of intersection points between the rays and the partitioning planes are determined. For example, the Y- and Z-coordinates of rays cast along an X-partitioning plane that intersect with the Y-partitioning planes are determined; and the Y- and Z-coordinates of rays cast along an X-partitioning plane that intersect with the Z-partitioning planes are determined. The process is repeated for rays cast along the Y-partitioning planes and for ray cast along the Z-partitioning planes.

The X-, Y-, and Z-coordinates of intersection points between the rays and the triangle edges are determined. Using these intersection points, it can be determined if intersection points lie within the grid and within the triangle, thus identifying dirty cells. In a particular embodiment, surface ray processing occurs in three phases: (1) identifying dirty cells by casting rays along the X-axis partitioning planes; (2) identifying dirty cells by casting rays along the Y-axis partitioning planes; and (3) identifying dirty cells by casting rays along the Z-axis partitioning planes.

Figure 34:
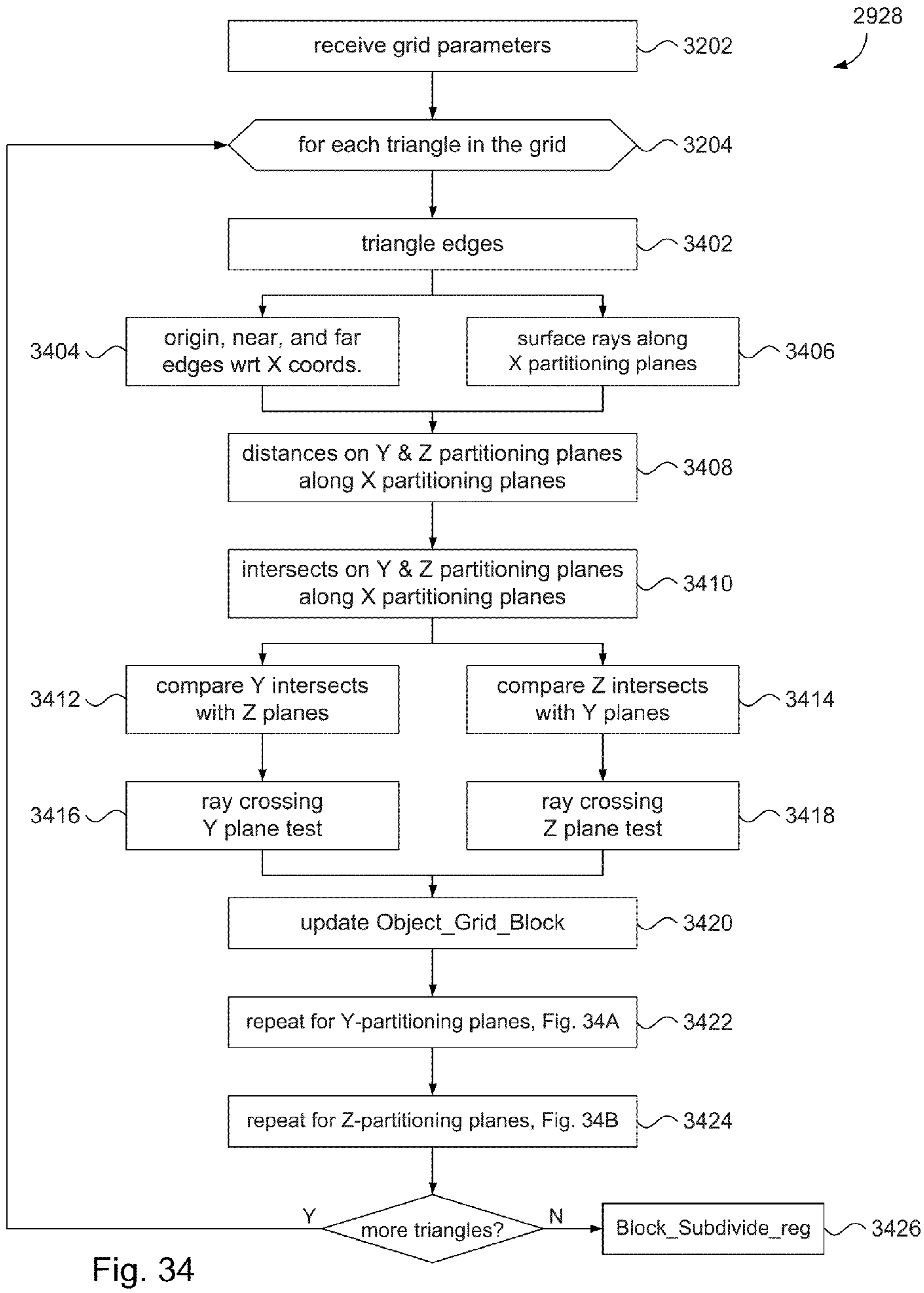
FIGS. 34, 34A, 34B illustrate a high level flow surface ray binning.

This section will describe surface ray processing for rays cast on the X-partitioning planes. Referring now to FIG. 34, surface ray binning may have a common starting point with edge ray binning, namely, the receiving of grid parameters (e.g., block 3202) and the setting up for processing each triangle associated with the given grid (e.g., block 3204).

At block 3402 triangle edges are generated. In some embodiments, the processing in block 3402 may be identical to the processing for generating edge rays in block 3302 (FIG. 33). In the context of surface rays, however, the "ray" aspect of the edges is not relevant. Much of the remainder of FIG. 34 shows details for processing surface rays cast on the X-axis partitioning planes. In blocks 3422 and 3424, processing is also performed for surface rays cast on the Y- and Z-axis partitioning planes, respectively. This aspect of FIG. 34 will be explained in more detail below. The figures and pseudo-code that follow describe the processing of surface rays cast on the X-axis partitioning planes.

a) Get Triangle Origin, Near, and Far Edges

Figures 1, 35A:
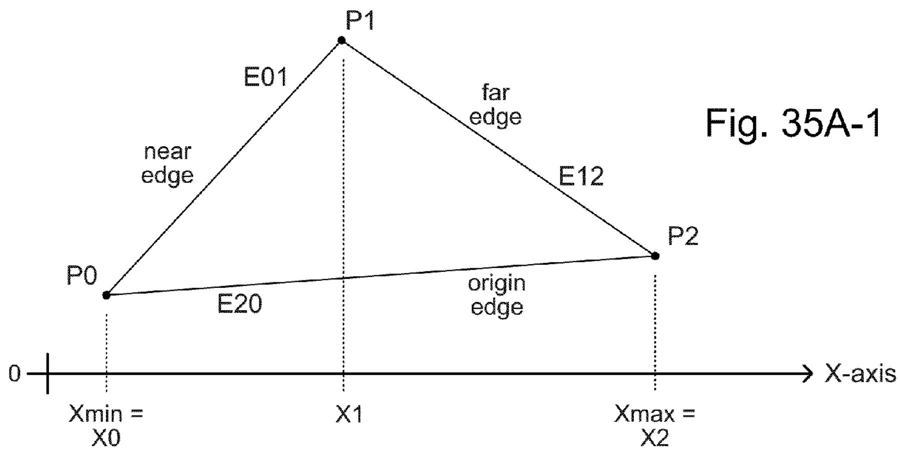
Figures 2, 35A:
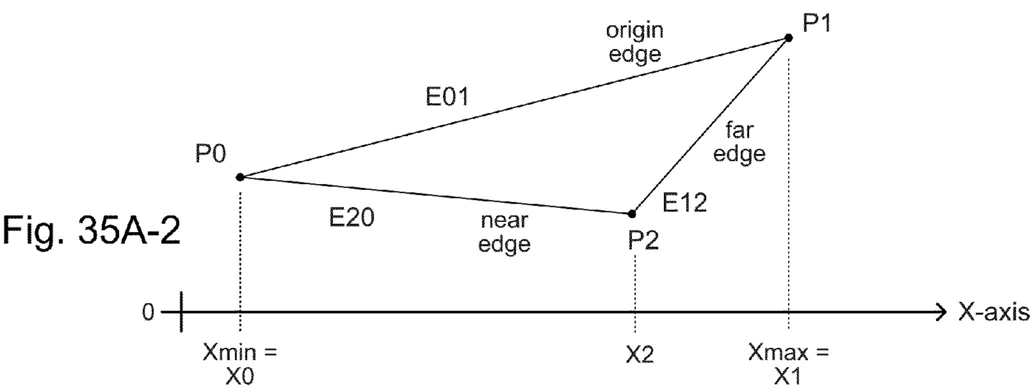

At block 3404, the edges E01, E12, E20 of the triangle are categorized as being an origin edge, a near edge, and a far edge. The origin edge is defined as the edge connecting the min position and the max position vertices, using the X-coordinates of the vertices to define the min and max positions. The near edge is defined from the min position vertex to the mid position vertex, and the far edge is defined from the mid position vertex to the max position vertex. FIG. 35A-1 shows an example of a triangle and its vertices. In this particular example, the min position is at vertex is P0 because the X-coordinate of the P0 vertex is the minimum value among the X-coordinates. Likewise, the max position is at vertex P2. FIG. 35A-2 illustrates another example. In this example, the max position is the P1 vertex. The Xmax_Position and Xmin_Position enumerated values determined at block 2902 may be used to identify the origin, near, and far edges.

Figure 35B:
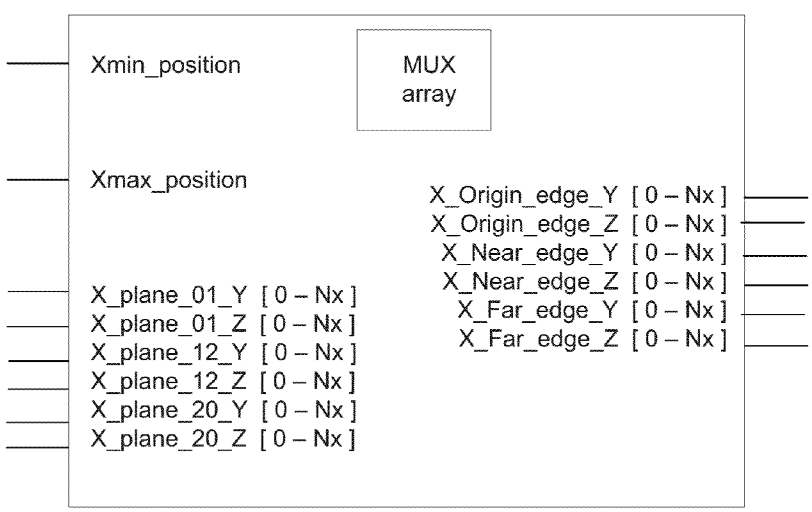

FIG. 35B shows how block 3404 may be implemented using digital logic circuits (rather than software executing on a CPU). In some embodiments, for example, the GTU 1402 (FIG. 14) may be configured to deploy MUX module 1452. The data generated in block 3404 may use inputs and produce outputs shown in FIG. 35B in accordance with the following pseudo-code fragment:

PSEUDO-CODE FRAGMENT XXXVIII.

```
// Edge Enumerated values
// = Edge_01
// = Edge_12
// = Edge_20
If ( Xmin_position == '100' )                    // P0x is Xmin
  If ( Xmax_position == '010' )                  // P1x is Xmax
    X_Origin_edge      = Edge_01
    X_Near_edge        = Edge_20
    X_Far_edge         = Edge_12
  Else
    X_Origin_edge      = Edge_20
    X_Near_edge        = Edge_01
    X_Far_edge         = Edge_12
Else If ( Xmin_position == '010' )               // P1x is Xmax
  If ( Xmax_position == '100' )                  // P0x is Xmax
    X_Origin_edge      = Edge_01
    X_Near_edge        = Edge_12
    X_Far_edge         = Edge_20
  Else
    X_Origin_edge      = Edge_12
    X_Near_edge        = Edge_01
    X_Far_edge         = Edge_20
Else If ( Xmin_position == '001' )               // P2x is Xmin
  If ( Xmax_position == '100' )                  // P0x is Xmax
    X_Origin_edge      = Edge_20
    X_Near_edge        = Edge_12
    X_Far_edge         = Edge_01
  Else
    X_Origin_edge      = Edge_12
    X_Near_edge        = Edge_20
    X_Far_edge         = Edge_01
End If
// Parallel Mux
If ( X_Origin_edge == Edge_01 )
  X_Origin_edge_Y [ 0 - Nx ] = X_plane_01_Y [ 0 - Nx ]
  X_Origin_edge_Z [ 0 - Nx ] = X_plane_01_Z [ 0 - Nx ]
Else If ( X_Origin_edge == Edge_12 )
  X_Origin_edge_Y [ 0 - Nx ] = X_plane_12_Y [ 0 - Nx ]
  X_Origin_edge_Z [ 0 - Nx ] = X_planei2_Z [ 0 - Nx ]
Else If ( X_Origin_edge == Edge_20 )
  X_Origin_edge_Y [ 0 - Nx ] = X_plane_20_Y [ 0 - Nx ]
  X_Origin_edge_Z [ 0 - Nx ] = X_plane_20_Z [ 0 - Nx ]
If ( X_Near_edge == Edge_01)
  X_Near_edge_Y [ 0 - Nx ] = X_plane_01_Y [ 0 - Nx ]
  X_Near_edge_Z [ 0 - Nx ] = X_plane_01_Z [ 0 - Nx ]
Else If ( X_Near_edge == Edge_12 )
  X_Near_edge_Y [ 0 - Nx ] = X_plane_12_Y [ 0 - Nx ]
  X_Near_edge_Z [ 0 - Nx ] = X_planei2_Z [ 0 - Nx ]
Else If ( X_Near_edge == Edge_20 )
  X_Near_edge_Y [ 0 - Nx ] = X_plane_20_Y [ 0 - Nx ]
  X_Near_edge_Z [ 0 - Nx ] = X_plane_20_Z [ 0 - Nx ]
If ( X_Far_edge == Edge_01)
  X_Far_edge_Y [ 0 - Nx ] = X_plane_01_Y [ 0 - Nx ]
  X_Far_edge_Z [ 0 - Nx ] = X_plane_01_Z [ 0 - Nx ]
Else If ( X_Far_edge == Edge_12 )
  X_Far_edge_Y [ 0 - Nx ] = X_planei2_Y [ 0 - Nx ]
  X_Far_edge_Z [ 0 - Nx ] = X_plane_12_Z [ 0 - Nx ]
Else If ( X_Far_edge == Edge_20 )
  X_Far_edge_Y [ 0 - Nx ] = X_plane_20_Y [ 0 - Nx ]
  X_Far_edge_Z [ 0 - Nx ] = X_plane_20_Z [ 0 - Nx ]
// End Parallel
```

As mentioned above, the notation X_plane__01_Y[0-Nx] represents an array of Y-coordinates of the intersection points between the edge ray E01, and likewise for the remaining similarly named arrays. These arrays are categorized as being associated with the origin, near, or far edges of the triangle.

b) Find Triangle Surface Rays on Partitioning Planes

Figure 35C:
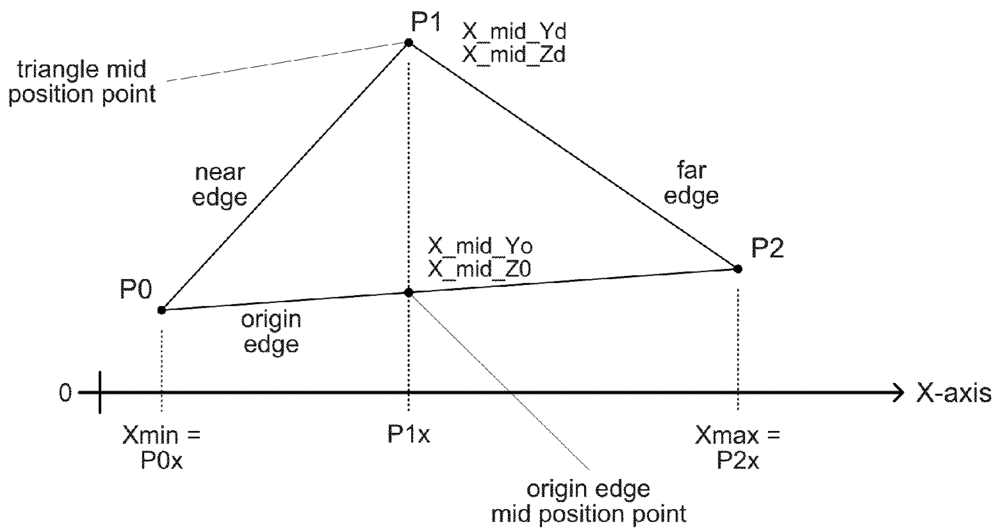
Figure 35D:
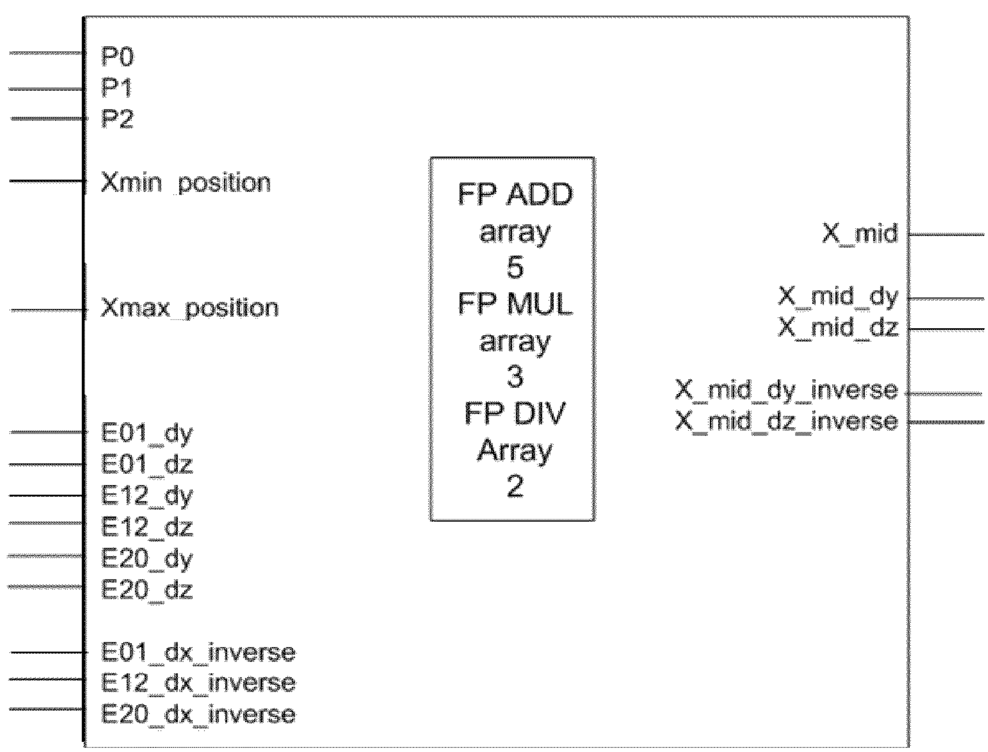

At block 3406 the origin edge mid position point can be generated. Referring to FIG. 35C, the origin edge mid position point is a point on the origin edge and is derived from the triangle mid position point, which in the example shown in FIG. 35C is vertex P1. The X-coordinate of the origin edge mid position point is taken from the triangle mid position point, and the Y- and Z-coordinates are generated. FIG. 35D shows how block 3406 may be implemented using digital logic circuits (rather than software executing on a CPU). In some embodiments, for example, the GTU 1402 may be configured to deploy the divider module 1432, the adder module 1434, and the multiplier module 1436. The data generated in block 3406 may use inputs and produce outputs shown in FIG. 35D in accordance with the following pseudo-code fragment:

PSEUDO-CODE FRAGMENT XXXIX.

```
// Parallel
Xmid_position      = NOT( Xmin_position OR Xmax_position )
If ( Xmid_position == '100' ) // P0 is Xmid, Edge 12 is the origin edge
   X_mid           = P0x;
   X_mid_Yd        = P0y;
   X_mid_Zd        = P0z;
   // X_mid = F1x + ( t_mid_x * E12_dx )
   // X_mid − P1x = t_mid_x * E12_dx
   t_mid_x         = ( X_mid − P1x ) * E12_dx_inverse
   X_mid_Yo        = P1y + ( t_mid_x * E12_dy )
   X_mid_Zo        = P1z + ( t_mid_x * E12_dz )
Else If ( Xmid_position == '010') // P1 is Xmid, Edge 20 is the origin edge
   X_mid           = P1x;
   X_mid_Yd        = P1y;
   X_mid_Zd        = P1z;
   t_mid_x         = ( X_mid − P2x) * E20_dx_inverse;
   X_mid_Yo        = P2y + ( t_mid_x * E20_dy )
   X_mid_Zo        = P2z + ( t_mid_x * E20_dz )
Else // ( Xmid_position == '001') // P2 is Xmid, Edge 01 is the origin edge
   X_mid           = P2x;
   X_mid_Yd        = P2y;
   X_mid_Zd        = P2z;
   t_mid_x         = ( X_mid − P0x) * E01_dx_inverse;
   X_mid_Y0        = P0y + ( t_mid_x * E01_dy )
   X_mid_Z0        = P0z + ( t_mid_x * E01_dz )
End If
// End Parallel
// Parallel
X_mid_dy = X_mid_Yd − X_mid_Yo;
X_mid_dz = X_mid_Zd − X_mid_Zo;
// End Parallel
// 2 divides
// Parallel
X_mid_dy_inverse = 1 / X_mid_dy;
X_mid_dz_inverse = 1 / X_mid_dz;
// End Parallel
```

The enumerated values for representing the triangle vertices introduced in block 2902 above make it the determination of the mid position point simply a matter of a bit-wise inversion of an Or'ing of the enumerated values that represent the min position point and max position point.

c) Get Distance of Ray Intersection Y & Z_Planes Along X_Planes

Figure 35E:
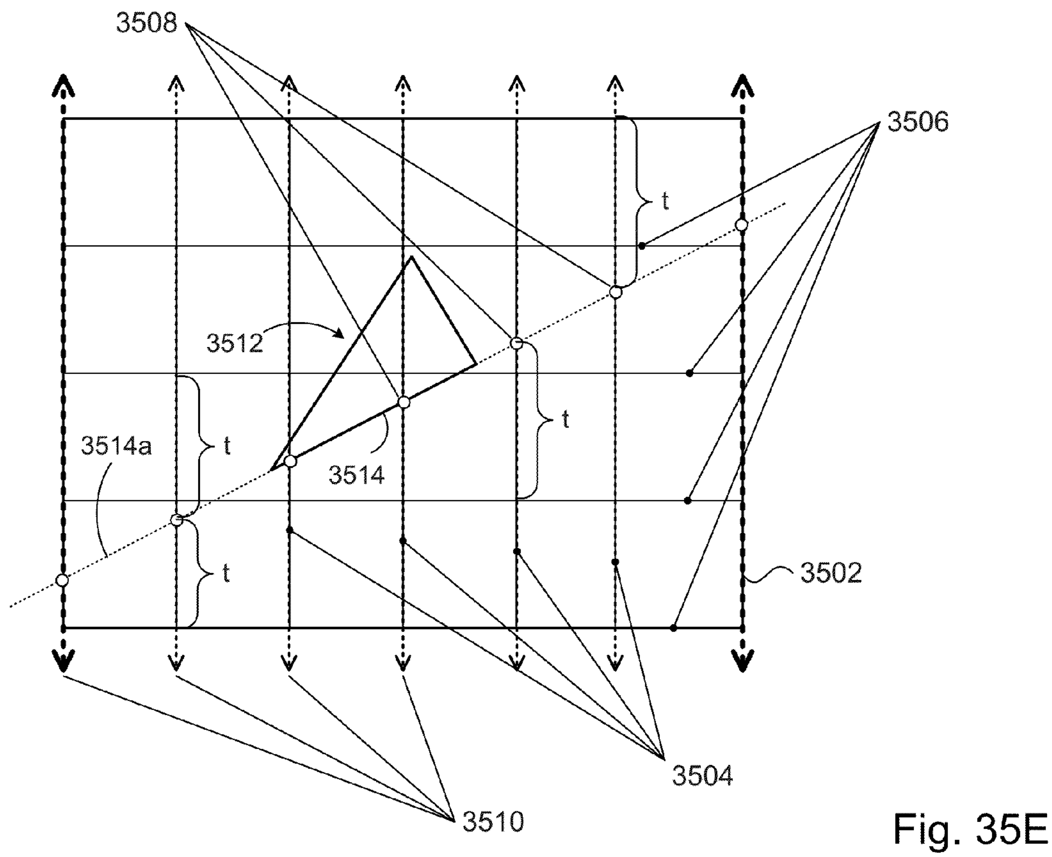

Block 3408 generates ray distances of rays cast along each of the X-axis partitioning planes, originating on the origin edge to where the rays cross each of the Y- and Z-axis partitioning planes ("ray crossings"). Referring to FIG. 35E, an example of a grid 3502 and its X- and Y-axis partitioning planes 3504, 3506 are shown. The origin edge 3514 of triangle 3512 is shown. An extended origin edge **3514*a* extends the origin edge 3514 to pass through all the X-axis partitioning planes 3504. Rays 3510 originating from the extended origin edge 3514*a* are cast along the X-axis partitioning planes 3504** in the positive and negative direction. The ray distance t between the origin and the intersection point with each Y-axis partitioning plane can be generated. A similar set of distances can be generated for the Z-axis partitioning planes.

Figure 35F:
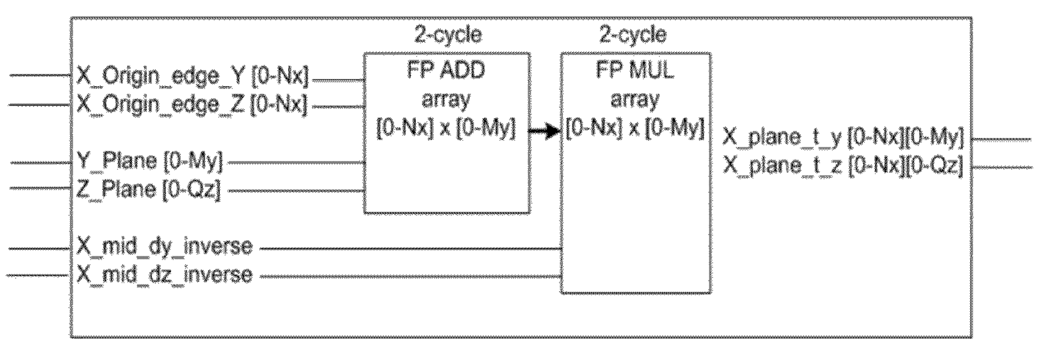

FIG. 35F shows how block 3408 may be implemented using digital logic circuits (rather than software executing on a CPU). In some embodiments, for example, the GTU 1402 may be configured to deploy the adder module 1434 and the multiplier module 1436. The data generated in block 3408 may use inputs and produce outputs shown in FIG. 35F in accordance with the following pseudo-code fragment:

PSEUDO-CODE FRAGMENT XL.

```
// Parallel 2-cycle
For ( i = 0 ; i <= Nx ; i++)
   For ( j = 0 ; j <= My ; j++)
      X_plane_t_y [ i ] [ j ] =
         ( Y_plane [ j ] − X_Origin_edge_Y [ i ] ) * X_mid_dy_inverse
   For ( j = 0 ; k <= Qz ; j++)
      X_plane_t_z [ i ] [ k ] =
         ( Z_plane [ k ] − X_Origin_edge_Z [ i ] ) * X_mid_dz_inverse
End For
// End Parallel
```

The notation X_plane_t_y[i][j] represents an array of distance values, for each ray that is cast along an X-axis partitioning plane i, from the origin edge to a Y-axis partitioning plane j ("ray-crossing Y-plane"). The distance between the ray origin and the Y-axis partitioning plane is stored in X_plane_t_y[i][j]. Likewise for the array X_plane_t_z [i][k], which stores distance values to ray-crossing Z-planes.

d) Get Points for Ray on Y_Planes and Z_Planes Along X_Planes

Figure 35G:
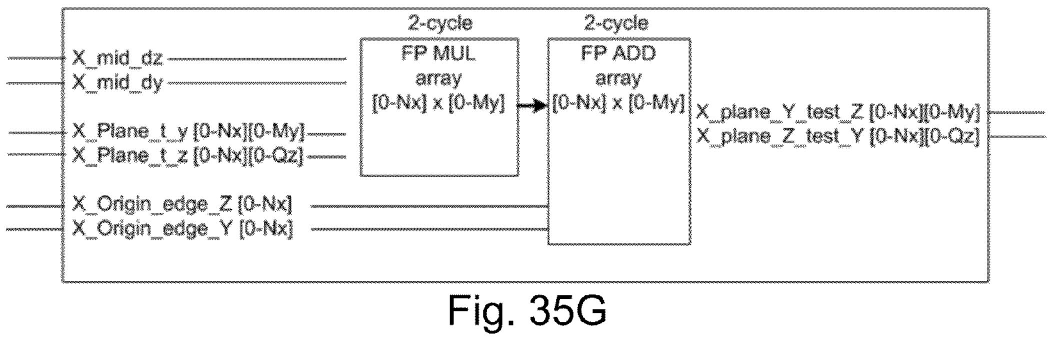

At block 3410, the Y-coordinates where rays cross the Z-axis partitioning planes are generated. Also, the Z-coordinates where rays cross the Y-axis partitioning planes are generated. FIG. 35G shows how block 3410 may be implemented using digital logic circuits (rather than software executing on a CPU). In some embodiments, for example, the GTU 1402 may be configured to deploy the adder module 1434 and the multiplier module 1436. The data generated in block 3410 may use inputs and produce outputs shown in FIG. 35G in accordance with the following pseudo-code fragment:

PSEUDO-CODE FRAGMENT XLI.

```
// Parallel 2-cycle
For ( i = 0 ; i <= Nx ; i++)
   For ( j = 0 ; j <= My ; j++)
      X_plane_Y_test_Z [ i ] [ j ] =
         X_Origin_edge_Z [ i ] + ( X_Plane_t_y [ i ] [ j ] * X_mid_dz )
   For ( j = 0 ; k <= Qz ; j++)
      X_plane_Z_test_Y [ i ] [ k ] =
         X_Origin_edge_Y [ i ] + ( X_Plane_t_z [ i ] [ k ] * X_mid_dy )
End For
// End Parallel
```

The notation X_plane_Y_test_Z[i][j] refers to an array of Z-axis coordinate values. More particularly, a ray that is cast along an X-axis partitioning plane i intersects a Y-axis partitioning plane j. The Z-coordinate of that intersection point can be generated and stored in X_plane_Y_test_Z[i][j]. Likewise for X_plane_Z_test_Y[i][k] array, which stores the Y-coordinate of an intersection point of a ray cast along the $i^{th}$ X-axis partitioning plane with the $k^{th}$ Z-axis partitioning plane.

e) Compare Y_Plane Intersections with Z_Planes

Figure 35H:
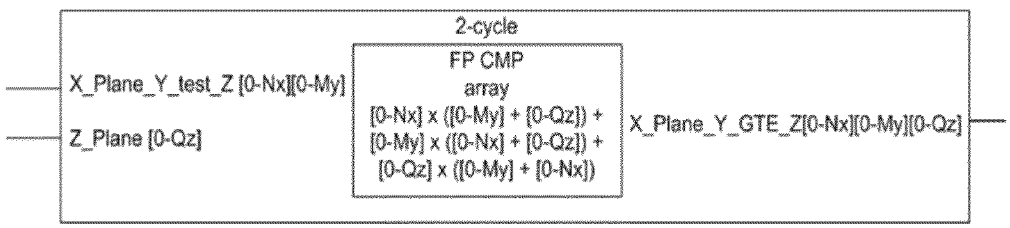

At block 3412, the Z-coordinates of the intersects at the ray-crossing Y-planes are compared to the Z-axis partitioning planes (Z_Plane[0-Qz]). FIG. 35H shows how block 3412 may be implemented using digital logic circuits (rather than software executing on a CPU). In some embodiments, for example, the GTU 1402 may be configured to deploy one of the comparator modules 1438*a-c*. The data generated in block 3412 may use inputs and produce outputs shown in FIG. 35H in accordance with the following pseudo-code fragment:

PSEUDO-CODE FRAGMENT XLII.
f) Compare Z_Plane Intersections with Y_Planes

```
// Parallel 2-cycle
X_plane_Y_GTE_Z [ 0 – Nx ] [ 0 – My ] [ 0 – Qz ] = 0
For ( i = 0 ; i <= Nx ; i++)
  For ( j = 0 ; j <= My ; j++)
    For ( k = 0; k <= Qz; k++)
      If ( X_plane_Y_test_Z [ i ] [ j ] >= Z_Plane [ k ] )
        X_plane_Y_GTE_Z [ i ] [ j ] [ k ] = 1 ;
// End Parallel
```

Figure 35I:
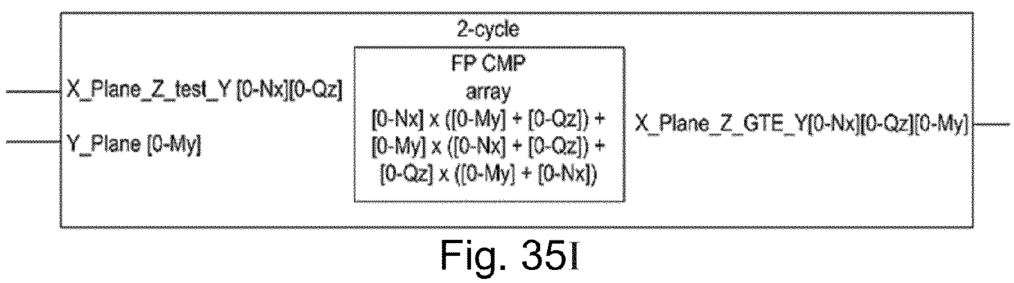

At block 3414 the Y-coordinates of the intersects at the ray-crossing Z-planes are compared to the Y-axis partitioning planes (Y_Plane[0-My). FIG. 35I shows how block 3414 may be implemented using digital logic circuits (rather than software executing on a CPU). In some embodiments, for example, the GTU 1402 may be configured to deploy one of the comparator modules 1438*a-c*. The data generated in block 3414 may use inputs and produce outputs shown in FIG. 35I in accordance with the following pseudo-code fragment:

PSEUDO-CODE FRAGMENT XLIII.
g) Ray Crossing Y_Plane Test

```
// Parallel 2-cycle
X_plane_Z_GTE_Y [ 0 – Nx ] [ 0 – My ] [ 0 – Qz ] = 0
For ( i = 0 ; i <= Nx ; i++)
  For ( j = 0 ; j <= Qz ; j++)
    For ( k = 0; k <= My; k++)
      If ( X_plane_Z_test_Y [ i ] [ j ] >= Y_Plane [ k ] )
        X_plane_Z_GTE_Y [ i ] [ j ] [ k ] = 1 ;
// End Parallel
```

Figure 35J:
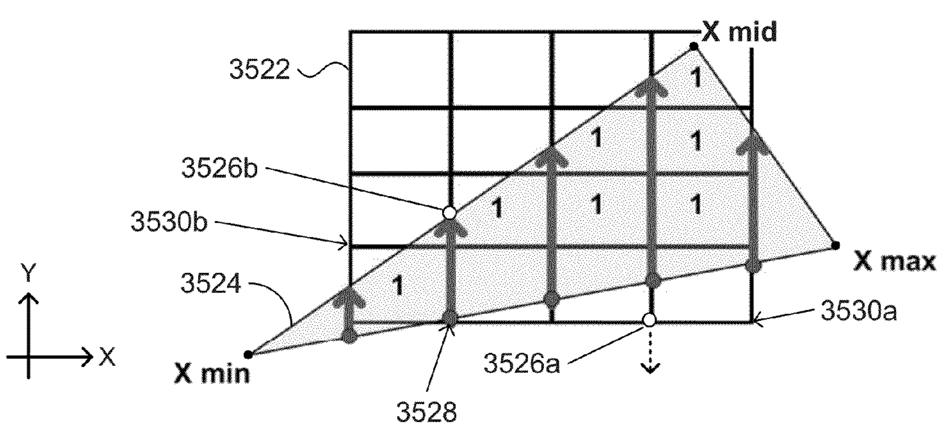

At block 3416, for each intersection point (ray crossing intersection) where a ray cast along an X-axis partitioning plane crosses a Y-axis partitioning plane, a cell address is produced and a corresponding a dirty bit is set in the working bitmap if that intersection point lies within the triangle. In some embodiments, a test is made to determine if the intersection point is located behind the origin edge of the triangle; for example, by testing for a negative distance value. Referring to FIG. 35J, for example, point 3526*a* represents an intersection of a ray cast from the origin edge (defined between X min and X max) of triangle 3524 to a Y-axis partitioning plane 3530*a* that is behind the origin edge; the distance from the origin edge to the plane 3530*a* is negative.

A subsequent test may be made to determine whether the intersection point lies within the grid 3522; for example by testing the Z coordinate at the intersection point against the coordinates of the first and last Z-axis partitioning planes. Though the Z-axis is not shown in FIG. 35J, an intersection point that is outside of the grid 3522 would be in front of the grid or behind the grid.

At this point, we know the ray is in front of the origin edge and within the grid. We now use the intersection of the ray with the near edge or the far edge of the triangle to identify the Y-axis partitioning plane that bounds that intersection. Referring to FIG. 35J, point 3526*b* is an intersection of a ray (cast along X-axis partitioning plane 3228) with the near edge (defined between X min and X mid). The intersection 3526*b* is bounded by Y-axis partitioning plane 3230*b* and thus inside the triangle 3524.

Figure 35K:
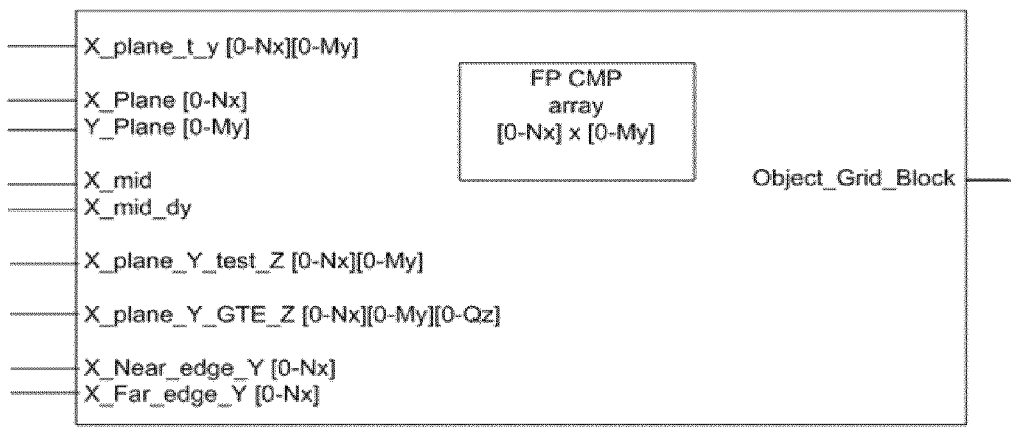

FIG. 35K shows how block 3416 may be implemented using digital logic circuits (rather than software executing on a CPU). In some embodiments, for example, the GTU 1402 may be configured to deploy one of the comparator modules 1438*a-c*. The data generated in block 3416 may use inputs and produce outputs shown in FIG. 35K in accordance with the following pseudo-code fragment:

PSEUDO-CODE FRAGMENT XLIV.

```
// Parallel 2-cycle
For ( i = 0 ; i <= Nx ; i++)
  For ( j = 0 ; j <= My ; j++)
    If ( ( X_plane_t_y [ i ] [ j ] > 0 ) // NOT behind X_Origin_edge_Y ori-
gin
      && ( X_plane_Y_test_Z [ i ] [ j ] >= Z_Plane [ 0 ] )
      && ( X_plane_Y_test_Z [ i ] [ j ] <= Z_Plane [ Qz ] ) )
      // Z_Value in Grid
      // account for boundary conditions
      If ( i == Nx ) X_addr = Nx – 1;
        Else X_addr = i ;
      If ( j == My ) Y_addr = My – 1;
        Else Y_addr = j ;
      If ( X_plane [ i ] < X_mid )
        If ( X_mid_dy >= 0 )
          If ( Y_Plane [ j ] < X_Near_edge_Y [ i ] ) // inside triangle
            Z_addr = Addr_GTE (X_plane_Y_GTE_Z [ i ] [ j ]
            [ 0 – Qz ]) ;
            Object_Grid_Block [ X_addr , Y_addr, Z_addr ] = 1 ;
            // set dirty bit
        Else // ( X_mid_dy < 0 )
          If ( Y_Plane [ j ] > X_Near_edge_Y [ i ] ) // inside triangle
            Z_addr = Addr_GTE (X_plane_Y_GTE_Z [ i ] [ j ]
            [ 0 – Qz ] ) ;
            Object_Grid_Block [ X_addr , Y_addr, Z_addr ] = 1 ;
            // set dirty bit
      Else // ( X_plane [ i ] >= X_mid )
        If ( X_mid_dy >= 0 )
          If ( Y_Plane [ j ] <X_Far_edge_Y [ i ] ) // inside triangle
            Z_addr = Addr_GTE (X_plane_Y_GTE_Z [ i ] [ j ]
            [ 0 – Qz ] ) ;
            Object_Grid_Block [ X_addr , Y_addr, Z_addr ] = 1 ;
            // set dirty bit
        Else // ( X_mid_dy < 0 )
          If ( Y_Plane [ j ] >X_Far_edge_Y [ i ] ) // inside triangle
            Z_addr = Addr_GTE (X_plane_Y_GTE_Z [ i ] [ j ]
            [ 0 – Qz ] ) ;
            Object_Grid_Block [ X_addr , Y_addr, Z_addr ] = 1 ;
            // set dirty bit
      End If
    End If
  End For
End For
// End Parallel
```

Since the For loops are iterated for each X- and Y-axis partitioning plane, we know the X- and Y-coordinates of the ray crossing intersection are within the grid, so we need only test the Z-coordinate of the ray crossing intersection. The tests X_plane [i]<X_mid and X_plane [i]>=X_mid determine whether to consider intersections with the near edge or the far edge. Object_Grid_Block is a working bitmap that is local to this process. As explained above, Object_Grid_Block is one of five working bitmaps used to construct the block bitmap for the given grid.

h) Ray Crossing Z_Plane Test

Figure 35L:
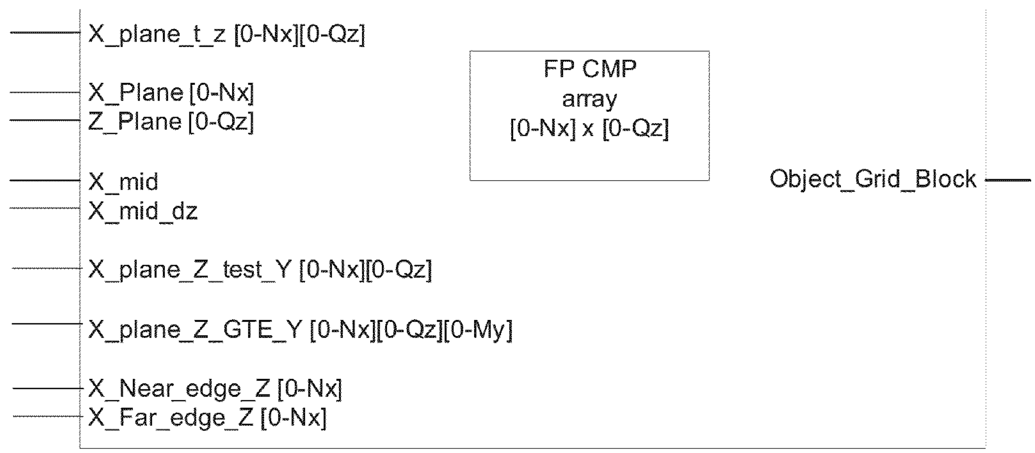

At block 3418 a similar operation is performed as in block 3416, but for the Z-axis partitioning planes, where a ray cast along an X-axis partitioning plane intersects a Z-axis partitioning plane. Accordingly, the above discussion applies, but with references to Y and Z swapped. FIG. 35L shows how block 3418 may be implemented using digital logic circuits (rather than software executing on a CPU). In some embodiments, for example, the GTU 1402 may be configured to deploy one of the comparator modules 1438*a-c*. The data generated in block 3418 may use inputs and produce outputs shown in FIG. 35L in accordance with the following pseudo-code fragment:

PSEUDO-CODE FRAGMENT XLV.

```
// Parallel 2-cycle
For ( i = 0 ; i <= Nx ; i++)
  For ( j = 0 ; j <= My ; j++)
    If ( ( X_plane_t_z [ i ] [ j ] > 0 ) // NOT behind
    X_Origin_edge_Y origin
      && ( X_plane_Z_test_Y [ i ] [ j ] >= Y_Plane [ 0 ] )
      && ( X_plane_Z_test_Y [ i ] [ j ] <= Y_Plane [ My ] ) )
      // Y_Value in Grid
      If ( i == Nx ) X_addr = Nx − 1;
        Else X_addr = i ;
      If ( j == Qz ) Z_addr = Qz − 1;
        Else Z_addr = j ;
      If ( X_plane [ i ] < X_mid )
        If ( X_mid_dz >= 0 )
          If ( Z_Plane [ j ] < X_Near_edge_Z [ i ] ) // inside triangle
            Y_addr = Addr_GTE (X_plane_Z_GTE_Y [ i ] [ j ]
            [ 0 – My ]) ;
            Object_Grid_Block [ X_addr , Y_addr, Z_addr ] = 1 ;
            // set dirty bit
        Else // ( X_mid_dz < 0 )
          If ( Z_Plane [ j ] > X_Near_edge_Z [ i ] ) // inside triangle
            Y_addr = Addr_GTE (X_plane_Z_GTE_Z [ i ] [ j ]
            [ 0 – My ] ) ;
            Object_Grid_Block [ X_addr , Y_addr, Z_addr ] = 1 ;
            // set dirty bit
      Else // ( X_plane [ i ] >= X_mid )
        If ( X_mid_dz >= 0 )
          If ( Z_Plane [ j ] <X_Far_edge_Z [ i ] ) // inside triangle
            Z_addr = Addr_GTE (X_plane_Z_GTE_Z [ i ] [ j ]
            [ 0 – My ] ) ;
            Object_Grid_Block [ X_addr , Y_addr, Z_addr ] = 1 ;
            // set dirty bit
        Else // ( X_mid_dz < 0 )
          If ( Z_Plane [ j ] >X_Far_edge_Z [ i ] ) // inside triangle
            Z_addr = Addr_GTE (X_plane_Z_GTE_Z [ i ] [ j ]
            [ 0 – My ] ) ;
            Object_Grid_Block [ X_addr , Y_addr, Z_addr ] = 1 ;
            // set dirty bit
      End If
    End If
  End For
End For
// End Parallel
```

Object_Grid_Block is a working bitmap that is local to this process. As explained above, Object_Grid_Block is one of five working bitmaps used to construct the block bitmap for the given grid, which will now be discussed.

i) Update Object_Grid_Block

Figure 35M:
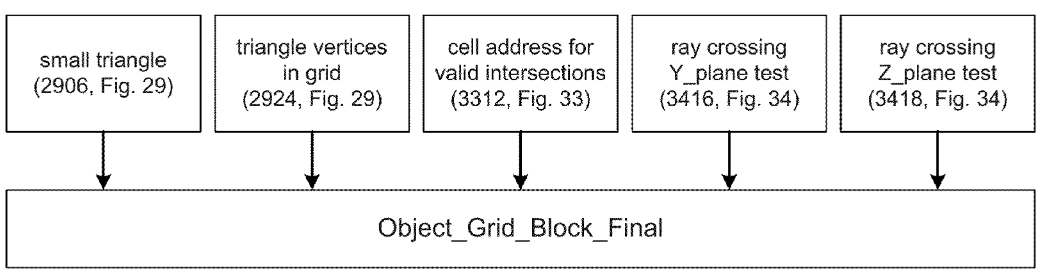

At block 3420, the Object_Grid_Block working bitmaps that are local to blocks 2906, 2924, 3312, 3416, and 3418 are bit-wise OR'd together as illustrated in FIG. 35M. The result is a bitmap Object_Grid_Block_Final containing dirty bits corresponding to dirty cells that were identified by casting surface rays on the X-axis partitioning planes. The operation performed by block 3420 may proceed in accordance with the following pseudo-code fragment:

PSEUDO-CODE FRAGMENT XLVI.

```
Object_Grid_Block_Final = Object_Grid_Block bit-wise-OR  // local to block 2906
                          Object_Grid_Block bit-wise-OR  // local to block 2924
                          Object_Grid_Block bit-wise-OR  // local to block 3312
                          Object_Grid_Block bit-wise-OR  // local to block 3416
                          Object_Grid_Block              // local to block 3418
```

In some embodiments, the Object_Grid_Block working bitmaps may be stored in hardware registers. The bit-wise OR function can be realized using an OR'ing circuit to OR together the separate Object_Grid_Block registers.

The foregoing processing in blocks 3404-3420 have been described with respect to casting surface rays on the X-axis partitioning planes. In accordance with the present disclosure, the foregoing processing is repeated for surface rays cast on the Y-axis partitioning planes and again for surface rays cast on the Z-axis partitioning planes.

3. Repeat for Surface Rays Along Y_Planes

Figure 34A:
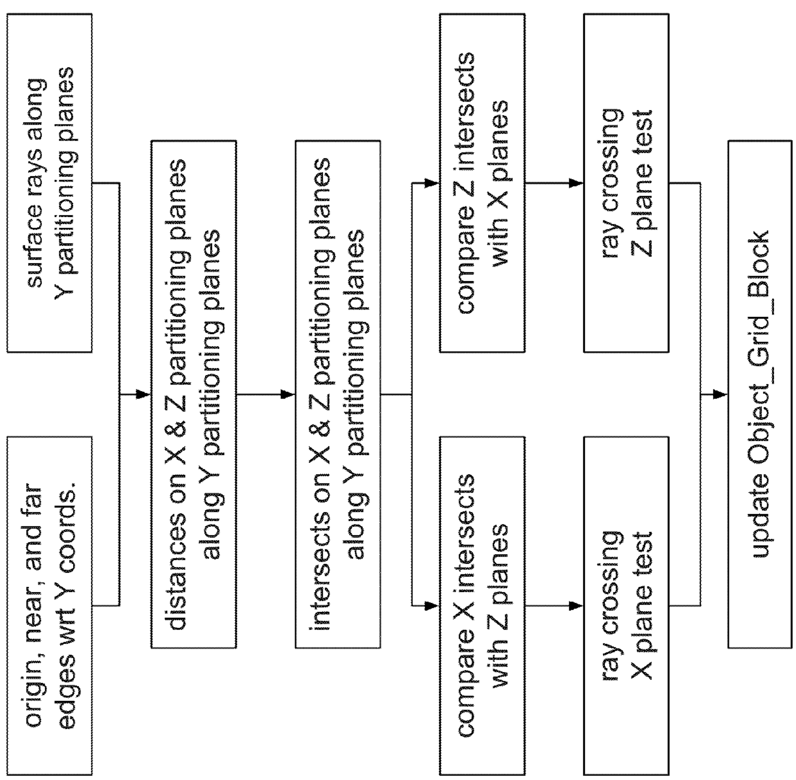

Accordingly, at block 3422, the processing in blocks 3404-3420 is repeated for surface rays cast in the Y-axis partitioning planes. When processing blocks 3404-3418 for surface rays cast in the Y-axis partitioning planes, one of ordinary skill will appreciate that all X and Y references made in blocks 3404-3418 and their corresponding figures and pseudo-code would be interchanged accordingly. For example, the origin, near, and far edge definitions (e.g., FIG. 35A-1) would be defined using the Y-coordinates of the triangle vertices P0, P1, P2. As another example, the inverse value operations made in block 3406:

X_mid_dy_inverse=1/X_mid_dy;
X_mid_dz_inverse=1/X_mid_dz;

would become the following:

Y_mid_dx_inverse=1/Y_mid_dx;
Y_mid_dz_inverse=1/Y_mid_dz;

and so on. FIG. 34A illustrates the casting of rays in the Y-axis partitioning planes.

Processing at block 3420 for surface rays cast along the Y-axis partitioning plane may set Object_Grid_Block_Final with additional dirty bits corresponding to identified dirty cells. It is noted that some or all of the dirty cells identified by casting surface rays in the Y-axis partitioning planes may have been already identified by casting rays in the X-axis partitioning planes.

4. Repeat for Surface Rays Along Z_Planes

At block 3424, the processing in blocks 3404-3420 is repeated for surface rays cast in the Z-axis partitioning planes. When processing blocks 3404-3418 for surface rays cast in the Z-axis partitioning planes, one of ordinary skill will appreciate that all X and Z references made in blocks 3404-3418 and their corresponding figures and pseudo-code would be interchanged accordingly. Processing at block 3420 for surface rays cast along the Z-axis partitioning plane may set Object_Grid_Block_Final with additional dirty bits corresponding to identified dirty cells.

Figure 34B:
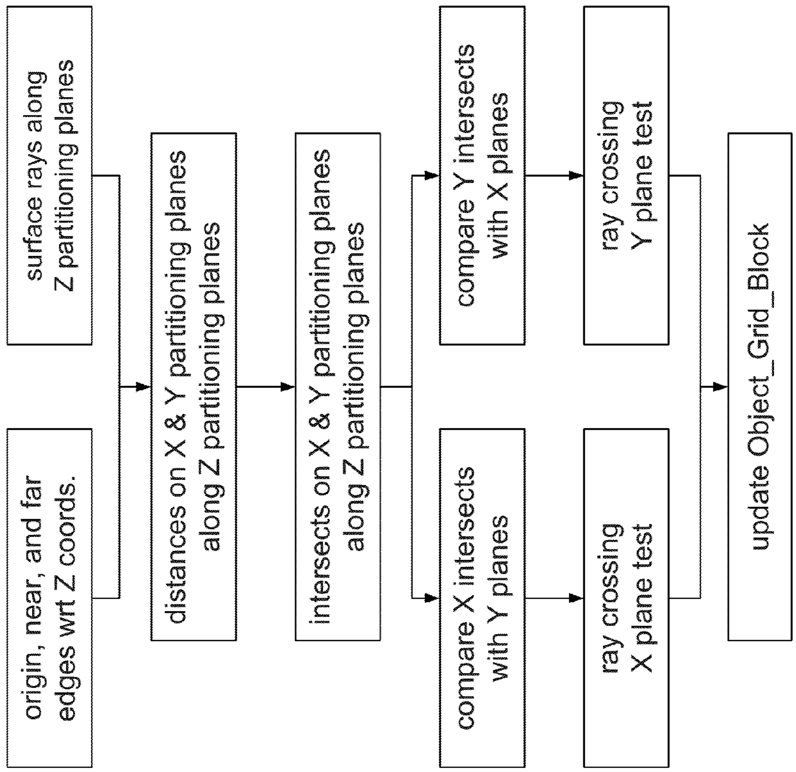

It is noted that some or all of the dirty cells identified by casting surface rays in the Z-axis partitioning planes may have been already identified by casting rays in the X-axis partitioning planes and/or by casting rays in the Y-axis partitioning planes. FIG. 34B illustrates the casting of rays in the Z-axis partitioning planes.

5. Load Block_Subdivide_reg

At block 3426, the triangle has been binned into the cells that comprise the grid of interest. Object_grid_block_final has it dirty bits identified. Accordingly, the bits stored in Object_grid_block_final are loaded into the Block_Subdivide register 236.

The foregoing modules use 15 divides; 9 divides in block 3302 and 2 divides in block 3406, each, for rays cast in the X-, Y-, and Z-partitioning planes. In a particular hardware implementation, only one floating point divider can be used as long as a new input triangle can be applied on each cycle (pipeline processing). In some embodiments this can be a relevant design consideration, since floating point divider circuits are typically much more costly in terms of circuit complexity and die area than other circuits such as comparators. So, with a single divider, we have 15 effective cycles for 15 divides. As the pipe fills, other stages in the module will be performed in parallel and concurrently. Using the existing resources from the Grid Traversal Engine would allow for worst case binning to a 512 cell Grid in effectively 16 cycles. An implementation using 16 Grid Traversal Engines would allow binning to a 512 cell Grid in effectively 1 cycle.

II. Packet Binning

The foregoing discussion of triangle binning represents an example of "spatial binning," which organizes triangles from the top down. In accordance with the present disclosure, "packet binning" is a storage technique that organizes triangles from the bottom up. Advantages of packet binning include:

- the triangle data need only be touched (accessed) once for any level of the hierarchy
- the data packets can be written in linear contiguous order, thereby reducing latency Triangle binning is concerned with identifying triangles with cells of a grid at a given level. In triangle binning, each triangle has been placed into one or more logical "bins," where a bin corresponds to a cell. Packet binning concerns how the triangle data is actually stored.

In accordance with some embodiments, packet binning operates on units of storage called a "data packet," which is defined as the data that is stored in a bin. Consider, for example, an implementation where a grid comprises 512 cells, and thus requires 512 corresponding bins. If the implementation stores the 512 bins in 4 MB of memory, then the size of the data packet for each bin is 8 KB. If a triangle uses 64B of data to describe the triangle, then each data packet can hold data for 128 triangles. Stated in another way, a data packet is needed to store the data for every 128 triangles binned in a given cell. If more than 128 triangles are binned into a cell, then additional data packets are allocated for that bin (cell).

Packet binning is concerned with the storage and management of data packets for each bin. When a bin fills, the data packet for that bin is written out to memory in linear contiguous order. The memory may be any suitable configuration of off-chip memory. In some embodiments, the data packets may be buffered for longer burst transfers to off-chip memory. As will be explained in more detail below, in order to manage the data packets for each bin, a "pointer packet" may be defined. Pointer packets, in turn, may be treated as data and stored in data packets in order to represent large numbers of triangles.

Figure 36:
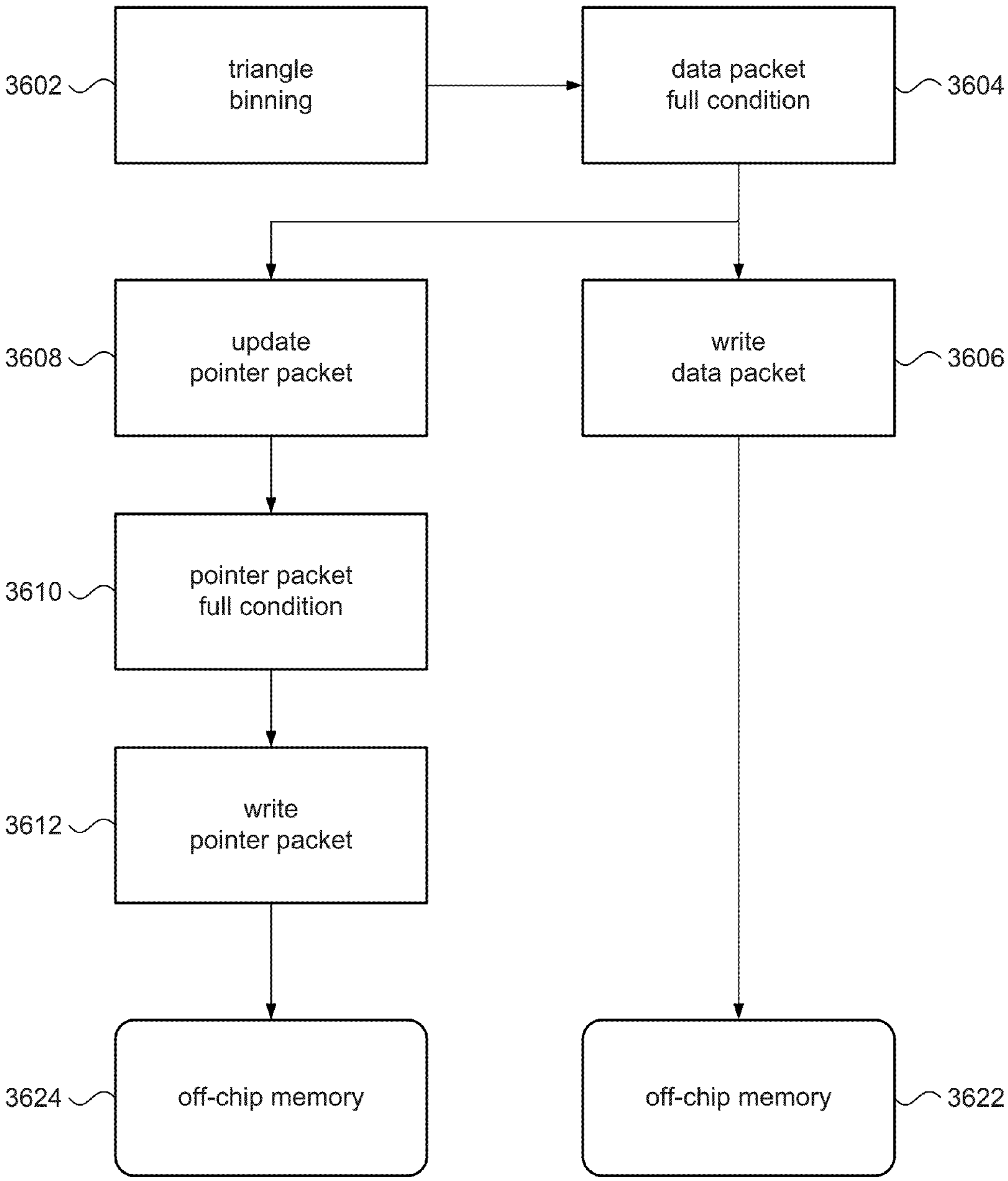
FIGS. 36 and 37 illustrate high level flows for packet binning in accordance with principles of the present disclosure.

FIG. 36 illustrates a general high level block diagram of a flow to process data packets and pointer packets in accordance with the present disclosure. At block 3602, as triangle binning occurs, triangle data is written out to the bin(s) that correspond to cells with bound at least a portion of a given triangle. At block 3604, when a given data packet becomes full (e.g., using the example above, when 128 triangles have been written, or binned, into the given bin), then the data packet is written out (block 3606) to a suitable off-chip memory 3622. In some embodiments, a pointer packet corresponding to the written data packet may be updated (block 3608) to point to that data packet.

At block 3610, when a given pointer packet becomes full, the pointer packet may be written out to an off-chip memory 3624 at block 3612). As will be explained in more detail below, just as data packets can become full when some predetermined number of triangles has been binned into a bin, a pointer packet can likewise become full when some predefined number of data packets tracked by that pointer packet has been written out.

The off-chip memories 3622 and 3624 may be separate or the same memories. In an implementation, for example, the memory for data packets may be L3 memory and the memory for pointer packets may be L2 memory. If the L2 memory is 32 KB, then the pointer packets may be 64B (512 bits) in size to accommodate 512 bins.

In accordance with the present disclosure, a pointer packet can accommodate a large number of objects (e.g., triangles) in a given bin. Consider, for example, a 512-bit (64B) pointer packet. The structure of the pointer packet may comprise a 16-bit control word. For example, the control word may have the following structure:

- pointer packet [8–0] "bin designation" identifies one of 512 bins
- pointer packet [10–9] packet hierarchy level:
  - '00' level 0 packet—this packet points to a data packet containing triangle data
  - '01' level 1 packet—this packet contains pointers to level 0 packets
  - '10' level 2 packet—this packet contains pointers to level 1 packets
  - '11' level 3 packet—this packet contains pointer to level 2 packets
- pointer packet [15–11] this a count of the number of pointer values in this packet The remaining 496 bits (pointer packet [511–16]) may be pointers to: (1) actual data packets (in the case of a level 0 packet) that contain triangle data; or (2) other pointer packets (in the case of level 1, 2, or 3 packets). In some embodiments, the 496 bits can be divided into 16 31-bit pointers. For example, if a data packet can hold data for 128 triangles, then a level 0 pointer packet for a given bin can reference 16×128=2K (2048) triangles.

In other embodiments, the 496 bits can be divided into 20 24-bit pointer values, and so on. In some embodiments, the size of the pointer values may vary in progressive and adaptive manner. For example, the pointer values may start off being N-bits in length in order to pack as many pointers into a pointer packet as is practical. The size of the pointer values may adaptively increase (e.g., to M-bits, M>N) when the object count grows too large for the current pointer size.

Figure 37:
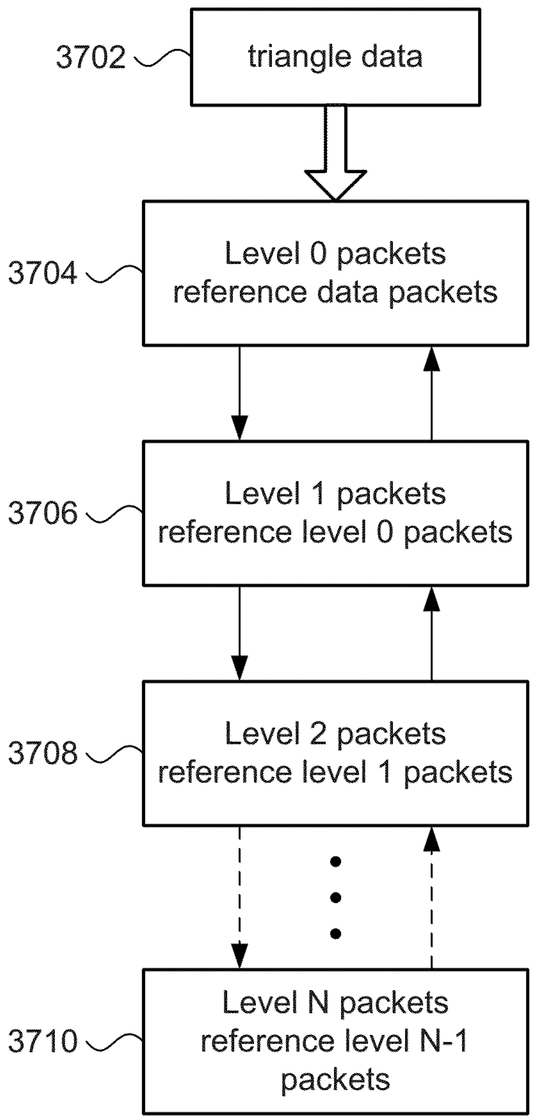

FIG. 37 illustrates the process flow for processing pointer packets, in accordance with the present disclosure. Thus, at 3702, data for a triangle is received into one or more bins that correspond to the cell or cells that bound at least a portion of that triangle. Thus, using a data packet size of 8 KB and triangle data of 64B, each data packet can store data for 128 triangles. There is a corresponding data packet for each bin.

When 128 triangles for a given bin are written to a corresponding data packet (3704), the data packet is written out to off-chip memory (e.g., Data_Mem shown below). A pointer (e.g., storage location) to the area in the off-chip memory containing the data packet is stored in a level 0 pointer packet. There is a corresponding level 0 pointer packet for each bin. When a level 0 pointer packet is full (i.e., there are no more pointer value entries in the current level 0 pointer packet), then that level 0 pointer packet is written out to off-chip memory (e.g., Pointer_Packet_Mem shown below) and a new level 0 pointer packet is created. Block 3704 continues until all the triangle data are written (binned).

After all the triangle data have been binned, then at 3706, the level 0 pointer packets may be collected and "binned" into level 1 data packets according to the bin designations of the level 0 pointer packets. For example, level 0 pointer packets that correspond to bin 0 may be binned into level 1 data packets that correspond to bin 0, level 0 pointer packets that correspond to bin 1 may be binned into level 1 data packets that correspond to bin 1, and so on. Binning of level 0 pointer packets includes storing the level 0 pointer packets in a level 1 data packet. For example, an 8 KB data packet will store 128 512-bit (64B) level 0 pointer packets. Each level 1 data packet that is created is written to off-chip memory. A pointer (e.g., storage location) to the area in the off-chip memory containing the level 1 data packet is stored in a current level 1 pointer packet. When a level 1 pointer packet is full, then that pointer packet is written out to off-chip memory and a new level 1 pointer packet is created. Block 3706 continues until all the level 0 pointer packets are binned in this way.

After all the level 0 pointer packets have been binned into level 1 pointer packets, then at 3708, the level 1 pointer packets may be collected and "binned" into level 2 data packets according to the bin designations of the level 1 pointer packets. For example, level 1 pointer packets corresponding to bin 0 may be binned into corresponding level 2 data packets corresponding to bin 0, and so on. Binning of level 1 pointer packets includes storing the pointer packets in a data packet. For example, an 8 KB data packet will store 128 64B level 1 pointer packets. Each level 2 data packet that is created is written to off-chip memory. A pointer to the area in the off-chip memory containing the level 2 data packet is stored in a level 2 pointer packet. When a level 2 pointer packet is full, then that pointer packet is written out to off-chip memory and a new level 2 pointer packet is created. Block 3708 continues until all the level 1 pointer packets are binned in this way. The process may be continue (block 3710) to subsequent levels until level N.

Figure 38:
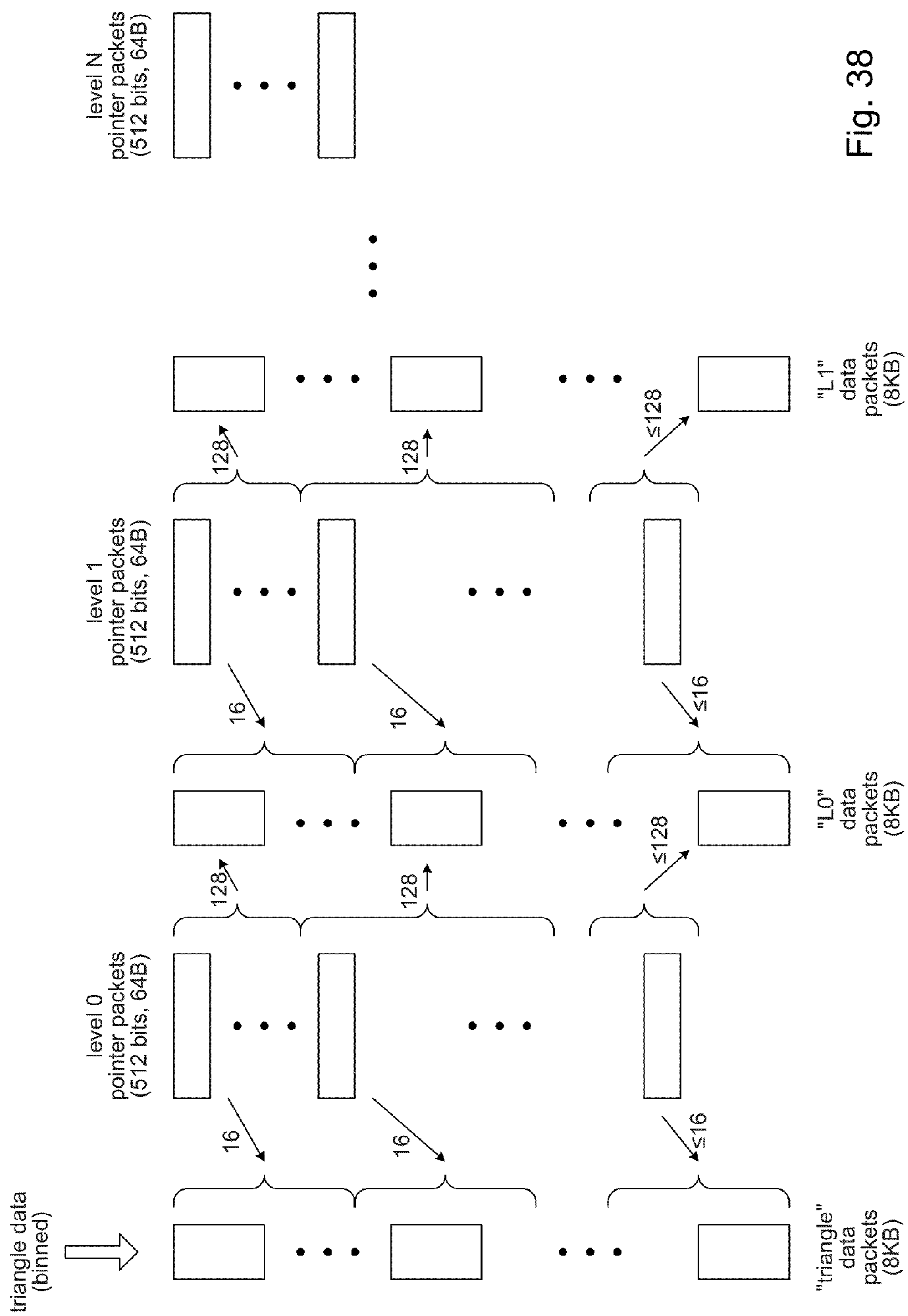
FIG. 38 depicts the data structures relating to packet binning.

FIG. 38 illustrates a storage hierarchy in accordance with some embodiments of the present disclosure for a given bin. The example shown in FIG. 38 uses the illustrative data sizes described above, namely 64B triangle data, 8 KB data packets, 64B pointer packets, and 16 pointers per pointer packet. The structure may be used for every bin. Data for 128 triangles can be stored in a data packet ("triangle" data packet), which can be stored in off-chip memory. Pointers to the data packets are stored in level 0 pointer packets; 16 pointers per pointer packet. Each level 0 pointer packet therefore can reference 16×128=2K)(2×$2^{10}$) triangles.

For every 2K of triangle data that is binned and offloaded into a data packet in Data_Mem, a pointer is to that data packet is stored in a level 0 pointer packet. When a pointer packet stores 16 pointers, that pointer packet is offloaded into Pointer_Packet_Mem. In some embodiments, the level 0 pointer packets are packed into 8 KB data packets (and may therefore be referred to as level 0 data packets). In particular, 128 level 0 pointer packets can fit into an 8 KB data packet ("L0" data packet). Each data packet can therefore reference 128×2K=256K triangles. And since a level 1 pointer packet can point to 16 level 0 data packets, a level 1 pointer packet can reference 16×256K=4M (4×$2^{20}$) triangles.

Taking the example one more level, the level 1 pointer packets may be managed using level 2 pointer packets in a similar manner. In some embodiments, the level 1 pointer packets are packed into 8 KB data packets (level 1 data packets). A level 1 data packet can therefore reference 128×4M=512M triangles. Since, a level 2 pointer packet can point to 16 level 1 data packets, a level 2 pointer packet can reference 8G (8×$2^{30}$) triangles, in a given bin. In general, using the foregoing illustrative parameters and assuming constant-sized pointer values, a level n pointer packet can reference $2^{12\times(n+1)}$ triangles in a given bin.

Figure 39A:
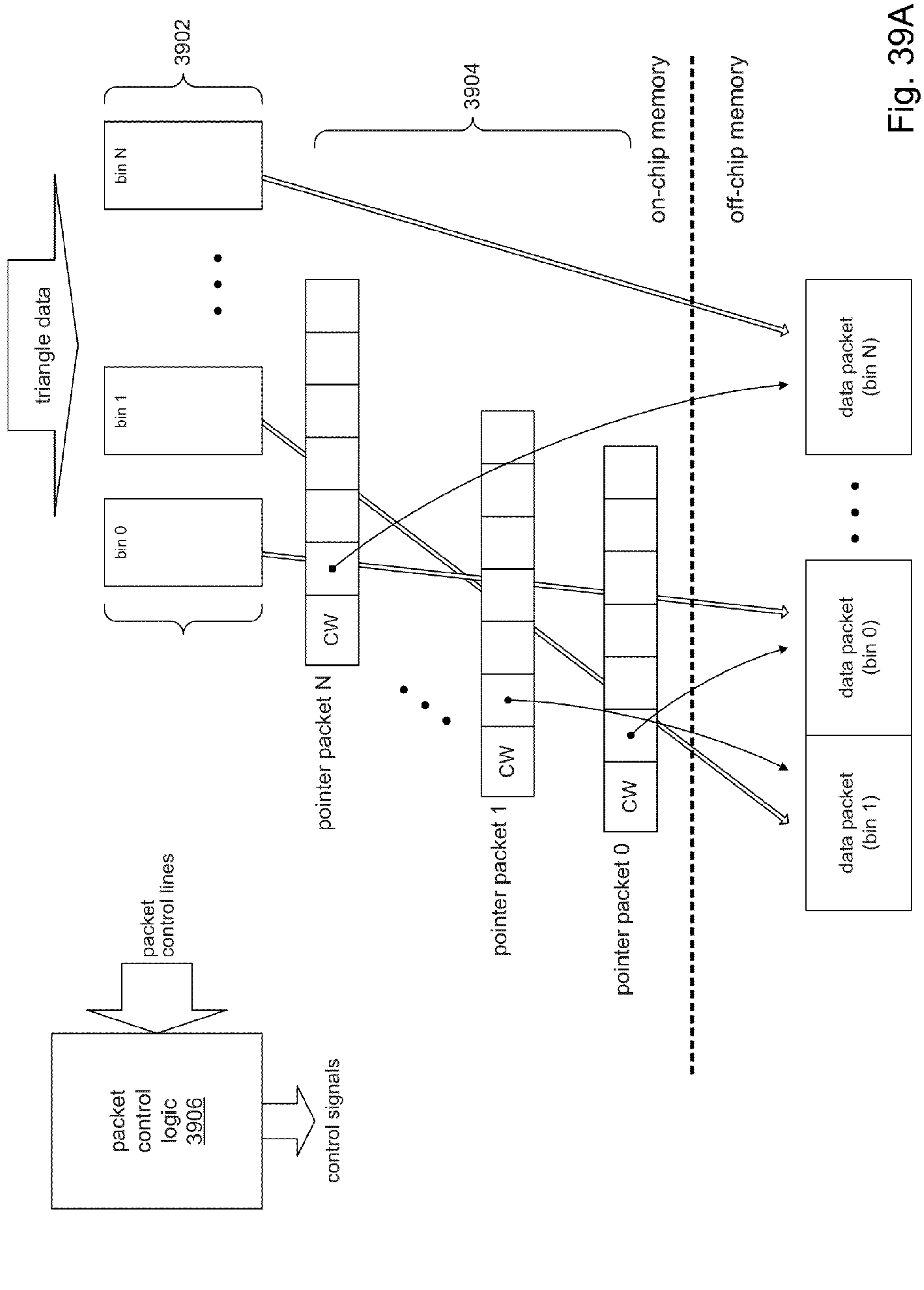
FIGS. 39A and 39B show the relation between on-chip and off-chip storage in accordance with embodiments for packet binning.

FIG. 39A shows a hardware configuration, in accordance with some embodiments, of an arrangement of on-chip memory and off-chip memory for storing triangle data (more generally, primitive objects) in a scene, according to the flow described above. The configuration includes on-chip memory arranged as several data arrays 3902, identified as bin 0, bin 1, etc. Triangle data may feed into the data arrays 3902 via an input bus. The on-chip memory may include pointer packet registers 3904 (e.g., pointer packet 0, pointer packet 1, etc.) corresponding to each data array. It will be appreciated that other memory configurations are possible.

Packet control logic 3906 manages the storing of triangle data into on-chip memory and the packetizing and storing of data into off-chip memory, as explained above. The packet control logic 3906 receives control input from packet control lines, described in more detail below, to generate suitably timed packet control signals to control data storage in the data arrays 3902 and pointer packet registers 3904, and to control movement of data into off-chip memory.

Figure 39B:
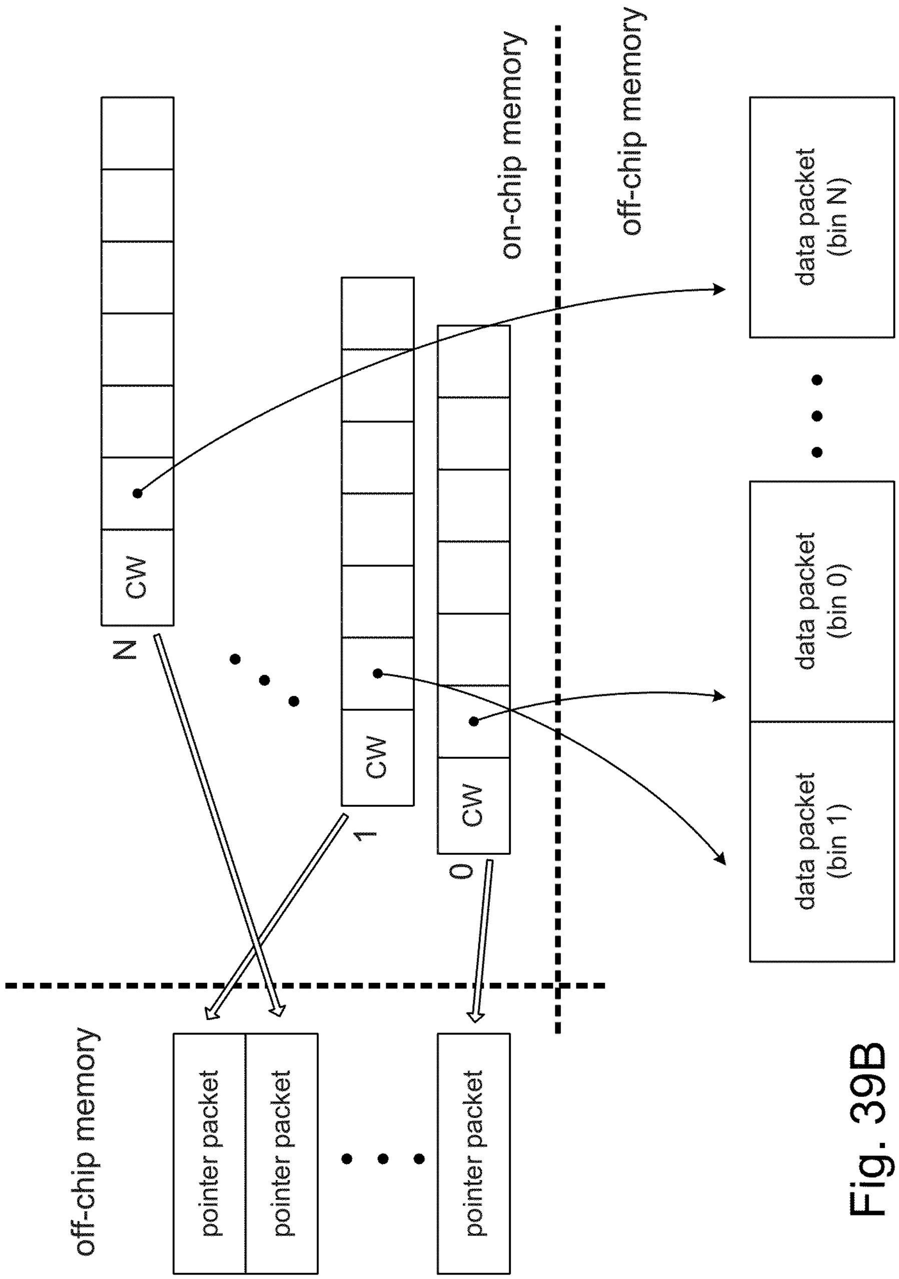

As triangles are binned during database construction, their data is stored in the bin 0, bin 1, etc. data arrays 3902 according to which cells the triangles are binned into. When a bin (e.g., bin 1) is full, a corresponding signal line among the packet control lines (e.g., Data_Bin_Full[1]) may be asserted. The packet control logic 3906 may respond to the full-bin condition by generating control signals to move the data from the bin 3902 to a data packet in off-chip memory. The packet control logic 3906 may generate control signals to clear the bin 3902 to make room for more triangle data. The control signals may cause a pointer to the off-chip data packet in to be stored in the corresponding pointer packet register 3904 (e.g., pointer packet 1). As pointer packet registers 3904 fill up, the packet control logic 3906 may store (via suitable control signals) their data in off-chip memory, as illustrated in FIG. 39B.

Although FIG. 39A shows the packet control logic 3906 in a single block, in some embodiments, the packet control logic 3906 may be distributed across the data arrays 3902 and the pointer packet registers 3904. In this way, each data array and pointer packet register can operate independently of the other data arrays and pointer packet registers. This allows for the packetizing of triangle data and pointer packet data at or close to "wire" speed.

In some embodiments, the bins (data arrays 3902) and pointer packet registers 3904 are provided in the on-chip memory. Data packets and pointer packets that are stored in off-chip memory may be referred to, for convenience, respectively as Data_Mem and Pointer_Packet_Mem. It will be appreciated of course that other memory configurations are possible. The packet control lines referenced in FIG. 39A may comprise signal lines and/or data registers such as:

Total_Object_Count–32-bits—Will increment for each object, or each bin, as an object is written to.

Object_Bin_Count[#Bins][32-bits]–#Bins×32-bits=512 Bins×32-bits=2 KB

Each Bin will have a count of the objects written to it. Will also be used to manage Pointer Packets Packet_Bin_Write[#Bins]—When a Pointer_Packet is written to Pointer_Packet_Mem. Set the corresponding Bin# bit in Packet_Bin_Write Packet_Bin_Dirty[#Bins]—When data is written into a Bin, Set the corresponding Bin# bit in Packet_Bin_Dirty Data_Bin_Full [#Bins]—When a data bin is full Data_Bin_Dirty[#Bins]—When a bin has at least one data value The discussion will now turn to a description of some pseudo-code that represents a particular implementation of the configuration shown in FIG. 39A using digital logic circuits (rather than software executing on a CPU). First, is a description of level 0 pointer packets, which manage data packets that store triangle data. A one-bit vector of size Bin # called Data_Bin_Full [bin] may be used to indicate (e.g., set to '1') that the data packet corresponding to bin number bin is full (i.e., contains data for 128 triangles). The data packet may then be written to off-chip memory called Data_Mem (e.g., 220, FIG. 2) at an address Data_Mem_Ptr. Each increment of Data_Mem_Ptr may represent the size of a data packet, namely 8 KB. Data_Mem_Ptr is written into the next entry in the current pointer packet. When the current pointer packet fills (e.g., contains 16 pointers), then it may be written out to off-chip memory called Pointer_Packet_Mem. The foregoing may be represented using the following pseudo-code fragment:

PSEUDO-CODE FRAGMENT XLVII.

```
Data_Mem_Ptr [ 32-bit ] = 0 ;                  // Start of Data_Mem
Pointer_Packet_Mem_Addr [ 32-bits ] = 0;       // Start of
                                               Pointer_Packet_Mem
For (every Bin_# with Data_Bin_Full [ Bin_# ] = 1 )
  Pointer_Packet [ Bin_# ] =
    Process_Pointer_Packet ( Pointer_Packet [ Bin_# ], Bin_# ,
    Data_Mem_Ptr )
  Write Data Packet at Data_Mem_Ptr
  // each increment of Data_Mem_Ptr = 8KB Bin = Data Packet size
  Data_Mem_Ptr = Data_Mem_Ptr + 1
  Data_Bin_Full [ Bin_# ] = 0
End For
Unit: Process_Pointer_Packet
Input: Pointer_Packet [ 511 - 0 ] , Bin_#, Data_Mem_Ptr [ 30 - 0 ]
Output: Pointer_Packet
// Pointer_Value_size = 31-bits, Control_Word_size =16-bits
// Parallel
If ( Pointer_Packet [ 15 - 11 ] == '10000' )
  // write to output buffer for Pointer Packet Mem
  // but for this research paper, just write straight to
  Pointer_Packet_Mem
  Pointer_Packet_Mem [ Pointer_Packet_Mem_Addr ] =
  Pointer_Packet ;
  Pointer_Packet_Mem_Addr = Pointer_Packet_Mem_Addr + 1 ;
  Packet_Bin_Write [ Bin# ] = 1 ; // A Packet for Bin#is written to
  Pointer_Packet_Mem
  Index_value = Control_Word_size ;
  Pointer_Packet [ ( Index_value + Pointer_Value_size – 1 ) –
  Index_value ] =
    Data_Mem_Ptr [ ( Pointer_Value_size – 1 ) – 0 ]
  Pointer_Packet [ 15 - 11 ] = 1 ;
```

-continued

PSEUDO-CODE FRAGMENT XLVII.

```
Else
  Index_value = ( Pointer_Packet [ 15 - 11 ] * Pointer_Value_size ) +
  Control_Word_size ;
  Pointer_Packet [ ( Index_value + Pointer_Value_size – 1 ) –
  Index_value ] =
    Data_Mem_Ptr [ ( Pointer_Value_size – 1 ) – 0 ]
  Pointer_Packet [ 15 - 11 ] =Pointer_Packet [ 15 - 11 ] + 1 ;
End If;
// End Parallel
End Process_Pointer_Packet
```

When the final data object (e.g., triangle) has been binned, the remaining data should be flushed from the bins into Data_Mem. The foregoing may be performed in hardware (e.g., digital logic) rather than in software executing on a CPU, as represented by the following pseudo-code fragment:

PSEUDO-CODE FRAGMENT XLVIII.

```
For ( i = 0 ; i < Block_Count ( Data_Bin_Dirty[ ] ) ; i++ )
  Bin# = RtAE ( Data_Bin_Dirty[ ] , i ) ;
  Data_Count = Object_Bin_Count [ Bin# ] [ 6 - 0 ];
    // 7-bits for data packet size = 127 Triangles
    // for cleanup, Data_Count can be less than full data packet size
  Pointer_Packet [ Bin_# ] =
    Process_Pointer_Packet (Pointer_Packet [ Bin_# ], Bin_# ,
    Data_Mem_Ptr )
  Write Data Packet [ Bin# ] at Data_Mem_Ptr
    // each increment of Data_Mem_Ptr = 8KB Bin = Data Packet size
    // for cleanup, Data_Count can be less than full data packet size
  Data_Mem_Ptr = Data_Mem_Ptr + 1
  If ( Packet_Bin_Write [ Bin# ] == 1 )
    Pointer_Packet_Mem [ Pointer_Packet_Mem_Addr ] =
    Pointer_Packet [ Bin# ]
    Pointer_Packet_Mem_Addr = Pointer_Packet_Mem_Addr + 1 ;
  End If
End For
Data_Bin_Full [ ] = 0
Data_Bin_Dirty [ ] = 0
```

Following are some illustrative examples of how the Pointer Packet table may look after all the triangle data has been binned and stored. If a Pointer Packet is written to Pointer_Packet_Mem, then another pass at another Packet Level may be required when the binned triangle data is greater than a single Pointer Packet.

Starting with the 32 KB that was assigned to Packet Level 0 Pointer Packets.

Each Pointer Packet is 64B

Each Pointer Value points to a data packet of 128 Triangles

Each Pointer Packet can hold 16 Pointer Values=2K Triangles e.g., Bin #A has 1K Triangles Pointer Packet[Bin #A] will have 8 Pointer Values=1K Triangles Packet_Bin_Write[Bin #A]=0; //No writes to Pointer_Packet_Mem Pointer_Packet[10–9]='00'//Top Level at Bin #A is Packet Level 0

Packet_Bin_Dirty[Bin #A]=1

Any Bin with Packet_Bin_Write[Bin# ] will need next Level Packet Binning

Next Level Pointer Packets (e.g., level 1) will be needed for any Bin with Packet_Bin_Write[Bin# ]. The next Level data packets will use the previous Level Pointer Packets as data to be binned, as explained in FIG. 37 and illustrated in FIG. 38:

Data Packet Level 1 will store Packet Level 0 Pointer Packets as data.

A Pointer Packet is 64B, each of the 512 Bins are 8 KB and can store 128 Pointer Packets.

In other words, the processing of level 0 pointer packets in Pointer_Packet_Mem may proceed in the same manner as described above for triangle data. Each Packet Level 0 Pointer Packet points to 2K Triangles. Level 1 data packet=Bin of 128 Packet Level 0 Pointer Packets. A Pointer Value at level 1 points to this level 1 data packet effectively pointing to 128×2K=256K Triangles.

A Packet level 1 Pointer Packet holds 16 Pointer Values effectively making a Packet Level 1 Pointer Packet represent 16×256K=4M Triangles. If a Bin would have more than 4M Triangles, then Packet Level 2 Binning would be necessary, using Packet Level 1 Pointer Packets as the data.

Ex) Data Packet Level 0=128 Triangles

Pointer Packet Level 0 Pointer points to 128 Triangles

Pointer Packet Level 0 holds 16 Pointers=16×128=2K Triangles

Data Packet Level 1=128 Pointer Packets Level 0=128×2K=256K Triangles

Pointer Packet Level 1 Pointer points to 256K Triangles

Pointer Packet Level 1 holds 16 Pointers=16×256K=4M Triangles e.g., Bin #B has 1M Triangles 512 Packet Level 0 Pointer Packets Each Packet Level 0 Pointer Packets represents 2K Triangles.

Each Packet Level 1 Pointer Value represents 128 Packet Level 0 Pointer Packets

Each Packet Level 1 Pointer Packet represents 128×2K=256K Triangles

Packet Level 1 Pointer Packet will have 4 Packet Level 1 Pointer Values to represent 4×256K=1M Triangles The Packet Table now hold the following Pointer Packet control words:

Pointer Packet[Bin #A][8-0]=Bin #A

Pointer Packet[Bin #A][10-9]='00'—Packet Level 0

Pointer Packet[Bin #A][15-11]=8 Pointer Values for 1K Triangles

Pointer Packet[Bin #B][8-0]=Bin #B

Pointer Packet[Bin #B][10-9]='01'—Packet Level 1

Pointer Packet[Bin #B][15-11]=4 Pointer Values for 1M Triangles

32 KB of L2 Memory are used for the Packet Tablet.

2 KB are needed for Object_Bin_Count 256B for status bits

4B Total Object Count

III. Triangle Binning—Levels 1, 2, and 3

Packet binning can be used at each partitioning level (Block Level) 1, 2, 3. Packet binning starts at Packet Level 0 for each new Block Level cell. When the Block_Level__3 Bins are complete for a Block Level 2 cell, the Block_Level__3 Bins within it can be compacted down with a modified Write_Data_Structure( ) module. Or Packet Binned at a Coarser Level.

IV. Multi-Grid Binning and Ultra-Fine Grain

In some embodiments, if a subsequent partitioning level uses a lower grid resolution, the hardware can be configured to process several such lower-resolution bins concurrently. For example, if a grid at a previous partitioning level uses 512-cell resolution and the next partitioning level uses 64-cell resolution, the GTU resources for processing a 512-cell grid can be used to concurrently process three 64-cell grids in the amount of time (cycles) it takes to process one 512-cell grid.

Figure 40:
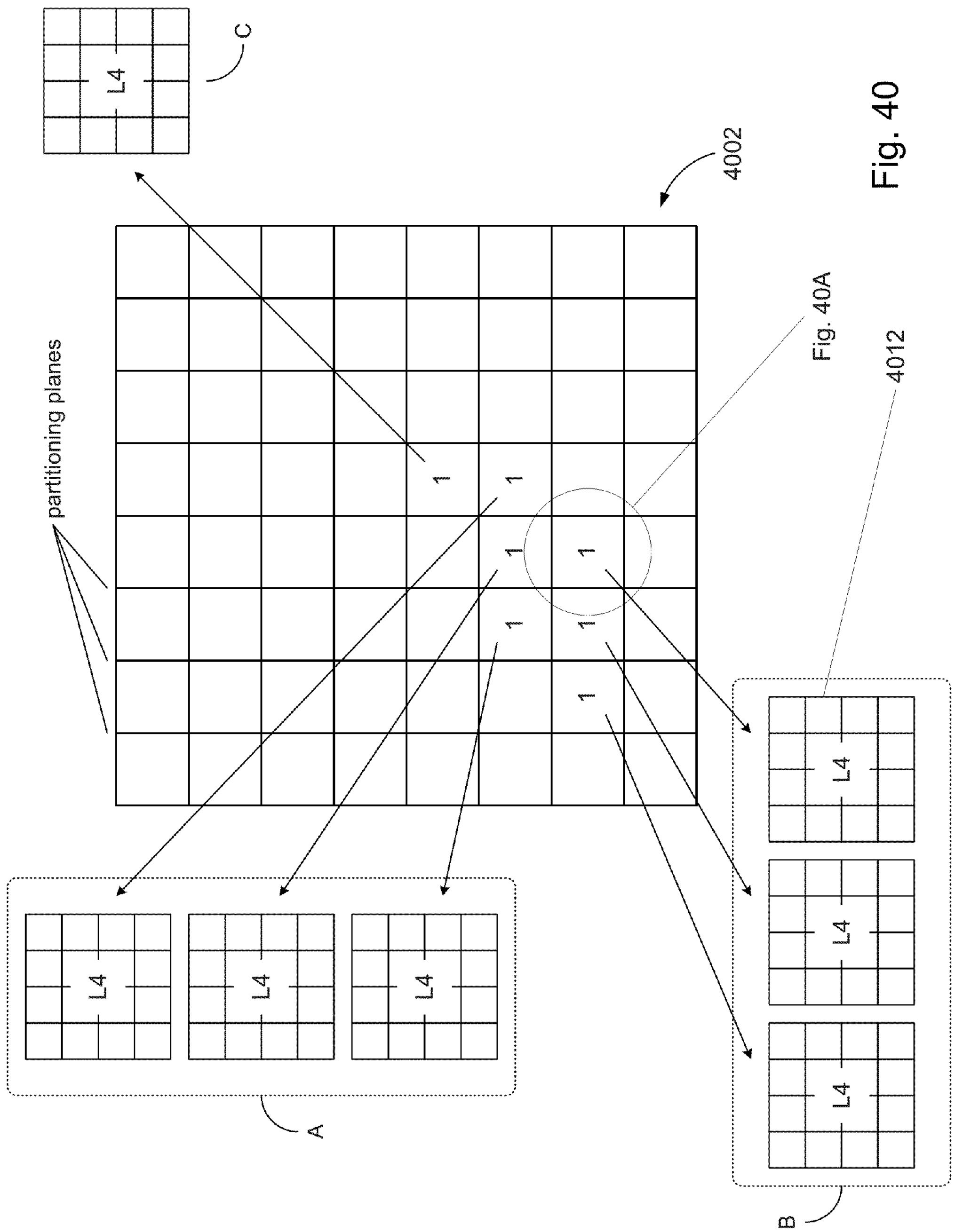
FIGS. 40 and 40A illustrate an example of re-using calculations from a previous level.

FIG. 40, for example, represents an example of a 512-cell level 3 3D grid 4002 and several level 4 3D grids of 64-cell resolution. The figure shows only two dimensions (e.g., X- and Y-axes) of the 3D grids in order to keep the illustration manageable. In the foregoing disclosed illustrative embodiments, a GTU can be configured with sufficient resources to bin a worst-case triangle (requiring edge-ray and surface-ray processing) in a 512-cell grid in at most 16 cycles. The 64-cell level 4 grids (e.g., 4012), on the other hand, can be processed three at a time in the same 16-cycle period to bin a worst-case triangle in each such grid. For example, the level 3 grid in FIG. 40 shows 7 dirty cells, which can be binned at level 4 in three steps A, B, and C, where a "step" refers to the binning of a triangle to a grid.

Figure 40A:
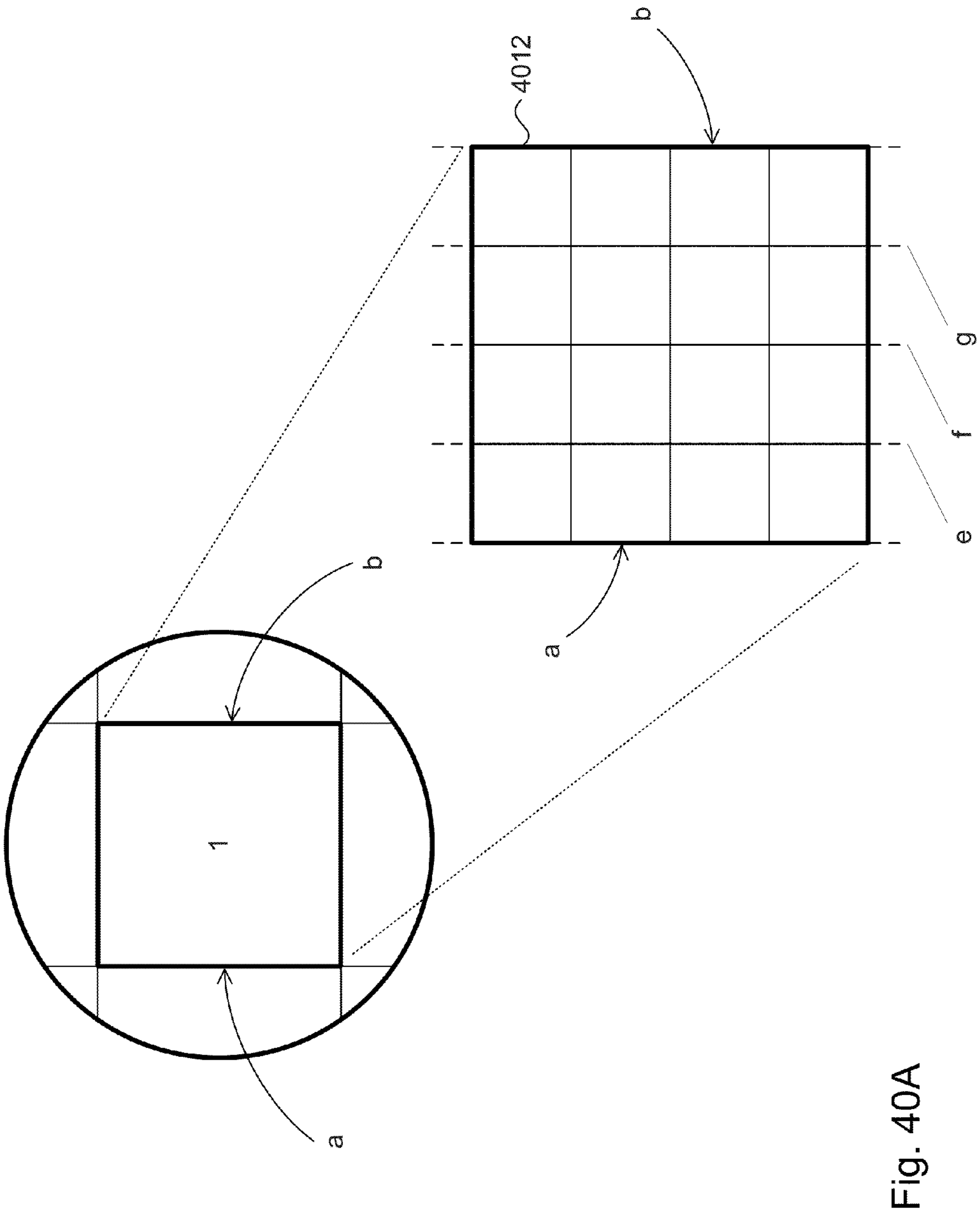

As will now be explained, the GTU can concurrently bin the triangle into three level 4 grids corresponding to the dirty level 3 cells in a single step A, and likewise for step B. This can be achieved, for example, by using results from processing in level 3 to process level 4. In particular, the GTU can process the 9 partitioning planes along each of the X-, Y-, and Z-axes of the level 3 grid 4002. The 64-cell level 4 grids (e.g., 4022), on the other hand, are defined by five partitioning planes along each of its X-, Y-, and Z-axes. Referring to FIG. 40A, for example, two of the five X-axis partitioning planes (e.g., planes a and b) in a level 4 grid (e.g., 4012) are the same X-axis partitioning planes in the corresponding level 3 cell. Since those partitioning planes a, b have been processed at level 3 (e.g., intersect points, if any, have been generated), they need not be regenerated at level 4, leaving only three level 4 partitioning planes e, f, g that need to be processed. The same reasoning applies to the Y- and Z-axes partitioning planes. Since, the GTU can process one 512-cell grid (with 9 partitioning planes), the GTU can concurrently process three 64-cell grids if results from the level 3 partitioning plane operations are saved and used in level 4.

The information for level 4 binning information may be stored with each triangle, separately from the triangles, or some combination of both. In an embodiment, for example, the level 4 binning information may be stored with the level 3 data. To access the level 4 data, then, the data for corresponding level 3 must be accessed. This can result in some latency just to access level 4 data.

Figure 41:
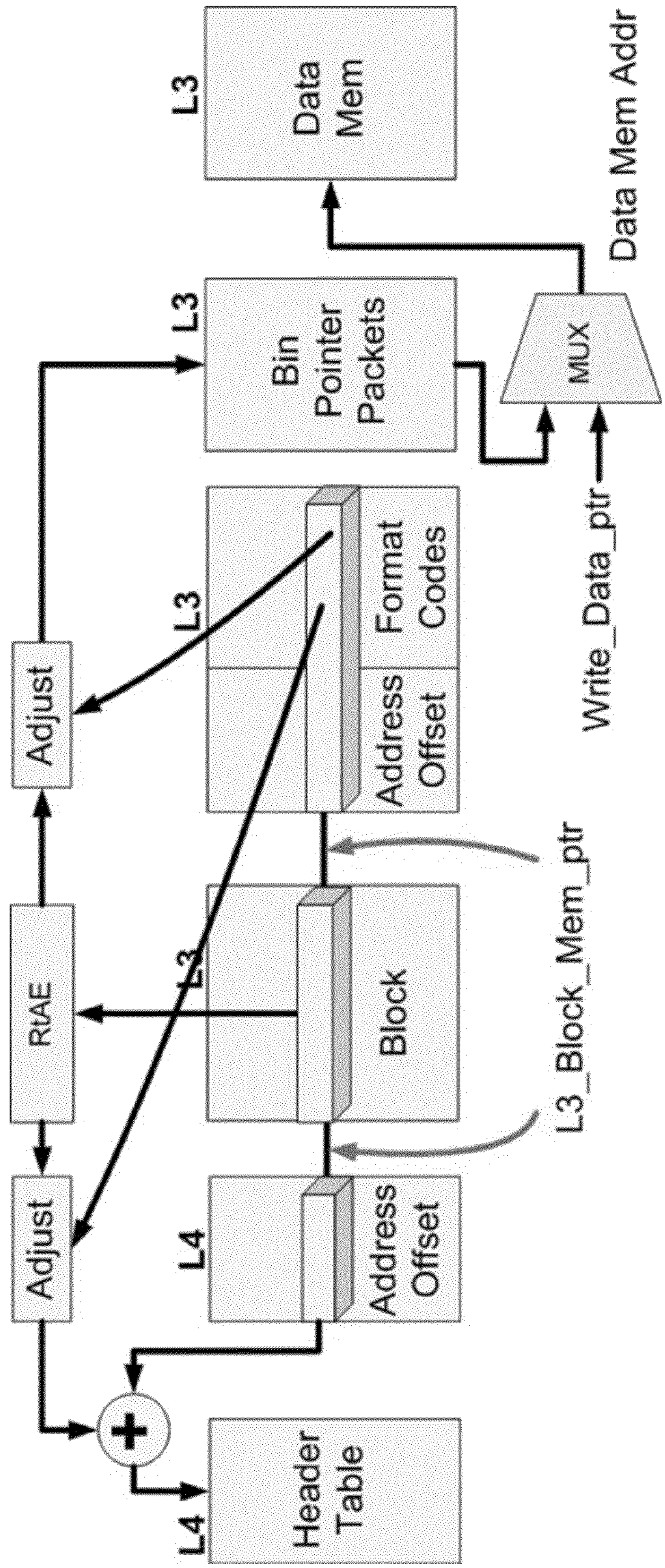
FIG. 41 illustrates an embodiment for storing and using level 4 data.

In another embodiment, the latency can be avoided by storing the level 4 data separately in its own memory space. FIG. 41 illustrates an example of such an embodiment. Recall that individual bits in the Pointer Structure had dual-meaning: as Absolute Data, and as a Relative Pointer. An additional meaning may be assigned as a Relative Pointer to a separate memory space for the L4 Header Table. Each L3 block has the overhead of an L3 Address, and L3 Format Codes, and an additional overhead of L4 Address for each L3 block if Relative Indexing is used for the L4 Header Table, and the number of entries (not value or size) in the L3 Data Structure and L4 Header Table would be different. Each dirty bit in a level 3 block points to a Header in the L4 Header Table.

Some considerations that may be assessed before deciding whether to create level 4 ultra-fine grain spatial data, before rays are cast, include:

From the view of Rays, and ignoring the Object Data: The number of Rays is expected to be significant enough to justify the time spent creating the level 4 Spatial Data.

From the view of Data, and ignoring the number of Rays: The size of the Objects are small relative to the Grid, in 1 or 2 Bins, allowing binning in 1-cycle. For example, a particle system, or numerous very small polygons. and/or large objects if enough resources are allocated to Bin Data at the speed of Data.

However, once the overhead has been spent to create level 4 Spatial Data, then retrieving the level 4 Spatial Data could be made inexpensive with linear bursts, and/or piggybacked with L3 transfers hiding latency. The Level 4 Header Table could also be created, on the fly, by the Level 4 Object Attributes, and/or Headers. But a benefit of storing the Level 4 Header Table first is to avoid the initial unnecessary movement of the Object Data.

As discussed above, results from level 3 processing can be re-used to process level 4. The following pseudo-code fragment expresses this re-use:

PSEUDO-CODE FRAGMENT XLIX.

```
Unit: Partitioning_Planes_64
Input: XYZ_Addr
L4_X_Planes [ 0 ] = L3_X_Planes [ X_Addr ]
L4_X_Planes [ 1 ] = L4_X_Planes [ 1 ]
L4_X_Planes [ 2 ] = L4_X_Planes [ 2 ]
L4_X_Planes [ 3 ] = L4_X_Planes [ 3 ]
L4_X_Planes [4 ] = L3_X_Planes [ X_Addr +1 ]
Same for Y_Values & Z_Values
End Partitioning_Planes_64
```

The following pseudo-code may be used to implement digital logic circuits (rather than software executing on a CPU) to process triangle edges in level 4:

PSEUDO-CODE FRAGMENT L.

```
Saving the L3 results from level 3 processing. For each 01, 12, 20 Edge:
Edge_cell_count = Block_Count ( Object_Grid_Block ) ;
i = 0;
While ( Edge_cell_count > 0 )
// Parallel - up to 3 – independent 64-Grid
  XYZ_addr = RtAE ( i , Object_Grid_Block ) ;
  i++ ;
  Edge_cell_count = Edge_cell_count - 1 ;
  use Partitioning_Planes_64 ( XYZ_Addr )
  Object_Grid_Block_64, but use new Partitioning_Planes_64
  ( XYZ_Addr )
      // Could be assigned as an Attribute to the Object
  Object_Grid_L4_Header_Table [ XYZ_Addr ] =
      Object_Grid_Block_64 | Object_Grid_L4_Header_Table
      [ XYZ_Addr ]
  If ( Edge_cell_ count > 0 )
    XYZ_addr = RtAE ( i , Object_Grid_Block ) ;
    i++ ;
    Edge_cell_count = Edge_cell_count - 1 ;
    Object_Grid_Block_64, but use new Partitioning_Planes_64
    ( XYZ_Addr )
      // Could be assigned as an Attribute to the Object
    Object_Grid_L4_Header_Table [ XYZ_Addr ] =
      Object_Grid_Block_64 | Object_Grid_L4_Header_Table
      [ XYZ_Addr ]
  End If
  If ( Edge_cell_ count > 0 )
    XYZ_addr = RtAE ( i , Object_Grid_Block ) ;
    i++ ;
    Edge_cell_count = Edge_cell_count - 1 ;
    Object_Grid_Block_64, but use new Partitioning_Planes_64
    ( XYZ_Addr )
      // Could be assigned as an Attribute to the Object
    Object_Grid_L4_Header_Table [ XYZ_Addr ] =
      Object_Grid_Block_64 | Object_Grid_L4_Header_Table
      [ XYZ_Addr ]
  End If
// End Parallel
End While
```

The following pseudo-code may be used to implement digital logic circuits (rather than software executing on a CPU) to process triangle areas in level 4:

PSEUDO-CODE FRAGMENT LI.

```
Similar to the above, re-use the results from processing in level 3
with Partitioning_Planes_64.
Object_cell_count = Block_Count ( Object_Grid_Block ) ;
i = 0;
While ( Object_cell_count > 0 )
// Parallel - up to 3 – independent 64-Grid
  XYZ_addr = RtAE ( i , Object_Grid_Block ) ;
  i++ ;
  Object_cell_count = Obejct_cell_count - 1 ;
  use Partitioning_Planes_64 ( XYZ_Addr )
  Object_Grid_Block_64, but use new Partitioning_Planes_64
  ( XYZ_Addr )
    // Could be assigned as an Attribute to the Object
  Object_Grid_L4_Header_Table [ XYZ_Addr ] =
    Object_Grid_Block_64 | Object_Grid_L4_Header_Table
     [ XYZ_Addr ]
  If ( Object_cell_ count > 0 )
    XYZ_addr = RtAE ( i , Object_Grid_Block ) ;
  i++ ;
  Object_cell_count = Object_cell_count - 1 ;
  Object_Grid_Block_64, but use new Partitioning_Planes_64
  ( XYZ_Addr )
    // Could be assigned as an Attribute to the Object
  Object_Grid_L4_Header_Table [ XYZ_Addr ] =
    Object_Grid_Block_64 | Object_Grid_L4_Header_Table
  [ XYZ_Addr ]
  End If
  If ( Object_cell_ count > 0 )
    XYZ_addr = RtAE ( i , Object_Grid_Block ) ;
  i++ ;
  Object_cell_count = Object_cell_count - 1 ;
  Object_Grid_Block_64, but use new Partitioning_Planes_64
  ( XYZ_Addr )
    // Could be assigned as an Attribute to the Object
  Object_Grid_L4_Header_Table [ XYZ_Addr ] =
    Object_Grid_Block_64 | Object_Grid_L4_Header_Table
  [ XYZ_Addr ]
  End If
// End Parallel
End While
```

V. On-Chip Memory Partitioning

The disclosure will now turn to a discussion of memory partitioning for different applications of the GTU, with different views for the configuration of the memory resources.

A. Triangle Binning

Using the floating point resources of the GTU, binning to a $N_x \times M_y \times Q_z$ grid will take an effective 16 cycles. Effective meaning after the initial latency of the scheduler & pipes fill. The memory can be partitioned to allow worst case writing of triangle to bins in 16 cycles. The numbers of bins divided by 16-cycles equals the number of Parallel Memory Accesses. Though it is ideal to have the Number of Memory Partitions equal the number of Bins. For example, 512 Bins divided by 16 cycles=32 Parallel Memory Partitions. If reducing on-chip memory is the target, consideration of only 64-cell Grid binning may be a possible option, as fewer bins are needed.

Following is an example with 64 bins with shared memory partitioning. Suppose, the memory size is 4 MB, then:

64 bins divided by 16 cycles=4 Parallel Memory Partitions

Memory Partitions=4

4 MB divided by 4 Partitions=1 MB per Memory Partition

Memory_Partition_Size=1 MB

4 MB divided by 64 Bins=64 KB

Bin_Size=64 KB

If the data word size is 64B, then the Memory Partition Address Range would be 1 MB divided by 64B=16K

Memory Partition Address=16K==[0-13]

Memory Partition__0[#Memory_Partition_Address]// Data Range [0-1 MB]

Memory Partition__1[#Memory_Partition_Address] II Data Range [1 MB-2 MB]

Memory Partition__2[#Memory_Partition_Address]//Data Range [2 MB-3 MB]

Memory Partition__3[#Memory_Partition_Address]//Data Range [3 MB-4 MB]

64 Bins divided by 4 Memory Partitions=16 Bins per Memory Partition

Bins_per_memory_partition=16

Following is an example with 64 bins with multiple GTUs. The effective rate for binning is linear to the number of GTUs. For example, using two GTUs will change the effective binning rate of 16 cycles to 8 cycles. As another example, 4 GTUs=>16 cycles divided by 4 GTUs=4 cycles 64 Bins divided by 4 cycles=16 Parallel Memory Partitions

Memory Partitions=16

4 MB divided by 16 Partitions=256 KB per Memory Partition

Memory_Partition_Size=256 KB

4 MB divided by 64 bins=64 KB

Bin_Size=64 KB

64 Bins divided by 16 Memory Partitions=4 Bins per Memory Partition

Bins_per_memory_partition=4

Following is an example with 64 bins with separate memory partitions. It will be far easier to think of the architecture with each Bin having its own Memory Partition. Writing to the Memory Bins can be done in parallel in an effective single cycle, for example:

64 Bins=64 Parallel Memory Partitions

Memory Partitions=64

4 MB divided by 64 Partitions=64 KB per Memory Partition

Memory_Partition_Size=64 KB

4 MB divided by 64 Bins=64 KB

Bin_Size=64 KB

If the data word size is 64B, then the Memory_Partition_Address Range would be 64 KB divided by 64B=1K

Memory_Partition_Address=1K=[0-9]

Memory Partition__0[#Memory_Partition_Address]//Data Range [0-64 KB]

Memory Partition__1[#Memory_Partition_Address]/Data Range [64 KB-128 KB]

Memory Partition__2[#Memory_Partition_Address]//Data Range [128 KB-192 KB]

Memory Partition__3[#Memory_Partition_Address]//Data Range [192 KB-256 KB]

. . .

Memory Partition 63[#Memory_Partition_Address]//Data Range[(4 MB less 64 KB)–4 MB]

The following pseudo-code fragment expresses how triangles can be written to on-chip memory bins, which can be implemented using digital logic circuits rather than software executing on a CPU:

PSEUDO-CODE FRAGMENT LII.

```
Bin_# = 0 ;
Memory_Bin_Full [ #Bins ] = 0
For ( i = 0 ; i < #Bins ; i++)
  Memory_Bin_Addr [ i ] = ( i % #Bins_per_Memory_Partition ) * #Bin-
_Size ;
For ( cycle = 0 ; cycle < #Bins_per_Memory_Partition ; cycle++ )
// Parallel
  For ( MP_# = 0 ; MP_# < #Memory_Partitions ; MP_#++ )
    Bin_# = cycle + ( MP_# × #Bins_per_Memory_Partition ) ;
    If ( Object_Grid_Block [ Bin_# ] == 1 )
      Memory_Parition_[ MP_#] [ Memory_Bin_Addr [ Bin_# ]] =
      Triangle ;
```

-continued

PSEUDO-CODE FRAGMENT LII.

```
      If (Memory_Bin_Addr [ Bin_# ] == all 1's )
        Memory_Bin_Full [ Bin_# ] = 1 ; // Write Bin to off-chip memory
        Memory_Bin_Addr [ Bin_# ] =
          ( Bin_# % #Bins_per_Memory_Partition ) * #Bin_Size ;
      Else
        Memory_Bin_Addr [ Bin_# ] = Memory_Bin_Addr [ Bin_# ] + 1 ;
    End If
    Bin_# = Bin_# + 1 ;
  End For
// End Parallel
End For
```

As each Flag is set in Memory_Bin_Full, write each Full Bin to Off-Chip Memory. Reset Memory_Bin_Full flag to allow Bin refill. When the Triangle Input Stream ends, write each non-empty Bin to Off-Chip Memory. All off-chip write addresses are known in advance and are written in linear contiguous order. This will help with buffering, and the minimizing or hiding of latency.

B. Block Memory

The block memory, along with the Overhead, could be configured adaptively with 64-bit, or 512-bit words. Construct a memory architecture to support the adaptive radix:

block memory=2 MB=32 KB×512-bit=32 KB×(8×64-bit)

Memory Block size=32 KB×64-bit=256 KB block memory=8×256 KB Memory Partitions=8×(32 KB×64-bit)

1. Adaptive Radix Alignment

In some embodiments, the grid resolution at a given partitioning level may be adaptive and the corresponding bitmap can vary in length. Under certain predefined conditions, the resolution may change, for example, from $2^6$ to $2^9$ with a bitmap length changing from 64 bits to 512 bits. Having at least two Memory Partitions will allow Adaptive Alignment of different bitmap sizes in a single cycle. For example, If the Memory data word size is 256-bits, then 512-bits divided by 256-bits=2 #Memory Partitions=2

If the Memory data word size is 64-bits, then 512-bits divided by 64-bits=8 #Memory Partitions=8

Exception: a 512-bit Memory data word will require #Memory_Partitions=2

2. Alignment

Assuming a data word transfer uses 1 cycle, if the Memory data word size is 64-bits, then it would take 8-cycles to transfer a 512-bit data word. In order to transfer all 512-bits in 1-cycle, make a 8 column×64-bit Memory Partition to support the adaptive sizing. The 64-bit data words will be stored linearly, by column, then by row, and the 512-bit word will be stored linearly as well, by column, then by row, but starting from the first empty column, and could be stored in more than a single row. If a new 512-bit data word needs to be stored, a 1-cycle 512-bit data word transfer can only happen if the full 512-bits can be transferred. If part of the 512-bit data word, in Memory, has been filled with at least one 64-bit data word, or less than 8×64-bit data words . . . then it will require an additional transfer cycle to transfer the full 512-bit data word. For example, Block 0—64-bits Block 1—64-bits Block 2—512-bits Block 3—64-bits Block 4—64-bits Memory_Partition_[0-7] with 64-bit Memory data word The above would be stored as:

Memory_Partition_0[0]=Block 0 Addr=0

Memory_Partition_1[0]=Block 1

Memory_Partition_2[0]=Block 2

Memory_Partition_3[0]=Block 2

Memory_Partition_4[0]=Block 2

Memory_Partition_5[0]=Block 2

Memory_Partition_6[0]=Block 2

Memory_Partition_7[0]=Block 2

Memory_Partition_0[1]=Block 2 Addr=1

Memory_Partition_1[1]=Block 2

Memory_Partition_2[1]=Block 3

Memory_Partition_3[1]=Block 4

We can see from the above if the 512-bit block 2, doesn't start on Memory_Partition 0, but instead starts at Memory_Partition 2. This makes for a 2-cycle access where Addr=0 is accessed for block 2, Memory_Partition[2-7], and Addr=1 is accessed for block 2, Memory_Partition[0-1]. Provide a mechanism to make a 512-bit access in 1-cycle, and access all Memory_Partitions in 1-cycle. The following pseudo-code fragment represents an example of a mechanism that can be used for both read and write addressing, which can be implemented using digital logic circuits rather than software executing on a CPU:

PSEUDO-CODE FRAGMENT LIII.

```
Create a unit Wrap-Around Alignment
Input: Block_Mem_Ptr
Output: Memory_Partition_Addr [ 0 − K ] // K + 1
separate Memory Partition Addresses
LSBs is defined as how many binary bits to designate K + 1 positions
e.g., LSBs = least significant 3 bits of Block_Mem_Ptr to designate
8 Memory_Partitions
Parallel
For ( i = 0 ; i < #MP ; i++ )
  If ( i < Block_Mem_Ptr [ LSBs ] )
    Memory_Partition_Addr [ i ] = Block_Mem_Ptr + 1
  Else
    Memory_Partition_Addr [ i ] = Block_Mem_Ptr
End For
End Parallel
End Wrap-Around Alignment
```

C. Packet Binning

If the size of the memory is 4 MB, with 512-Bins, then each Bin will be 8 KB. Using a 512-bit data word leads to a Bin of 128×512-bits=8 KB. Using memory blocks of 64-bit width will result in a memory configuration for a Bin of 128 by (8×64-bits). A 128×64-bit memory block is 8K-bits=1 KB. There will be 8×1 KB memory blocks per Bin. For example, with a memory block=1 KB:

512-bins×8 memory blocks per bin=4K memory blocks of 1 KB=128×64-bits

D. Multi-Level Binning/Ultra-Fine Grain

From a Level 2 cell, the architecture needs to access Level 4 Attributes for 3-independent Level 3 cells. The architecture can make use of 3-independent 64-bit words from a 512-cell grid. Since the architecture can be 512 bit, or 64 bit, the memory will be partitioned to do both, along with supporting wrap-around. From a view of Single-port Memory blocks: the mechanism to do this is to distribute successive access across the Memory Partitions.

Creating 512 Memory_Partitions organized in a 64-Row×8-Column:

Data_Mem_ptr[2−0]—Column Address

Data_Mem_ptr[8−3]—Row Address

Data_Mem_ptr[8−0]—Memory_Partition #

Using 2 MB for 512 Memory_Partitions=4 KB per Memory_Partition 4 KB=512×64-bit Memory_Partitions In some embodiments, for example, for 3 independent 64-bit words, muxing structures may be attached to the inputs & outputs of the Memory_Partitions. In other embodiments, the data for the Level 3 cells and Level 4 cells, for the Level 2 cell, can be loaded into a local register file with the muxing structures.

VI. Some Additional Enhancements

Using 512-cell Grids for the Level 4 Headers—If all the dividers in a GTU are to be used for Triangle binning, then tripling the multipliers, adders, and comparators of a GTU would reduce worst-case binning of a Triangle to a 512-cell Grid in an effective 5 cycles. And this would extend worst-case Multi-Level/Ultra-Fine Grain binning to 9-independent 64-cell Grids per Step. For example, with a current spatial resolution of:

$L1\times L2\times L3=2^9\times 2^9\times 2^6=2^{24}=16M$ bit block

With Adaptive Level 3 increases to:

$L1\times L2\times L3=2^9\times 2^9\times 2^9$

The next spatial increase should look at L1. Either $L1=2^{12}$ or $L1=L1a\times L1b=2^6\times 2^6$.

Part III—Multiple Rays

Figure 42:
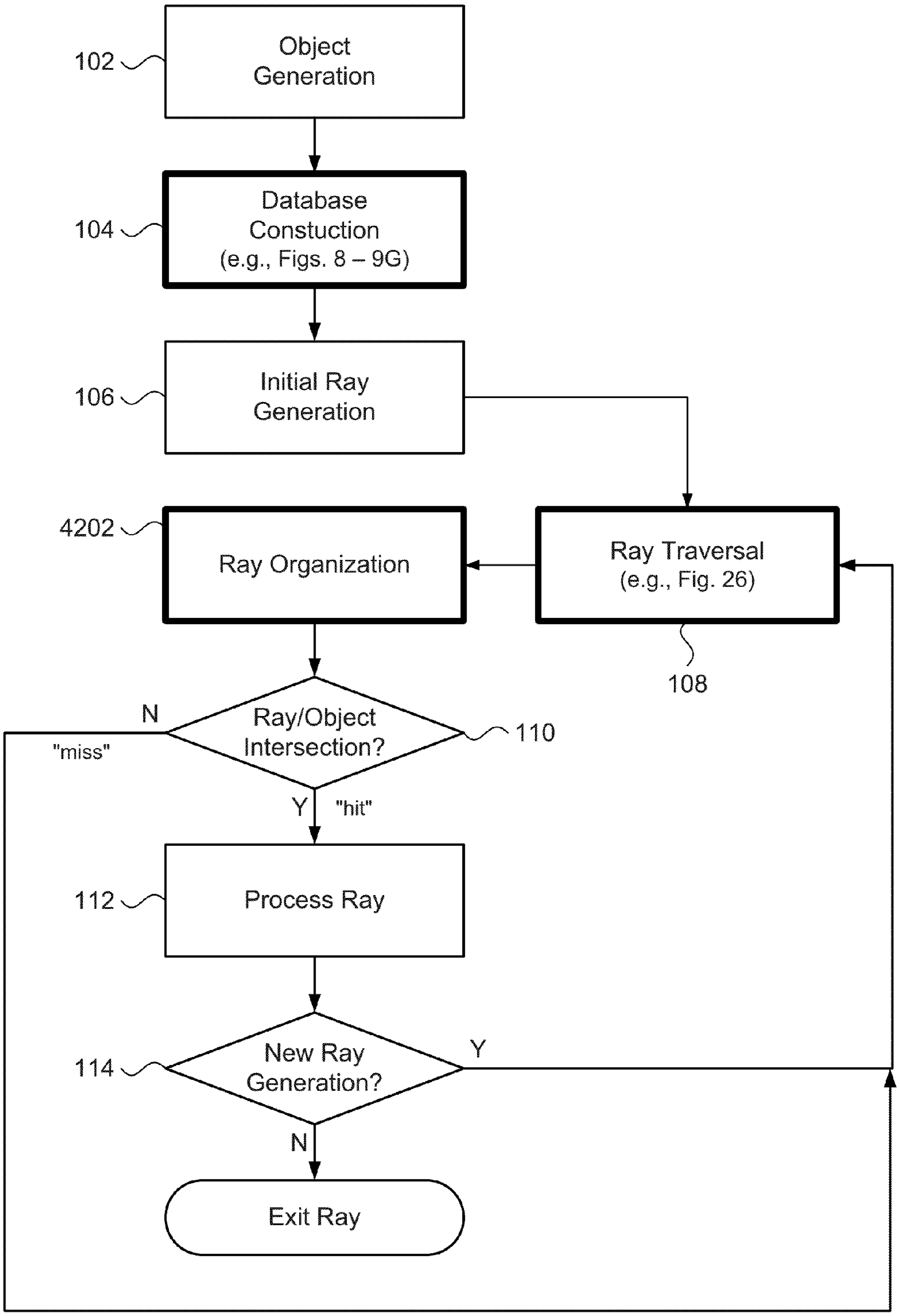
FIG. 42 shows ray traversal using with ray organization.

The single ray architecture described above is constructed for fast indexing and minimal movement of random data. However, random indexing (processing of rays in random order) comes with an external memory access latency, which leads to data needing to be moved for every access. This is solved by extending the single ray architecture to a multiple ray architecture with a mechanism to group the rays for access to common data sets. This may be referred to herein as "ray coherency" among data sets. Accelerating multiple ray traversal may be accomplished by organizing the rays for minimal movement of data, hiding latency to external memory data, as well as adaptive binning at the speed of ray movement. Rays are binned into coarse grain, and then into Fine grain Spatial Bins, independent of direction. FIG. 42, for example, shows the high level view for ray processing of FIG. 1 modified to include a block 4202 for organizing a ray after ray traversal processing (block 108) has been performed.

I. Coherency Among Incoherent Rays

Coherency can be found in very large numbers of incoherent rays. In some embodiments, this will be the same number as the Fail Safe resolution with 16M rays. At 64 bytes of data per ray, 1G byte of memory would be required. As will be discussed below, ray compaction, can compact the rays to 32 Bytes of data per ray, resulting in a memory requirement of 512M bytes. In a Fail Safe Resolution of 16M cells, X×Y×Z=d×d×d=256×256×256. For discussion purposes, a single ray could intersect with 3d−2 cells=766 cells. Which is relative to 16M cells−766 intersected cells=lots of non-intersected cells. To find coherency among incoherent rays, many rays must be cast to group common ray/cell intersections.

New On-Chip Memory Overheads are introduced to efficiently manage very large numbers of rays typically encountered in actual systems. The number of rays can be so large that they will exceed the capacity of on-chip memory. As the data will be streaming on/off chip, parallelism gives way to processing sequences of data. The architecture's organizational strength keeps on/off chip streaming to a minimum.

In order to keep Rays moving at the speed of Rays (data speed), the architecture in accordance with some embodiments, uses 3 memories:

1) Traversal Memory—4 MB Traversal Memory can be viewed as the Block Memory combined with the GTUs. It will use the Fail Safe allocation of Level 3 block memory of 4 MB.
2) Coarse grain Memory—4 MB This is for random unknown numbers of Rays that are entirely Incoherent. It is used bin a Ray after the Ray has gone through Traversal Levels 1 to 3, and has a Level 3 Hit in a new Level 1 cell. This memory will use Packet Binning to bin Rays.
3) Fine grain Memory—5 MB This is for known numbers of Rays that are in a Level 1 cell, but Incoherent for Level 2 and Level 3. This memory will use Ray Count Binning to bin Rays.

Implementing these 3 memories can save multiple on/off-chip accesses for the organization of every ray. Accelerated ray traversal is essentially better management of a database, with the allocation of resources required for the organization and access of massive numbers of incoherent data sets.

II. Grouping Rays

In accordance with the present disclosure, rays may be grouped according to the level 3 cells that they intersect. Thus, for a given dirty level 3 cell, all the rays that intersect that cell are grouped or otherwise identified as having intersected that cell. In this way, only one set of memory accesses needs to be performed to process all the rays that intersect a given dirty level 3 cell; in other words, the rays are spatially grouped. The best time to group a ray is when it has gone thru Ray_Traversal( ) described above and is ready to execute Ray_Intersect( ). This way, rays are grouped when they share a data access.

In some embodiments, as the ray traverses the hierarchy within Ray_Traversal( ) the ray data may be tagged with the cell addresses at each level that the ray traverses. Thus, a ray that intersects a dirty level 3 cell may be tagged with the cell address of that cell (e.g., L3_XYZ_Addr). In addition, the ray may be further tagged with cell address (e.g., L2_XYZ_Addr) of the level 2 cell containing the dirty level 3 cell, and with the cell address (e.g., L1_XYZ_Addr) of the level 1 cell containing that level 2 cell. The level 1 cell and the level 2 cells are also dirty cells because they too contain the portion of the triangle in the dirty level 3 cell. The ray data may therefore include a hierarchy of dirty cells, namely the level 1, 2, and 3 cells, that the ray intersects. Allocating for each level:

$$X\times Y\times Z=2^3\times 2^3\times 2^3=2^9=8\times 8\times 8$$

This requires 3-bits for each X, Y, Z_addr=9 bits. A total of 27 bits would be allocated for: [L1_XYZ_Addr, L2_XYZ_Addr, L3_XYZ_Addr] and stored as an attribute with each ray. If a ray moves up/down thru levels, it is re-tagged at that level.

In accordance with the present disclosure, each ray is "atomic" in the sense that the ray is processed independently from the other rays. Each ray will advance with its own ray distance parameter Ray_t_current through the scene. Concurrent pipeline processing of rays will result in the ray getting out of order from their input sequence, since each ray will take a different amount of time to be processed by Ray_Traversal( ). When the ray has hit a level 3 dirty cell, a Ray/Grid Dirty Intersection could be done and stored as an attribute L4_Block_Ray. However, L4_Block_Ray could also be calculated when needed and not be stored.

A. Coarse Grain Binning

Coarse grain binning can be used for a large, unknown number of unordered rays. As a ray is traversed to where it intersects a dirty cell at level 3, the ray will be binned with the spatial resolution of level 1. In other words, the ray will be binned into the level 1 cell that contains the dirty level 3 cell that the ray intersects. In some embodiments, packet binning may be used for the coarse grain level. Generally, rays are traversed until they hit a dirty cell at the fine grain level, then binned at a coarse grain level at level 1. The optimal ray traversal allows rays to be written off-chip and coarse grain binned at the transfer rate of ray data movement. As an example, if coarse grain memory is 4 MB with 512 bins (cell locations), then the memory would be allocated as 8 KB partitions.

Figure 43:
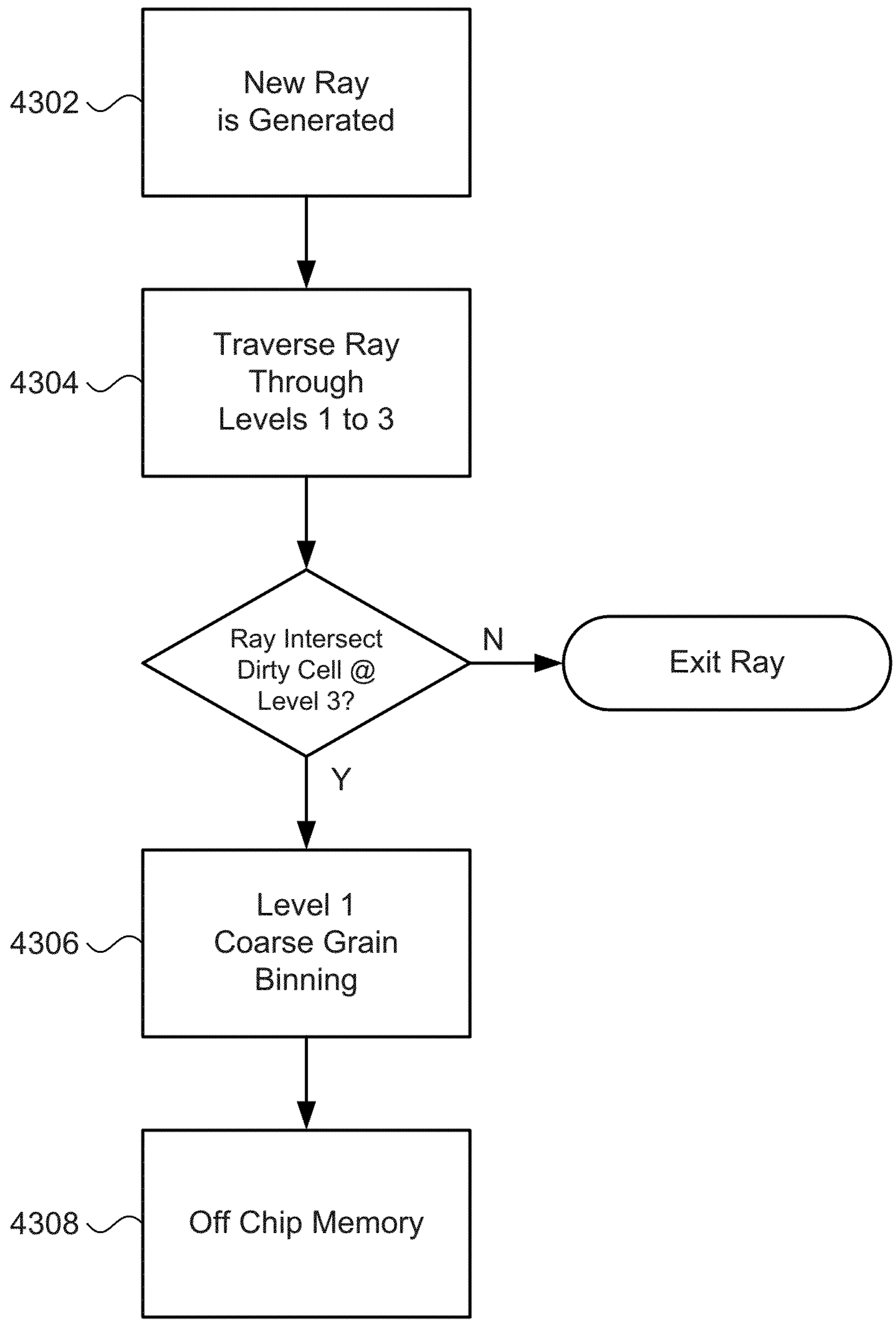
FIG. 43 shows ray traversal with level 1 coarse grain binning.

FIG. 43 shows an example that illustrates this flow. At block 4302, a ray is received (or otherwise generated) for traversal through the scene (e.g., 10, FIG. 1). At block 4304, ray traversal is performed on the received ray, and continues until the ray intersects a dirty level 3 cell or exits the scene. If the ray has intersected a dirty cell at level 3, then at block 4306 the ray is binned (grouped) according to the level 1 cell that contains the dirty level 3 cell, referred to as level 1 coarse grain binning Note, at this point, it is only determined that the ray has intersected a level 3 dirty cell but not whether the ray has intersected a triangle in that dirty cell; this subsequent determination of an intersection is made later on, as will be explained below.

The binned ray may be written to off-chip memory (block 4308); e.g., coarse grain memory. If the coarse grain memory is 4 MB with 512 bins, then the memory would be allocated as 8 KB partitions. The rays may be binned according to the operations of the packet binning module described above, for example. In some embodiments, the processing of FIG. 43 may occur in pipeline fashion.

B. Fine Grain Binning

The coarse grain binning serves to bin rays that have intersected dirty level 3 cells according to the level 1 cells that contain the dirty level 3 cells. Note that each ray also intersects a level 2 cell that contains the dirty level 3 cell. Fine grain binning further sorts the level 1 binned rays according to the level 2 and level 3 cells that the rays intersect. This subsequent binning is referred to as "fine grain" binning in the sense that each ray is further binned into higher resolution cells. When sorted according to level 2 and level 3 cells, spatial coherency among the rays is achieved. In other words, rays are grouped according to the location of the level 3 cells in the scene. Thus, when ray intersection processing is performed, the same object data can be shared by spatially close rays so as to significantly reduce the amount of data that needs to be read in and written out.

Figure 44:
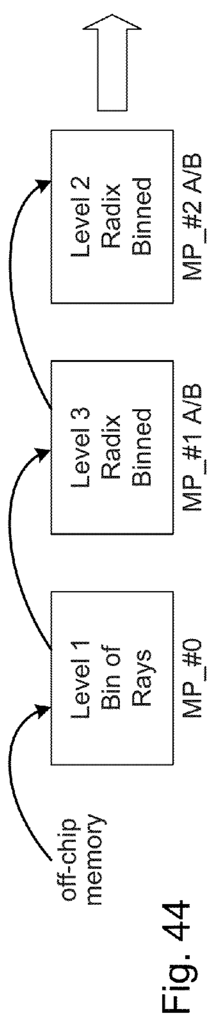
FIG. 44 illustrates the flow for fine grain binning across memory partitions.

Referring now to FIG. 44, the discussion will turn to additional details about the fine grain binning process. In accordance with the present disclosure, fine grain binning may use "ray count binning," which is based on a known sorting algorithm called "radix sort," as described for example by Cormen, Thomas H.; Leiserson, Charles E.; Rivest, Ronald L.; Stein, Clifford (2001), "8.3 Radix Sort," *Introduction to Algorithms* (2nd ed.), MIT Press and McGraw-Hill, pp. 170-173. In a particular embodiment, the radix sort is of the class called least significant digit (LSD) radix sort where sorting begins with the LSD (radix) of each key and continues with the next neighboring more significant digit (radix) until there are no more digits to process. Sorting by each radix may be performed using a counting sort algorithm as described for example, at Id "8.2 Counting Sort," pp. 168-170. Ray count binning sorts rays, while keeping the data moving from one bin level to the next in order to transfer data between bins at data transfer rates.

The cell addresses may be treated as "digits" in the radix sort algorithm, where the level 1 cell addresses are the most significant digits (MSDs) and the lowest level cell addresses (level 3 in our examples) are the least significant digits (LSDs). The coarse grain binning discussed above may be viewed as an initial sort on the MSDs, where the rays are sorted in order according the level 1 cells they first intersect. In accordance with the present disclosure, the coarse grain binned rays may be stored off chip in order to accommodate large numbers of rays.

In FIG. 44, a memory MP__#0 receives ray data from the off-chip memory (see, for example, block 4602, FIG. 46) for rays that have been binned in a given level 1 cell (bin), for example, per FIG. 43. The so-called "level 1" ray data may be stored in MP__#0 in the order that the ray data comes in from the off-chip memory; i.e., the ray data is not sorted or otherwise ordered according level 2 cells or level 3 cells. As will be explained in more detail below, addressing information is generated as ray data for each ray is received and stored into MP__#0, using level 3 cell address information contained in the ray data. The level 3 cell addresses represent the LSD digits in the LSD radix sort. The addressing information is generated using a counting sort performed on the level 3 cell addresses.

Next, the level 1 ray data in MP__#0 is stored into memory MP__#1. In accordance with the present disclosure, the addressing information that was generated as level 1 ray data was being stored into MP__#0 can be used to store the level 1 ray data into MP__#1 as "level 3" ray data in sorted order according to the addresses of the level 3 cells that their corresponding rays intersect. At the same time that the ray data is being stored into MP__#1, addressing information is generated using level 2 cell address information contained in the ray data. The level 2 cell addresses represent the next higher LSD digits in the LSD radix sort. The addressing information is generated using a counting sort on the level 2 cell addresses.

Next, the level 3 ray data in MP__#1 is stored to memory MP__#2 as "level 2" ray data using the addressing information that was generated as ray data was being stored into MP__#1. At this point, the ray data in MP__#2 is sorted according to level 1 cells, level 2 cells, and level 3 cells.

The pseudo-code fragments below represent the flow of ray data from MP__#0 to MP__#2. The first pseudo-code fragment will set up the level 3 bin addresses for MP__#1. In some embodiments, 16K rays from a level 1 dirty cell stream into MP__#0. The rays are ordered with level 1, but unordered with level 2 and level 3. This will setup the bin addresses for MP__#1 using the level 3 radix. There may be more ray data stored in the off chip memory for a given level 1 cell than can be stored in MP__#0. In accordance with the present disclosure, however, as long as MP__#0 holds enough ray data to establish spatial coherency among an adequate number of rays, then the subsequent sorting with level 2 and level 3 can proceed 16K rays at a time.

As the 16K Rays flow into MP__#0, 512 bin addresses will be concurrently updated for the level 3 radix, which can be implemented using digital logic circuits rather than software executing on a CPU:

PSEUDO-CODE FRAGMENT LIV.

```
// Initial:
MP_#1_Bin_Addr [ 0 – 511 ] = 0     // Level 3 Radix Addresses
MP_#0_Ray_Addr = 0
For every Ray received into MP_#0:
MP_[ MPit_#0_Ray_Addr ] = Ray
MP_#0_Ray_Addr = MP_#0_Ray_Addr + 1
// Parallel
For ( i = 0 ; i < #L3_Bins ; i++ )
   If ( i > Ray. L3_XYZ_Addr )
MP_#1_Bin_Addr [ i ] = MP_#1_ Bin_Addr [ i ] + 1
// End Parallel
```

A $2^{nd}$ set of 16K rays will be concurrently flowing into MP__#0 as the $1^{st}$ set of 16K rays are flowing out of MP__#0 into MP__#1. The notation Ray.L3_XYZ_Addr represents a reference to the cell address of the level 3 cell that that the ray has intersected.

To keep data flowing into MP__#0, as soon as the 16K rays have been received by MP__#0, they are immediately read out in a ray stream to MP__#1. Implementation for MP__#1 could be separate A/B Memories, or a memory with twice the address space. So in implementation MP__#1 will actually be 2 MB, though logically treated as 1 MB. Treating as A/B, each MP__#1 partition will be 1 MB. The following pseudo-code fragment expresses the processing, which can be implemented using digital logic circuits rather than software executing on a CPU:

PSEUDO-CODE FRAGMENT LV.

```
// Initial:
MP_#2_Bin_Addr [ 0 – 511 ] = 0     // Level 2 Radix Addresses
For every Ray received into MP_#1:
MP_#1 [ MP_#1_Bin_Addr [ Ray.L3_XYZ_Addr ]] = Ray
MP_#1_Bin_Addr [ Ray.L3_XYZ_Addr ] = MP_#1_Bin_Addr
[ Ray.L3_XYZ_Addr ] + 1
// Parallel
For ( i = 0 ; i < #L2_Bins ; i++ )
   If ( i > Ray. L2_XYZ_Addr )
MP_#2_Bin_Addr [ i ] = MP_#2_ Bin_Addr [ i ] + 1
// End Parallel
```

The rays are now ordered into adaptively sized bins for the level 3 radix. Level 2 radix addresses are ready for level 2 radix binning. A 2nd set of 16K rays will be flowing into MP__#1/B as the 1st set of 16K rays are concurrently flowing out of MP__#1/A, then swap A/B with next pass.

To keep data flowing into MP__#1, as soon as the 16K rays have been received by MP__#1, they are immediately read out in a ray stream to MP__#2. Implementation for MP__#2 could be separate A/B Memories, or a memory with twice the address space. So in implementation MP__#2 will actually be 2 MB, though logically treated as 1 MB. Treating as A/B, each MP__#2 partition will be 1 MB.

For every ray received into MP__#2:

PSEUDO-CODE FRAGMENT LVI.

```
MP_#2 [ MP_#2_Bin_Addr [ Ray.L2_XYZ_Addr ]] = Ray
MP_#2_Bin_Addr [ Ray.L2_XYZ_Addr ] = MP_#2_Bin_Addr
[ Ray.L2_XYZ_Addr ] + 1
```

The rays are now ordered into adaptively sized bins for the level 2 radix. A $2^{nd}$ set of 16K rays will be flowing into MP__#2/B as the 1st set of 16K rays are concurrently flowing out of MP__#2/A, then swap A/B with next pass.

Figure 45:
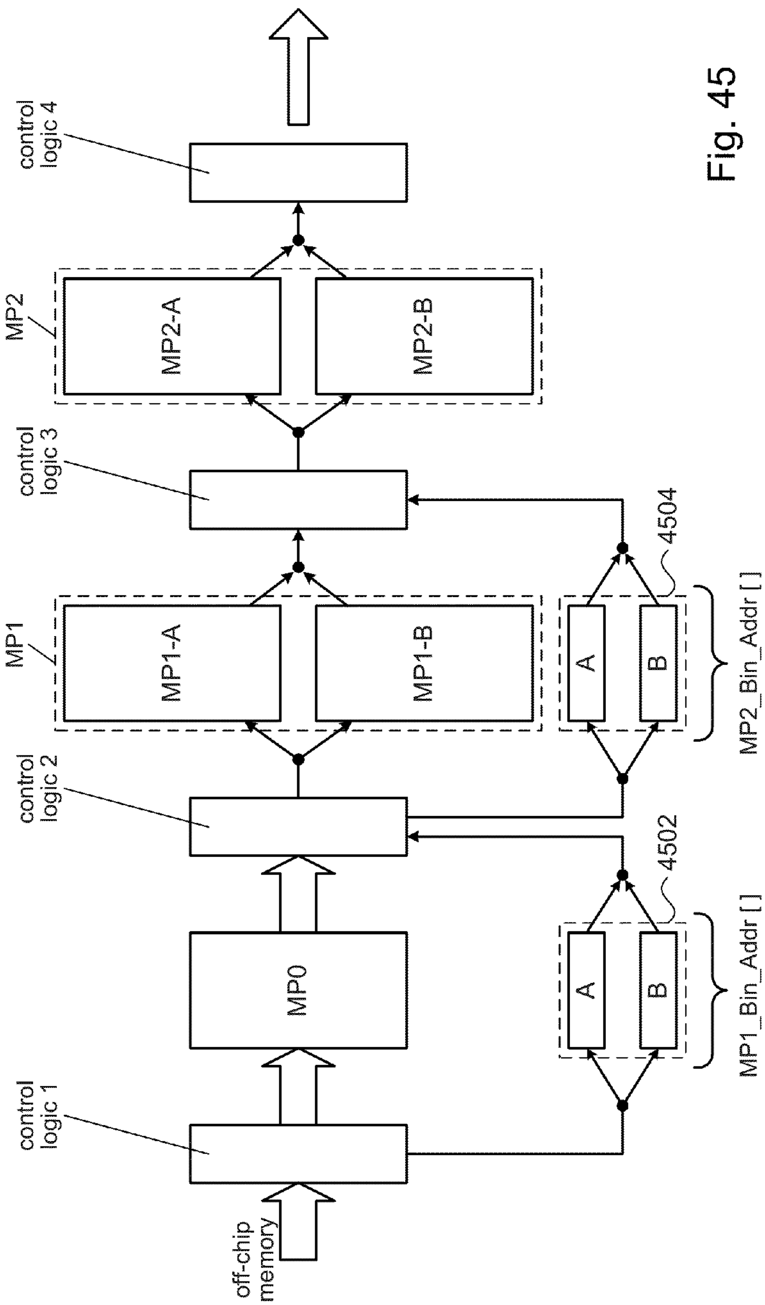
FIG. 45 shows an illustrative embodiment of the memory partitions of FIG. 44.

FIG. 45 illustrates an example of a hardware configuration of the arrangement shown in FIG. 44 and represented by the above pseudo-code fragments. Control logic 1 receives ray data (e.g., from off-chip memory) one ray at a time and stores the ray data in memory MP0. Control logic 1 also updates register bank 4502 to store addressing information, for example, as set forth in above in the pseudo-code. The addressing information identifies addresses in memory MP1, and may be generated from the level 3 cell addresses stored in the ray data (in accordance with an LSD radix sort) by sorting the level 3 cell addresses using a counting sort algorithm.

In some embodiments, register bank 4502 may comprise two banks of registers: registers A and registers B. Register bank 4502 may be shared between control logic 1 and control logic 2 in alternating fashion. Thus, for example, as control logic 1 updates registers A in a first cycle, control logic 2 may access data stored in registers B by control logic 1 in a previous cycle. Then in the next cycle, control logic 1 may write to registers B, while control logic 2 reads from registers A, and so on with succeeding cycles.

Control logic 2 stores data from MP0 into locations in MP1 according to the addresses contained in register bank 4502, either in registers A or in registers B. As the ray data is copied or moved from MP0 into MP1, the ray data in MP1 is sorted or binned according to their corresponding level 3 cells irrespective of the level 2 cell addresses, in accordance with radix sort.

At the same time that data is moved into MP1, control logic 2 updates register bank 4504 to store addressing information that identifies addresses in memory MP2. The addressing information may be generated from the level 2 cell addresses stored in the ray data (in accordance with an LSD radix sort) by sorting the level 2 cell addresses using a counting sort algorithm. Control logic 3 then stores data from MP1 into locations in MP2 according to the addresses contained in register bank 4504, either in registers A or in registers B. Control logic 2 and control logic 3 may switch between registers A and B of register bank 4504 during successive cycles.

In some embodiments, the MP1 memory comprises an A-component and a B-component, so that the ray stream can flow without interruption. As data is written into MP1-A from MP0 by control logic 2, data from MP1-B can be read out by control logic 3 into MP2. The roles of MP1-A and MP1-B are then switched on the next cycle, and so on. MP2, likewise, may be configured as a dual memory comprising an A-component and a B-component, allowing data to be written to one of the memory components (e.g., MP2-A), while data is being read out of the other memory component (e.g., MP2-B). The roles of MP2-A and MP2-B can be switched between control logic 3 and control logic 4 at every cycle.

In a particular embodiment, a 5 MB memory may be partitioned into five separate 1 MB memory partitions for MP0, MP1-A, MP1-B, MP2-A, and MP2-B. With five memory partitions, 48K rays can go through fine grain binning using the resources of the disclosed GTU (FIG. 14). In a particular embodiment, rays from a level 1 dirty cell stream into MP0. In some embodiments, packet binning may be used to bin 16K rays at a time, allowing 48K rays to be concurrently going through fine grain binning C. Mismatch Encoding Referring to the section above called "MisMatch," in some embodiments, the spatial resolution for Level 3 Traversal may be at a finer-grain than the Data storage. This can be used above when moving data from MP_#1 to MP_#2 and from MP_#2 to MP_#3. If the number of Objects is 1M Triangles, with Level 3 blocks of $2^9$, giving an effective Grid Resolution of $2^{27}$, could result in many object overlaps into many Grid cells. The solution is to keep the fine grain for Traversal, but store the Triangles in a coarser-grain. The Triangles, at Level 3, could either be stored, as a Level 2 cell, a octree, a 64-tree, or combined in linear order.

Example

Combining Spatial Area in Linear Order

If a Level 3 block is $2^9$ cells, and the Triangles are stored in a coarser-grain $2^3$ block, then for every $2^6$ bits of a $2^9$ Level 3 block will point to a same coarser-grain cell.

This could help manage the overhead of Fine grain binning, and keep the data structure in a smaller footprint. Spatial/Object density will determine what grain to store the data.

Ray Coherency, with the number of rays being $2^{14}$=16K, could be extremely low, with an effective grid resolution of Level 2 and Level 3 either being $2^9\times2^6=2^{15}$, or $2^9\times2^9=2^{18}$. This promotes the Mismatch Encoding to create temporal spatial coherency among the Rays. However, density of the objects will be the priority variable.

D. Ray Grouping and Traversal Flow

Figure 46:
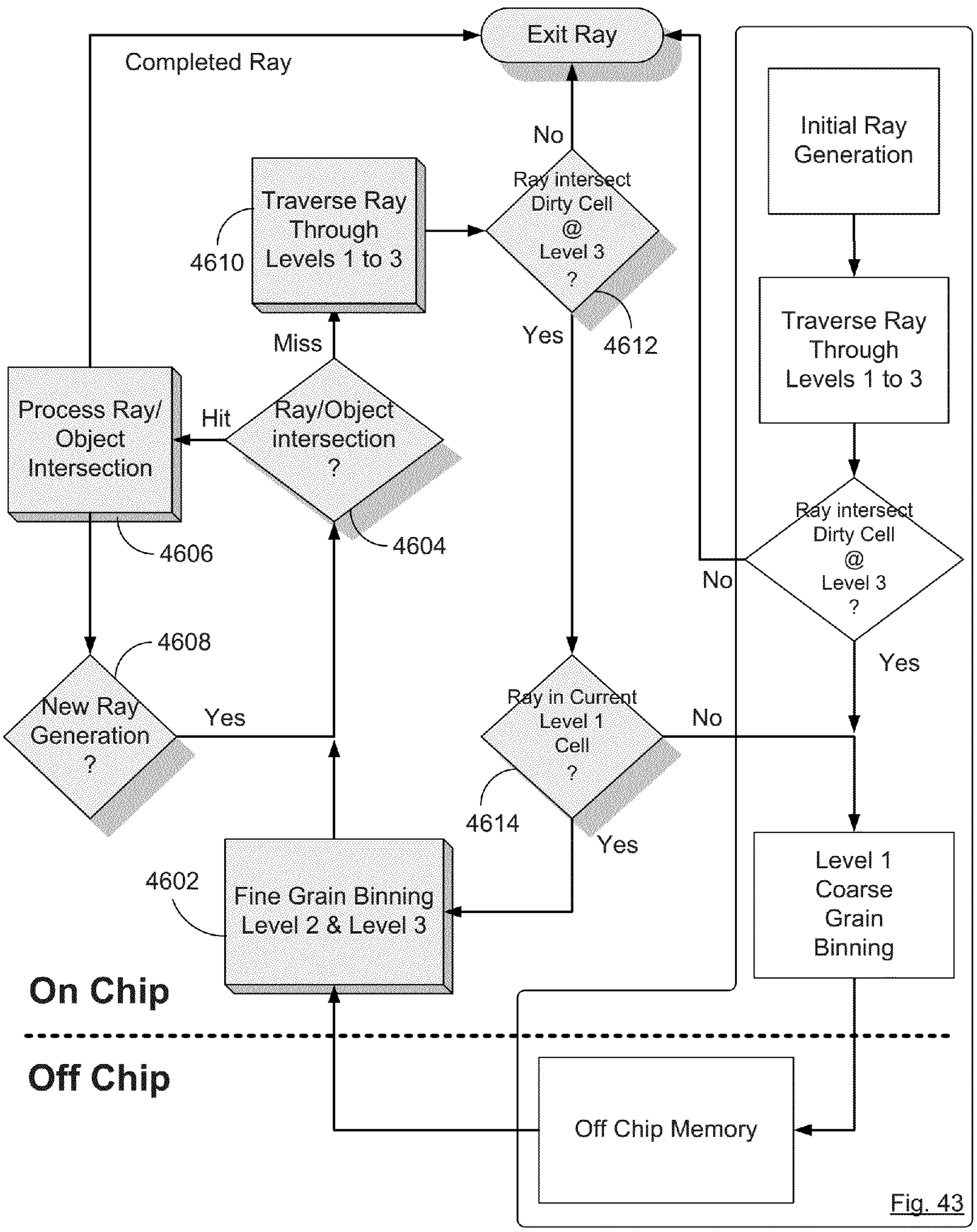
FIG. 46 shows a high level flow for ray traversal processing according to the present disclosure.

FIG. 46 illustrates an embodiment that ties together coarse grain binning and fine grain binning in the context of ray traversal in accordance with the present disclosure. In the overall flow shown in FIG. 46, rays have been binned into level 1 cells, as explained per FIG. 43, and may be stored in off-chip memory.

As rays are being binned into level 1 cells and stored off-chip, groups of rays in a given level 1 cell may be read from off-chip memory and further binned into level 2 and level 3 cells. Accordingly, at block 4602, a given level 1 cell (referred to as the "current level 1 cell") may be processed by reading in the rays that have been binned into that cell so far; e.g., using fine grain binning. The number of rays (more specifically, ray data) that are read in may be determined by the size of the memory (e.g., MP_#0, FIG. 44) that is receiving the ray data. In some embodiments, for example, the size of MP_#0 can store ray data for 16K rays. Each ray is then sorted according to level 2 cells and level 3 cells, for example, as described above.

At block 4604, a determination may be made for each of the sorted rays whether the ray intersects an object. Recall that ray traversal in FIG. 43 determines only whether the ray has intersected a level 3 dirty cell; it is not known whether the ray actually intersects a portion of a triangle in that dirty cell. Accordingly, if the ray intersects an object ("Hit"), then in block 4606, the ray may be processed at block 4606 to store data relating to the ray/object intersection; e.g., incorporating ray attribute data and triangle attribute data with the ray data.

Hit Processing ("Hit" from Block 4604)

If the ray hits an object, then that ray is complete and exits (via Exit Ray). At the same time, a determination is made in block 4608 whether one or more new rays should be generated from the completed ray, for example, as a result of the ray/object intersection. For instance, if the ray should be reflected, then a reflection ray may be generated. If the object is transparent, then a transparency ray may be generated, and so on. The new ray(s) can then be tested for intersection with an object in block 4604. In other embodiments, the new ray(s) can be processed in block 4602 if the previously loaded object data is not locally saved.

Missed Ray Processing ("Miss from Block 4604)

If, in block 4604, the ray does not intersect an object in the level 3 dirty cell ("Miss"), then processing proceeds to block 4610 to traverse the ray through the remainder of the scene to determine if the ray intersects another level 3 dirty cell. If the ray intersects another level 3 dirty cell in the current level 1 cell ("YES", blocks 4612 and 4614), then processing proceeds to block 4602. The ray is resorted among the unprocessed rays in block 4602 so that the ray is sorted with other rays close to the level 2 cell and level 3 cell intersected by the ray. If the ray intersects a level 3 dirty cell in another level 1 cell ("YES" block 4612, "NO" block 4614), then the ray is coarse grain binned (block 4306, FIG. 43) to be sorted among the other level 1 rays.

E. Ray Access Maps

A ray access map is essentially a bitmap that represents the linear ordered access of rays to data. As the rays are being ordered, the ray access maps can be developed concurrently. It could be done at any step of Ray Count binning, but loading MP__#2 the Rays are ordered at Level 2.

Adding on to the pseudo code for moving data from MP__#1 to MP__#2:

Initial

Level__2_Access_Map[0-511]=0//512-bits

Level__3_Access_Map[0-511][0-511]=0//32K Bytes

L2_XYZ_Addr_prev=−1

For every Ray received into MP__#2:

Level__2_Access_Map[Ray.L2_XYZ_Addr]=1

Level__3_Access_Map[Ray.L2_XYZ_Addr][Ray.L3_XYZ_Addr]=1

The architect/engineer can use this to pre-fetch data, or have some foreknowledge of how to setup later steps as the Rays leave MP__#2 or MP__#3.

In summary:

Rays Traverse until a Ray HIT at Level 3 Dirty Cell.

Rays are Coarse grain Binned to Level 1. Rays can get sent out, as fast as they come in.

Rays are read in and Fine grain Binned to Level 2 and Level 3, on-chip.

Results in a single pass bursting off/on chip access to get to Fine grain ordered Rays.

III. Ultra-Fine Grain Level 4

Figure 47:
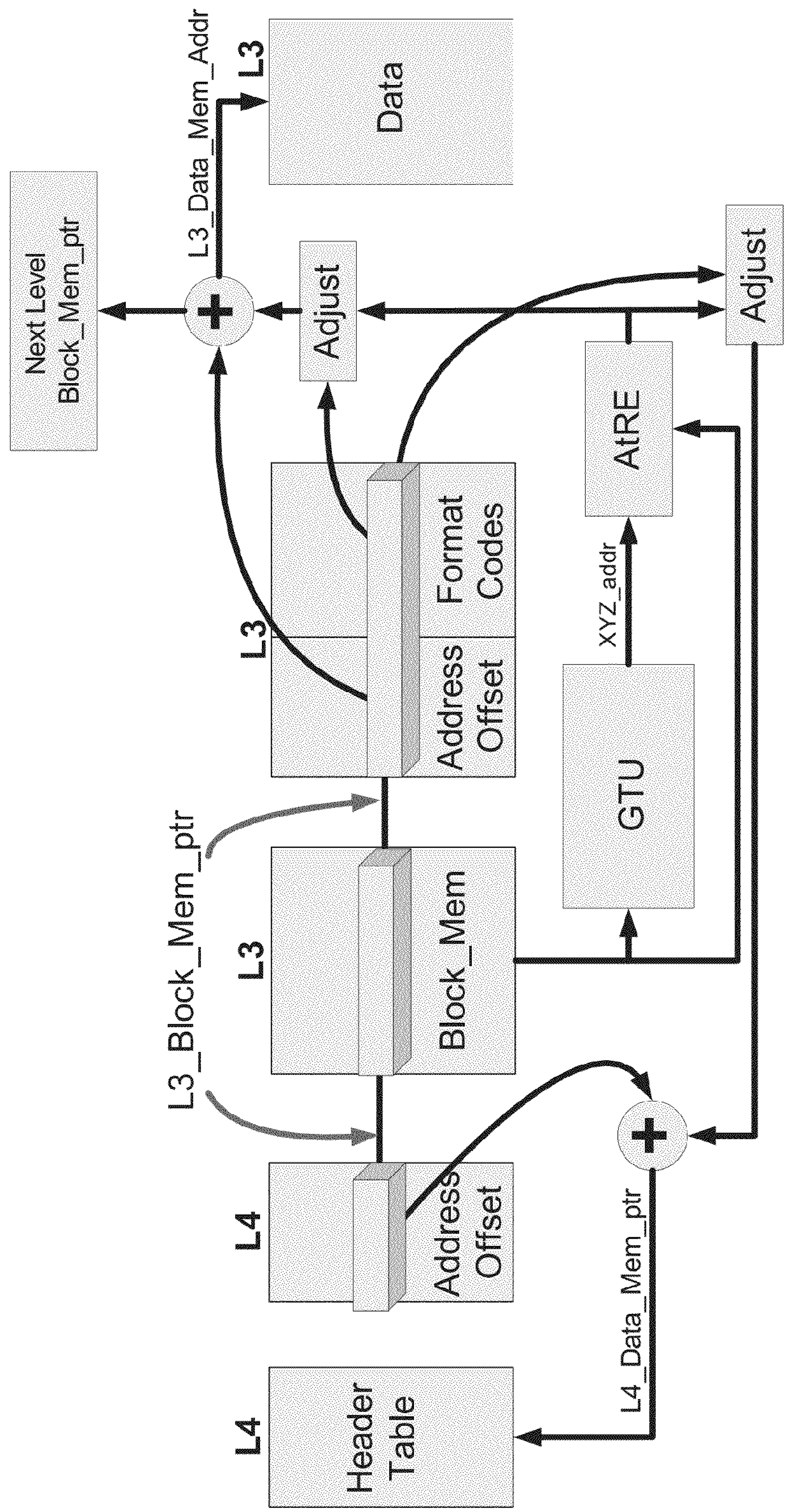
FIG. 47 shows a memory arrangement to accommodate level 4.
Figure 48:
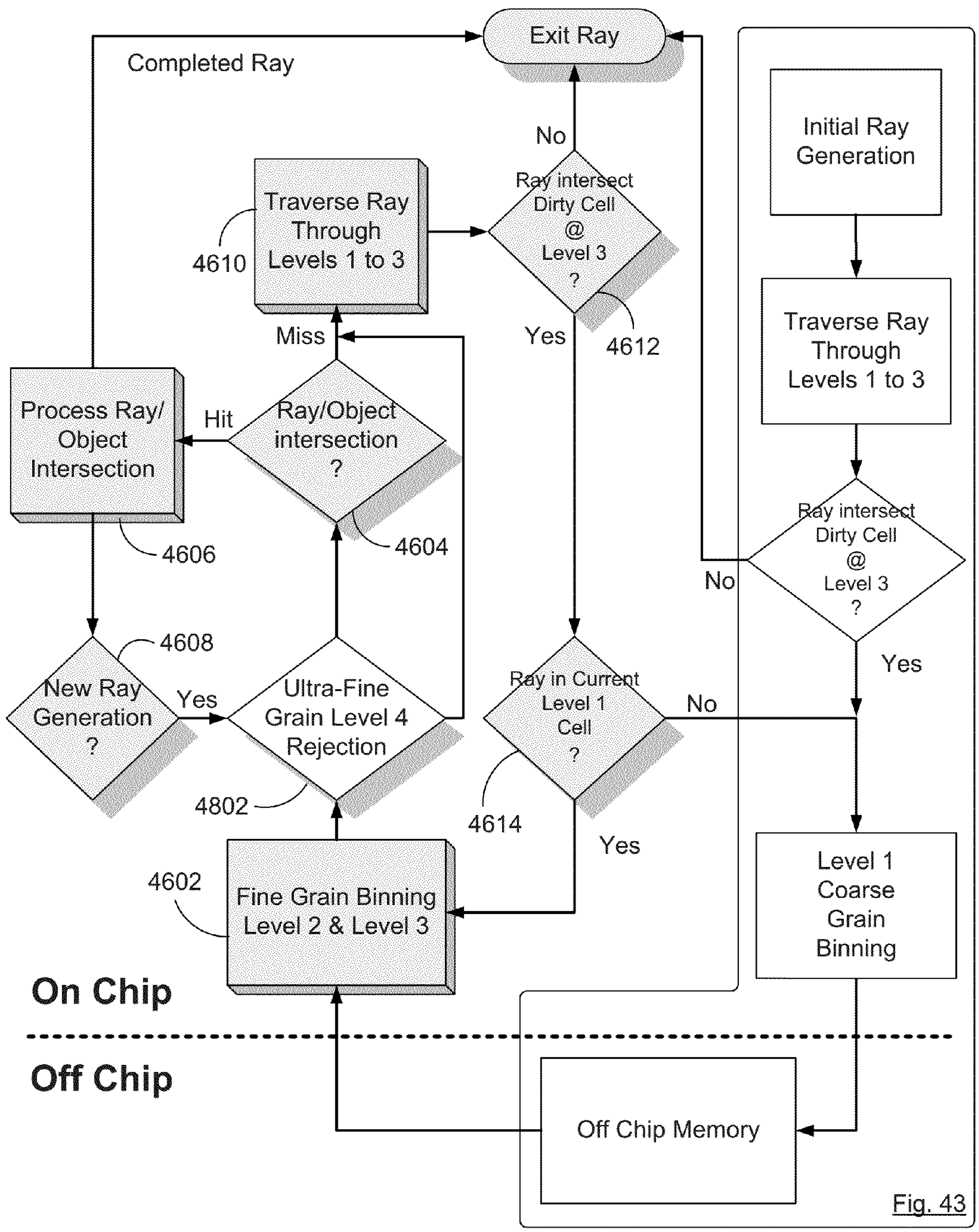
FIG. 48 shows ray traversal with fine grain binning using level 4.

In some embodiments, ultra-fine grain can be extended to a higher resolution level. The description will now turn to a discussion of some points in connection with processing for level 4. FIG. 47 shows an illustrative implementation that includes access for level 4. FIG. 48 illustrates how the processing of FIG. 46 may be modified to include level 4. The flow is modified by using a rejection test block 4802 to determine whether the ray intersects any dirty level 4 cells. If an intersection occurs, then processing proceeds to block 4604 to test if the ray intersects the object at level 3. If no intersection, then processing proceeds to block 4610 to traverse the ray through the rest of the scene.

A. Level 4 Header Table

As mentioned above, the 64-bit L4_Block_Ray attribute can be generated during Ray_Traversal( ), or in some embodiments, the attribute can be generated on the fly after MP__#3, and placed as the L4_Block_Ray attribute on a ray. As can be seen in FIG. 47, if relative indexing is used on the Level 4 Header Table, then a separate L4_Address_Offset table will be accessed exactly as the L3_Address_Offset.

As the rays flow out of MP__#3, they will check their L4_Block_Ray 64-bit value with the L4_Header_Table. All the accesses to L4_Header_Table are already in the Ray_Access Maps in ordered linear access. Any and all L4 data could be pre-fetched, or setup to stream, as all Access Addresses are known. As the rays are being tested, an all-new updated Ray_Access Map can be constructed on the fly. The rejection test at block 4802 may be expressed as explained above in connection with FIG. 27, namely:

Ultra-Fine Rejection=NOT((Ray-L123_XYZ_Addr==Object-L123_XYZ_Addr) && ((Ray-L4_Block_Ray bit-wise-AND L4_Block_Header)!=0))

B. Level 4 Data

If the object has a 64-bit L4_Block_Object spatial attribute, then it can be tested against a ray's L4_Block_Ray attribute for a Ray_Hit/Miss.

C. Parallel Level 4 Comparison

This section addresses some implementation-specific points. The particular hardware building blocks and on-chip memory technology that is available may determine whether to test multiple objects in parallel against a ray, or parallel rays against an object.

1. Parallel Rays Against an Object

As the rays stream in/out of Level 4 Header comparisons, they can be loaded into a group of registers to be tested in parallel against an object. Implementation specific, but this research paper will choose a 512-Register group. The ray access map for the 512 rays can be pre-constructed, or created on the fly. The Architect/Engineer will use the ray access maps to schedule the data to be available to the rays so any latencies could be hidden.

Ray Group Registers for 512 rays could be 512×512 bit registers. Load the 512 rays into the Ray Group Registers. The range between the $1^{st}$ ray's L123_XYZ_Addr and $512^{th}$ ray's L123_XYZ_Addr will use the Ray Access Maps to move the objects to be tested.

As each object is received, its L123_XYZ_Addr and L4 attributes can be stored with, or constructed on the fly. Rejection testing (block 4802, FIG. 48) can may be expressed as explained above in connection with FIG. 27, namely:

Ultra-Fine Rejection=NOT ((Ray-L123_XYZ_Addr==Object-L123_XYZ_Addr) && ((Ray-L4_Block_Ray bit-wise-AND Object-L4_Block_Object)!=0))

2. Parallel Objects Against a Ray

Similar to the above section, but the Ray Group Registers are filled with 512 objects, then a ray is rejection tested using the L123_XYZ_Addr and L4 attributes.

IV. Multi-Grid Traversal/Ultra-Fine Grain

In some embodiments, previous level results can be re-used by the next level to allow for continued pipeline processing in case the hardware resources are limited. This is similar to the discussion above for multi-grid binning/ultra-fine grain. The following pseudo-code fragment expresses this re-use:

PSEUDO-CODE FRAGMENT LVII.

```
Unit: Partitioning_Planes_64
Input: XYZ_Addr    // represents X, Y, and Z, address
                    components of a cell
L4_X_Planes [ 0 ] = L3_X_Planes [ X_Addr ]
L4_X_Planes [ 1 ] = L4_X_Planes [ 1 ]
L4_X_Planes [ 2 ] = L4_X_Planes [ 2 ]
L4_X_Planes [ 3 ] = L4_X_Planes [ 3 ]
L4_X_Planes [ 4 ] = L3_X_Planes [ X_Addr + 1 ]
// Same for Y_Values & Z_Values
End Partitioning_Planes_64
```

If Level 4 Values are 64-bit, the GTU could traverse 3 independent Level 3 dirty cells checking the ray's newly calculated L4_Block_Ray, against a L4_Header_Table, for each Level 3 dirty cell. In some embodiments, a comparator tree can be used to find the 3 closet dirty cells from current ray position. The ray distance values for X, Y, and Z values are already in sorted order with individual valid flags.

A. Lookahead Flags

In accordance some embodiments of the present disclosure, lookahead data may be used to do improve the performance of ray traversal by increasing the likelihood of detecting a miss and thus avoid the cost (data movement and processing) of testing for a ray-object intersection. In some embodiments, for example, the GTU may be modified to concurrently traverse three level 3 dirty cells at level 4 resolution in order to determine whether or not to test a level 3 dirty cell for a ray-object intersection.

Figure 52:
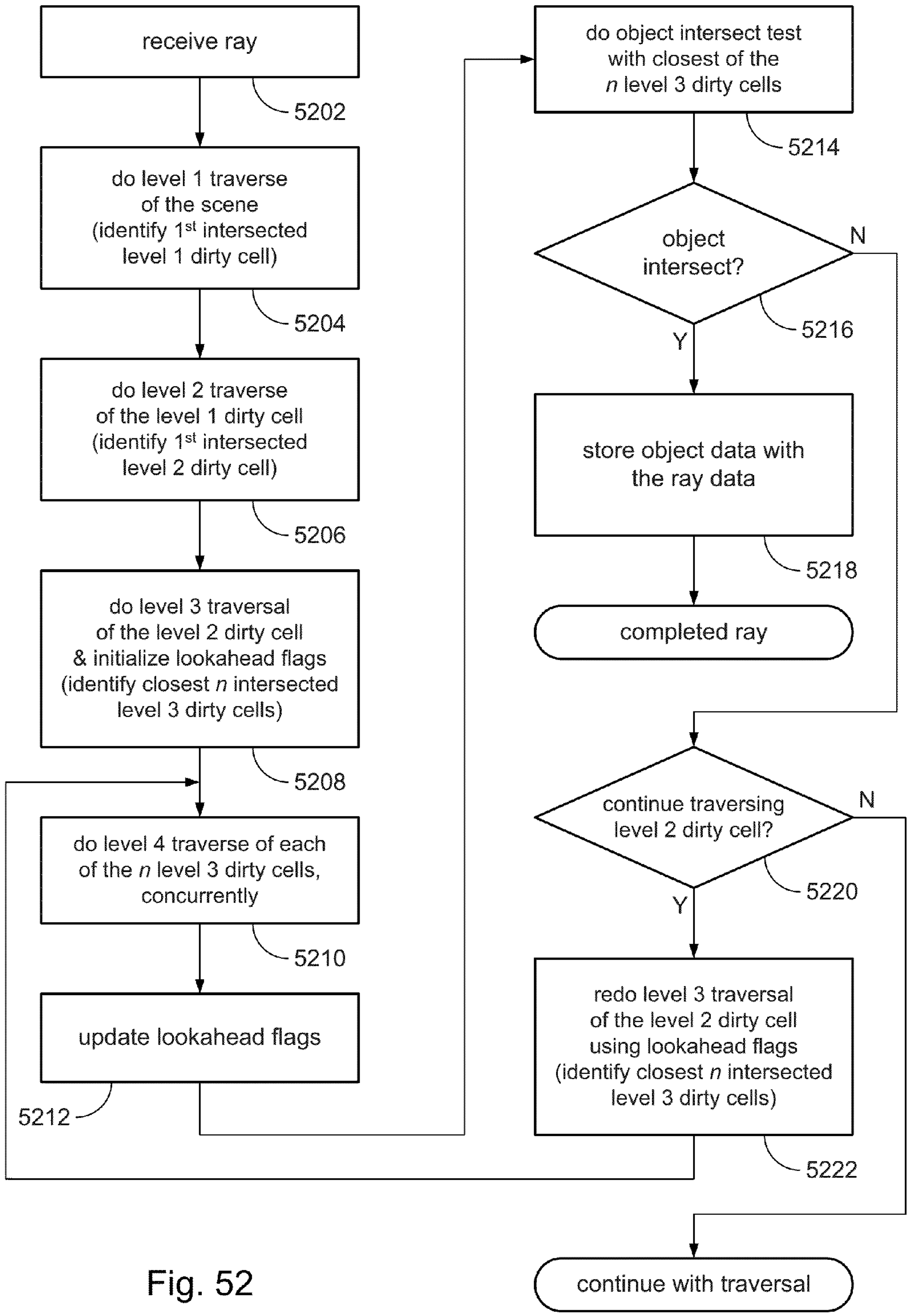
FIG. 52 illustrates a high level flow for lookahead processing in accordance with the present disclosure.

Referring to FIG. 52, a GTU in accordance with some embodiments may receive at 5202 a ray to be traversed through a scene. At 5204, the GTU may perform a level 1 traversal to identify the first level 1 dirty cell that the ray intersects. At 5206, the GTU may perform a level 2 traversal of that level 1 dirty cell to identify the first level 2 dirty cell that the ray intersects.

At 5208, the GTU may perform a level 3 traversal of that level 2 dirty cell to identify all the level 3 dirty cells that the ray can intersect. In a particular implementation, the GTU may sort the level 3 dirty cells in order of their distance from the ray. Lookahead data can be generated to identify the level 3 dirty cells. In a particular embodiment, the GTU may identify three level 3 dirty cells that are closest to the ray. For example, the GTU may include comparator tree logic that uses previously described internal data registers such as:

t_valid_X_Plane[ ], t_valid_Y_Plane[ ], t_valid_Z_Plane[ ]

t_x[ ], t_y[ ], t_z[ ]

X_addr_Y_Plane[ ], Z_addr_Y_Plane[ ]

X_addr_Z_Plane[ ], Y_addr_Z_Plane[ ]

Y_addr_X_Plane[ ], Z_addr_X_Plane[ ]

in order to sort the level 3 dirty cells and determine the cell address (XYZ_addr) of the closest three level 3 dirty cells. It will be appreciated that more than three closest dirty cells may be identified, depending on the particular implementation.

At 5210, the GTU may concurrently process each of the three level 3 dirty cells for level 4 traversal as explained above, for example, in FIGS. 40 and 40A. In particular, the level 4 traversal will identify, in each of the three level 3 dirty cells, whether the ray intersects a level 4 dirty cell in that level 3 dirty cell.

As will be explained in more detail below, the lookahead data may be updated at 5212 to indicate whether a given level 3 dirty cell includes a level 4 dirty cell that is intersected by the ray; the level 3 dirty cell is said the have a "level 4 hit." In addition, the lookahead data further may be further updated to indicate that a given level 3 dirty cell with a level 4 hit has been tested for ray-object intersection at 5214.

At 5216, if there was a ray-object intersection, then at 5218, the object data may be stored with the ray data for subsequent processing. If there was no ray-object intersection, then at 5220 if there are additional level 3 dirty cells in the current level 2 dirty cell that contain a level 4 hit, then processing continues in 5222. Traversal through the level 2 dirty cell is repeated to identify the next three closest level 3 dirty cells using the updated lookahead data to omit the level 3 dirty cell that was just tested. Processing may continue to 5210, where the cycle is repeated with level 4 traversal of the next three closest level 3 dirty cells.

If, at 5220, there are no more level 3 dirty cell in the current level 2 dirty cell, then the process may continue to traverse the ray through the scene. For example, the ray may be processed at the next level 2 cell, or at the next level 1, or exit the scene, as the case may be.

In a particular implementation, for example, with regard to the section on Ray Attributes, each ray can replace its 24-bit ray flags with XYZ lookahead flags (lookahead data). As a ray enters a 'new' Level 2 cell for traversal, these bits could all be set to '1' for valid. In some embodiments, each X, Y, and Z lookahead flag may be an 8-bit register, each bit corresponding to a cell's location along respective X, Y, and Z axes:

X_flags 8-bit

Y_flags 8-bit

Z_flags 8-bit

The lookahead flags can be used in connection with block 1512 (FIG. 15F) for identifying dirty cells. The direction of the ray, Pos or Neg, will determine which XYZ_Plane_Valid[ ] to use (reference discussion of block 1508, FIG. 15D above):

if Xd is pos, the X_flags will correspond to X_Plane_Valid [0-7]

if Xd is neg, the X_flags will correspond to X_Plane_Valid [1-8]

The following pseudo-code fragment may be used to set the XYZ lookahead flags:

PSEUDO-CODE FRAGMENT LVIII.

```
Ray.X_flags [ 0 – 7 ] = 1     // initialize each of the 8 bits to logic '1'
Ray.Y_flags [ 0 – 7 ] = 1     // initialize each of the 8 bits to logic '1'
Ray.Z_flags [ 0 – 7 ] = 1     // initialize each of the 8 bits to logic '1'
For ( i = 0 ; i < 7 ; i++ )
  If ( Xd pos)
    t_valid_X_Plane [ i ] = t_valid_X_Plane [ i ] & Ray.X_flags [ i ]
  Else
    t_valid_X_Plane [ i +1 ] = t_valid_X_Plane [ i +1 ] &
    Ray.X_flags [ i ]
Ray.X_flags= t_valid_X_Plane [ ]
// similar pseudo-code for Y_flags and for Z_flags
```

As an example, suppose a ray intersects six dirty level 3 cells in the following order A, B, C, D, E, and F:

1) In an embodiment, the lookahead may process three cells at a time, as described for example in FIGS. 40 and 40A. In some embodiments, a comparator tree may be used to find the 3 closest Level 3 Dirty cells using ray distance.
2) Get the XYZ_Addr for the first three Dirty cells A, B, C.
3) Access the values from the L4_Header_Table (either Relative or Absolute, implementation specific).
4) Get the 3 independent Level 4 Ray_Grid_Blocks from the GTU.
5) Compare Level 4 Ray_Grid_Blocks with values from L4_Header_Table.

After comparing L4_Ray_Grid_Blocks with L4_Header_table for cells A, B, and C, suppose:

cell A was a Ray Miss (i.e., no ray intersection with dirty level 4 cells)

cell B was a Ray Hit cell C was a Ray Hit 1) the bits in the lookahead flags that correspond to cell A are set to '0'
2) the bits in the lookahead flags that correspond to cell B are set to '0'—Lookahead flags are updated for traversal. Ray.L3_XYZ_Addr is updated to store the cell address of cell B
3) the bits in the lookahead flags that correspond to cell C are set to '1'—can still use in the next pass The ray can be tested for object intersections with cell B. If NO Ray/Object intersections occurred in cell B, then the ray would check if all lookahead flags are set to 0. If they are, then there are no more Level 3 Dirty cells for the ray to traverse in the current Level 2 cell. If any bit in the lookahead flags is a '1', then the ray can continue traversing the current Level 2 cell.

In our example, suppose the ray returns from Ray/Object intersections at cell B with a Miss (i.e., no object intersection in cell B). The GTU generates Level 4 Ray_Grid_Blocks with the updated lookahead flags. The next three Dirty Cells at Level 3 to process are C, D, E.

After comparing L4_Ray_Grid_Blocks with L4_Header_table for cells C, D, and E, suppose:

cell C was a Ray Hit cell D was a Ray Miss (i.e., no ray intersection with dirty level 4 cells)

cell E was a Ray Miss 1) the bits in the lookahead flags that correspond to cell A are set to '0'—Lookahead flags are updated for traversal. Ray.L3_XYZ_Addr is updated to cell C
2) the bits in the lookahead flags that correspond to cell B are set to '0'
3) the bits in the lookahead flags that correspond to cell C are set to '0'

The ray can be tested for object intersections with cell C. If NO Ray/Object intersections occurred in cell C, then the ray would check if all lookahead flags are set to 0. If they are, then there are no more Level 3 Dirty cells for the ray to traverse in the current Level 2 cell. If any bit in the lookahead flags is a '1', then the ray can continue traversing the current Level 2 cell.

In our example, suppose the ray returns from Ray/Object intersections at cell C with a Miss (i.e., no object intersection in cell C). The GTU generates Level 4 Ray_Grid_Blocks with the updated lookahead flags. The Dirty Cells at Level 3 is cell F.

After comparing L4_Ray_Grid_Blocks with L4_Header_table for cell F, suppose cell F was a Ray Miss (i.e., no ray intersection with dirty level 4 cells). As above, the bits in the lookahead flags that correspond to cell F are set to '0'. A this point, the lookahead flags are now '0'. The ray leaves the current Level 2 cell. The ray has been advanced by updating Ray_t_current, then continues traversal at Level 1 testing for the next Level 2 Dirty cell, and Level 3 Dirty cell.

If there is a Ray MISS at Level 1:

1) The current resources allow 48K rays for Fine grain binning. As a ray leaves the current Level 1, it can be replaced by a new ray to keep the concurrent processing of 48K rays. Note: If the total number of rays is less than 48K for the current Level 1 cell, then the architecture will keep cycling through until the ray count is 0, and all current Level 1 rays have either terminated, or exited the current Level 1 cell.
2) The Missed ray goes through Ray_Traversal( ) from the top with Level 1, and traverses until it Hits a Level 3 Dirty cell. This ray is then sent out to an unordered, bulk storage for all rays that were in the current Level 1 cell, but have missed any object intersections.
3) Or after Ray_Traversal( ), the ray is placed in a unordered bulk storage for all rays that missed the objects in their corresponding Level 1 cells.

B. Lookahead Traversal/Ultra-Fine Grain

If keeping Level 4 data accessible or moving the Level 4 data is more expensive than calculating data, then in some embodiments we can perform all the lookahead flag operations while the Level 4 data sets are in place.

Supporting lookahead traversal is if a ray would miss all Objects in the first Level 3 cells, that all the data to perform the Ray_Traversal( ) calculations would have to be moved again, the Ray_Traversal( ) calculations performed again, and the ray would go through Fine grain binning And though a ray can intersect with up to 3d-2 cells, the average ray will intersect with less than that, with the only cells that matter being the dirty cells.

Traversing a Level 2 cell, the GTU will output Ray_Grid_Block for Level 3, which indicates all the cells the Ray intersects in a Grid. L3_Ray_Dirty_cells=L3_Ray_Grid_Block bit-wise AND operation with the Dirty/Clean bits for the L3_Block. L3_Ray_Dirty_cells, for a 512-cell Grid is a max 22 Dirty cells.

An advantage is that this does not use a comparator tree, but instead uses parallel RtAE(s), where ray distance order does not matter. The disadvantage for lookahead traversal using a comparator tree is that if the ray intersects an Object in the first Level 3 cells, then the extra work of lookahead traversal would still have been unnecessary and could have been avoided.

In this embodiment, the lookahead flags can be a vector of 512 bits, each bit corresponding to a level 4 cell. As an example, suppose a ray intersects six dirty level 3 cells in the following order A, B, C, D, E, and F:

1) Ray distance order doesn't matter. Take Level 3 output from GTU Ray_Grid_Block. Save values from Level 3 for Level 4 Traversal.
2) Perform a bit-wise AND operation with the L3 Block and the output from the GTU L3_Ray_Grid_Block to find all Dirty cells the Ray hits=L3_Ray_Dirty_cells
3) #Ray_Dirty_cells=Block_Count (L3_Ray_Dirty_cells)
4) For using 64-bit Level 4 Traversal, 3 independent 64-bit Grid can be executed in parallel. GTU outputs 3 independent 64-bit L4_Ray_Grid_Block[0-2].

```
Current_Cell#                  = 0
Lookahead_L3_Block [ 0 – 511 ]  = 0 // lookahead flags
While ( #Ray_Dirty_Cells != 0 )
// Parallel
  Cell_Addr      = RtAE ( L3_Ray_Dirty_Cells , Current_Cell# )
  L4_Header      = L4_Header_Table [ Cell_Addr ]
  If ( ( L4_Header bit-wise AND L4_Ray_Grid_Block [ 0 ] ) != 0 )
    Lookahead_L3_Block [ Cell_Addr ] = 1
  Current_Cell# = Current_Cell# + 1
  #Ray_Dirty_Cells = #Ray_Dirty_Cells – 1
  If ( #Ray_Dirty_Cells != 0 )
    Cell_Addr = RtAE ( L3_Ray_Dirty_Cells , Current_Cell# )
    L4_Header = L4_Header_Table [ Cell_Addr ]
    If ( ( L4_Header bit-wise AND L4_Ray_Grid_Block [ 1 ] ) != 0 )
      Lookahead_L3_Block [ Cell_Addr ] = 1
    Current_Cell# = Current_Cell# + 1
    #Ray_Dirty_Cells = #Ray_Dirty_Cells – 1
  End If
  If ( #Ray_Dirty_Cells != 0 )
    Cell_Addr = RtAE ( L3_Ray_Dirty_Cells , Current_Cell# )
    L4_Header = L4_Header_Table [ Cell_Addr ]
    If ( ( L4_Header bit-wise AND L4_Ray_Grid_Block [ 2 ] ) != 0 )
      Lookahead_L3_Block [ Cell_Addr ] = 1
    Current_Cell# = Current_Cell# + 1
    #Ray_Dirty_Cells = #Ray_Dirty_Cells – 1
  End If
// End Parallel
End While
```

5) Re-run Level 3 Traversal, but substitute Lookahead_L3_Block for L3_Block
6) Store new Lookahead flags As a Ray will Traverse Level 3, the Lookahead flags already have the encoding for Level 4 Traversal.

As an example, consider that a ray intersects 6 dirty level 3 cells in the following order A, B, C, D, E, and F:

1) L3_Ray_Dirty_cells = Dirty Bits for cells *A*, *B*, *C*, *D*, *E*, *F*

= L3_Block bit-wise AND L3_Ray_Grid_Block

2) Lookahead Traversal is done on the Relative Order of Dirty Bits in L3_Ray_Dirty_cells. But result will be the same, so for example, will keep the same cell order as the Ray distance order.
3) After comparing the cells, in Relative Order, from L3_Ray_Dirty_cells, L4_Ray_Grid_Blocks with L4_Header_table for cells A, B, & C
   cell A was a Ray Miss
   cell B was a Ray Hit
   cell C was a Ray Hit
   1. Lookahead_L3_Block[cell A Addr]='0'
   2. Lookahead_L3_Block[cell B Addr]='1'
   3. Lookahead_L3_Block[cell C Addr]='1'
4) After comparing the cells, in Relative Order, from L3_Ray_Dirty_cells, L4_Ray_Grid_Blocks with L4_Header_table for cells D, E, & F
   cell D was a Ray Miss
   cell E was a Ray Miss
   cell F was a Ray Miss
   1. Lookahead_L3_Block[cell D Addr]='0'
   2. Lookahead_L3_Block[cell E Addr]='0'
   3. Lookahead_L3_Block[cell F Addr]='0'
5) Re-Run Traversal at Level 3, but substitute Lookahead_L3_Block for L3 Block
6) Store XYZ_Lookahead flags for Ray Now Traversing at Level 3, has the Level 4 Traversal Encoded in the Lookahead flags. For the current Level 2 cell, Level 3 Traversal is now done with Level 4 Spatial Accuracy.

Storing the data at, and Fine Grain Binning the Rays, to a Coarser Grain at L3=23, but Traverse the Rays at a Finer Grain Traversal L3 Block=26 or 29, the L3 Block of Dirty Bits could be masked to only perform Lookahead Traversal in the Coarser Grain Block.

C. Extending GTU Resources

It can be appreciated that adding more GTU resources can result in more parallel Ultra-Fine Grain cells per cycle. For example, instead of 3 Ultra-Fine Grains cells per cycle, tripling the FPMUL, FPADD, and FPCMP of a GTU allows 9 Ultra-Fine Grain cells per cycle. The number of FPDIV does not need to be increased.

V. Ray Miss—Next Level 1 Cell

Ray Miss—Next Level 1 Cell will use the Coarse grain Memory for Binning the Rays in the Current Level 1 Cell, but Miss all objects in the Current Level 1 Cell. When a Ray has missed the objects in the Current Level 1 Cell, it is Traversed through Level 1 to Level 3 until it has a Level 3 hit, then it is Coarse grain Binned to the corresponding Level 1 Cell.

If the Coarse grain Memory is 4 MB, then 512 bins partitions the memory into 8 KB data packets for Packet Binning. The value of this memory saves an off/on-chip data transfer for every Ray that goes through Traversal and has a Level 3 hit in a different Level 1 Cell. After Ray Traversal from Level 1 through Level 3, the Rays are Coarse grain Packet Binned to Level 1. A current Ray Bin will be cleared out when an active Dirty Level 1 Cell becomes the Current Level 1 Cell.

For Ray Traversal, having the three large memories allows for continuous flow of data while organizing it on-the-fly for Coarse grain Binning, Fine grain Binning, and Traversal.

When a Level 1 Cell becomes the Current Level 1 Cell, then the corresponding Bin of Rays stored with Ray Miss—Next Level 1 Cell will be transferred into Fine grain Binning for the Current Level 1 Cell.

VI. Self-Atomic Rays

When there is a large number of rays, the overhead to centrally manage the rays can create significant latency and storage issues. Accordingly, in some embodiments, all rays can manage themselves, and can complete, and/or launch new rays, based on type of ray and data stored as attributes associated with each ray and object independently of other rays. For example, when a primary ray hits an object, multiple rays can be cast from the result, such as shadow rays, reflection rays, diffuse rays, refraction rays, and so on. These additional rays can be cast into the ray stream to be immediately organized independently of each other. Because rays are atomic, they do not need to reference any stack and there is no need for a central or main controlling process to manage the progress of the rays.

The processes shown in FIGS. 46 and 48 illustrate self-atomic processing. At block 4608, for example, completed rays (from block 4606) that do not generate any new rays take the NO branch and exits. For completed rays where there are reflections, shadow, etc., new rays are generated and then exit. The newly generated rays are passed to block 4610 for processing via the YES branch. The newly generated rays may be processed independently of each other.

A. Ray Attributes

Each ray will need a new set of attributes. It will be implementation specific which attributes will be replaced. Following are some attributes:

Ray-Type: 2-bits, '00'—Primary/Diffuse/Reflection—Primary when Ray-Level=0
   '01'—Shadow
   '10'—Refraction
   '11'—Ray origin is at a Light Source if Ray-Level==0
      Shadow for Refraction Ray if Ray-Level !=0

Ray-Level 4-bits, '0000'—Bounce level for each Ray
   Primary when Ray-Level=0
   Shadow Rays keep their level the same as Originating Ray.

For example, if there are 4 light sources, and the surface is reflective, then a Primary Ray striking this surface could generate 4 Shadow Rays, including a Reflection Ray. The Ray-Type, and Ray-Level attributes will be set for each Ray. All Rays, at all bounce levels, will have the same Ray # as the originating Primary Ray #.

Primary Ray #P, has attributes:

| | | |
|---|---|---|
| Ray # | = P | Ray-Type = '00' Ray-Level='0000'= 0 Primary |

For example, if Primary Ray #P hits a Triangle and launches 4 Shadow Rays, and one Reflection Ray, the Rays will have the following attributes respectively:

| | | | | | | |
|---|---|---|---|---|---|---|
| Ray # | = P | Ray-Type | = '01' | Ray-Level | = 0 | shadow |
| Ray # | = P | Ray-Type | = '01' | Ray-Level | = 0 | shadow |
| Ray # | = P | Ray-Type | = '01' | Ray-Level | = 0 | shadow |
| Ray # | = P | Ray-Type | = '01' | Ray-Level | = 0 | shadow |
| Ray # | = P | Ray-Type | = '00' | Ray-Level | = 1 | reflection |

If a Reflection Ray hits a Triangle and launches 4 Shadow Rays, and two Diffuse Rays, the Rays will have the following:

| | | | | | | |
|---|---|---|---|---|---|---|
| Ray # | = P | Ray-Type | = '01' | Ray-Level | = 1 | shadow |
| Ray # | = P | Ray-Type | = '01' | Ray-Level | = 1 | shadow |
| Ray # | = P | Ray-Type | = '01' | Ray-Level | = 1 | shadow |
| Ray # | = P | Ray-Type | = '01' | Ray-Level | = 1 | shadow |
| Ray # | = P | Ray-Type | = '00' | Ray-Level | = 2 | diffuse |
| Ray # | = P | Ray-Type | = '00' | Ray-Level | = 2 | diffuse |

B. Triangle Attributes

Implementation decisions will be made on how to store the Triangles. This disclosure will use individual Triangles as primitive objects without loss of generality. Each Triangle can be defined as:

Triangle #4-Bytes

P0(X, Y, Z)-Bytes

P1(X, Y, Z)-Bytes

P2(X, Y, Z)-Bytes

Total-Bytes

Storing the minimum data for a Triangle has an advantage of less data transferring during Traversal, but the Ray may need to get to more Triangle data, such as vertex normals, to launch an extension ray.

For Ray_Traversal( ) a Triangle can be stored as 40-Bytes, 48-Bytes, or 64-Bytes. If 64-Bytes are used, then 24-Bytes could be used for information, such as coordinates, coefficients, or indices for lookup into a table, for the Reflection, Diffuse, and/or Refraction Rays. Also, if the MAX number of Triangles can be limited, then part of the 32-bit Triangle # could be designated as control bits. Persistent maps or functions could be available for the Reflection, Diffuse, and/or Refraction Rays.

As an example, suppose MAX number of Triangles is 16M=24-bits. This leaves 8-bits, of the Triangle #, for control bits for Reflection, Refraction, and other implementation capabilities. The extra byte results in 25-Bytes available for Ray bounce calculations.

An advantage of storing this data, with the Triangle, is an immediate launch of Reflection, Diffuse, and/or Refraction Rays. The sooner a Ray is launched, the sooner it will finish. A positive cumulative effect for Ray Paths with many bounce levels. Another advantage includes that access to fragment shading data is kept to end of Ray Completion.

However, if the shader involved is too sophisticated to efficiently fit the variables as Triangle attributes, then the Rays will need to go through Re-Assembly at every bounce level. Though Ray Re-Assembly will group the Rays with common access to fragment shading data, the disadvantage is an access to the fragment shading code per bounce level. Fragment shading data could be stored in a Global Triangle List, or by Level 1 cell, and/or Level 2 cell, and/or Level 3 cell, and be available for Ray Completion, and/or launch of extension Rays.

Triangle Attributes Extended—In foregoing embodiments, Triangle binning was demonstrated with 4 MB of memory, and 64B per Triangle. From the current 3 large memories, the system now could have 12 MB of memory. Leading to either more Triangles in a Data Packet, or Triangles using a larger memory footprint such as 128B allowing more capability for self-atomic rays. If the Triangles used during Traversal are allocated more attribute space, then these attributes should be used for immediate launch of the extension Rays.

C. Ray Completion

When an individual Ray hits an object, traverses a max distance, or exits due to missing all scene objects, it will be taken out of the Ray Stream and stored as a completed Ray. It will be implementation specific whether to store these Rays as separate Ray-Types. For example, if a scene would have Light Sources too numerous to keep in persistent memory, have a separate Ray-Type group for completed Shadow Rays could be beneficial for separate passes through Ray Re-Assembly. If separate Ray-Types are used for grouping, then separate Ray Completion buffers should be implemented. This research paper will group all completed Ray-Types together, and assumes the Light Sources are persistent.

When a Ray completes, some of the current attributes will be over written with new information necessary to group the Rays, and data for the shaders. There are two basic types of rays: rays that are cast towards light sources, and rays that are cast to intersect with scene objects. Primary, Diffuse, Reflection, and Refraction are types of rays that will be cast to intersect with scene objects, returning attribute info about the object. Shadow is a type of ray that will be cast towards a light source returning different attribute info for a light source as compared to an object.

When a Primary type Ray completes, some attribute(s) need to be returned to allow the Rays to be grouped. Attributes such as Ray #, Triangle #, Spatial Hierarchy, Ray-Type, Ray-Level, distance, intersect point, etc. When a Shadow type Ray completes, some attribute(s) returned could be the Triangle # it was launched from, Ray #, Light #, Ray-Type, Ray-Level, etc.

Ray Completion Buffer—As any Ray completes it is stored in a Ray Completion Buffer to be sent out off-chip, when the buffer has enough Rays for a burst transfer to a large memory space for all completed Rays. Primary, Shadow, and all bounce level of Rays will be stored in this Ray Completion memory space. This research paper will use a single memory space for all Rays. Multiple Ray Completion Buffers could be used if Rays would be grouped by Ray-Type. If a larger memory is used for the Completion Buffer, then this could be used to Packet Bin to save an on/off chip transfer for Ray Re-Assembly.

Ray Completion Size—This disclosure assumes, without loss of generality, that the Ray Completion Size would be the same as the Ray size. However, this is entirely implementation specific (as to the size of a completed Ray) and does not need to match the size of the originating Ray.

VII. Ray Re-Assembly

With Self-Atomic Rays, the rays will complete in entirely random order. Accordingly, a mechanism is provided to group the rays to their corresponding shaders. Fragment shading data will be stored in an implementation specific organization, but this research paper will either store the fragment shading data with the object (e.g., triangle), or store the fragment shading data with the spatial hierarchy.

A. Rays to Objects

If the fragment shading data is attached to the Triangles, then store the Triangle Data in linear order by Triangle #. Organize the rays to access the Triangle data.

Every ray will have a triangle # attribute returned when it completes.

For primary type rays, the triangle # identifies the triangle that the ray hits.

For shadow type rays, the triangle # identifies the triangle that launched it.

There are many ways to group rays, but for this section, the rays will be grouped in the following attribute order:

Triangle #

Ray #

Ray-Level

Ray-Type

Intersection Point—if multiple diffuse type rays are launched per object

At 32-bits, there could be 4 billion triangles, consideration needs to be given as to how many triangles are in a scene. Per frame, the starting place for grouping rays to triangles will be determined by the number of triangles. For example, there is no need to set up binning for 4 billion triangles when a scene has 2M triangles. The architecture has been setup for 512-bins using 9-bits per level. If the scene has 2M triangles, then it only needs 21-bits for the Triangle #s, bits [20–0]. The Binning could adapt and start with the MSD for Packet Binning using the first 9-bits of the Triangle #, bits [20–12].

Taking from the above example, if the scene has 2M Triangles:

1) Start packet binning with Triangle # [20–12]

2) If Bin is 16K Triangles or less, use Ray Count Binning to connect the Rays to the Triangles

OR

3) If Bin is greater than 16K Rays, then execute next level of packet binning for Attribute Order:

e.g., Triangle # [11–3]. (Next pass gets next level)

4) Repeat steps 2, 3 until all attributes have been organized in order of:

Triangle #, Ray #, Ray-Level, Ray-Type

When a bin starts Ray Count binning, all remaining levels and attributes will be grouped.

To keep the ray number within 3 Levels of binning, with 9-bits to identify a bin, the number of initial rays should be limited to 128M primary rays, or 27-bits of Ray #s. Extension rays do not have the same limitation since they also use the primary Ray #, but use Ray-Type and Ray-Level to differentiate themselves from other rays.

Ray/Object Fine Grain Binning—

Fine grain Binning has been setup for 16K Rays, so Packet Binning will be used for when the Ray Stream is greater than 16K Rays. Once a Bin, at any level, has 16K or less Rays, it can then stream through the architecture.

Figure 49:
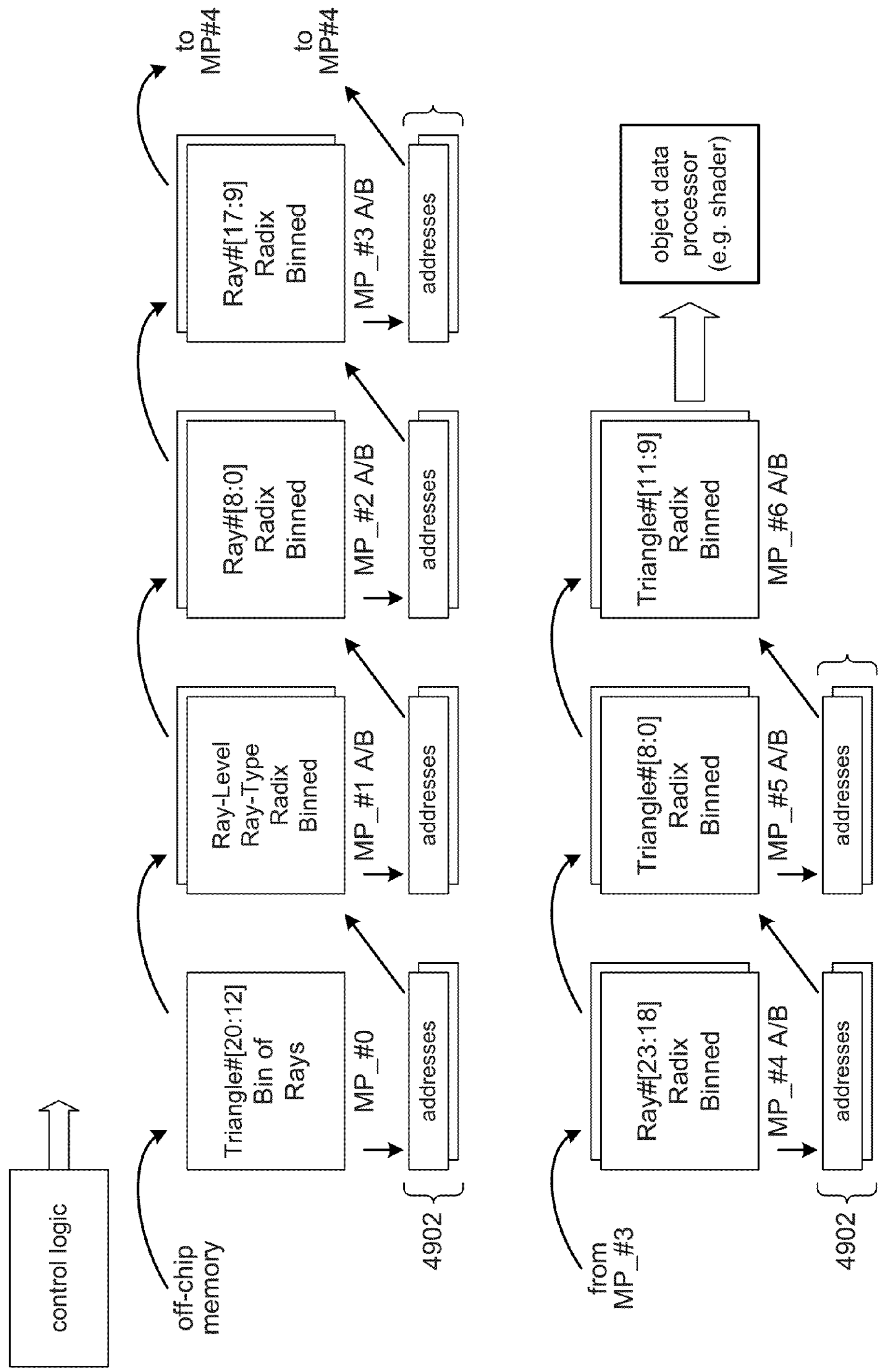
FIG. 49 shows a memory configuration for ray to object re-assembly using seven dual-memory memory partitions.

Referring to FIG. 49, in some embodiments, a memory space of 13 MB can be partitioned into 13 partitions of 1 MB each. This provides for 6 levels for Ray Count Binning. If the Primary Ray #s are within 128M, then they will be within 3 Levels of Ray Count Binning. For example:

2M Triangles Triangle # [20–0]

16M Primary Rays # [23–0]

Assume Bin# for Triangle # [20–12]≤16K Rays.

B. Ray Order 1$^{st}$ Pass

The Rays are now ordered by Triangle #, Ray #, Ray-Level, and Ray-Type. An example will provide a clearer explanation. Note: this encoding works with a single Diffuse, or Reflection Ray at any bounce level.

Suppose triangle #T has 10 rays:

2 Primary type Rays: (Rays that hit Triangle #T)

| | |
|---|---|
| Ray #P1 | Primary Ray – Bounce level 0 |
| Ray #P9 | Reflection Ray – Bounce level 2 |

8 Shadow type Rays: (Rays that launch from Triangle #T)

| | |
|---|---|
| Ray #P1 | Shadow Ray – Bounce level 0 |
| Ray #P1 | Shadow Ray – Bounce level 0 |
| Ray #P1 | Shadow Ray – Bounce level 0 |
| Ray #P1 | Shadow Ray – Bounce level 0 |
| Ray #P9 | Shadow Ray – Bounce level 2 |
| Ray #P9 | Shadow Ray – Bounce level 2 |

-continued

| | |
|---|---|
| Ray #P9 | Shadow Ray – Bounce level 2 |
| Ray #P9 | Shadow Ray – Bounce level 2 |

After going through organization with Triangle #, Ray #, Ray-Level, and Ray-Type, the rays will be ordered:

| | | | | |
|---|---|---|---|---|
| Triangle # T | Ray # P1 | Ray-Level 0 | Ray-Type 00 | Primary |
| Triangle # T | Ray # P1 | Ray-Level 0 | Ray-Type 01 | Shadow |
| Triangle # T | Ray # P1 | Ray-Level 0 | Ray-Type 01 | Shadow |
| Triangle # T | Ray # P1 | Ray-Level 0 | Ray-Type 01 | Shadow |
| Triangle # T | Ray # P1 | Ray-Level 0 | Ray-Type 01 | Shadow |
| Triangle # T | Ray # P9 | Ray-Level 2 | Ray-Type 00 | Reflection |
| Triangle # T | Ray # P9 | Ray-Level 2 | Ray-Type 01 | Shadow |
| Triangle # T | Ray # P9 | Ray-Level 2 | Ray-Type 01 | Shadow |
| Triangle # T | Ray # P9 | Ray-Level 2 | Ray-Type 01 | Shadow |
| Triangle # T | Ray # P9 | Ray-Level 2 | Ray-Type 01 | Shadow |

The rays are now organized in linear order, and grouped for common access to shared data.

The above example would take Ray # P1, and apply the fragment shading code (shader) for Triangle # T, using the returned data from the shadow rays. The shadow rays could return parameters from the light source, or even the Light # if the light source data would be persistent. When Ray # P1 is complete, then it is written to an output buffer for the 2nd pass for Ray Re-Assembly. Ray # P9 would execute similarly to the above, but with its own data sets, and returned shadow ray parameters. When Ray # P9 is complete, it is written to the same output buffer. Rays no longer needed are discarded and the Ray Re-Assembly stream is reduced.

C. Ray Order 2$^{nd}$ Pass

Only completed shaded primary type rays are now left to order. Ray re-assembly now orders every primary type ray, to all the bounce levels of all the reflected/diffuse/refracted rays, that were launched from a primary ray as the root ray. Rays will be ordered by Ray #, then by bounce level. For example, If Primary Ray #P launched a Reflection Ray at bounce level 1

Level 1 Reflection Ray launched a Reflection Ray at bounce level 2

Level 2 Reflection Ray launched a Reflection Ray at bounce level 3

Rays will be received in entirely random order. Resulting Ray order:

| | | |
|---|---|---|
| Ray #P | Ray-Level | 0 |
| Ray #P | Ray-Level | 1 |
| Ray #P | Ray-Level | 2 |
| Ray #P | Ray-Level | 3 |

Combine the results from the successive bounces to generate a final Ray result.

In a particular embodiment, the sorting in FIG. 49 may be a combined radix sort and counting sort, as illustrated in FIG. 45. At each stage (e.g., MP__#1, MP__#2, etc.), the ray data is sorted according to a given radix selected from the attributes in the ray data; the ray data is initially loaded from off-chip memory into MP__#0. The embodiment shown in FIG. 49, for example, sorts the ray data according to the following radices at each stage:

Triangle#[20:12] the high order nine bits of the triangle identifier

Ray Level and Type a combination of the ray level and ray type identifiers

Ray#[8:0] the low order nine bits of the ray identifier

Ray#[17:9] bits 9-17 of the ray identifier

Ray#[23:18] the high order 6 bits of the ray identifier

Triangle#[8:0] the low order nine bits of the triangle identifier

Triangle#[11:9] bits 9-11 of the triangle identifier

In an embodiment, each radix is sorted using a counting sort algorithm to generate counts, which can be used as addresses into the next memory partition. Thus, for example, as ray data is read into MP__#0, the high order nine bits of the triangle identifier (Triangle#[20:12]) are sorted using a counting sort, which generate counts corresponding to each value of Triangle#[20:12] encountered in the ray data. The generated counts are stored in the address registers 4902. The ray data are then stored from MP__#0 according to Triangle#[20:12] into locations in MP__#1 identified by the corresponding counts. As ray data is stored into MP__#1, the sorting continues with the next radix, namely Ray Level and Ray Type (e.g., by combining the identifiers for Ray Level and Ray Type), and generating counts corresponding to each value of Ray Level/Ray Type that occurs in the ray data where the generated counts identify locations in MP__#3. The progression continues until the ray data is completely sorted according to Triangle#, Ray#, and Ray Level & Ray Type in MP__#6.

In some embodiments, the memory partitions may be configured as dual memories such as described in FIGS. 44 and 45. Likewise, the address registers 4902 may be dual memories. The dual memories allow for a partition (e.g., MP__#1) to receive ray data concurrently as previously stored ray data is read out in order to sort ray data as fast as the data can be moved from one partition to another.

Figure 50:
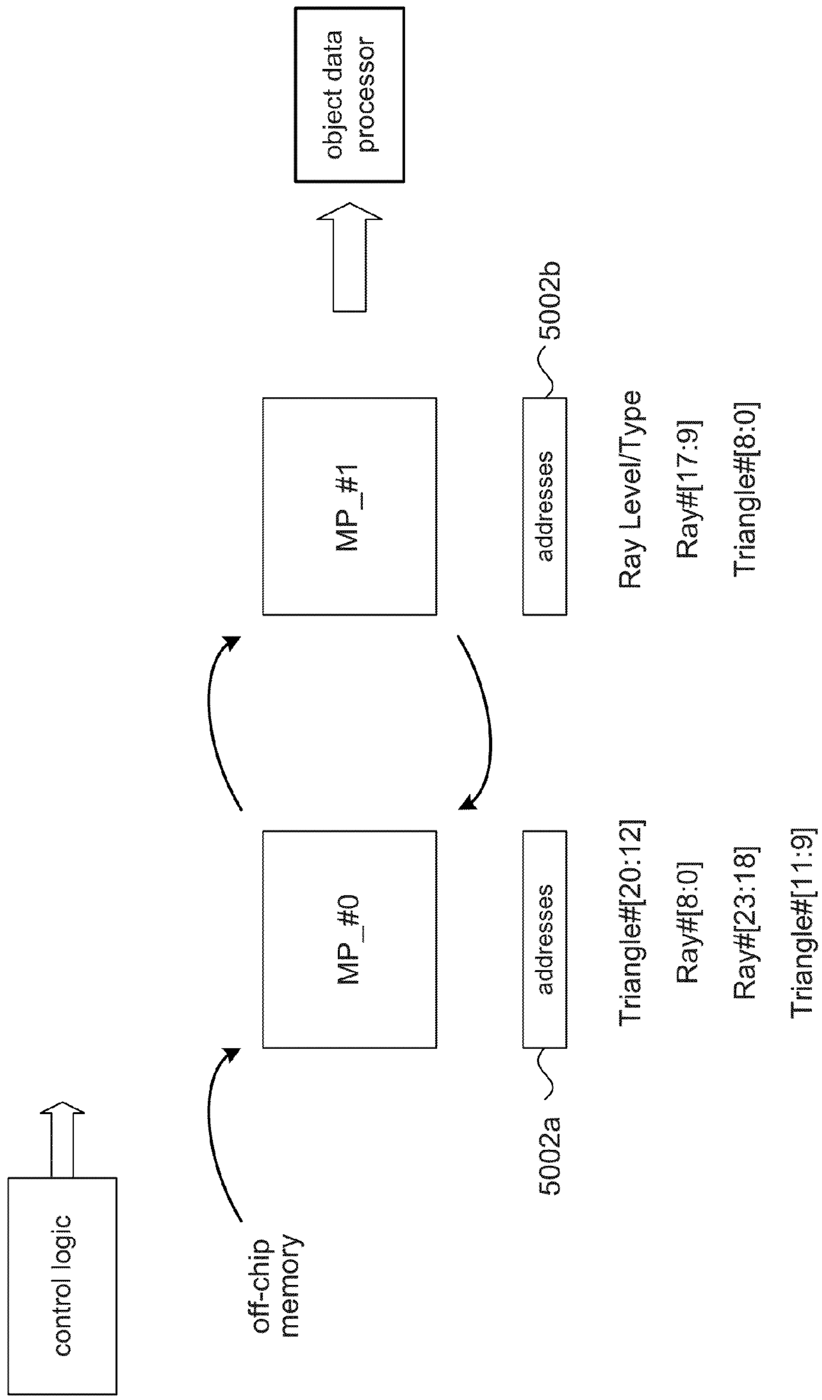
FIG. 50 shows an example of a memory configuration for ray to object re-assembly using two single-memory memory partitions.

The sorting performed by the embodiment shown in FIG. 49 can be performed using two partitions, as illustrated in FIG. 50. The ray data can be stored back and forth between MP__#0 and MP__#1, and the radices sorted by address counters 5002*a*, 5002*b* can change with each cycle. Thus, for example, in an initial cycle ray data may be initially loaded from off-chip memory into MP__#0, and address registers 5002*a* can sort on the Triangle#[20:12] radix. In the next cycle, the ray data may be copied from MP__#0 to MP__#1 using the addressing information in 5002*a* to place the ray data into MP__#1 sorted according to the Triangle#[20:12] radix. At the same time, address registers 5002*b* can sort on the Ray Level, Ray Type combination as the next radix. In the following cycle, the ray data may be copied from MP__#1 to MP__#0 using the addressing information in 5002*b* to place the ray data into MP__#0 sorted according to the Ray Level, Ray Type radix. At the same time, address registers 5002*a* can sort on the Ray#[8:0] radix. And so on with subsequent cycles.

VIII. Ray Compaction

Reducing the size of Rays will speed up the on/off-chip Ray transfers. The method to compact a ray is Data-Recalculation. Additional ray attributes can optionally not be stored, and can be recalculated when the Ray is received on-chip. The decision to compact Rays will be determined if implementation is targeted at speed or versatility.

A. Basic Ray Attributes

In foregoing disclosed embodiments, rays have currently been defined to have attributes=64 Bytes. The following 32-Bytes are a set of attributes to define a Ray:

| | |
|---|---|
| Ray # | - 32 bits |
| Xo | - 32 bits |
| Yo | - 32 bits |
| Zo | - 32 bits |
| Xd | - 32 bits |
| Yd | - 32 bits |
| Zd | - 32 bits |

Ray_t_current or Ray_t_max—32 bits

If Ray_t_current is saved, then Ray_t_max can be used when set as a global variable, or assigned to a type of Ray, or as a local variable Ray_t_max at Ray Launch. If Ray_t_max is saved, then Ray_t_current will be recalculated with t_min_cell of the current L3 cell.

B. Additional Ray Attributes

The following 32-Bytes of attributes may be viewed as additional to transfer on/off-chip:

Ray_t_current or Ray_t_max—32-bit, see above t_max_cell—32-bit, can be recalculated Level 1,2,3 XYZ_Addr—32-bit, can be recalculated Object_Handle__1—32-bit, used for precision problems that may occur when launching a Ray from an Object. Ignore the Object when normal faces Ray. Will be allocated when a Primary type launches secondary type Rays. Can be discarded after Ray has traversed the Level 3 cell that it was launched from.

Object_Handle__2—32-bit, same as Object_Handle__1, but Ignore the Object when normal faces away from the Ray.

Control/Flags—32-bit, move 1-bit to Ray # for: '0' Closest, '1' Any

L4_Block_Ray—64-bit, can be recalculated

C. Ray # Attribute

Self-Atomic rays, to be organized, need to differentiate themselves. The ray attributes to do this were Ray #, Ray-Level, and Ray-Type. To add the Ray-Level and Ray-Type attributes to the 32B Core ray attributes, then part of the 32-bits defined for Ray # will be allocated for these attributes. Attributes can be implementation modified.

Ray-Level—4 bits

Ray-Type—2 bits

Closest/Any—1 bit

Leaving 25-bits for the Ray #=32M Primary Rays.

D. Ray Completion

When a Primary type Ray completes, the Xd, Yd, and Zd attributes will be replaced by the values of Ray/Object intersection. Ray_t_current will be replaced by the Triangle #. Values such as distance and direction can be recalculated.

With Ray Compaction, the Triangle # would not need to be stored with the Shadow Rays. Shadow Rays will launch with the Ray/Object intersection as the attributes Xo, Yo, and Zo. When a shadow ray completes, it will retain these attributes to organize the Rays.

E. Ray Re-Assembly

For compacted 32B rays, there's no room to store the attribute Triangle # with a shadow type ray. For Multiple Diffuse Rays, their corresponding Shadow Rays will organized by their spatial location, which will use the Xo, Yo, and Zo attributes. As the Rays are transferred, the attribute Level 1,2,3 XYZ_addr will recalculated. The Ray Order 1st Pass will be:

Level 1,2,3 XYZ_addr

Ray #

Ray-Level

Ray-Type

Instead of using Triangle # as the major index, the Rays will be start the organization with their location in the spatial hierarchy using attribute Level 1,2,3 XYZ_addr. This promotes storing the fragment shading data within the spatial hierarchy. The same ray re-assembly process described above applies to Bin sizes, when a Bin can start the Ray Count binning, and use the stream organizing. For example, suppose we have:

2M Triangles Triangle # [20-0]

16M Primary Rays # [23-0]

Figure 51:
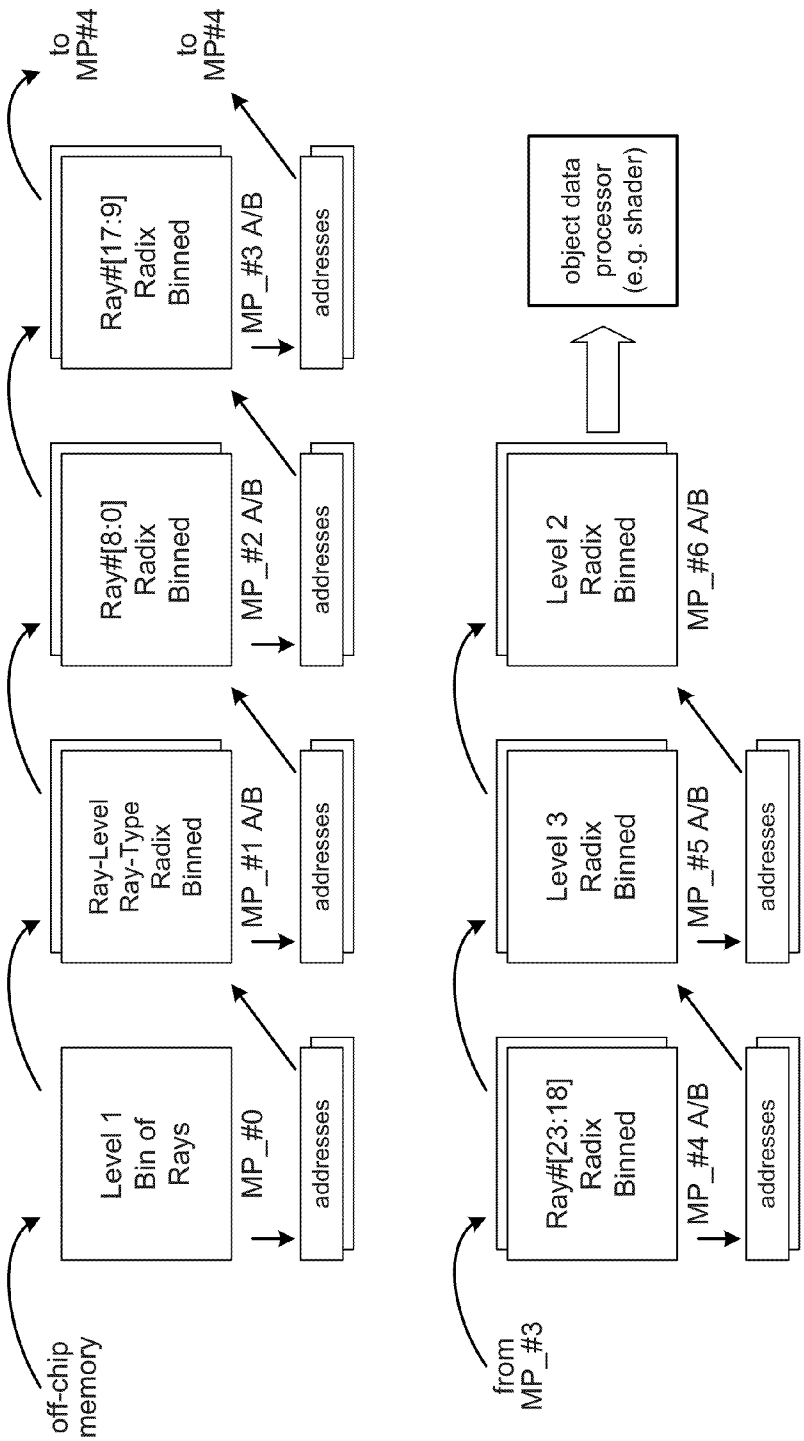
FIG. 51 shows a memory configuration for ray to spatial hierarchy re-assembly using seven dual-memory memory partitions.

Assume Bin# for Level 1 cell≤16K Rays. FIG. 51 shows the ray to spatial hierarchy re-assembly flow. The embodiment shown in FIG. 51 uses the same dual memory configuration as in FIG. 49, and sorts on different radices.

F. Multiple Diffuse Rays

If a Primary type ray hit can launch multiple diffuse rays, the method to group the shadow rays to the corresponding diffuse ray will use the Ray/Object intersection point. It is the ending point on a completed Primary type ray, and it will be the origin location of a Shadow type ray. For example, after the ray order 1st pass:

| | | | |
|---|---|---|---|
| Ray #X | Ray-Level 02 | Ray-Type 00 | Rd = intersection point P2 |
| Ray #X | Ray-Level 02 | Ray-Type 00 | Rd = intersection point P1 |
| Ray #X | Ray-Level 02 | Ray-Type 01 | Ro = intersection point P1 |
| Ray #X | Ray-Level 02 | Ray-Type 01 | Ro = intersection point P2 |
| Ray #X | Ray-Level 02 | Ray-Type 01 | Ro = intersection point P2 |
| Ray #X | Ray-Level 02 | Ray-Type 01 | Ro = intersection point P1 |

When multiple Rays have the same Ray #, Ray-Level #, and Ray-Type is a Primary type ray, then this is code for multiple Diffuse rays. In the above example, two primary type rays are in successive order, so the following shadow type rays will belong one of the primary type rays. To avoid sorting, a Content Addressable Memory (CAM) could be used to store the intersection points for the Diffuse Rays. The size of the CAM could determine the number of Diffuse Rays at a bounce level.

CAM[0]=intersection point P2

CAM[1]=intersection point P1

The CAM could used with a counting sort, or Ray Count binning if memory space is available, to Bin the Rays with the intersection points:

| | | | |
|---|---|---|---|
| Ray #X | Ray-Level 02 | Ray-Type 00 | Rd = intersection point P2 |
| Ray #X | Ray-Level 02 | Ray-Type 01 | Ro = intersection point P2 |
| Ray #X | Ray-Level 02 | Ray-Type 01 | Ro = intersection point P2 |
| Ray #X | Ray-Level 02 | Ray-Type 00 | Rd = intersection point P1 |
| Ray #X | Ray-Level 02 | Ray-Type 01 | Ro = intersection point P1 |
| Ray #X | Ray-Level 02 | Ray-Type 01 | Ro = intersection point P1 |

The completed Diffuse Rays are now in order with their corresponding completed Shadow Rays.

IX. Ray Traversal Unit

This section is for the architect/engineer who will implement a Ray Traversal Unit (RTU). It is not a design manual, or definitive implementation. Rather, it provides a few architectural considerations as a starting point. The view presented is from Ray_Traversal( ).

A. Traversal Memory

Figure 53:
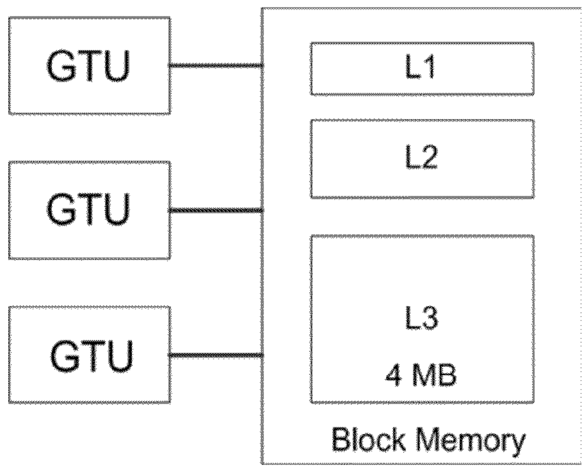
FIG. 53 shows a 3-GTU configuration of a traversal memory (traversal processing unit).

As discussed, ray traversal involves traversing through multiple levels of resolution. With 3 levels of traversal, for example, a ray would take an effective 3-cycles to traverse through the levels. Instantiating 3 GTUs could get to an effective 1-cycle. To keep the Ray Stream flowing, separate block memories can be used for each Level of Block_Mem. FIG. 53 shows an example of a hardware implementation of a traversal memory (traversal processing unit) comprising 3 GTUs and corresponding separate level 1, level 2, and level 3 memory blocks.

Figure 54:
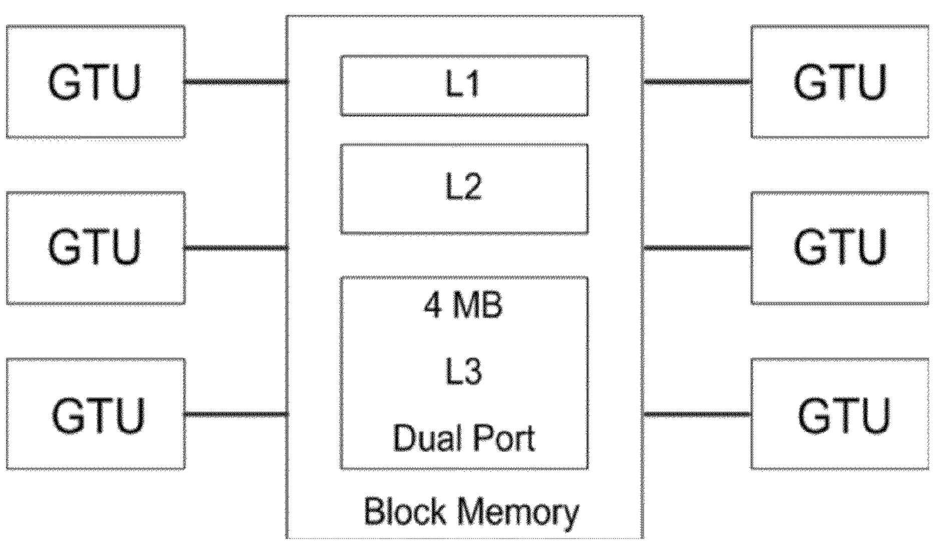
FIG. 54 shows a traversal memory using dual-ported memory.

The configuration is well suited for rays that hit a lowest level dirty cell in one pass through each level. However, rays typically need to traverse up and down levels through the spatial hierarchy before hitting a lowest level dirty cell. Either the GTUs will have to execute faster than the ray stream, or rays will need to be traversed in parallel, or both. The system speed will be determined by the access speed of the on-chip memory. In some embodiments, the traversal memory may comprise dual-ported memory blocks, such as illustrated in FIG. 54, for example. It will be appreciated that other memory configurations can provide further performance improvements; e.g., quad-port memories, larger memory layouts, and so on.

B. Coarse Grain Memory

Figure 55:
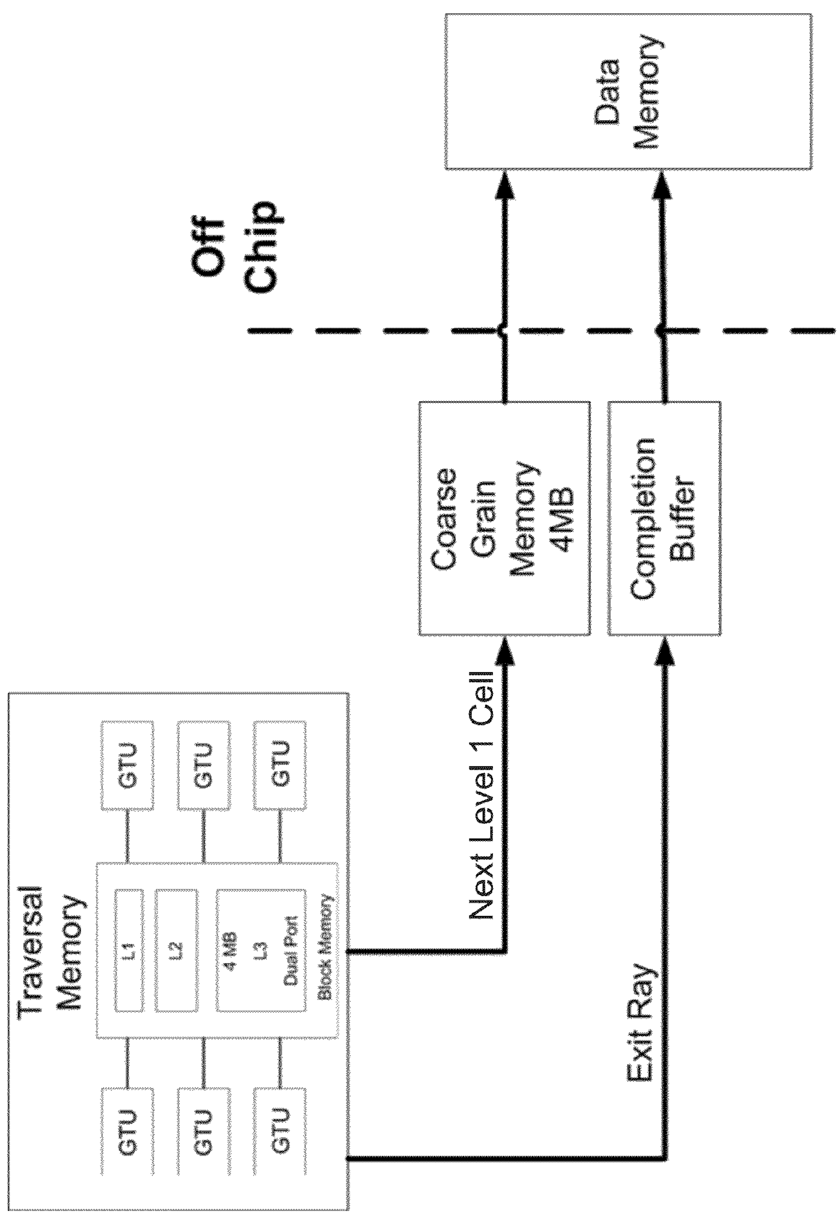
FIG. 55 shows a traversal memory configured with coarse grain memory (coarse grain binning unit).

As rays in the current level 1 cell miss, they go through Ray_Traversal( ) and either complete (traverse through all levels with no Hit), or hit another dirty level 3 cell and remain active as a ray miss from the current level 1 cell. As discussed, in some embodiments, an active ray may be coarse grain binned at level 1, and then sent out to off-chip/external memory. FIG. 55 shows an illustrative example of a hardware implementation of a traversal memory configured with a 4 MB coarse grain memory (coarse grain binning unit) to provide coarse grain binning in accordance with block 4306 (FIG. 43).

Rays that complete traversal, but exit the scene or achieve a max distance, will be sent to the completion buffer. In some embodiments, to keep up with the maximum ray traversal rate from traversal memory, the completion buffer can be a dual-port memory. In other embodiments, the completion buffer can be large enough to perform a coarse grain binning. If the completion buffer was 4 MB, then perform packet binning with MSD of either Triangle # or spatial hierarchy. This will save an on/off-chip access for every completed ray in Ray Re-Assembly.

Coarse grain memory will also have supporting memory for management of the pointer packets. This memory will function as Ray Miss—Next Level 1 Cell. To keep up with max Ray Traversal rate from Traversal Memory, the coarse grain memory can be made dual-port.

C. Fine Grain Memory, Ray Traversal Unit (RTU)

Figure 56:
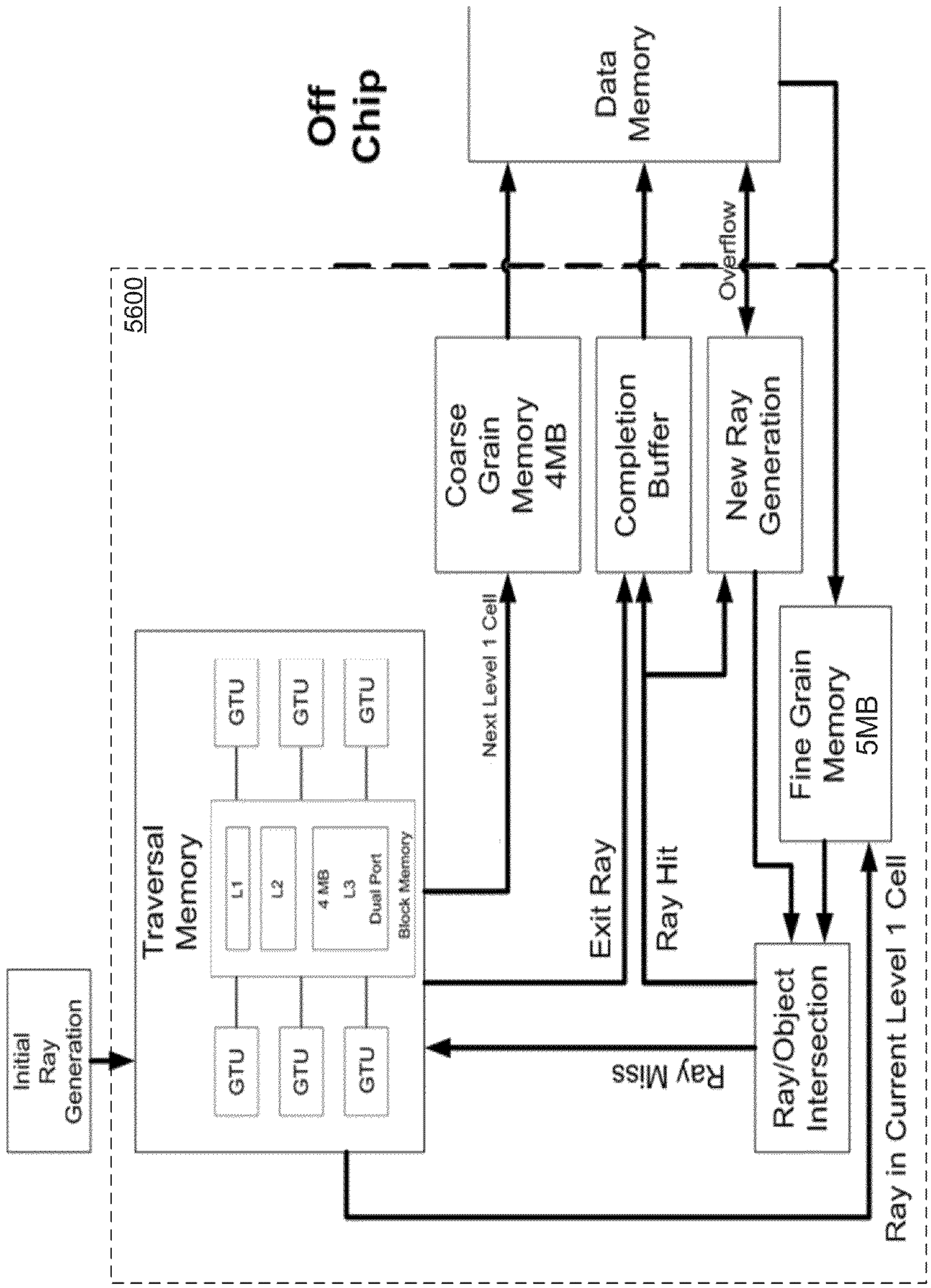
FIG. 56 shows an example of a ray traversal unit (RTU), with the addition of fine grain memory (fine grain binning unit) to the configuration shown in FIG. 55.

FIG. 56 shows a ray traversal unit (RTU) 5600 configured to operate in accordance with the process shown in FIG. 46. The RTU 5600 may include a traversal memory and coarse memory, with the addition of a fine grain memory (fine grain binning unit) to provide fine grain binning in accordance with FIG. 44. The fine grain memory will receive its inputs from either traversal memory, when the ray advances within a current level 1 cell, or from the off-chip/external memory with the rays stored for the current level 1 cell. Fine grain memory will also have supporting memory to organize the bins. To keep up with max ray traversal rate from traversal memory, the fine grain memory can be made dual-port giving priority to ray in current level 1 cell over the ray stream from off-chip data memory.

The rays from the fine grain memory will go through Ray/Object Intersection and Processing. For a Ray Miss, the Ray is sent back to Ray_Traversal( ) traverse the ray through the remainder of the scene, where the ray exits when it traverses the remainder of the scene without hitting another dirty level 1 cell, or continues processing in the current level 1 cell or in another level 1 cell. For a Ray_Hit, the ray is sent to the Ray Completion Buffer. One or more new rays may be generated from the completed ray (e.g., due to reflections or the like) and perform Ray/Object tests in the current level 3 cell. To keep up max completed ray rate from Traversal Memory and Ray/Object Intersection, the completion buffer could be made quad-port.

FIG. 56 shows that New Ray Generation may go straight into Ray/Object Intersection to take advantage of the currently loaded data. However, new ray generation could instead go into Fine grain binning if the previously loaded cell data is not saved, such as shown in FIG. 46.

D. Extended Ray Traversal Unit (RTU)

Figure 57:
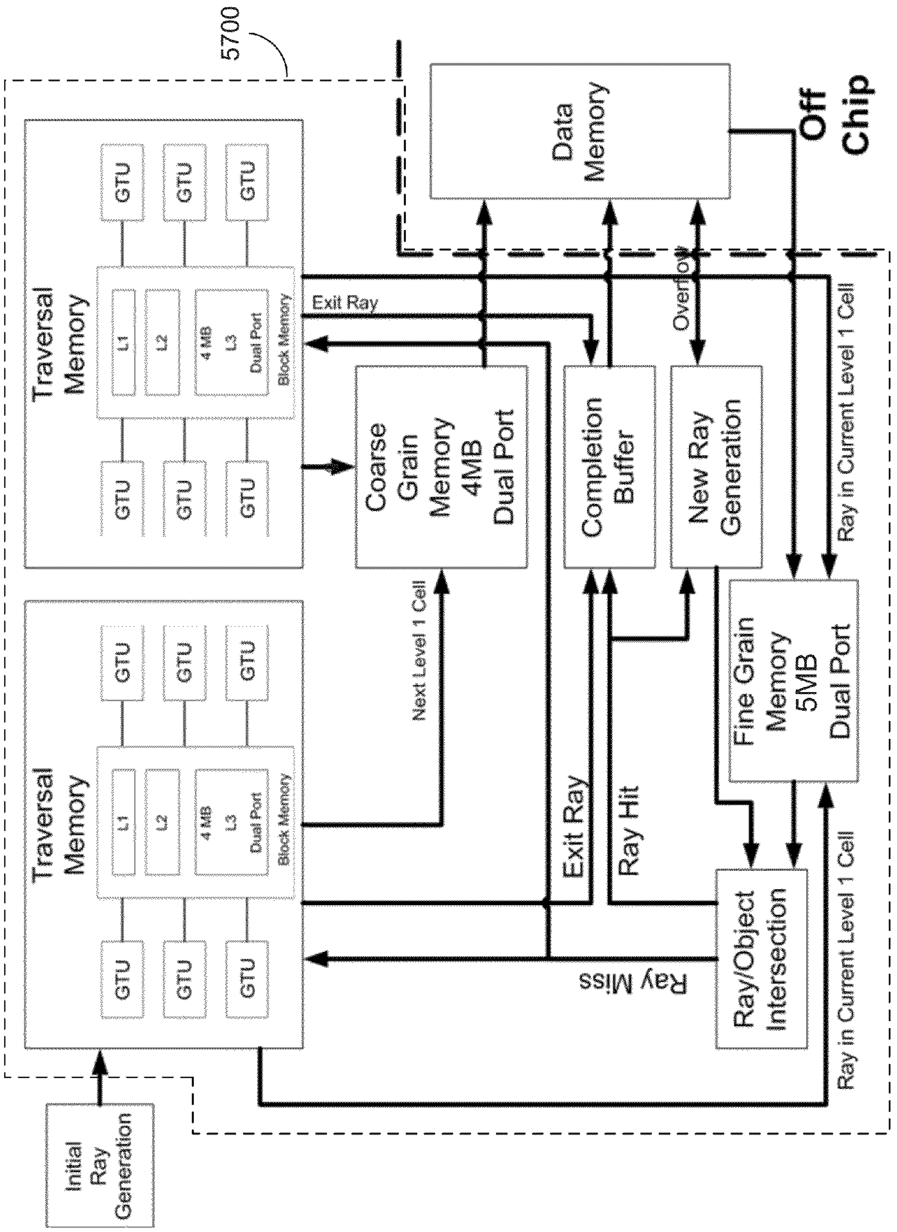
FIG. 57 shows an example of an RTU comprising dual-ported configurations of the coarse grain memories and fine grain memories illustrated in FIG. 56.

If the average Ray Traversal time is greater than an effective 2-cycles, then an additional Traversal Memory could be implemented to traverse twice the number of rays in parallel. FIG. 57 shows an example of an embodiment of an extended RTU 5700 where the coarse- and fine-grain memories are dual-ported. The extended RTU 5700 may include 17 MB of memory plus the completion buffer.

E. Parallel Ray Traversal Units

Figure 58:
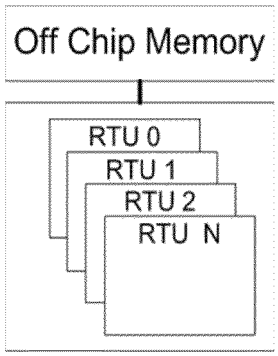
FIG. 58 illustrates an example of a configuration of parallel RTUs.

In some embodiments, parallel RTUs could be implemented if they are needed for data transfer rates that could be faster than the on-chip processing rate. FIG. 58 illustrates an example of a configuration of parallel RTUs. In some embodiments, each RTU may be configured according to FIG. 56 or FIG. 57, for example.

F. Level 4

Figure 59:
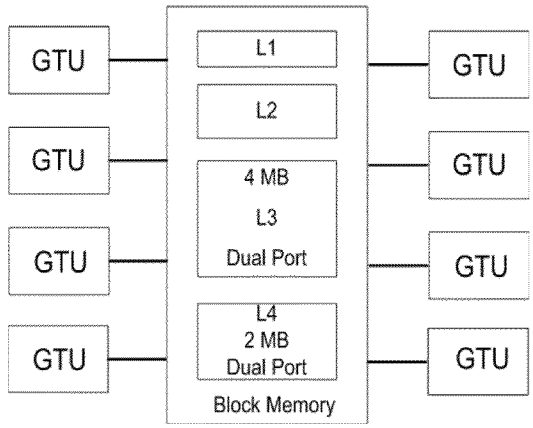
FIG. 59 shows an example of a traversal memory having additional resources for level 4.
Figure 60:
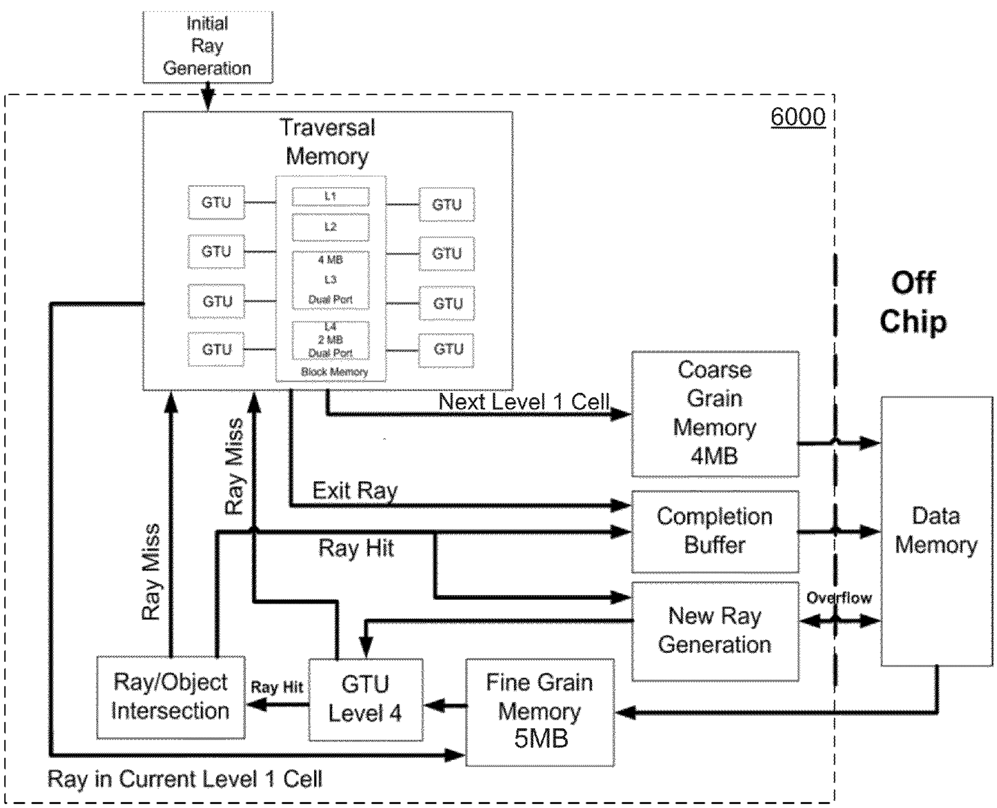
FIG. 60 shows an RTU configured for level 4.

If level 4 is provided in Ray_Traversal( ) then the traversal memory may be instantiated with another GTU with level 4 memory, such as level 4 Header Memory, or Object Memory with level 4 attributes. FIG. 59 illustrates an example of a traversal memory configured for level 4 processing. There could also be a GTU attached to the output of Fine grain binning to test the level 4 L4_Block_Ray against a level 4 memory or Object attribute. FIG. 60 shows an RTU 6000 that incorporates the traversal memory of FIG. 59 to provide for level 4 processing.

X. Triangle Attributes Extended

Two separate methods will be briefly discussed to store the Triangles:

1) Triangle List

2) Spatial Hierarchy

Originally, Triangle binning was demonstrated with 4 MB of memory, and 64B per Triangle. From the current 4 large memories, the system now could have 16 MB of memory. Leading to either more Triangles in a Data Packet, and/or individual Triangles using a larger memory footprint such as 96B, 128B, or 256B. Assembled Triangles have all the attributes attached. Traversal Triangles are a subset of Assembled Triangles with only parameters for Traversal. If the Triangles used during Traversal are allocated more attributes, then these attributes should be used for immediate launch of the extension Rays. The Input Stream to the GTU are Assembled Triangles.

A. Triangle List

As an Assembled Triangle is input, it will be sent to two separate sets of Triangles:

Triangle List—the Assembled Triangle will be written, in linear order, to the Global Triangle List.

Binned Triangles—a Traversal Triangle will be created, with a subset of Attributes from the Assembled Triangle. The smaller Traversal Triangle will have less data to be moved during binning and Traversal.

A practical view is for Triangle List and Binned Triangles each to have its own separate memory space. Binned Triangles will use full 16 MB memory space for Binning Triangle List can use other smaller memories such as completion buffer since the data is already organized in linear order Triangle # Order—As an Assembled Triangle comes in, it is assigned a Triangle # in linear order. This will identify the individual Triangle, and provide its position and location in a Global Triangle List. The Global Triangle List can be looked at as a write once, read once data set. The size, and number of Assembled Triangles should be considered as writing it once, then reading it could affect system performance.

When Level 1 Triangle Binning is complete, there will be both a Level 1 Binned Triangles using the smaller Traversal Triangles, and a Global Triangle List using the Assembled Triangles. The Level 1 Binned Triangles will now be referenced to create Level 2 Binned Triangles, then Level 2 Binned Triangles to create Level 3 Binned Triangles.

The Global Triangle List, created concurrently with Level 1 Binning, won't be referenced until Ray Re-Assembly.

B. Spatial Hierarchy

Instead of starting with the creation of two Triangle sets, binned triangles and Triangle List, level 1 binning will only create the level 1 binned triangles, but with the larger size of Assembled Triangles. Use all 16 MB for Triangle binning Use the larger memory footprint Triangles from level 1 binned triangles, and create level 2 binned triangles with Triangles of the same size. However, at level 3, in addition to level 3 binned triangles, a separate Local Triangle List can be created with the size of Assembled Triangles. Level 3 Binned triangles can then be compacted as Traversal Triangles.

Triangle # Order—For organizing Triangles by Spatial Hierarchy, the Triangle # will start over with every cell at every Level. This way, the Triangle #s can access their corresponding Triangle by position. For example, at every level 1 cell, each Triangle will receive a Triangle # in linear order, with respect to the corresponding level 1 cell. Every level 1 cell will start with Triangle # set to 0. After level 1 binning is complete, the Triangle #s could start over for each level 2 cell as it goes through level 2 binning. As well as the Triangle #s starting over for level 3. Object density can determine the method of bottom level Triangle storage.

C. Traversal Triangles

When the block level 3 Bins are complete for a block level 2 cell, based on object density, the block level 3 Bins within it can be compacted down with a modification to Write_Data_Structure( ). Or Packet Binned at a Coarser Level, and/or compacted.

ADVANTAGES AND TECHNICAL EFFECT

An entirely new architecture and method of Ray Traversal has been presented, providing the tools needed for managing the coherency of massive numbers of incoherent data sets. New encodings, new engines, new allocations of resources, new data flows, self-managing Rays and grouping to their shared data sets have been realized.

New encodings collapse the pointer tables required for indexing, thus preventing the explosion of on-chip memory requirements, and take advantage of the scene empty space to compact high spatial resolution grids onto on-chip memory. New encoders transform the iterative calculations for Absolute/Relative encoding to a single hardware function, enabling High-Radix BitMaps for low levels of indexing with Nested Grids.

Accelerating a Ray Hit is accomplished by accelerating a Ray Miss. Extremely tight spatial proximity tests are applied to Rays and Objects for greater avoidance of unnecessary Ray/Object intersection processing.

Conventional architectures are highly inefficient for the new operations required. New engines were designed to create, access, and operate on data based on these new encodings.

The architecture's organizational strength enables Self-Atomic Rays with Ray Re-Assembly. Self-Atomic Rays manage themselves and decouple Ray Traversal from the Shaders. Ray Re-Assembly organizes the completed Rays to their common Shaders, then groups the Rays, in order, to their originating Primary Ray.

Technology's ever advancing building blocks, combined with targeted design performance, will allow many optimizations and enhancements for the architects/engineers that will be involved with the implementation of this architecture.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

I claim:

1. Digital circuitry to create a database of objects in a scene for ray tracing comprising:

a plurality of data arrays in a first memory, each data array corresponding to a cell comprising the scene, each data array operative to receive and store data for objects in the scene that are at least partially contained by the cell corresponding to said each data array;

a plurality of pointer packet registers, each pointer packet register corresponding to a cell comprising the scene and operative to receive and store pointers to areas of memory in a data packet memory separate from the first memory; and control logic circuitry configured to control operation of the data arrays and pointer packet registers while the data for the objects are being stored in the data arrays, wherein the control logic circuitry:

(i) moves data from a given data array that is on-chip with respect to the digital circuitry into an area of memory in the data packet memory that is off-chip with respect to the digital circuitry when the given data array is in a full condition;

(ii) stores a pointer to the area of memory in the data packet memory into one of the pointer packet registers, wherein said one of the pointer packet registers and the given data array correspond to the same cell; and (iii) moves data from a given pointer packet register that is on-chip with respect to the digital circuitry into a corresponding pointer packet memory that is off-chip with respect to the digital circuitry when the given pointer packet register is in a full condition, wherein the control logic circuitry is distributed among the data arrays and the pointer packet registers so that the data arrays operate independently of each other and the pointer packet registers operate independently of each other.

2. The digital circuitry of claim 1 wherein the objects comprise one or more of rays, geometric shapes, or geometric surfaces.

3. The digital circuitry of claim 1 wherein the control logic circuitry is further configured to control operation of the data arrays and pointer packet registers to manage data stored in a plurality of pointer packet memories, wherein the control logic circuitry moves data from each pointer packet memory into one of the data arrays; and performs (i) to (iii) at the same time that the data from said each pointer packet memory is being stored in the data arrays.

4. The digital circuitry of claim 1 wherein the data for the objects are stored in data arrays according to the cells into which the objects have been binned.

5. The digital circuitry of claim 1 wherein the data packet memory and the pointer packet memory are separate memories.

6. The digital circuitry of claim 1 wherein the data packet memory and the pointer packet memory are the same memory.

7. The digital circuitry of claim 1 wherein the scene is partitioned into a plurality of grids, each grid is partitioned into a plurality of cells.

8. The digital circuitry of claim 1 wherein when the data is moved from the given data array into the corresponding data packet memory, the given data array is reset to accept new data, and when the data is moved from the given pointer packet register into the corresponding pointer packet memory, the given pointer packet register is reset to accept new pointers.

9. The method of claim 1 wherein the pointer packet memory stores data for a plurality of pointers.

10. The digital circuitry of claim 1 wherein (i) and (ii) are performed concurrently.

11. Digital circuitry for storing data representative of objects in a scene, the digital circuitry comprising:

a plurality of data arrays in a first memory, each data array corresponding to a cell comprising the scene, each data array operative to receive and store data for objects in the scene that are at least partially contained by the cell corresponding to said each data array;

a plurality of pointer packet registers, each pointer packet register corresponding to a cell comprising the scene and operative to receive and store pointers to areas of memory in a data packet memory separate from the first memory; and digital circuit means for controlling operation of the data arrays and pointer packet registers while the data for the objects are being stored in the data arrays, including:

(i) moving data from a given data array that is on-chip with respect to the digital circuitry into an area of memory in the data packet memory that is off-chip with respect to the digital circuitry when the given data array is in a full condition;

(ii) storing a pointer to the area of memory in the data packet memory into one of the pointer packet registers, wherein said one of the pointer packet registers and the given data array correspond to the same cell; and (iii) moving data from a given pointer packet register that is on-chip with respect to the digital circuitry into a pointer packet memory that is off-chip with respect to the digital circuitry when the given pointer packet register is in a full condition, wherein the digital circuitry means comprises control logic circuitry distributed among the data arrays and the pointer packet registers so that the data arrays operate independently of each other and the pointer packet registers operate independently of each other.

12. The digital circuitry of claim 11 wherein the digital circuitry means further controls operation of the data arrays and pointer packet registers to manage data stored in a plurality of pointer packet memories including moving data from each pointer packet memory into one of the data arrays; and performing (i) to (iii) while the data from said each pointer packet memory are being stored in the data arrays.

13. The digital circuitry of claim 11 wherein the data for the objects are stored in data arrays according to the cells into which the objects have been binned.

14. The digital circuitry of claim 11 wherein (i) and (ii) are performed concurrently.

15. A method in a ray tracing system for creating a database of objects in a scene comprising:

receiving data for objects comprising a scene;

storing the data among a plurality of data arrays in a first memory, each data array corresponding to a cell comprising the scene, each data array operative to receive and store data for objects in the scene that are at least partially contained by the cell corresponding to said each data array;

(i) when a given data array that is on-chip with respect to digital circuitry containing the given data array is in a full condition, then:

logic circuitry causing data to be moved from the given data array into a data packet memory separate from the first memory that is off-chip with respect to the digital circuitry;

the logic circuitry resetting the given data array to accept new data; and the logic circuitry storing a pointer to the data packet memory into a pointer packet register, from among a plurality of pointer packet registers, that corresponds to the same cell as the given data array; and (ii) when a given pointer packet register that is on-chip with respect to the digital circuitry is in a full condition, then:

the logic circuitry causing data to be moved from the given pointer packet register into a corresponding pointer packet memory that is off-chip with respect to the digital circuitry; and the logic circuitry resetting the given pointer packet register to accept new data, wherein the logic circuitry is distributed among the data packet memory and the pointer packet registers so that the data arrays operate independently of each other and the pointer packet registers operate independently of each other.

16. The method of claim 15 further comprising the logic circuitry moving data from each pointer packet memory into one of the data arrays and performing (i) and (ii) concurrently with the data from said each pointer packet memory being stored in the data arrays.

17. The method of claim 15 wherein the logic circuitry stores the data for the objects in data arrays according to the cells into which the objects have been binned.

18. The method of claim 15 wherein the scene is partitioned into a plurality of grids, each grid is partitioned into a plurality of cells.

19. The method of claim 15 wherein the data packet memory and the pointer packet memory are separate memories.

20. The method of claim 15 wherein the data packet memory and the pointer packet memory are the same memory.

21. The method of claim 15 wherein (i) and (ii) are performed concurrently.

* * * * *